US011845873B2

(12) United States Patent
Tateishi et al.

(10) Patent No.: US 11,845,873 B2
(45) Date of Patent: Dec. 19, 2023

(54) DYE INK COMPOSITION, DYE INK FOR INK JET RECORDING, AND INK JET RECORDING METHOD

(71) Applicant: FUJIFILM Corporation, Tokyo (JP)

(72) Inventors: Keiichi Tateishi, Kanagawa (JP); Takashi Saitou, Kanagawa (JP); Yuta Takasaki, Kanagawa (JP); Yusuke Sakai, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 229 days.

(21) Appl. No.: 17/536,088

(22) Filed: Nov. 28, 2021

(65) Prior Publication Data

US 2022/0081581 A1 Mar. 17, 2022

Related U.S. Application Data

(63) Continuation of application No. PCT/JP2020/025371, filed on Jun. 26, 2020.

(30) Foreign Application Priority Data

Jun. 28, 2019 (JP) ................................ 2019-122362

(51) Int. Cl.

| | |
|---|---|
| ***C09D 11/32*** | (2014.01) |
| ***C09D 11/328*** | (2014.01) |
| ***C09B 47/04*** | (2006.01) |
| ***C09D 11/38*** | (2014.01) |

(52) U.S. Cl.

CPC ............ *C09D 11/328* (2013.01); *C09B 47/04* (2013.01); *C09D 11/38* (2013.01)

(58) Field of Classification Search

CPC ... B41J 2/01; B41J 2/21; B41J 2/5052; B41M 5/00; B41M 1/18; B41M 1/20; B41M 1/26; C09C 1/0063; C09C 1/0036; C09B 67/0033; C09B 67/006; C09B 47/04; C09D 11/322; C09D 11/328; C09D 11/38

See application file for complete search history.

(56) References Cited

U.S. PATENT DOCUMENTS

| | | | | |
|---|---|---|---|---|
| 5,980,623 | A | 11/1999 | Hiraoka et al. | |
| 8,101,011 | B2 * | 1/2012 | Tateishi | C09B 29/3656 534/769 |
| 2005/0132927 | A1 | 6/2005 | Tateishi et al. | |
| 2009/0047430 | A1 * | 2/2009 | Mori | C09D 11/32 427/256 |
| 2010/0028539 | A1 | 2/2010 | Tateishi et al. | |
| 2010/0302305 | A1 | 12/2010 | Tateishi et al. | |
| 2015/0240096 | A1 | 8/2015 | Fujie | |
| 2015/0247048 | A1 * | 9/2015 | Fujie | C08K 5/3417 347/85 |

FOREIGN PATENT DOCUMENTS

| | | |
|---|---|---|
| JP | H11158424 | 6/1999 |
| JP | 2008088344 | 4/2008 |
| JP | 2009132891 | 6/2009 |
| JP | 4516744 | 8/2010 |
| JP | 2013035922 | 2/2013 |
| JP | 2013221054 | 10/2013 |
| WO | 2014077291 | 5/2014 |

OTHER PUBLICATIONS

"Office Action of Japan Counterpart Application" with English translation thereof, dated Oct. 18, 2022, p. 1-p. 5.

"International Search Report (Form PCT/ISA/210) of PCT/JP2020/025371," dated Sep. 15, 2020, with English translation thereof, pp. 1-5.

"Written Opinion of the International Searching Authority (Form PCT/ISA/237)" of PCT/JP2020/025371, dated Sep. 15, 2020, with English translation thereof, pp. 1-8.

* cited by examiner

*Primary Examiner* — Kristal Feggins

(74) *Attorney, Agent, or Firm* — JCIPRNET

(57) ABSTRACT

A dye ink composition includes: a dye represented by the general formula (I) as defined herein; water; a compound represented by the general formula (II) as defined herein; and a toning agent represented by the general formula (Cy-2) as defined herein.

20 Claims, No Drawings

DYE INK COMPOSITION, DYE INK FOR INK JET RECORDING, AND INK JET RECORDING METHOD

CROSS REFERENCE TO RELATED APPLICATION

This is a continuation of International Application No. PCT/JP2020/025371 filed on Jun. 26, 2020, and claims priority from Japanese Patent Application No. 2019-122362 filed on Jun. 28, 2019, the entire disclosures of which are incorporated herein by reference.

BACKGROUND OF THE INVENTION

1. Field of the Invention

The present invention relates to a dye ink composition, a dye ink for ink jet recording, and an ink jet recording method.

2. Description of the Related Art

An ink jet recording method is advantageous in that the material cost is lower than that of other recording methods, high-speed recording is possible, noises during recording are small, furthermore, the process is simple, full-color printing is easily achieved, and high-resolution images are obtained even with an apparatus having a simple configuration. Therefore, the ink jet recording method is becoming common and spreading from personal use to office use and in the fields of commercial printing and industrial printing.

In such an ink jet recording process, there are two types of coloring agents used in ink jet inks, namely, dyes and pigments, and these coloring agents are each widely used as an ink jet colorant. It is known that, in general, since dyes have low durability to light and ozone gas and are soluble in water, recording materials after printing have low resistance to water. On the other hand, pigments are known to have high fastness, such as light resistance, resistance to ozone gas, and water resistance. However, pigments are insoluble in water and thus have a drawback in that once pigments become dry and aggregate, the pigments cannot be dispersed in water again, which is likely to cause trouble.

Compounds having a phthalocyanine skeleton are known as coloring agents for cyan dye inks (JP1999-158424A (JP-H11-158424A), JP2013-35922A, JP2013-221054A, and JP4516744B).

SUMMARY OF THE INVENTION

In the ink jet recording method, besides, for example, ink jet paper and ink jet glossy paper that have an ink-receiving layer, for example, general-purpose plain paper having low water absorbency are used as recording materials in some cases. In ink jet printing for office use, plain paper is mainly used as a recording medium, and high image density is required. Such a recording material does not positively include an absorbing layer and an ink is less likely to penetrate into the recording material, and thus it takes a long time for drying. For example, in the case of high-speed automatic double-sided printing, in which a sheet having a front surface that has been subjected to printing is immediately reversed and back-surface printing is performed in an ink jet printing apparatus, there may be a problem in that, for example, inversion rollers are contaminated with an undried ink. It is also known that an increase in the coloring agent concentration in an ink composition for the purpose of increasing the image density decreases stability of the ink. Furthermore, the coloring agent is deposited by drying near a nozzle, which may result in clogging of the nozzle. For example, when a pigment ink is printed on plain paper, a pigment penetrates into the paper without staying on the surface of the paper, and thus the pigment density on the surface of the paper decreases, and the image density decreases. If the pigment concentration in the ink is increased, the image density increases. However, the viscosity of the ink increases, resulting in a decrease in ejection stability. Therefore, there has been a high demand for an ink jet recording method that achieves quick drying, high image density, high image quality, and high durability even on a recording material that does not have an ink-receiving layer, such as plain paper.

Recently, in order to extend the field of use (application to photographs and application to documents) of a printing method that utilizes features of dye inks, it has been essential for dye ink compositions used for ink jet printing and color images colored with the dye ink compositions to achieve high printing density and high fastness, such as light resistance and water resistance. In particular, from the viewpoint of the operating cost (low material cost and being free of maintenance), more and more users switch from an electrophotographic recording process that uses color toners to an ink jet process, also for application to documents. Thus, together with application to high-image-quality photographs obtained with dye inks, printing properties (in particular, high printing density) on plain paper have been desired.

Compounds having a phthalocyanine skeleton that are widely used for application to cyan dye inks (for example, C.I. Direct Blue 86, 87, and 199) have low fastness to ozone gas in air. This is noticeable in, for example, recorded articles Obtained by using a recording medium (ink jet paper) having an ink-receiving layer formed of an inorganic substance such as alumina or silica. If such a recorded article is left to stand in a room for a long time, there may be a problem of significant color fading. On the other hand, compounds having a triphenylmethane skeleton have a feature that they have color developability better than that of compounds having a phthalocyanine skeleton. Therefore, for the purpose of recording images having high printing density (color developability), a cyan ink that contains, as colorants, a phthalocyanine compound and a compound having a triphenylmethane skeleton, such as C.I. Acid Blue 9 has been proposed (JP1999-158424A (JP-H11-158424A)). However, the cyan dye ink disclosed in JP1999-158424A (JP-H11-158424A) cannot realize both the printing density (color developability) and image durability (ozone resistance and light resistance) and requires a further improvement.

For the purpose of escaping from the trade-off relation between the printing density (color developability) and image durability (ozone resistance and light resistance), it has been proposed that the two required performances are achieved by mainly changing coloring agents (dyes) used for a cyan dye ink (JP2013-35922A and JP2013-221054A).

However, although the cyan dye ink disclosed in JP2013-35922A can be confirmed to achieve an improvement in the printing density (color developability), the two required performances cannot be combined because a decrease in image durability (ozone resistance: yellow discoloration) on ink jet paper due to a partial azaphthalocyanine compound, a decrease in image durability (ozone resistance: decoloration) on ink jet paper due to a phthalocyanine compound, and a decrease in image durability (light resistance) due to C.I. Acid Blue 9 are significant, and thus a further improvement is necessary. Similarly, although the cyan dye ink disclosed in JP2013-221054A can be confirmed to achieve an improvement in the printing density (color developability), the two required performances cannot be combined because a decrease in image durability (ozone resistance: yellow discoloration) on ink jet paper due to a partial azaphthalocyanine compound and a decrease in image durability (light resistance) due to C.I. Acid Blue 9 are significant, and thus a further improvement is necessary.

It has been found that, although the cyan dye ink disclosed in JP4516744B can be confirmed to achieve improvements in the printing density (color developability) and image fastness (ozone resistance) on ink jet paper, there is room for improving the printing density on plain paper due to a partial azaphthalocyanine compound.

As described above, although cyan ink compositions including various coloring agents (water-soluble dyes) have been proposed, there is no cyan dye ink that satisfies, at a high level, the printing density (color developability) and image fastness (ozone resistance and light resistance) on ink jet paper and plain paper. In particular, there has been a high demand for a further improvement in the printing density of a cyan dye ink on plain paper.

In recent years, a further improvement in the performance has been desired in the field of inks. In particular, an improvement in the performance has been desired for application to documents having high image quality and high durability with dye inks and provided with printing properties (in particular, high printing density) on plain paper as well as application to photographs.

An object of the present invention is to provide a dye ink composition, a dye ink for ink jet recording, and an ink jet recording method that enable the formation of an image having high priming density (in particular, color developability on plain paper) and having high ozone resistance and high light resistance.

The inventors of the present invention have found that the above object can be achieved by the configurations described below.

[1]

A dye ink composition containing a dye represented by the following general formula (I), water, a compound represented by the following general formula (II), and a toning agent represented by the following general formula (Cy-2).

General formula (I)

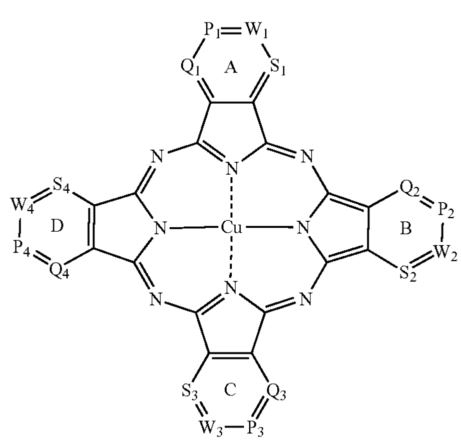

In the general formula (I), $Q_1$, $P_1$, $W_1$, $S_1$, $Q_2$, $P_2$, $W_2$, $S_2$, $Q_3$, $P_3$, $W_3$, $S_3$, $Q_4$, $P_4$, $W_4$, and $S_4$ each independently represent =N— or =CR$^1$—. $R^1$ represents a hydrogen atom or a substituent.

A ring A formed from $Q_1$, $P_1$, $W_1$, and $S_1$, a ring B formed from $Q_2$, $P_2$, $W_2$, and $S_2$, a ring C formed from $Q_3$, $P_3$, $W_3$, and $S_3$, and a ring L) formed from $Q_4$, $P_4$, $W_4$, and $S_4$ each independently represent a substituted or unsubstituted benzene ring or a substituted or unsubstituted six-membered nitrogen-containing heterocyclic ring.

In a case where three rings among the four rings of the ring A, the ring B, the ring C, and the ring D each represent a substituted or unsubstituted benzene ring, the remaining one ring represents a substituted or unsubstituted pyridine ring, a substituted or unsubstituted pyrazine ring, a substituted or unsubstituted pyrimidine ring, or a substituted or unsubstituted pyridazine ring.

In a case where two rings among the four rings of the ring A, the ring B, the ring C, and the ring D each represent a substituted or unsubstituted benzene ring, the remaining two rings each independently represent a substituted or unsubstituted pyridine ring, a substituted or unsubstituted pyrazine ring, a substituted or unsubstituted pyrimidine ring, or a substituted or unsubstituted pyridazine ring.

In a case where one ring among the four rings of the ring A, the ring B, the ring C, and the ring D represents a substituted or unsubstituted benzene ring, the remaining three rings each independently represent a substituted or unsubstituted pyridine ring, a substituted or unsubstituted pyrazine ring, a substituted or unsubstituted pyrimidine ring, or a substituted or unsubstituted pyridazine ring.

All the four rings of the ring A, the ring B, the ring C, and the ring D do not simultaneously represent a substituted or unsubstituted benzene ring.

All the four rings of the ring A, the ring B, the ring C, and the ring D do not simultaneously represent a substituted or unsubstituted six-membered nitrogen-containing heterocyclic ring.

However, the dye represented by the general formula (I) has at least one ionic hydrophilic group as a substituent.

General formula (II)

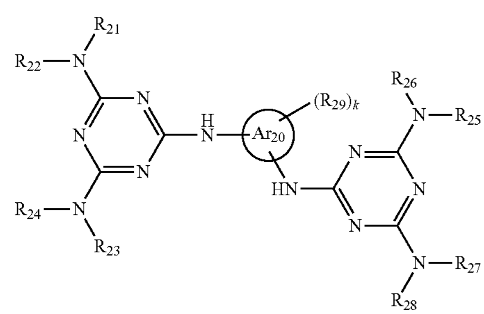

In the general formula (II), $Ar_{20}$ represents a benzene ring or a naphthalene ring. $R_{21}$ to $R_{28}$ each independently represent a hydrogen atom or a substituent. $R_{21}$ and $R_{22}$ may be linked to each other to form a ring. $R_{23}$ and $R_{24}$ may be linked to each other to form a ring. $R_{25}$ and $R_{26}$ may be linked to each other to form a ring. $R_{27}$ and $R_{28}$ may be linked to each other to form a ring. $R_{29}$ represents a substituent. In a case where $Ar_{20}$ represents a benzene ring, k represents an integer of 0 to 4. In a case where $Ar_{20}$ represents a naphthalene ring, k represents an integer of 0 to 6. In a case where a plurality of $R_{29}$'s are present, the plurality of $R_{29}$'S may be the same as or different from each other. In a case where a plurality of $R_{29}$'s are present, the plurality of $R_{29}$'s may be linked to each other to form a ring. However, the compound represented by the general formula (II) has at least one hydrophilic group.

(Cy-2)

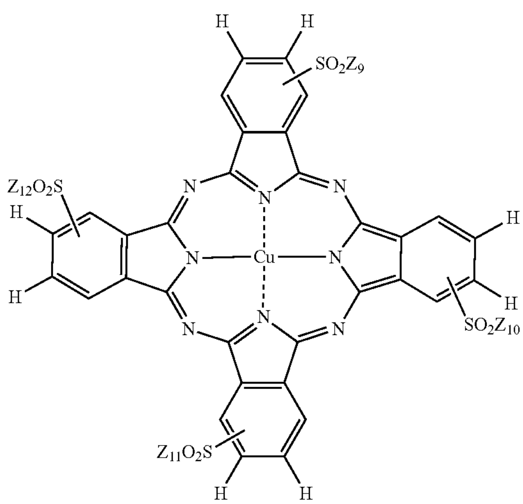

In the general formula (Cy-2), $Z_9$, $Z_{10}$, $Z_{11}$, and $Z_{12}$ each independently represent a substituted or unsubstituted alkyl group, a substituted or unsubstituted aryl group, or a substituted or unsubstituted heterocyclic group; and at least one of $Z_9$, $Z_{10}$, $Z_{11}$, or $Z_{12}$ has an ionic hydrophilic group as a substituent.

[2]

The dye ink composition according to [1], wherein at least one of the ring A, the ring B, the ring C, or the ring D in the dye represented by the general formula (I) has at least one group selected from the group consisting of —$SO_2$—Z, —$SO_3$M, and —$CO_2$M, where M represents a hydrogen atom or a counter cation, and Z represents a substituted or unsubstituted alkyl group, a substituted or unsubstituted aryl group, or a substituted or unsubstituted heterocyclic group.

[3]

The dye ink composition according to [2], wherein at least one of the ring A, the ring B, the ring C, or the ring D in the dye represented by the general formula (I) has —$SO_2$—Z.

[4]

The dye ink composition according to [3], wherein one to three of $P_1$, $W_1$, $P_2$, $W_2$, $P_3$, $W_3$, $P_4$, and $W_4$ in the general formula (I) have the —$SO_2$—Z as a substituent.

[5]

The dye ink composition according to any one of [1] to [4], further containing a toning agent represented by the following general formula (Cy-1), (Cy-1)

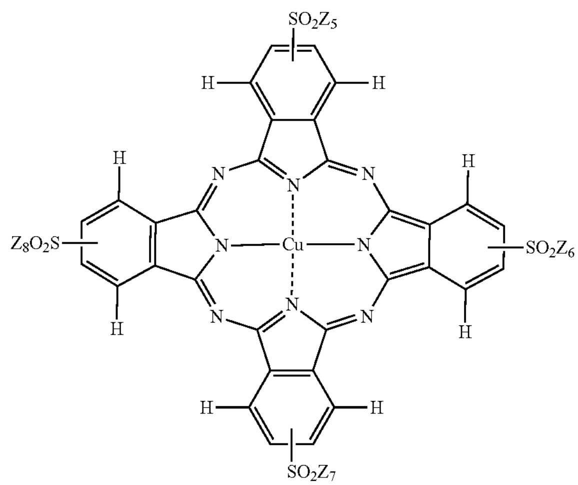

In the general formula (Cy-1), $Z_5$, $Z_6$, $Z_7$, and $Z_8$ each independently represent a substituted or unsubstituted alkyl group, a substituted or unsubstituted aryl group, or a substituted or unsubstituted heterocyclic group; and at least one of $Z_5$, $Z_6$, $Z_7$, or $Z_8$ has an ionic hydrophilic group as a substituent.

[6]

The dye ink composition according to any one of [1] to [5], further containing a toning agent represented by any of the following general formulae (Cy-3) to (Cy-6).

(Cy-3)

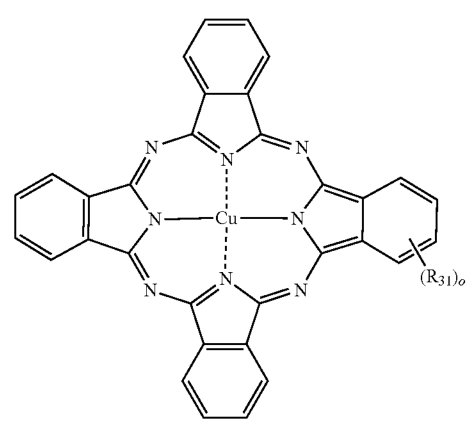

-continued (Cy-4)

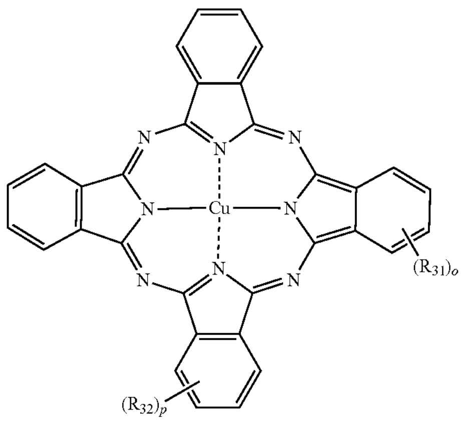

(Cy-5)

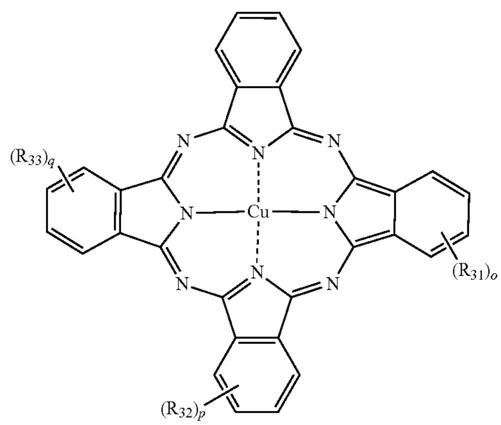

(Cy-6)

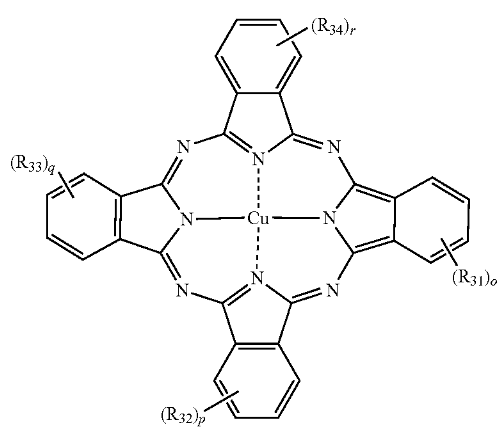

In the general formulae (Cy-3) to (Cy-6) $R_{31}$, $R_{32}$, $R_{33}$, and $R_{34}$ each independently represent a substituted or unsubstituted sulfamoyl group, a substituted or unsubstituted carbamoyl group, a sulfo group, or a carboxy group; in a case where a plurality of $R_{31}$'s are present, the plurality of $R_{31}$'s may be the same as or different from each other; in a case where a plurality of $R_{32}$'s are present, the plurality of $R_{32}$'s may be the same as or different from each other; in a case where a plurality of $R_{33}$'s are present, the plurality of $R_{33}$'s may be the same as or different from each other; in a case where a plurality of $R_{34}$'s are present, the plurality of $R_{34}$'s may be the same as or different from each other; and o, p, q, and r each independently represent an integer of 1 to 4.

[7]

The dye ink composition according to any one of [1] to [6], wherein the compound represented by the general formula (II) has at least one ionic hydrophilic group.

[8]

The dye ink composition according to any one of [1] to [7], wherein at least any one of $R_{21}$ to $R_{29}$ in the general formula (II) has an ionic hydrophilic group.

[9]

The dye ink composition according to any one of [1] to [8], wherein a content of the dye represented by the general formula (I) is 3.0% to 5.0% by mass with respect to a total mass of the dye ink composition, and the dye ink composition is a composition for a cyan dye ink.

[10]

The dye ink composition according to any one of [1] to [9], wherein a content of the compound represented by the general formula (II) is 0.5% to 2.0% by mass with respect to a total mass of the dye ink composition, and the dye ink composition is a composition for a cyan dye ink.

[11]

The dye ink composition according to any one of [1] to [10], further containing a chelating agent, wherein a content of the chelating agent is 0.001% to 0.3% by mass with respect to a total mass of the dye ink composition.

[12]

The dye ink composition according to any one of [1] to [11], further containing a preservative.

A dye ink for ink jet recording, the dye ink including the dye ink composition according to any one of [1] to [12].

[13]

An ink jet recording method including using the dye ink for ink jet recording according to [13].

According to the present invention, it is possible to provide a dye ink composition, a dye ink for ink jet recording, and an ink jet recording method that enable the formation of an image having high printing density (in particular, color developability on plain paper) and having high ozone resistance and high light resistance.

DESCRIPTION OF THE PREFERRED EMBODIMENTS

Hereafter, the present invention will be described in more detail with reference to preferred embodiments.

Dye Ink Composition

A dye ink composition according to the present invention is a dye ink composition that contains a dye represented by general formula (I) below, water, and a compound represented by general formula (II) below.

General formula (I)

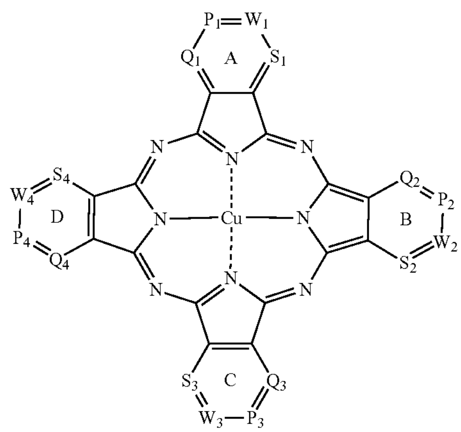

In general formula (I), $Q_1$, $P_1$, $W_1$, $S_1$, $Q_2$, $P_2$, $W_2$, $S_2$, $Q_3$, $P_3$, $W_3$, $S_3$, $Q_4$, $P_4$, $W_4$, and $S_4$ each independently represent $=N-$ or $=CR^1-$, $R^1$ represents a hydrogen atom or a substituent.

Ring A formed from $Q_1$, $P_1$, $W_1$, and $S_1$, ring B formed from $Q_2$, $P_2$, $W_2$, and $S_2$, ring C formed from $Q_3$, $P_3$, $W_3$, and $S_3$, and ring D formed from $Q_4$, $P_4$, $W_4$, and $S_4$ each independently represent a substituted or unsubstituted benzene ring or a substituted or unsubstituted six-membered nitrogen-containing heterocyclic ring.

In a case where three rings among the four rings of ring A, ring B, ring C, and ring D each represent a substituted or unsubstituted benzene ring, the remaining one ring represents a substituted or unsubstituted pyridine ring, a substituted or unsubstituted pyrazine ring, a substituted or unsubstituted pyrimidine ring, or a substituted or unsubstituted pyridazine ring.

In a case where two rings among the four rings of ring A, ring B, ring C, and ring D each represent a substituted or unsubstituted benzene ring, the remaining two rings each independently represent a substituted or unsubstituted pyridine ring, a substituted or unsubstituted pyrazine ring, a substituted or unsubstituted pyrimidine ring, or a substituted or unsubstituted pyridazine ring.

In a case where one ring among the four rings of ring A, ring B, ring C, and ring D represents a substituted or unsubstituted benzene ring, the remaining three rings each independently represent a substituted or unsubstituted pyridine ring, a substituted or unsubstituted pyrazine ring, a substituted or unsubstituted pyrimidine ring, or a substituted or unsubstituted pyridazine ring.

All the four rings of ring A, ring B, ring C, and ring D do not simultaneously represent a substituted or unsubstituted benzene ring.

All the four rings of ring A, ring B, ring C, and ring D do not simultaneously represent a substituted or unsubstituted six-membered nitrogen-containing heterocyclic ring.

However, the dye represented by general formula (I) has at least one ionic hydrophilic group as a substituent General formula (II)

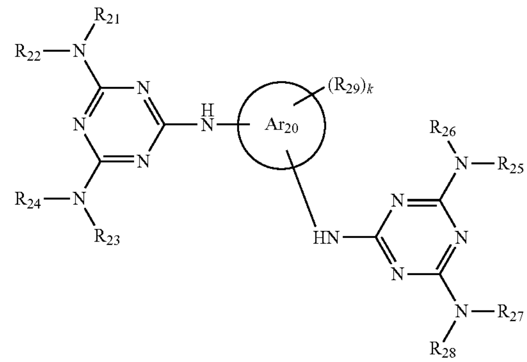

In general formula (II), $Ar_{20}$ represents a benzene ring or a naphthalene ring. $R_{21}$ to $R_{25}$ each independently represent a hydrogen atom or a substituent. $R_{21}$ and $R_{22}$ may be linked to each other to form a ring. $R_{23}$ and $R_{24}$ may be linked to each other to form a ring. $R_{25}$ and $R_{26}$ may be linked to each other to form a ring. $R_{27}$ and $R_{28}$ may be linked to each other to form a ring. $R_{29}$ represents a substituent. In a case where $Ar_{20}$ represents a benzene ring, k represents an integer of 0 to 4. In a case where $Ar_{20}$ represents a naphthalene ring, k represents an integer of 0 to 6. In a case where a plurality of $R_{29}$'s are present, the plurality of $R_{29}$'s may be the same or different. In a case where a plurality of $R_{29}$'s are present, the plurality of $R_{29}$'s may be linked to form a ring. However, the compound represented by general formula (II) has at least one hydrophilic group.

The reason why the dye ink composition according to the present invention enables the formation of an image having high printing density (in particular, color developability on plain paper) and having high image durability (ozone resistance and light resistance) has not been completely clarified; however, the inventors of the present invention assume that the reason is as follows.

An image with a cyan hue can be formed by an ink jet method using a dye ink composition including the dye (water-soluble dye) represented by general formula (I). In the image immediately after formation, the dye represented by general formula (I) is considered to form a relatively stable (metastable) association state of a phthalocyanine-based dye. Next, during drying of the dye ink composition, together with a change in the temperature and humidity of the surrounding environment, the highly water-soluble dye represented by general formula (I) is considered to proceed to a more stable dye association state with the temperature and moisture serving as driving force (a change in the presence state such as the H-aggregate of a dye: a decrease in wavelength of the hue and a simultaneous decrease in the color value). It is assumed that, as a result, a reflection density of the formed image decreases (the printing density is lowered).

Furthermore, in the case of inks using water-soluble phthalocyanine dyes, when a printed article is formed not on ink jet paper (that has, on resin coated paper serving as base paper, an image-receiving layer supported on porous silica or alumina) but on plain paper (that does not have the image-receiving layer), the dye ink composition penetrates as it is in the thickness direction of the base paper. Therefore, if the amount of dye ink composition ejected in the form of droplets is the same, when droplets of the dye ink composition are ejected onto plain paper, the resulting image has a lower reflection density than that in the case where droplets of the dye ink composition are ejected onto ink jet paper.

In contrast, in the present invention, the addition of the compound represented by general formula (II), which is a compound having high planarity, to the dye ink composition enables the dye to be stabilized, from the relatively stable association state of the dye represented by general formula (I), by the effect of the intermolecular interaction between the dye represented by general formula (I) and the compound represented by general formula (ill) in an image immediately after formation by the ink jet recording method. As a result, high printing density (high color developability can be ensued) can be provided to a formed image (particularly on plain paper) without causing a significant decrease in the color value accompanied by the formation of a high-order aggregated state between dye molecules.

Furthermore, when a printed article is formed on plain paper, the dye ink composition having the intermolecular interaction with the compound (additive) represented by general formula (II) also interacts with, for example, cellulose fibers constituting base paper and is thereby less likely to penetrate as it is in the thickness direction of the base paper, and as a result, the reflection density is less likely to decrease. This is considered to be one mechanism by which high printing density could be realized.

In addition to the above, the dye represented by general formula (I) does not cause a chemical reaction by a change in the surrounding environment (temperature, humidity, light, and active gas), and discoloration of the cyan hue of an image can be suppressed. Thus, image durability (in particular, ozone resistance and light resistance) could be probably improved.

First, specific examples of substituents that the dyes and compounds according to the present invention can have are defined as a substituent group A. Specifically, the substituent group A includes the following substituents.

Substituent Group A

The substituents include a halogen atom, an alkyl group, a cycloalkyl group, an aralkyl group, an alkenyl group, an alkynyl group, an aryl group, a heterocyclic group, a cyano group, a hydroxyl group, a mercapto group, a nitro group, an alkyloxy group (an alkoxy group), an aryloxy group, a silyloxy group, a heterocyclic oxy group, an acyloxy group, a carbamoyloxy group, an alkyloxycarbonyloxy group, an aryloxycarbonyloxy group, an amino group, an acylamino group, an aminocarbonylamino group, an alkyloxycarbonylamino group, an aryloxycarbonylamino group, a sulfamoylamino group, an alkylsulfonylamino group, an arylsulfonylamino group, a heterocyclic sulfonylamino group, an alkylthio group, an arylthio group, a heterocyclic thio group, a sulfamoyl group, an alkylsulfinyl group, an arylsulfinyl group, a heterocyclic sulfinyl group, an alkylsulfonyl group, an arylsulfonyl group, a heterocyclic sulfonyl group, an acyl group, an alkyloxycarbonyl group, an aryloxycarbonyl group, a heterocyclic oxycarbonyl group, a carbamoyl group (an aminocarbonyl group), an arylazo group, a heterocyclic azo group, an imide group, a phosphino group, a phosphinyl group, a phosphinyloxy group, a phosphinylamino group, a silyl group, an ionic hydrophilic group, and a substituent that is a combination of two or more of these.

The halogen atom is, for example, a fluorine atom, a chlorine atom, a bromine atom, or an iodine atom.

The alkyl group is a linear or branched substituted or unsubstituted alkyl group. This concept of an alkyl group also applies to an alkyl group in substituents described below (for example, an alkyl group in an alkoxy group or alkylthio group).

The alkyl group is preferably an alkyl group having 1 to 30 carbon atoms, such as a methyl group, an ethyl group, a n-propyl group, an i-propyl group, a t-butyl group, a n-octyl group, an eicosyl group, a 2-chloroethyl group, a 2-cyanoethyl group, or a 2-ethylhexyl group.

The cycloalkyl group is a substituted or unsubstituted cycloalkyl group and preferably a substituted or unsubstituted cycloalkyl group having 3 to 30 carbon atoms, such as a cyclohexyl group, a cyclopentyl group, or a 4-n-dodecylcyclohexyl group. The bicycloalkyl group is preferably a substituted or unsubstituted bicycloalkyl group having 5 to 30 carbon atoms, specifically, a monovalent group formed by removing one hydrogen atom from a bicycloalkane having 5 to 30 carbon atoms, such as a bicyclo[1.2.2]heptan-2-yl group or a bicyclo[2.2.2]octan-3-yl group.

The aralkyl group is a substituted or unsubstituted aralkyl group. The substituted or unsubstituted aralkyl group is preferably an aralkyl group having 7 to 30 carbon atoms, such as a benzyl group or a 2-phenethyl group.

The alkenyl group is a linear, branched, or cyclic substituted or unsubstituted alkenyl group and includes a cycloalkenyl group and a bicycloalkenyl group.

The alkenyl group is preferably a substituted or un substituted alkenyl group having 2 to 30 carbon atoms, such as a vinyl group, an allyl group, a prenyl group, a geranyl group, or an oleyl group. The cycloalkenyl group is preferably a substituted or unsubstituted cycloalkenyl group having 3 to 30 carbon atoms, specifically, a monovalent group formed by removing one hydrogen atom from a cycloalkene having 3 to 30 carbon atoms, such as a 2-cyclopenten-1-yl group or a 2-cyclohexen-1-yl group. The bicycloalkenyl group is a substituted or unsubstituted bicycloalkenyl group and is preferably a substituted or unsubstituted bicycloalkenyl group having 5 to 30 carbon atoms, specifically, a monovalent group formed by removing one hydrogen atom from a bicycloalkene having one double bond, such as a bicyclo[2.2.1]hept-2-en-1-yl group or a bicyclo[2.2.2]oct-2-en-4-yl group.

The alkynyl group is preferably a substituted or unsubstituted alkynyl group having 2 to 30 carbon atoms, such as an ethynyl group, a propargyl group, or a trimethylsilylethynyl group.

The aryl group is preferably a substituted or unsubstituted aryl group having 6 to 30 carbon atoms, such as a phenyl group, a p-tolyl group, a naphthyl group, a m-chlorophenyl group, or an o-hexadecanoylaminophenyl group.

The heterocyclic group is preferably a monovalent group formed by removing one hydrogen atom from a five- or six-membered substituted or unsubstituted aromatic or non-aromatic heterocyclic compound and more preferably a five- or six-membered aromatic heterocyclic group having 3 to 30 carbon atoms, such as a 2-furyl group, a 2-thienyl group, a 2-pyrimidinyl group, or a 2-benzothiazolyl group. An example of the non-aromatic heterocyclic group is a morpholinyl group.

The alkyloxy group is preferably a substituted or unsubstituted alkyloxy group having 1 to 30 carbon atoms, such as a methoxy group, an ethoxy group, an isopropoxy group, a t-butoxy group, a n-octyloxy group, or a 2-methoxyethoxy group.

The aryloxy group is preferably a substituted or unsubstituted aryloxy group having 6 to 30 carbon atoms, such as a phenoxy group, a 2-methylphenoxy group, a 4-t-butylphenoxy group, a 3-nitrophenoxy group, or a 2-tetradecanoylaminophenoxy group.

The silyloxy group is preferably a substituted or unsubstituted silyloxy group having 0 to 20 carbon atoms, such as a trimethylsilyloxy group or a diphenylmethylsilyloxy group.

The heterocyclic oxy group is preferably a substituted or unsubstituted heterocyclic oxy group having 2 to 30 carbon atoms, such as a 1-phenyltetrazole-5-oxy group or a 2-tetrahydropyranyloxy group.

The acyloxy group is preferably a formyloxy group, a substituted or unsubstituted alkylcarbonyloxy group having 2 to 30 carbon atoms, or a substituted or unsubstituted arylcarbonyloxy group having 6 to 30 carbon atoms, such as an acetyloxy group, a pivaloyloxy group, a stearoyloxy group, a benzoyloxy group, or a p-methoxyphenylcarbonyloxy group.

The carbamoyloxy group is preferably a substituted or unsubstituted carbamoyloxy group having 1 to 30 carbon atoms, such as an N,N-dimethylcarbamoyloxy group, an N,N-diethylcarbamoyloxy group, a morpholinocarbonyloxy group, an N,N-di-n octylaminocarbonyloxy group, or an N-n-octylcarbamoyloxy group.

The alkyloxycarbonyloxy group is preferably a substituted or unsubstituted alkyloxycarbonyloxy group having 2 to 30 carbon atoms, such as a methoxycarbonyloxy group, an ethoxycarbonyloxy group, a t-butoxycarbonyloxy group, or a n-octyloxycarbonyloxy group.

The aryloxycarbonyloxy group is preferably a substituted or unsubstituted aryloxycarbonyloxy group having 7 to 30 carbon atoms, such as a phenoxycarbonyloxy group, a p-methoxyphenoxycarbonyloxy group, or a p-n-hexadecyloxyphenoxycarbonyloxy group.

The amino group includes an alkylamino group, an arylamino group, and a heterocyclic amino group. The amino group is preferably an amino group, a substituted or unsubstituted alkylamino group having 1 to 30 carbon atoms, or a substituted or unsubstituted anilino group having 6 to 30 carbon atoms, such as a methylamino group, a dimethylamino group, an anilino group, an N-methyl-anilino group, a diphenylamino group, or a triazinylamino group.

The acylamino group is preferably a formylamino group, a substituted or unsubstituted alkylcarbonylamino group having 1 to 30 carbon atoms, or a substituted or unsubstituted arylcarbonylamino group having 6 to 30 carbon atoms, such as an acetylamino group, a pivaloylamino group, a lauroylamino group, a benzoylamino group, or a 3,4,5-tri-n-octyloxyphenylcarbonylamino group.

The aminocarbonylamino group is preferably a substituted or unsubstituted aminocarbonylamino group having 1 to 30 carbon atoms, such as a carbamoylamino group, an N,N-dimethylaminocarbonylamino group, an N,N-diethylaminocarbonylamino group, or a morpholinocarbonylamino group.

The alkyloxycarbonylamino group is preferably a substituted or unsubstituted alkyloxycarbonylamino group having 2 to 30 carbon atoms, such as a methoxycarbonylamino group, an ethoxycarbonylamino group, a t-butoxycarbonylamino group, a n-octadecyloxycarbonylamino group, or an N-methyl-methoxycarbonylamino group.

The aryloxycarbonylamino group is preferably a substituted or unsubstituted aryloxycarbonylamino group having 7 to 30 carbon atoms, such as a phenoxycarbonylamino group, a p-chlorophenoxycarbonylamino group, or a m-n-actyloxyphenoxycarbonylamino group.

The sulfamoylamino group is preferably a substituted or unsubstituted sulfamoylamino group having 0 to 30 carbon atoms, such as a sulfamoylamino group, an N,N-dimethylaminosulfonylamino group, or an N-n-octylaminosulfonylamino group.

The alkylsulfonylamino group or the arylsulfonylamino group is preferably a substituted or unsubstituted alkylsulfonylamino group having 1 to 30 carbon atoms or a substituted or unsubstituted arylsulfonylamino group having 6 to 30 carbon atoms, such as a methylsulfonylamino group, a butylsulfonylamino group, a phenylsulfonylamino group, a 2,3,5-trichlorophenylsulfonylamino group, or a p-methylphenylsulfonylamino group.

The heterocyclic sulfonylamino group is preferably a substituted or unsubstituted heterocyclic sulfonylamino group having 1 to 12 carbon atoms, such as a 2-thiophenesulfonylamino group or a 3-pyridinesulfonylamino group.

The alkylthio group is preferably a substituted or unsubstituted alkylthio group having 1 to 30 carbon atoms, such as a methylthio group, an ethylthio group, or a n-hexadecylthio group.

The arylthio group is preferably a substituted or unsubstituted arylthio group having 6 to 30 carbon atoms, such as a phenylthio group, a p-chlorophenylthio group, or a m-methoxyphenylthio group.

The heterocyclic thio group is preferably a substituted or unsubstituted heterocyclic thio group having 2 to 30 carbon atoms, such as a 2-benzothiazolylthio group or a 1-phenyltetrazol-5-ylthio group.

The sulfamoyl group is preferably a substituted or unsubstituted sulfamoyl group having 0 to 30 carbon atoms, such as an N-ethylsulfamoyl group, an N-(3-dodecyloxypropyl) sulfamoyl group, an N,N-dimethylsulfamoyl group, an N-acetylsulfamoyl group, an N-benzoylsulfamoyl group, or an N—(N'-phenylcarbamoyl)sulfamoyl group.

The alkylsulfinyl group or the arylsulfinyl group is preferably a substituted or unsubstituted alkylsulfinyl group having 1 to 30 carbon atoms or a substituted or unsubstituted arylsulfinyl group having 6 to 30 carbon atoms, such as a methylsulfinyl group, an ethylsulfinyl group, a phenylsulfinyl group, or a p-methylphenylsulfinyl group.

The heterocyclic sulfinyl group is preferably a substituted or unsubstituted heterocyclic sulfinyl group having 1 to 20 carbon atoms, and an example of the heterocyclic sulfinyl group is a 4-pyridinesulfinyl group.

The alkylsulfonyl group or the arylsulfonyl group is preferably a substituted or unsubstituted alkylsulfonyl group having 1 to 30 carbon atoms or a substituted or unsubstituted arylsulfonyl group having 6 to 30 carbon atoms, such as a methylsulfonyl group, an ethylsulfonyl group, a phenylsulfonyl group, or a p-methylphenylsulfonyl group.

The heterocyclic sulfonyl group is preferably a substituted or unsubstituted heterocyclic sulfonyl group having 1 to 20 carbon atoms, such as a 2-thiophenesulfonyl group or a 3-pyridinesulfonyl group.

The acyl group is preferably a formyl group, a substituted or unsubstituted alkylcarbonyl group having 2 to 30 carbon atoms, a substituted or unsubstituted arylcarbonyl group having 7 to 30 carbon atoms, or a substituted or unsubstituted heterocyclic carbonyl group having 2 to 30 carbon atoms in which any of the carbon atoms is linked to a carbonyl group, such as an acetyl group, a pivaloyl group, a 2-chloroacetyl group, a stearoyl group, a benzoyl group, a p-n-octyloxyphenylcarbonyl group, a 2-pyridylcarbonyl group, or a 2-furylcarbonyl group.

The aryloxycarbonyl group is preferably a substituted or unsubstituted aryloxycarbonyl group having 7 to 30 carbon atoms, such as a phenoxycarbonyl group, an o-chlorophenoxycarbonyl group, a m-nitrophenoxycarbonyl group, or a p-t-butylphenoxycarbonyl group, The alkoxycarbonyl group is preferably a substituted or unsubstituted alkoxycarbonyl group having 2 to 30 carbon atoms, such as a methoxycarbonyl group, an ethoxycarbonyl group, a t-butoxycarbonyl group, or a n-octadecyloxycarbonyl group.

The heterocyclic oxycarbonyl group is preferably a heterocyclic oxycarbonyl group having 2 to 20 carbon atoms, and an example of the heterocyclic oxycarbonyl group is a 2-pyridyloxycarbonyl group.

The carbamoyl group is preferably a substituted or unsubstituted carbamoyl group having 1 to 30 carbon atoms, such as a carbamoyl group, an N-methylcarbamoyl group, an N,N-dimethylcarbamoyl group, an N,N-di-n-octylcarbamoyl group, or an N-(methylsulfonyl)carbamoyl group.

The arylazo group or the heterocyclic azo group is preferably a substituted or unsubstituted arylazo group having 6 to 30 carbon atoms or a substituted or unsubstituted heterocyclic azo group having 3 to 30 carbon atoms, such as a phenylazo group, a p-chlorophenylazo group, or a 5-ethylthio-1,3,4-thiadiazol-2-ylazo group.

The imide group is preferably an N-succinimide group or an N-phthalimide group.

The phosphino group is preferably a substituted or unsubstituted phosphino group having 0 to 30 carbon atoms, such as a dimethylphosphino group, a diphenylphosphino group, or a methylphenoxyphosphino group.

The phosphinyl group is preferably a substituted or unsubstituted phosphinyl group having 0 to 30 carbon atoms, such as a phosphinyl group, a dioctyloxyphosphinyl group, or a diethoxyphosphinyl group.

The phosphinyloxy group is preferably a substituted or unsubstituted phosphinyloxy group having 0 to 30 carbon atoms, such as a diphenoxyphosphinyloxy group or a dioctyloxyphosphinyloxy group.

The phosphinylamino group is preferably a substituted or unsubstituted phosphinylamino group having 0 to 30 carbon atoms, such as a dimethoxyphosphinylamino group or a dimethylaminophosphinylamino group.

The silyl group is preferably a substituted or unsubstituted silyl group having 0 to 30 carbon atoms, such as a trimethylsilyl group, a t-butyldimethylsilyl group, or a phenyldimethylsilyl group.

Examples of the ionic hydrophilic group include a sulfo group (—$SO_3M$), a carboxy group (—COOM), a thiocarboxy group, a sulfino group (—$SO_2M$), a phosphono group (—PO(OR)(OM)), a dihydroxyphosphino group, a phosphate group (—$PO(OM)_2$), a quaternary ammonium group, an acylsulfamoyl group (—$SO_2N^-M^+COR$), a sulfonylcarbamoyl group (—$CON^-M^+SO_2$—R), and a sulfonylamino sulfonyl group (—$SO_2N^-M^+SO_2$—R), where M represents a hydrogen atom or a counter cation and R includes, for example, monovalent substituents (such as alkyl groups and aryl groups). Of these, a sulfo group (—$SO_3M$), a carboxy group (—COOM), and a phosphate group (—$PO(OM)_2$) are preferred, and a sulfo group (—$SO_3M$) and a carboxy group (—COOM) are particularly preferred.

As described above, the ionic hydrophilic group may be in a salt state. Examples of the counter cation that forms a salt include an ammonium ion, alkali metal ions (e.g., a lithium ion, a sodium ion, and a potassium ion), and organic cations (e.g., a tetramethylammonium ion, a tetramethylguanidinium ion, and a tetramethylphosphonium ion).

M is preferably a hydrogen atom, an ammonium ion, or an alkali metal ion, more preferably an alkali metal ion, still more preferably a lithium ion, a sodium ion, or a potassium ion, particularly preferably a lithium ion or a sodium ion, and most preferably a lithium ion.

In the present invention, when the compound is a salt, the salt is present in the water-soluble ink in such a manner that the salt is dissolved in a state of being completely dissociated into ions. When the compound has an ionic hydrophilic group having a high acid dissociation constant (pKa), in some cases, the compound is present in such a manner that most part is dissociated, and a part is dissolved in a salt state.

Dye Represented by General Formula (I)

The dye represented by general formula (I) below will be described.

General formula (I)

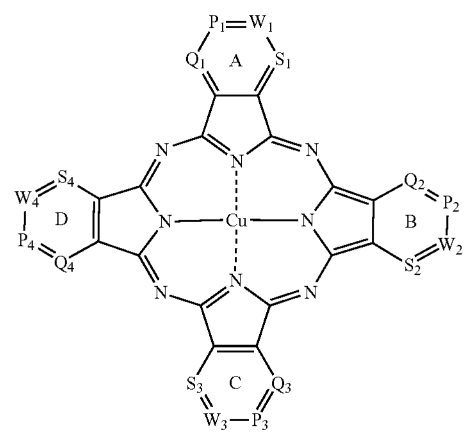

In general formula (I), $Q_1$, $P_1$, $W_1$, $S_1$, $Q_2$, $P_2$, $W_2$, $S_2$, $Q_3$, $P_3$, $W_3$, $S_3$, $Q_4$, $P_4$, $W_4$, and $S_4$ each independently represent =N— or =$CR^1$—. $R^1$ represents a hydrogen atom or a substituent.

Ring A formed from $Q_1$, $P_1$, $W_1$, and $S_1$, ring B formed from $Q_2$, $P_2$, $W_2$, and $S_2$, ring C formed from $Q_3$, $P_3$, $W_3$, and $S_3$, and ring D formed from $Q_4$, $P_4$, $W_4$, and $S_4$ each independently represent a substituted or unsubstituted benzene ring or a substituted or unsubstituted six-membered nitrogen-containing heterocyclic ring.

In a case where three rings among the four rings of ring A, ring B, ring C, and ring D each represent a substituted or unsubstituted benzene ring, the remaining one ring represents a substituted or unsubstituted pyridine ring, a substituted or unsubstituted pyrazine ring, a substituted or unsubstituted pyrimidine ring, or a substituted or unsubstituted pyridazine ring.

In a case where two rings among the four rings of ring A, ring B, ring C, and ring D each represent a substituted or unsubstituted benzene ring, the remaining two rings each independently represent a substituted or unsubstituted pyridine ring, a substituted or unsubstituted pyrazine ring, a substituted or unsubstituted pyrimidine ring, or a substituted or unsubstituted pyridazine ring.

In a case where one ring among the four rings of ring A, ring B, ring C, and ring D represents a substituted or unsubstituted benzene ring, the remaining three rings each independently represent a substituted or unsubstituted pyridine ring, a substituted or unsubstituted pyrazine ring, a substituted or unsubstituted pyrimidine ring, or a substituted or unsubstituted pyridazine ring.

All the four rings of ring A, ring B, ring C, and ring D do not simultaneously represent a substituted or unsubstituted benzene ring.

All the four rings of ring A, ring B, ring C, and ring D do not simultaneously represent a substituted or unsubstituted six-membered nitrogen-containing heterocyclic ring.

However, the dye represented by general formula (I) has at least one ionic hydrophilic group as a substituent.

When the four rings of ring A, ring B, ring C, and ring D have substituents thereon, preferred substituents may be substituents that are selected from the substituent group A and that can be chemically bound.

The dye represented by general formula (I) has at least one ionic hydrophilic group as a substituent. The expression "having an ionic hydrophilic group as a substituent" means having a substituent including an ionic hydrophilic group and encompasses the case of having, as a substituent, a group other than an ionic hydrophilic group, the group being substituted with at least an ionic hydrophilic group.

At least one of ring A, ring B, ring C, or ring D in the dye represented by general formula (I) preferably has at least one group selected from the group consisting of —$SO_2$—Z, —$SO_3$M, and —$CO_2$M. M represents a hydrogen atom or a counter cation. Z represents a substituted or unsubstituted alkyl group, a substituted or unsubstituted aryl group, or a substituted or unsubstituted heterocyclic group.

At least one ring of ring A, ring B, ring C, or ring D more preferably has at least one substituent selected from the group consisting of —$SO_2$—Z and —$SO_3$M, and particularly preferably has —$SO_2$—Z.

At least one ring of ring A, ring B, ring C, or ring D may have at least one group selected from the group consisting of —$SO_2$—Z, —$SO_3$M, and —$CO_2$M and have a halogen atom (for example, a fluorine atom, a chlorine atom, a bromine atom, or an iodine atom, and preferably a chlorine atom) as a substituent.

The dye represented by general formula (I) preferably has one to three —$SO_2$—Z, and, more preferably, one to three of $P_1$, $W_1$, $P_2$, $W_2$, $P_3$, $W_3$, $P_4$, and $W_4$ in general formula (I) have —$SO_2$—Z as a substituent ($R^1$ represents —$SO_2$—Z). The ring having —$SO_2$—Z as a substituent is preferably a benzene ring.

Z represents a substituted or unsubstituted alkyl group, a substituted or unsubstituted aryl group, or a substituted or unsubstituted heterocyclic group (specific examples of the heterocyclic group include the same groups as those of the heterocyclic group in the substituent group A). Z preferably represents a substituted or unsubstituted alkyl group having a total of 1 to 20 carbon atoms or a substituted or unsubstituted aryl group having a total of 6 to 20 carbon atoms. Z preferably has a substituent that includes an ionic hydrophilic group. The ionic hydrophilic group is preferably an acidic group, more preferably a sulfo group, a carboxy group, or a phosphate group, and still more preferably a sulfo group or a carboxy group.

Z is preferably an alkyl group, aryl group, or heterocyclic group having a substituent that includes at least an ionic hydrophilic group. The "alkyl group, aryl group, or heterocyclic group having a substituent that includes at least an ionic hydrophilic group" may be an "alkyl group, aryl group, or heterocyclic group having, as a substituent, at least an ionic hydrophilic group" or may be an "alkyl group, aryl group, or heterocyclic group having, as a substituent, a group other than an ionic hydrophilic group, the group being substituted with at least an ionic hydrophilic group".

Z is more preferably an alkyl group having a total of 1 to 20 carbon atoms and substituted with an ionic hydrophilic group, or an aryl group having a total of 6 to 20 carbon atoms and substituted with an ionic hydrophilic group, still more preferably an alkyl group having a total of 1 to 5 carbon atoms and substituted with an ionic hydrophilic group, or an aryl group having a total of 6 to 12 carbon atoms and substituted with an ionic hydrophilic group, and particularly preferably an alkyl group having a total of 1 to 3 carbon atoms and substituted with a sulfo group or a carboxy group, or an aryl group having a total of 6 to 10 carbon atoms and substituted with a sulfo group or a carboxy group.

When Z is an alkyl group, aryl group, or heterocyclic group having, as a substituent, a group other than an ionic hydrophilic group, the group being substituted with at least an ionic hydrophilic group, examples of the group other than the ionic hydrophilic group include substituted or unsubstituted alkyloxy groups, substituted or unsubstituted aryloxy groups, substituted or unsubstituted amino groups, substituted or unsubstituted sulfamoyl groups, substituted or unsubstituted carbamoyl groups, substituted or unsubstituted alkylsulfonyl groups, and substituted or unsubstituted arylsulfonyl groups. When these substituents can further have at least one substituent, groups having, as the additional substituent, for example, a substituent selected from the substituent group A are also included in examples of the group other than the ionic hydrophilic group. The group other than the ionic hydrophilic group preferably has 1 to 20 carbon atoms and more preferably has 1 to 10 carbon atoms.

Z may have, in addition to a substituent that includes an ionic hydrophilic group, a substituent other than the substituent that includes an ionic hydrophilic group. Examples of the substituent other than the substituent that includes an ionic hydrophilic group include halogen atoms, a hydroxy group, substituted or unsubstituted alkyl groups, substituted or unsubstituted aryl groups, substituted or unsubstituted heterocyclic groups, substituted or unsubstituted alkyloxy groups, substituted or unsubstituted aryloxy groups, substituted or unsubstituted amino groups, substituted or unsubstituted sulfamoyl groups, substituted or unsubstituted carbamoyl groups, substituted or unsubstituted alkylsulfonyl groups, and substituted or unsubstituted arylsulfonyl groups. When these substituents can further have at least one substituent, groups having, as the additional substituent, a substituent selected from the group consisting of the aforementioned substituents are also included in examples of the substituent other than a substituent that includes an ionic hydrophilic group. When the substituent other than the substituent that includes an ionic hydrophilic group is an organic group (group that includes at least one carbon atom), the substituent is preferably an organic group having 1 to 10 carbon atoms, and more preferably an organic group having 1 to 6 carbon atoms.

With regard to specific examples and preferred ranges of M, in the case of —$SO_3$M, M is preferably a lithium ion, a sodium ion, a potassium ion, or an ammonium ion, more preferably a lithium ion, a sodium ion, or a potassium ion, and most preferably a lithium ion or a sodium ion from the viewpoints of water solubility of the dye, storage stability of the ink, and image quality of ink jet printed articles. In the case of —$CO_2$M, M is preferably a lithium ion, a sodium ion, a potassium ion, or an ammonium ion, more preferably a sodium ion, a potassium ion, or an ammonium ion, and most preferably a sodium ion or a potassium ion from the viewpoints of water solubility of the dye, storage stability of the ink, and image quality of ink jet printed articles.

In general formula (I), when ring A, ring B, ring C, or ring D represents a six-membered nitrogen-containing heterocyclic ring, the rings each independently represent a pyridine ring, a pyrazine ring, a pyrimidine ring, or a pyridazine ring. The rings are preferably each independently a pyridine ring, a pyrazine ring, or a pyrimidine ring, more preferably a pyridine ring or a pyrazine ring, still more preferably a 3-pyridine ring or a 4-pyridine ring, and particularly preferably a 3-pyridine ring (a case where either $Q_1$ or $S_1$ represents =N—, a case where either $Q_2$ or $S_2$ represents =N—, a case where either $Q_3$ or $S_3$ represents =N—, or a case where either $Q_4$ or $S_4$ represents =N—).

The dye represented by general formula (I) is preferably a dye represented by general formula (III) below from the viewpoint of achieving both image fastness and water solubility of the dye (long-term storage stability of the water-soluble ink).

General formula (III)

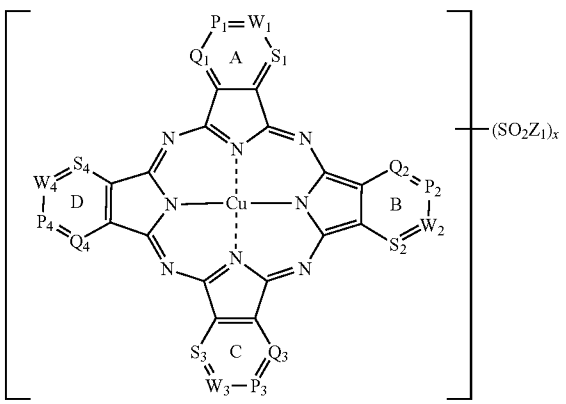

In general formula (III), $Q_1$, $P_1$, $W_1$, $S_1$, $Q_2$, $P_2$, $W_2$, $S_2$, $Q_3$, $P_3$, $W_3$, $S_3$, $Q_4$, $P_4$, $W_4$, and $S_4$ each independently represent =N— or =$CR^1$—. $R^1$ represents a hydrogen atom or a substituent.

Ring A formed from $Q_1$, $P_1$, $W_1$, and $S_1$, ring B formed from $Q_2$, $P_2$, $W_2$, and $S_2$, ring C formed from $Q_3$, $P_3$, $W_3$, and $S_3$, and ring D formed from $Q_4$, $P_4$, $W_4$, and $S_4$ each independently represent a substituted or unsubstituted benzene ring or a substituted or unsubstituted six-membered nitrogen-containing heterocyclic ring.

In a case where three rings among the four rings of ring A, ring B, ring C, and ring D each represent a substituted or unsubstituted benzene ring, the remaining one ring represents a substituted or unsubstituted pyridine ring, a substituted or unsubstituted pyrazine ring, a substituted or unsubstituted pyrimidine ring, or a substituted or unsubstituted pyridazine ring.

In a case where two rings among the four rings of ring A, ring B, ring C, and ring D each represent a substituted or unsubstituted benzene ring, the remaining two rings each independently represent a substituted or unsubstituted pyridine ring, a substituted or unsubstituted pyrazine ring, a substituted or unsubstituted pyrimidine ring, or a substituted or unsubstituted pyridazine ring.

In a case where one ring among the four rings of ring A, ring B, ring C, and ring D represents a substituted or unsubstituted benzene ring, the remaining three rings each independently represent a substituted or unsubstituted pyridine ring, a substituted or unsubstituted pyrazine ring, a substituted or unsubstituted pyrimidine ring, or a substituted or unsubstituted pyridazine ring.

All the four rings of ring A, ring B, ring C, and ring D do not simultaneously represent a substituted or unsubstituted benzene ring.

All the four rings of ring A, ring B, ring C, and ring D do not simultaneously represent a substituted or unsubstituted six-membered nitrogen-containing heterocyclic ring.

However, the dye represented by general formula (III) has —$SO_2$—$Z_1$ as a substituent, where $Z_1$ represents a substituted or unsubstituted alkyl group, a substituted or unsubstituted aryl group, or a substituted or unsubstituted heterocyclic group, and x represents 1 to 3. If a plurality of $Z_1$ are present, the plurality of $Z_1$ may be the same or different. At least one $Z_1$ has an ionic hydrophilic group as a substituent.

In general formula (III), ring A, ring B, ring C, and ring D have the same meaning as ring A, ring B, ring C, and ring D, respectively, in general formula (I) above, and the preferred examples are also the same. Preferred examples of $Z_1$ are the same as those of Z described above.

In general formula (III), the substitution positon of —$SO_2$—$Z_1$ is a β position or an α position (a hydrogen atom at a β position or a hydrogen atom at an α position is substituted with —$SO_2$—$Z_1$). Preferably, the substitution positon of at least one —$SO_2$—$Z_1$ is a β position, and most preferably, all —$SO_2$—$Z_1$ are introduced to β positions from the viewpoint of image fastness (in particular, ozone gas resistance) that varies depending on associating properties of the dye. The α positions and the β positions of the phthalocyanine skeleton are illustrated in formula (a) below.

In formula (a), Het represents a nitrogen-containing six-membered heterocyclic ring.

Formula (a)

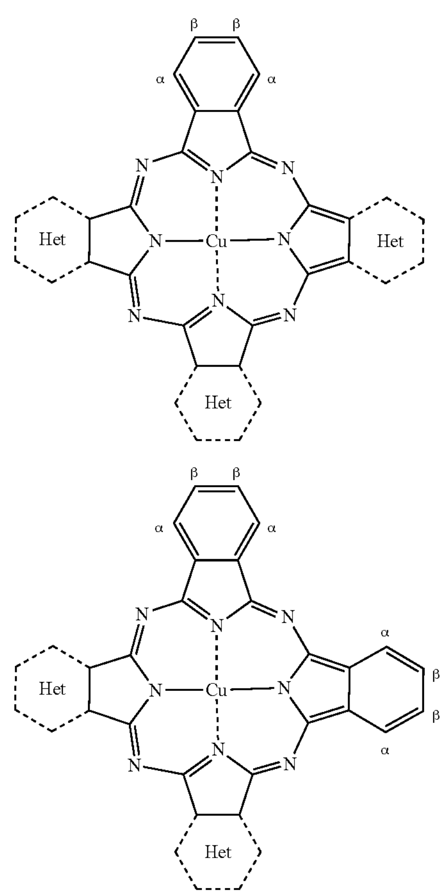

-continued

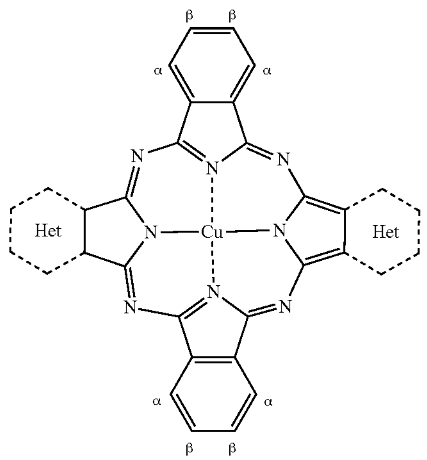

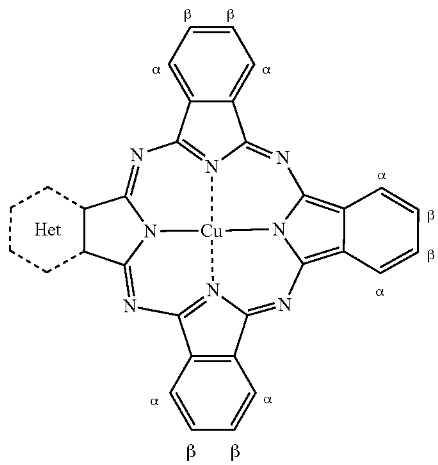

When the dye represented by general formula (III) has a plurality of $—SO_2—Z_1$, a plurality of $Z_1$ may be the same or different, but all $Z_1$ are preferably the same from the viewpoint of image fastness (ozone gas resistance) that varies depending on associating properties of the dye.

When $Z_1$ has an ionic hydrophilic group as a substituent, and the ionic hydrophilic group represents $—SO_3M$ or $—CO_2M$, preferred M has the same meaning as specific examples and preferred ranges of M in general formula (I) above, and the preferred examples are also the same.

$Z_1$ may have another substituent besides the ionic hydrophilic group. Examples of the other substituent include the substituents selected from the substituent group A. The substituent is preferably a halogen atom, a hydroxyl group, a substituted or unsubstituted alkoxy group, a substituted or unsubstituted aryloxy group, a substituted or unsubstituted amino group, a substituted or unsubstituted sulfamoyl group, an alkylsulfonyl group, an arylsulfonyl group, or a substituted or unsubstituted carbamoyl group, more preferably a hydroxyl group, a substituted or unsubstituted amino group, a substituted or unsubstituted sulfamoyl group, an alkylsulfonyl group, an arylsulfonyl group, or a substituted or unsubstituted carbamoyl group, still more preferably a substituted or unsubstituted sulfamoyl group or a substituted or unsubstituted carbamoyl group, and particularly preferably a substituted or unsubstituted sulfamoyl group.

Preferred examples of $—SO_2—Z_1$ include $—SO_2(CH_2)_3—SO_3M$, $—SO_2(CH_2)_4—SO_3M$, $—SO_2(CH_2)_5—SO_3M$, $—SO_2(CH_2)_3—CO_2M$, $—SO_2(CH_2)_4—CO_2M$, $—SO_2(CH_2)_5—CO_2M$, $—SO_2C_2H_4OC_2H_4SO_3M$, $—SO_2CH_2CH(OH)CH_2SO_3M$, $—SO_2CH_2CH(OH)CH_2CO_2M$, $—SO_2(CH_2)_2CH(CH_3)SO_3M$, $—SO_2(CH_2)_3CH(CH_3)SO_3M$, $—SO_2(CH_2)_3—SO_2NHCH_2CH(OH)CH_2SO_3M$, $—SO_2(CH_2)_3—SO_2NHCH_2CH(OH)CH_2CO_2M$, $—SO_2(CH_2)_3—SO_2NH(CH_2)_2SO_3M$, $—SO_2(CH_2)_3—CONHC_2H_4SO_3M$, $—SO_2(CH_2)_3—CONHCH_2CH(OH)CH_2CH_2SO_3M$, $—SO_2(CH_2)_3—CONHCH_2CH(OH)CH_2CH_2CO_2M$, and

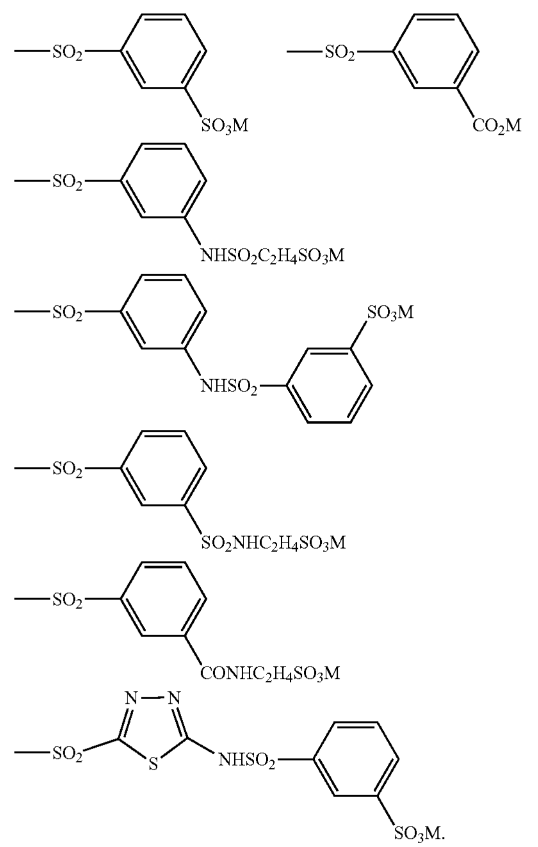

M represents a hydrogen atom or a counter cation. Examples of the counter cation include, but are not particularly limited to, alkali metal ions, an ammonium ion, and organic cations (such as tetramethylammonium, guanidinium, and pyridinium).

M is preferably a hydrogen atom, an ammonium ion, or an alkali metal ion, more preferably an alkali metal ion, still more preferably a lithium ion, a sodium ion, or a potassium ion, particularly preferably a lithium ion or a sodium ion, and most preferably a lithium ion.

In particular, a lithium salt of a sulfo group ($—SO_3Li$) is preferred because the solubility of the dye is enhanced, and ink stability is improved. M may be a divalent counter cation. When M is a divalent counter cation, the dye may have, for example, a form in which one M functions as a counter cation of two $—SO_3$. From the viewpoint of water solubility, M is preferably a monovalent counter cation.

When M represents a specific cation (e.g., a lithium ion), all M are not necessarily lithium ions, but substantially, the counter cation having the highest presence ratio is preferably a lithium ion. Under the conditions of such a presence ratio, the dye can include, as M, for example, a hydrogen atom, an alkali metal ion (e.g., a sodium ion or a potassium ion), an alkaline-earth metal ion (e.g., a magnesium ion, a calcium ion, or the like), a quaternary ammonium ion, a quaternary phosphonium ion, or a sulfonium ion. The amount of lithium ions is preferably 50% or more, more preferably 60% or more, still more preferably 80% or more, and particularly preferably 90% or more relative to the total of M. The upper limit of the amount of lithium ions is preferably 100%.

The above case of a lithium ion also applies to a case where the specific cation represents a cation (e.g., a sodium ion) other than a lithium ion.

The dye (partial azaphthalocyanine dye) represented by general formula (I) can be synthesized by a publicly known method (for example, a method described in Examples of JP4516744B).

The number of dyes represented by general formula (I) and included in the dye ink composition according to the present invention may be one or two or more, and is preferably two or more.

The dye ink composition according to the present invention preferably includes, as dyes represented by general formula (I), a dye in which three of the four rings of ring A, ring B, ring C, and ring D are each a six-membered nitrogen-containing heterocyclic ring (preferably, a dye represented by general formula (I-1) below), a dye in which two of the four rings of ring A, ring B, ring C, and ring D are each a six-membered nitrogen-containing heterocyclic ring (preferably, at least one of a dye represented by general formula (I-2-1) below or a dye represented by general formula (I-2-2) below), and a dye in which one of the four rings of ring A, ring B, ring C, and ring D is a six-membered nitrogen-containing heterocyclic ring (preferably, a dye represented by general formula (I-3) below).

General formula (I-1)

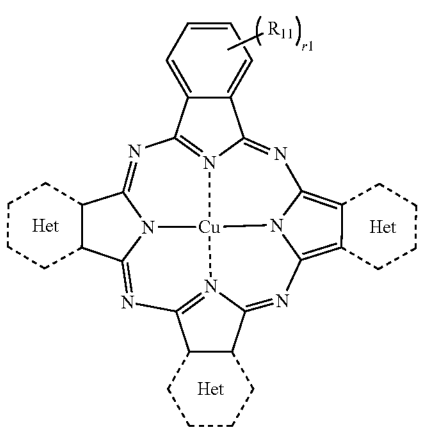

In general formula (I-1), Het each independently represent a pyridine ring, a pyrazine ring, a pyrimidine ring, or a pyridazine ring. $R_{11}$ represents a substituent. r1 represents 1 to 4. In a case where a plurality of $R^{11}$'s are present, the plurality of $R_{11}$'s may be the same or different. The dye represented by general formula (I-1) has at least one ionic hydrophilic group as a substituent.

General formula (I-2-1)

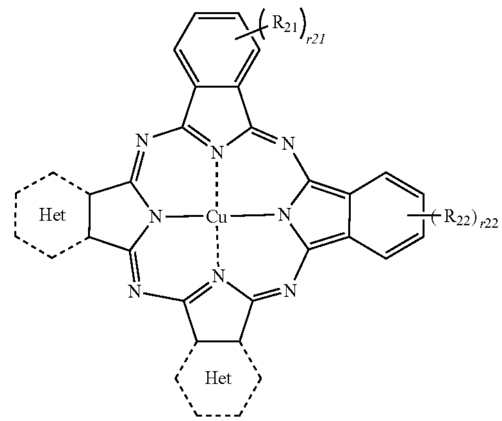

In general formula (I-2-1), Het each independently represent a pyridine ring, a pyrazine ring, a pyrimidine ring, or a pyridazine ring. $R_{21}$ and $R_{22}$ each independently represent a substituent. r21 and r22 each independently represent 0 to 4. In a case where a plurality of $R_{21}$'s are present, the plurality of $R_{21}$'s may be the same or different. In a case where a plurality of $R_{22}$'s are present, the plurality of $R_{22}$'s may be the same or different. The dye represented by general formula (I-2-1) has at least one ionic hydrophilic group as a substituent.

General formula (I-2-2)

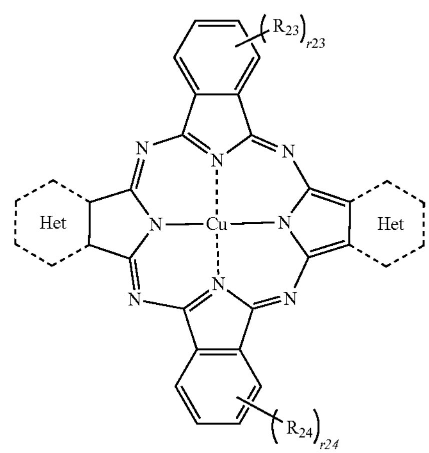

In general formula (I-2-2), Het each independently represent a pyridine ring, a pyrazine ring, a pyrimidine ring, or a pyridazine ring. $R_{23}$ and $R_{24}$ each independently represent a substituent. r23 and r24 each independently represent 0 to 4. In a case where a plurality of $R_{23}$'s are present, the plurality of $R_{23}$'s may be the same or different. In a case where a plurality of $R_{24}$'s are present, the plurality of $R_{24}$'s may be the same or different. The dye represented by general formula (I-2-2) has at least one ionic hydrophilic group as a substituent.

General formula (I-3)

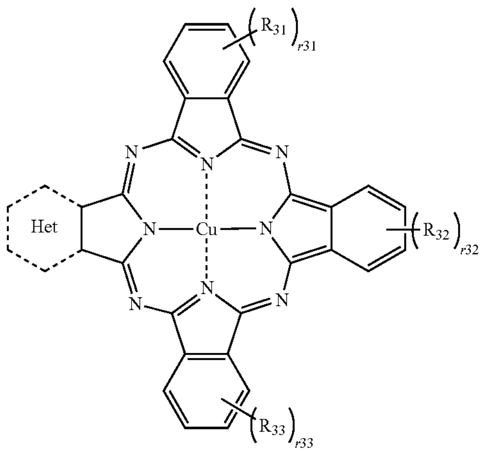

In general formula (I-3), Het represents a pyridine ring, a pyrazine ring, a pyrimidine ring, or a pyridazine ring. $R_{31}$, $R_{32}$, and $R_{33}$ each independently represent a substituent. r31, r32, and r33 each independently represent 0 to 4. In a case where a plurality of $R_{31}$'s are present, the plurality of $R_{31}$'s may be the same or different. In a case where a plurality of $R_{32}$'s are present, the plurality of $R_{32}$'s may be the same or different. In a case where a plurality of $R_{33}$'s are present, the plurality of $R_{33}$'s may be the same or different. The dye represented by general formula (I-3) has at least one ionic hydrophilic group as a substituent.

Specific examples and preferred examples of $R_{21}$ in general formula (I-1) are the same as those described as the substituents that ring A, ring B, ring C, and ring D may have. In addition, r1, which represents the number of substituents, preferably represents 1 to 3.

Specific examples and preferred examples of $R_{21}$ and $R_{22}$ in general formula (I-2-1) are the same as those described as the substituents that ring A, ring B, ring C, and ring D may have. In addition, r21 and r22, each of which represents the number of substituents, each preferably represent 1 to 3.

Specific examples and preferred examples of $R_{23}$ and $R_{24}$ in general formula (I-2-2) are the same as those described as the substituents that ring A, ring B, ring C, and ring D may have. In addition, r23 and r24, each of which represents the number of substituents, each preferably represent 1 to 3.

Specific examples and preferred examples of $R_{31}$, $R_{32}$, and $R_{33}$ in general formula (I-3) are the same as those described as the substituents that ring A, ring B, ring C, and ring D may have. In addition, r31, r32, and r33 each of which represents the number of substituents, each preferably represent 1 to 3.

The dye ink composition according to the present invention preferably contains 4% to 30% by mass of the dye represented by general formula (I-1), 15% to 45% by mass of at least one of the dye represented by general formula (I-2-1) or the dye represented by general formula (I-2-2) in total, and 20% to 50% by mass of the dye represented by general formula (I-3) relative to the total mass of the dye represented by general formula (I).

Specific examples of the dye represented by general formula (I) or (111) are described below, but are not limited thereto. In the specific examples below, it is indicated that each substituted sulfonyl group (—$SO_2Z$) replaces any hydrogen atom at a β position but does not replace the portions having "H" in each structural formula.

Specific examples of the case where three rings among the four rings of ring A, ring B, ring C, and ring D each represent a substituted benzene ring, and the remaining one ring represents a heterocyclic ring are described below without differentiating the substitution positons. Specifically, the specific examples below each encompass positional isomers having different substitution positons, such as (E1-1) to (E1-3) below. R and A each represent a substituent.

(E1-1)

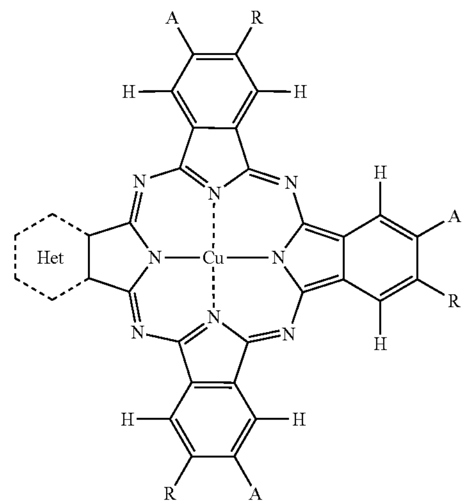

(E1-2)

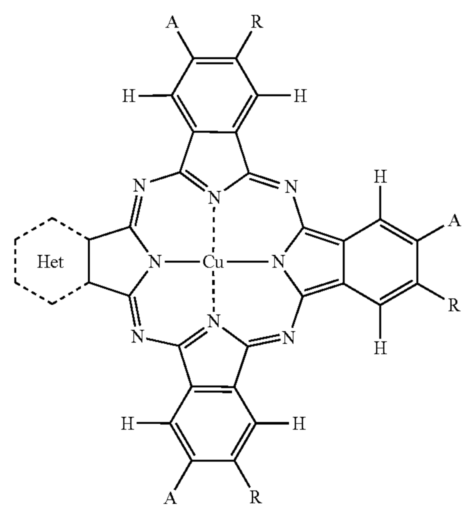

(E1-3)

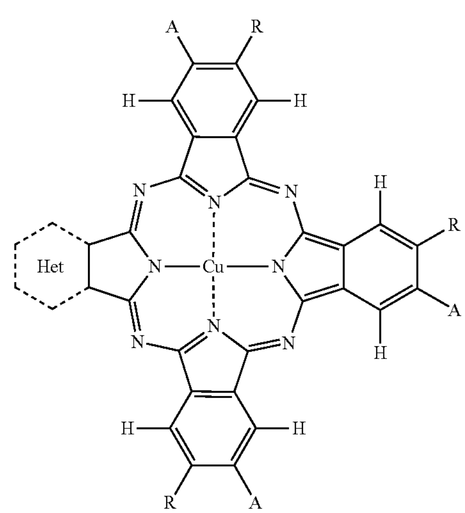

-continued (P-1)

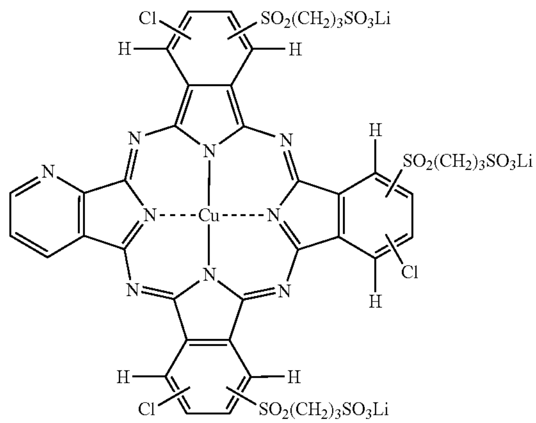

(P-2)

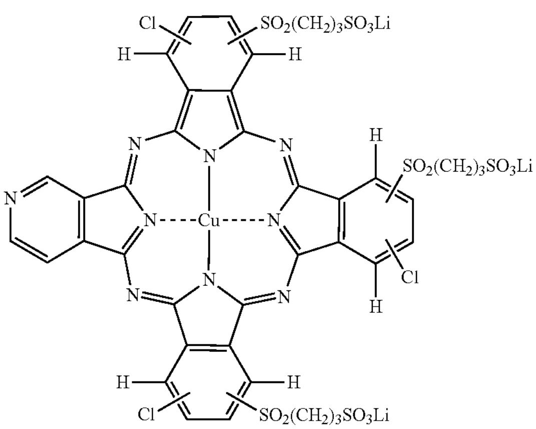

-continued (P-3)

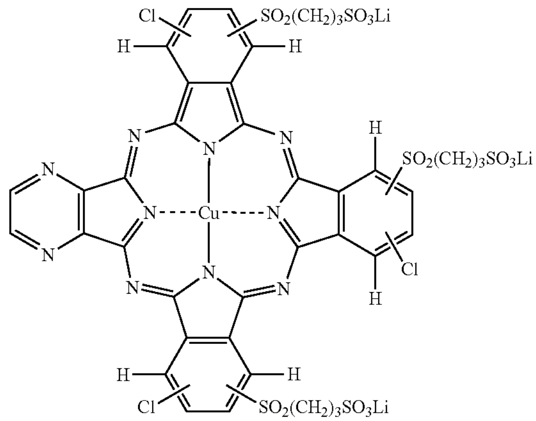

(P-4)

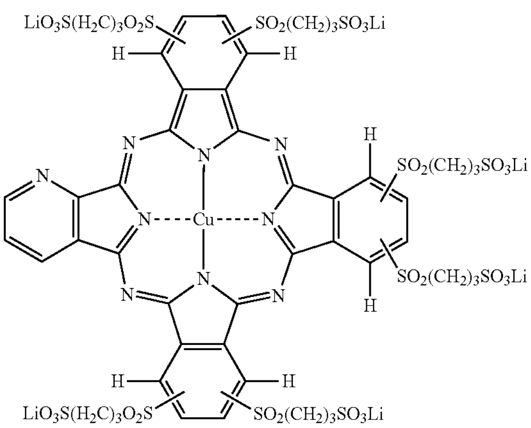

Specific examples of the case where three rings among the four rings of ring A, ring B, ring C, and ring D each represent a substituted benzene ring, and the remaining one ring represents a heterocyclic ring are described below without differentiating the substitution positons. Specifically, the specific examples below each encompass positional isomers having different substitution positons, such as (E1-4) to (E1-6) below. R represents a substituent.

(E1-4)

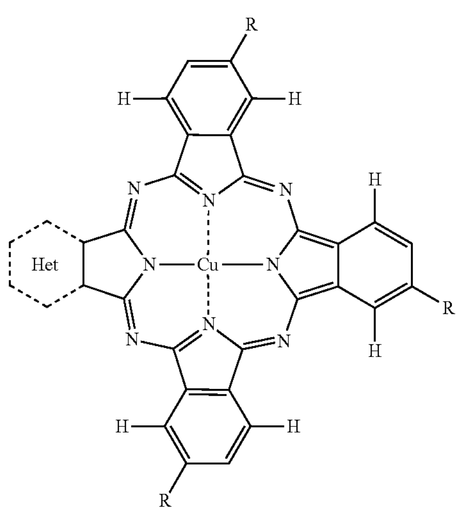

(E1-5)

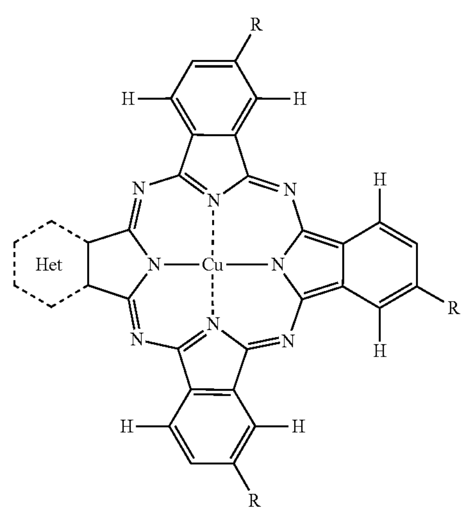

-continued
(E1-6)
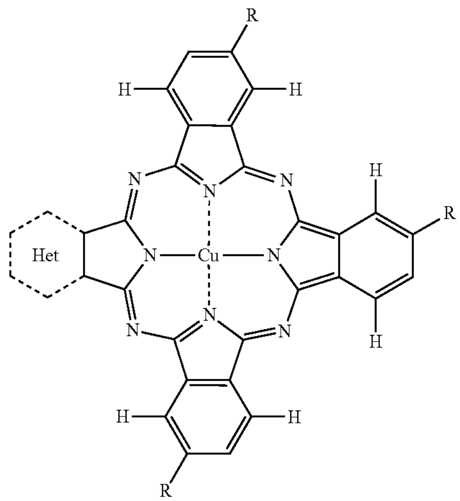
(P-5)
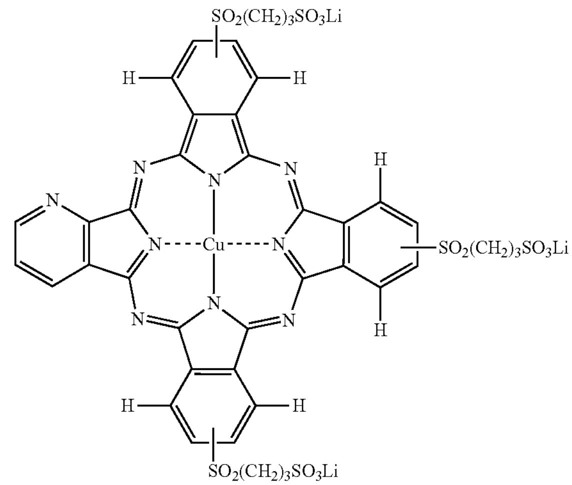
(P-6)
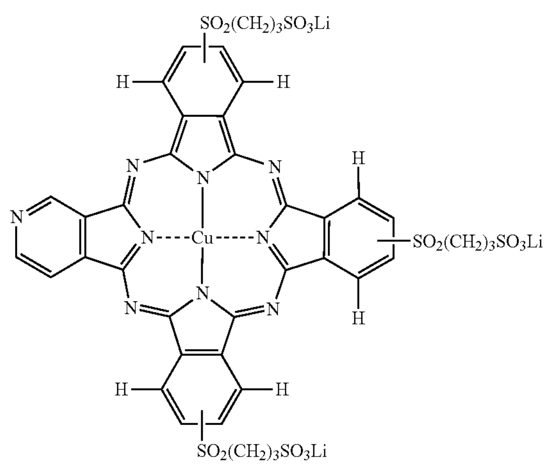
(P-7)
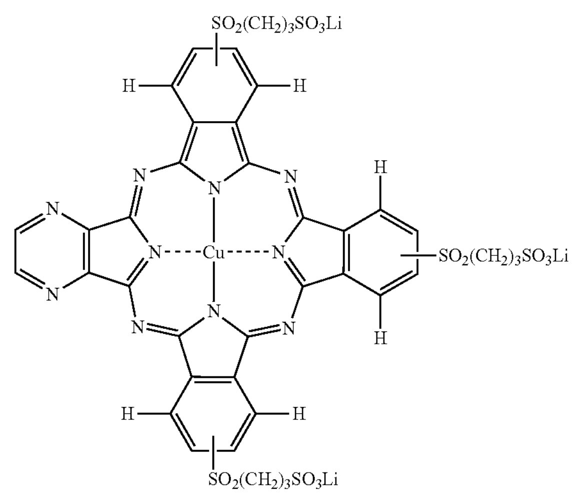
(P-8)
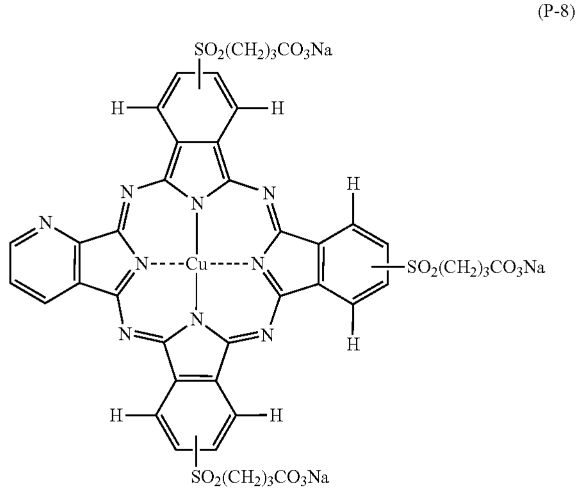
(P-9)
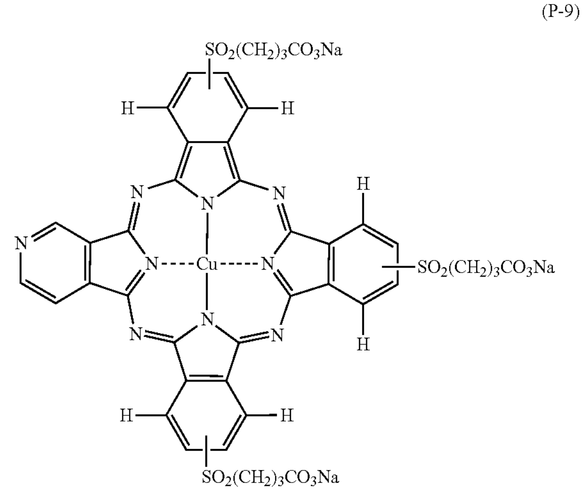

-continued
(P-10)
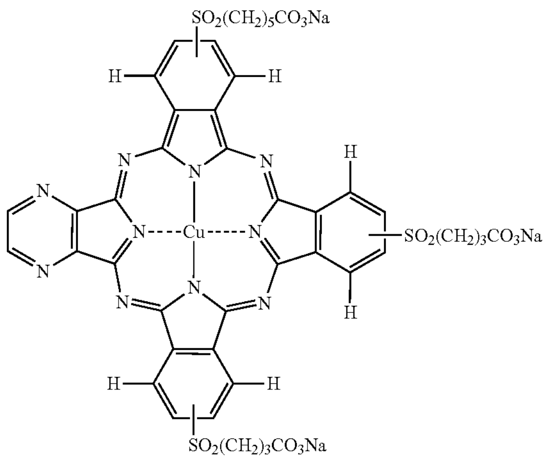
(P-11)
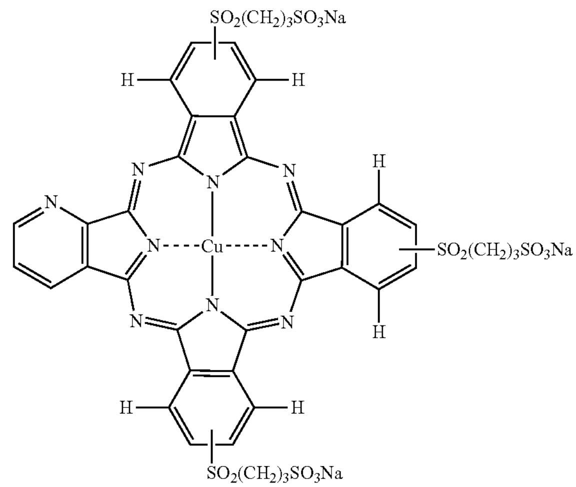
(P-12)
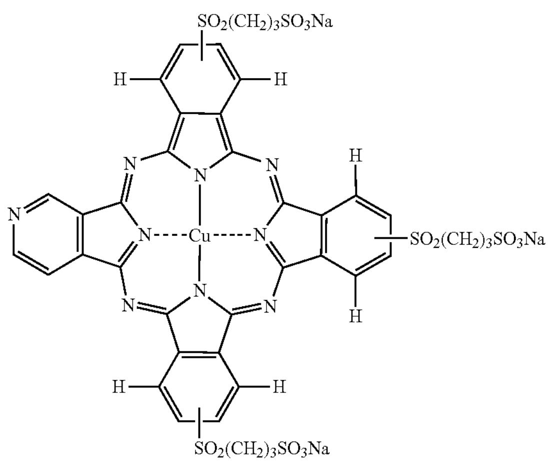
(P-13)
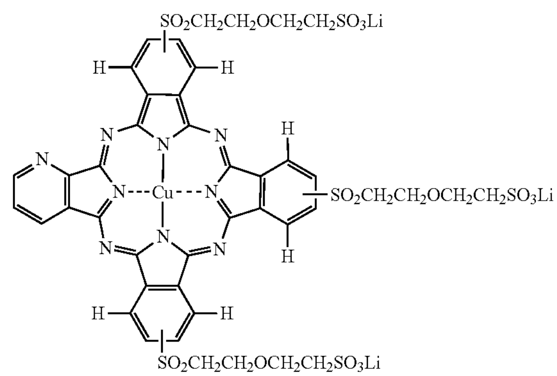
(P-14)
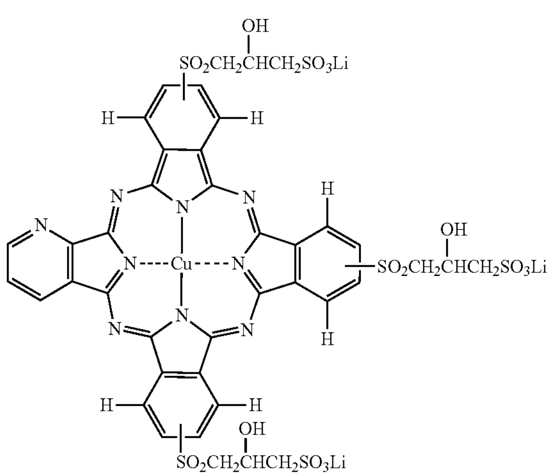
(P-15)
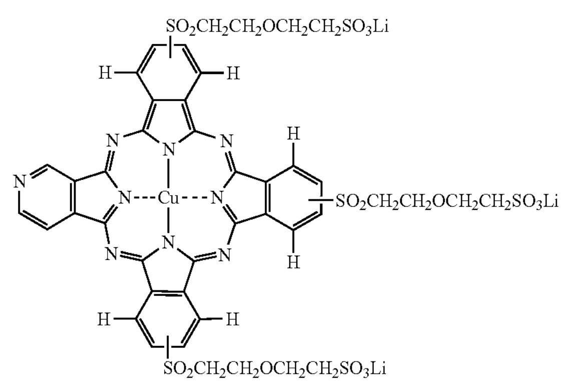

-continued
(P-16)
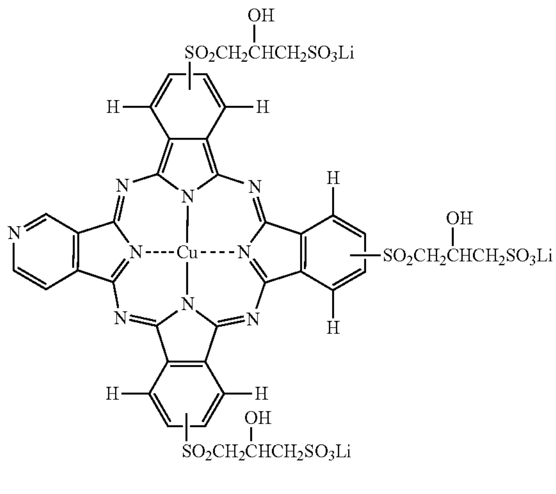
(P-17)
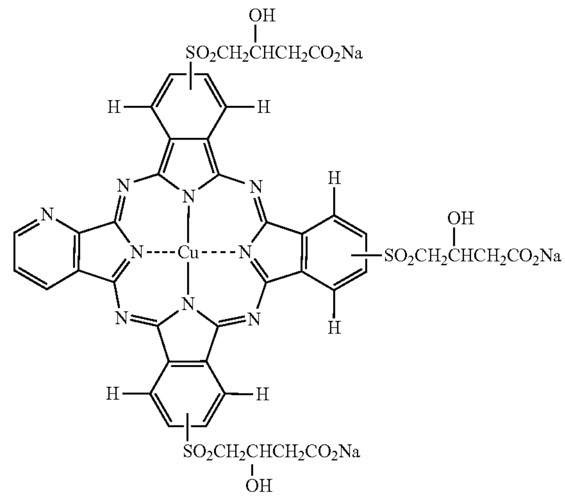
(P-18)
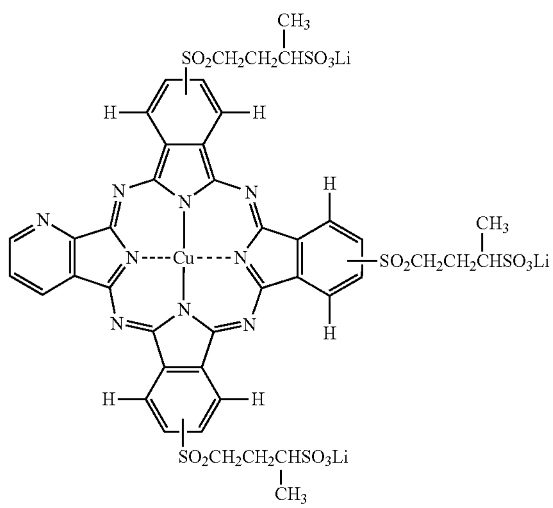
(P-19)
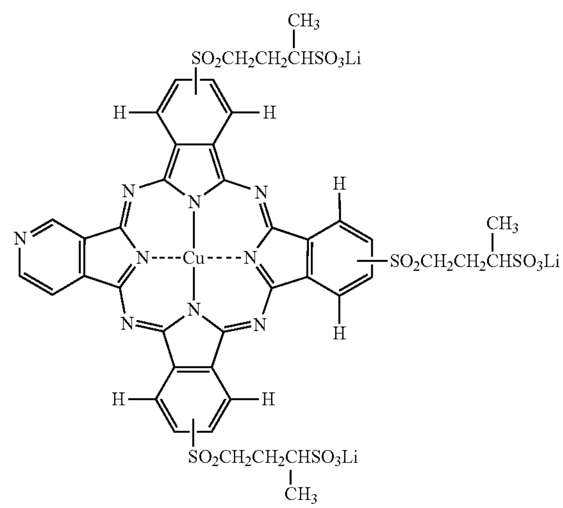
(P-20)
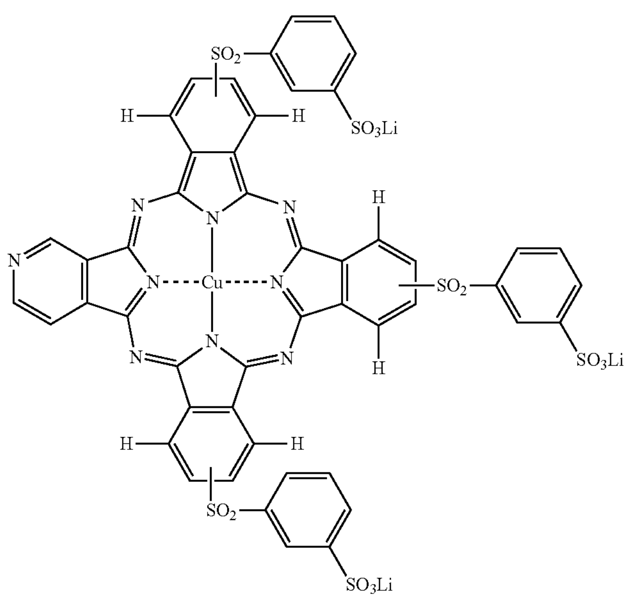

-continued
(P-21)
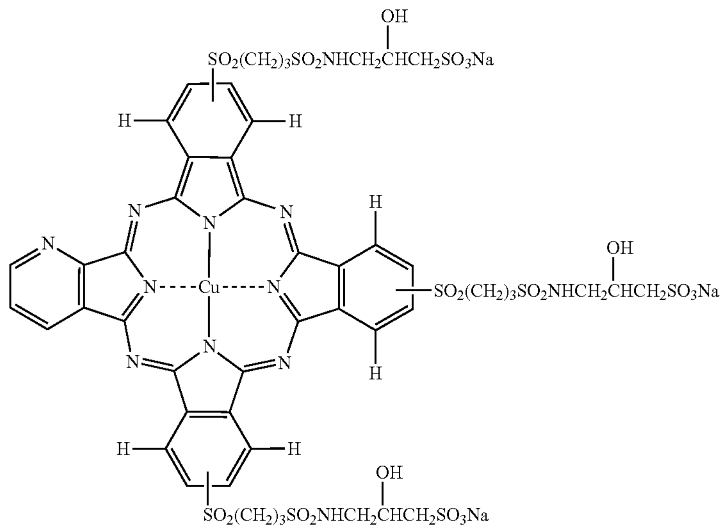
(P-22)
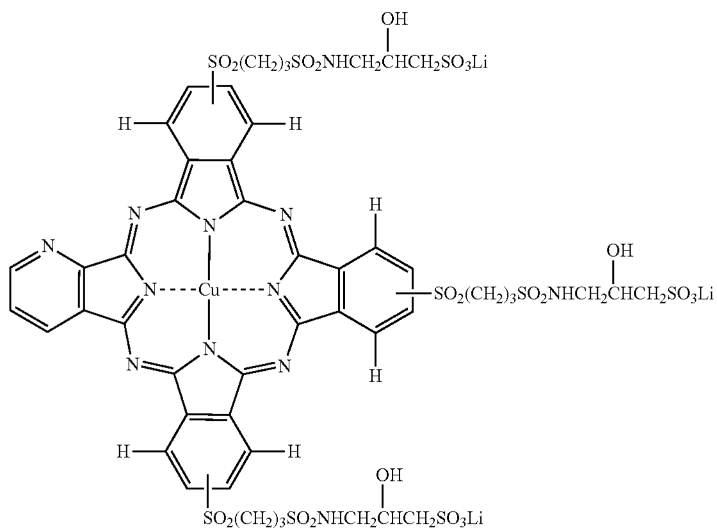
(P-23)
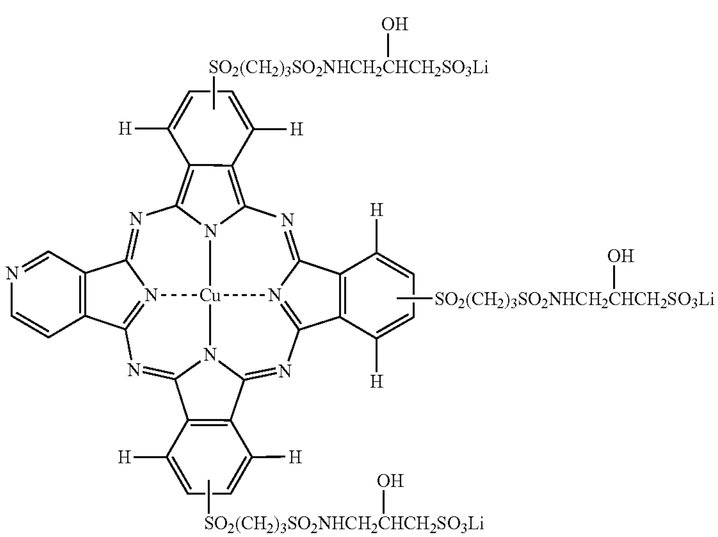

-continued
(P-24)
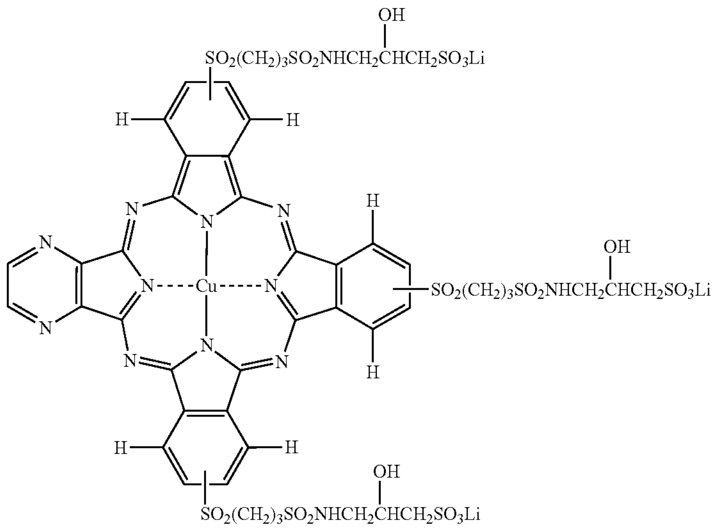
(P-25)
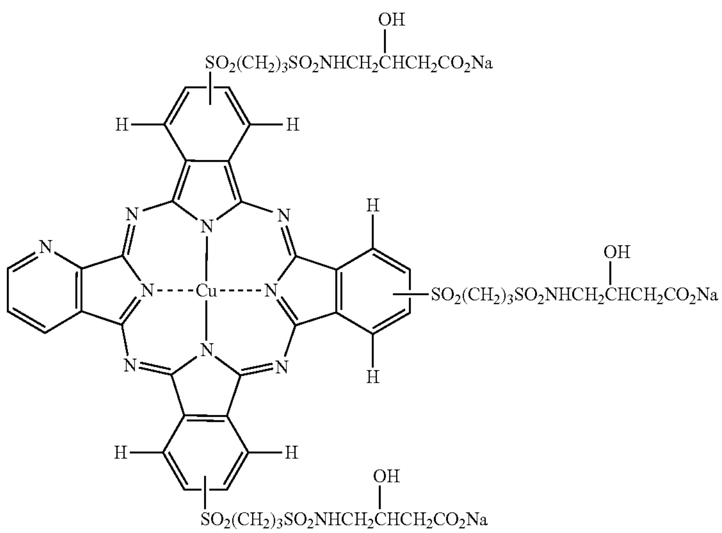
(P-26)
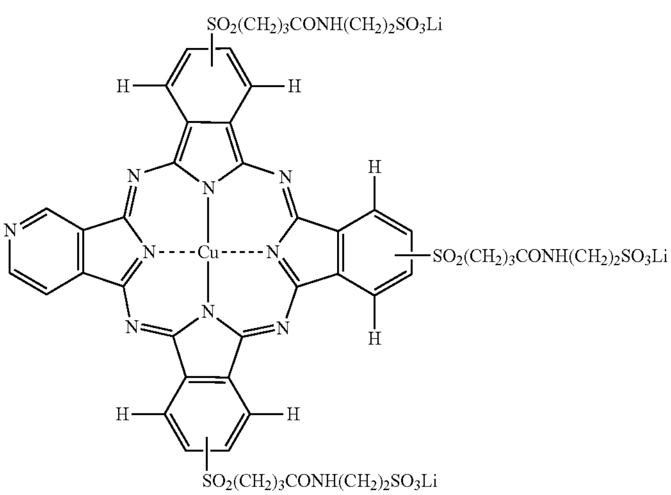

-continued
(P-27)
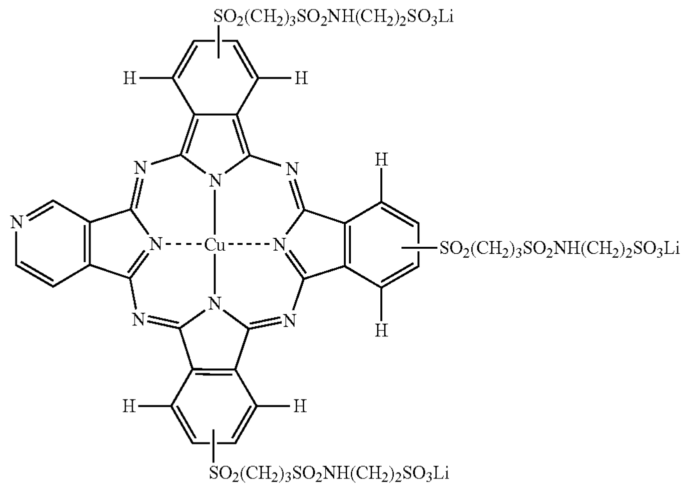
(P-28)
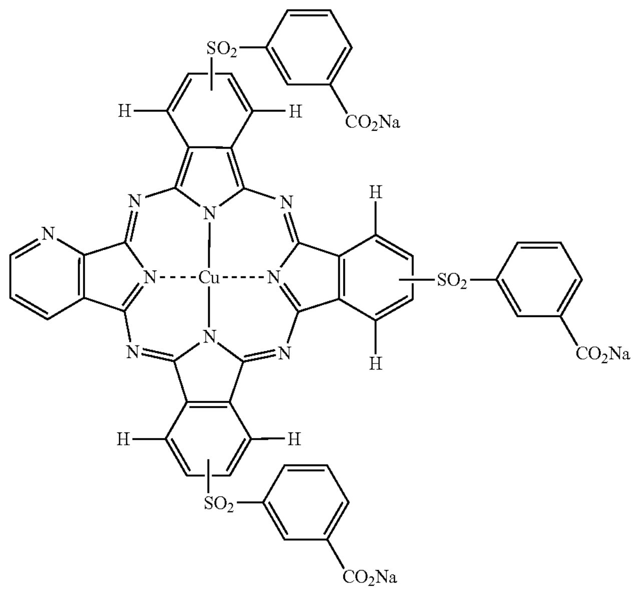
(P-29)
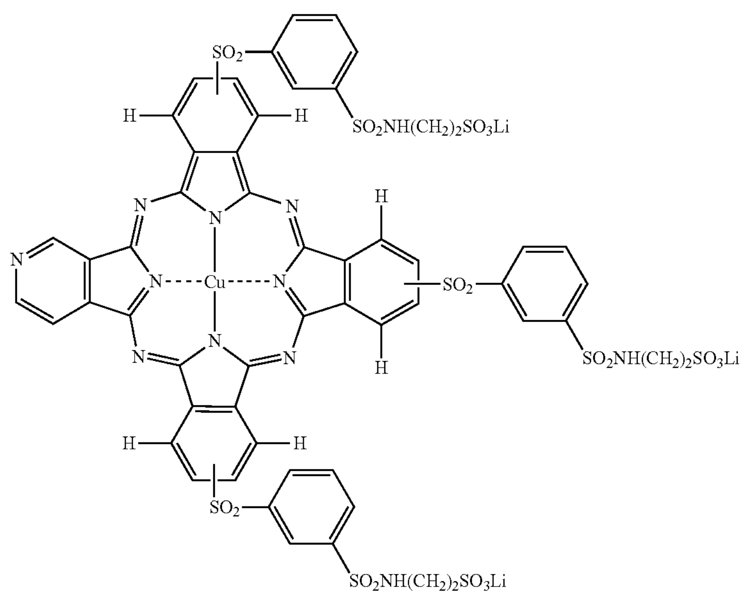

-continued
(P-30)
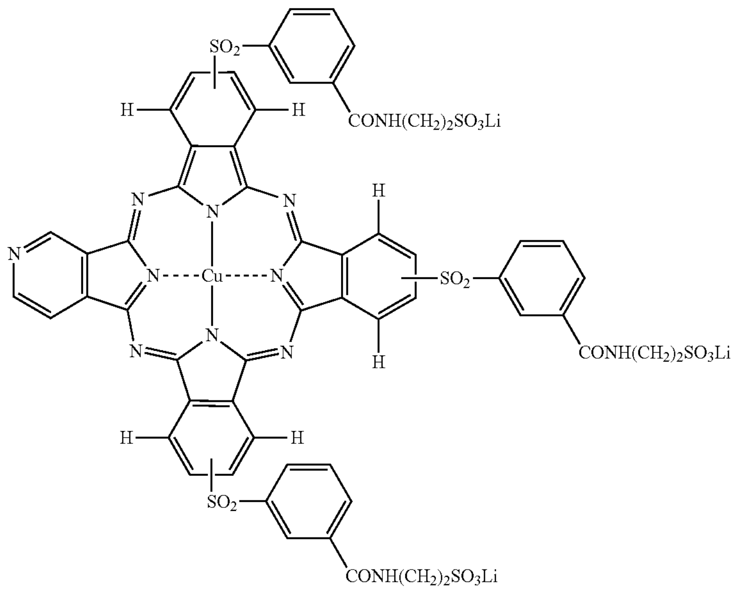
(P-31)
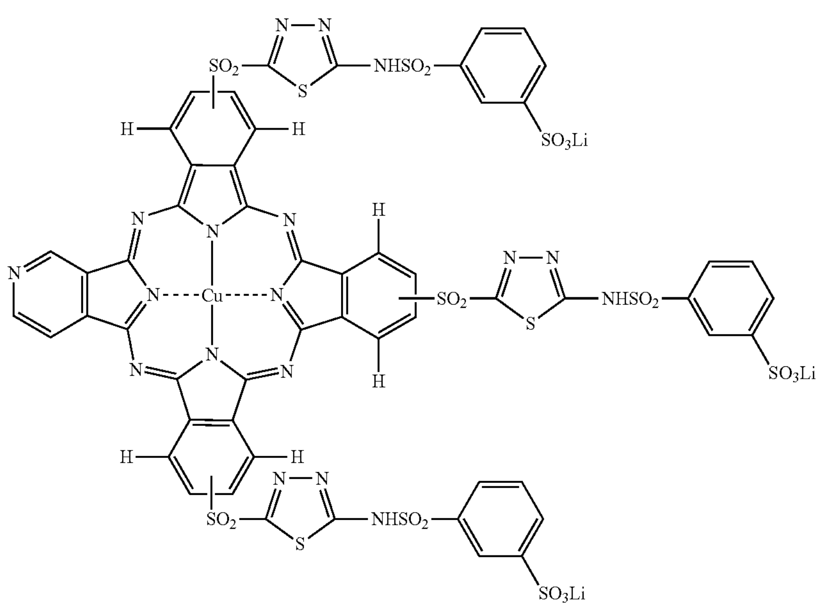

Specific examples of the case where two rings among the four rings of ring A, ring B, ring C, and ring D each represent a substituted benzene ring, and the remaining two rings each represent a heterocyclic ring are described below without differentiating the substitution positons. Specifically, the specific examples below each encompass positional isomers having different substitution positons, such as (E1-7) to (E1-8) or (E1-9) to (E1-10) below. R represents a substituent.

(E1-7)

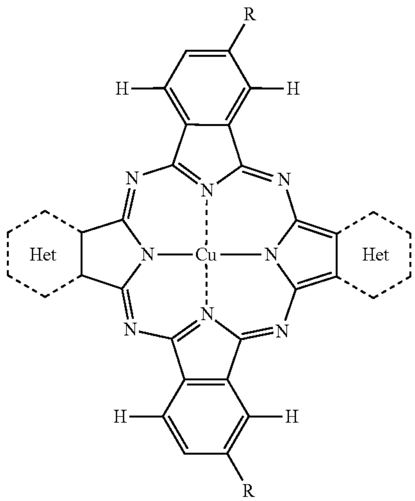

(E1-8)

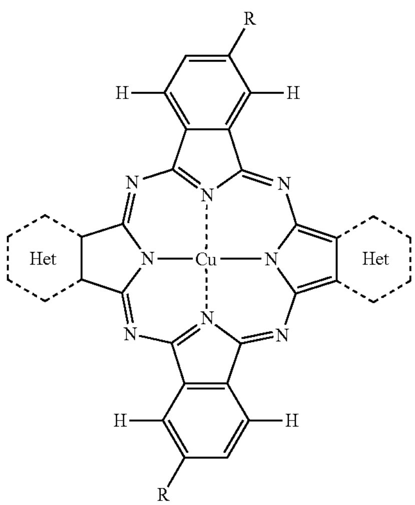

(E1-9)

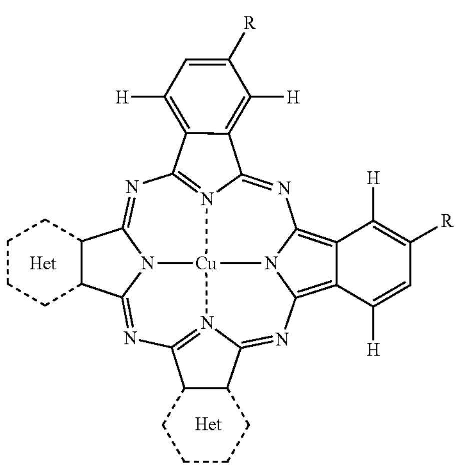

-continued (E1-10)

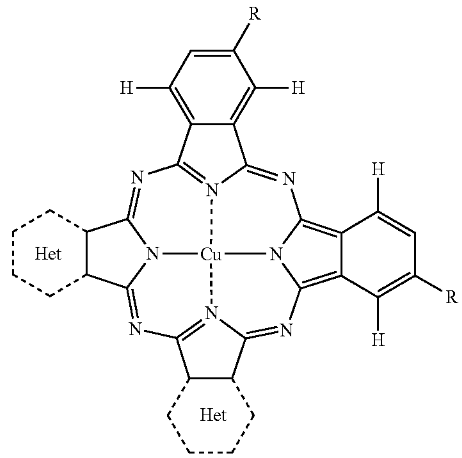

(P-32-1)

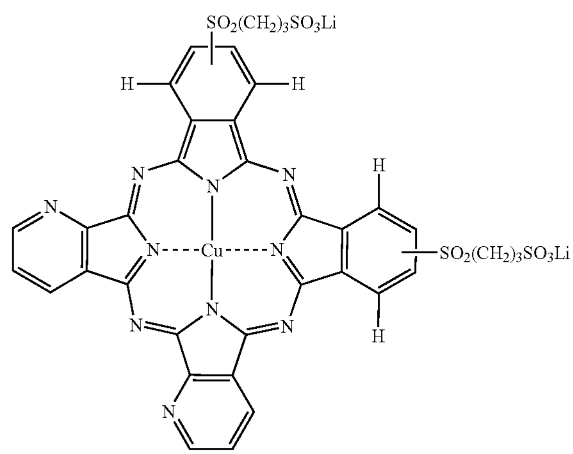

(P-32-2)

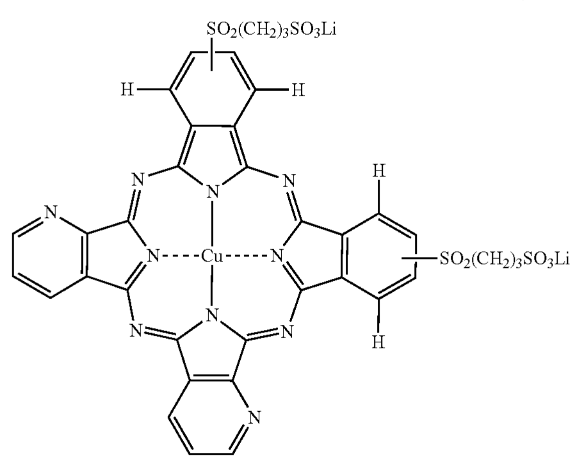

-continued
(P-32-3)
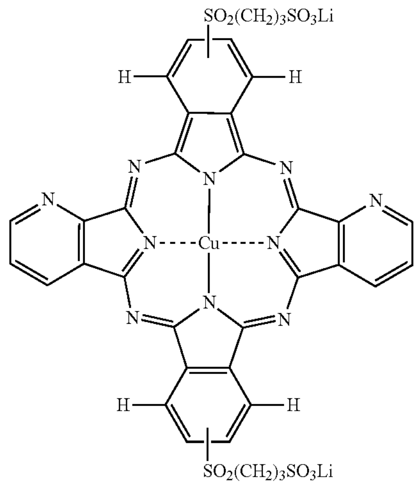
(P-32-4)
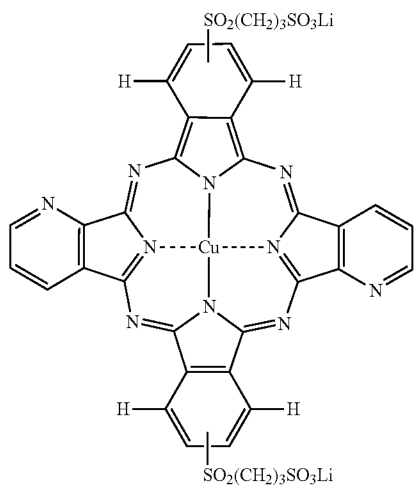
(P-33-1)
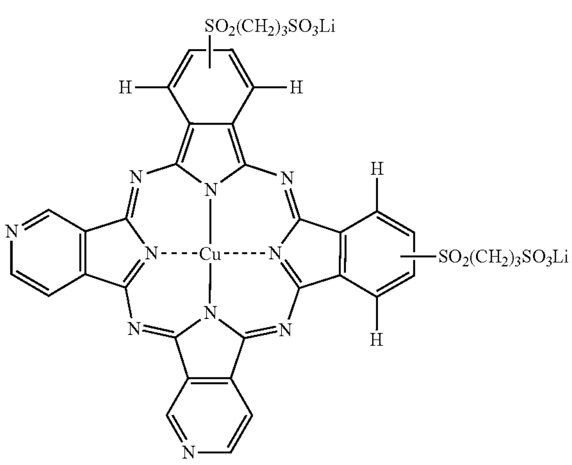
-continued
(P-33-2)
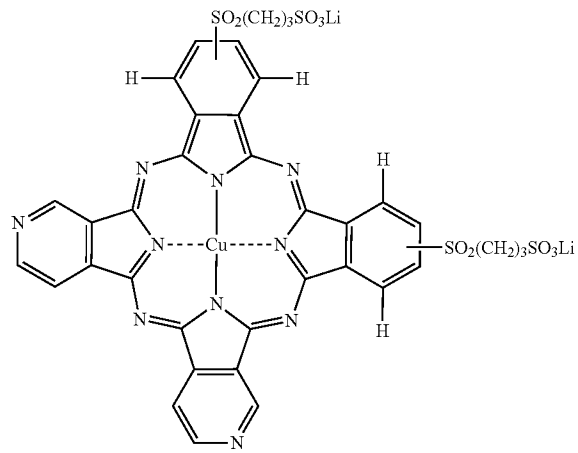
(P-33-3)
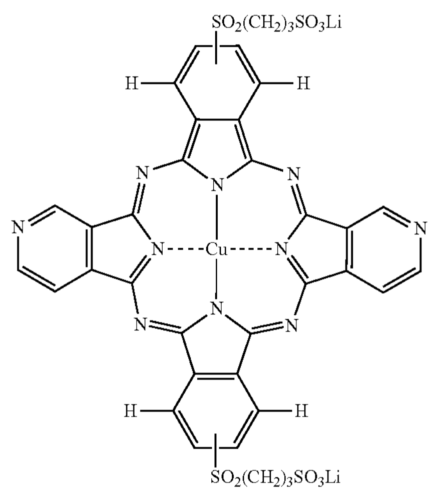
(P-33-4)
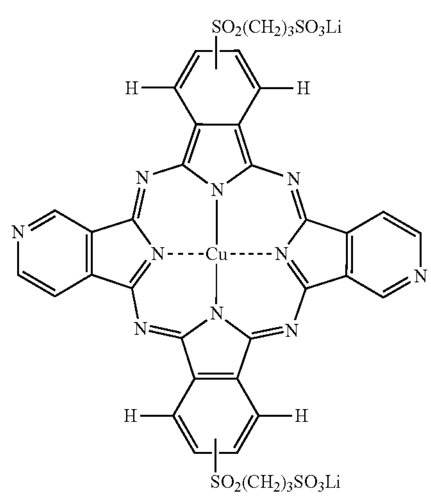

-continued
(P-34-1)
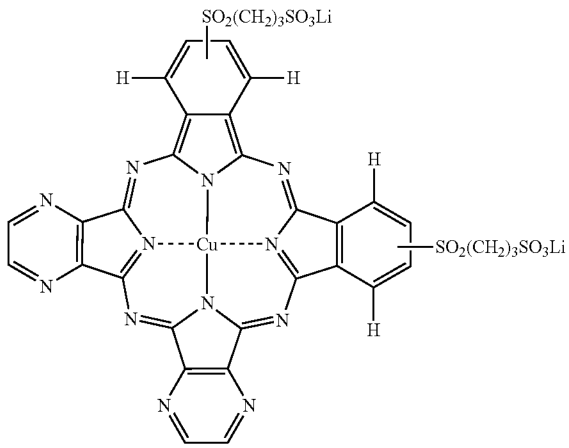
(P-34-2)
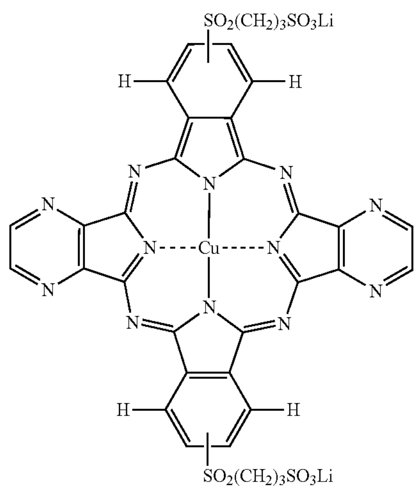
(P-35-1)
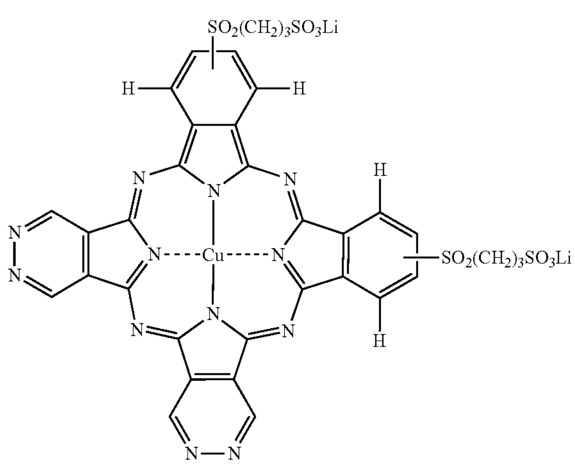
-continued
(P-35-2)
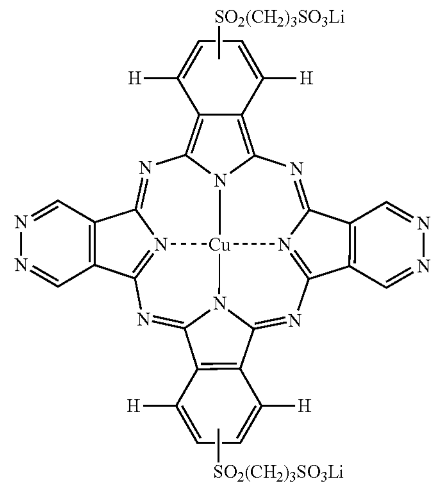
(P-36-1)
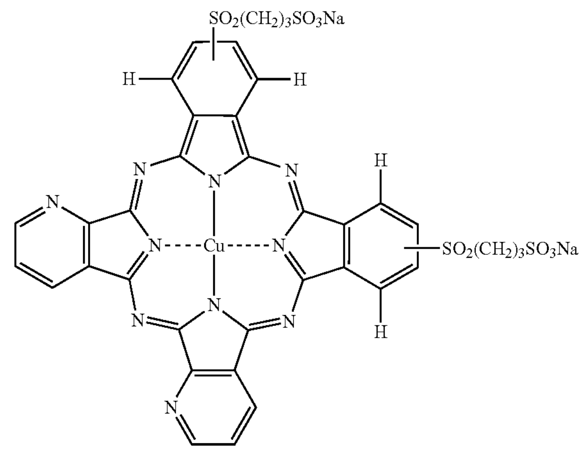
(P-36-2)
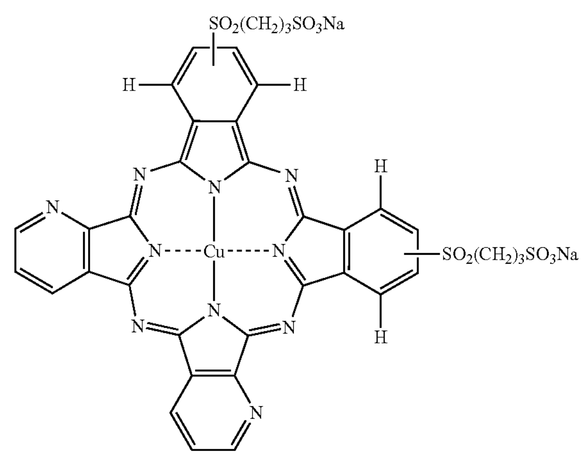

-continued
(P-36-3)
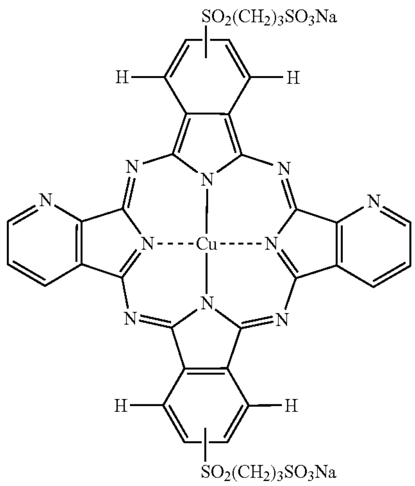
(P-36-4)
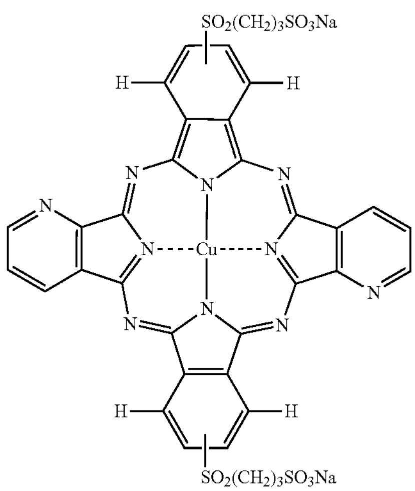
(P-37-1)
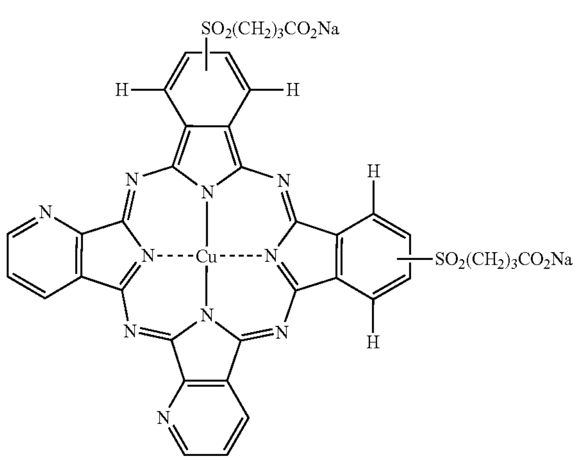
-continued
(P-37-2)
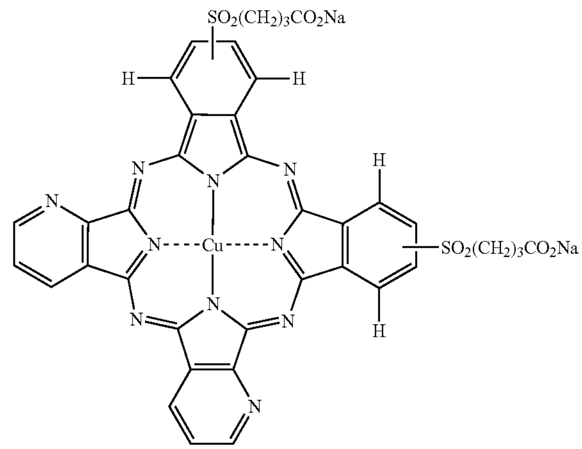
(P-37-3)
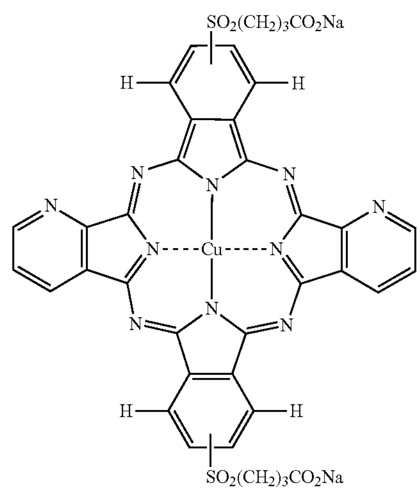
(P-37-4)
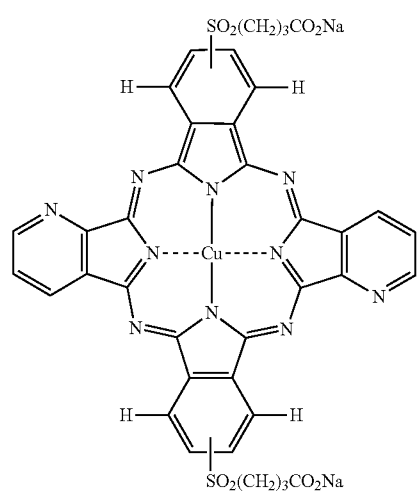

-continued
(P-38-1)
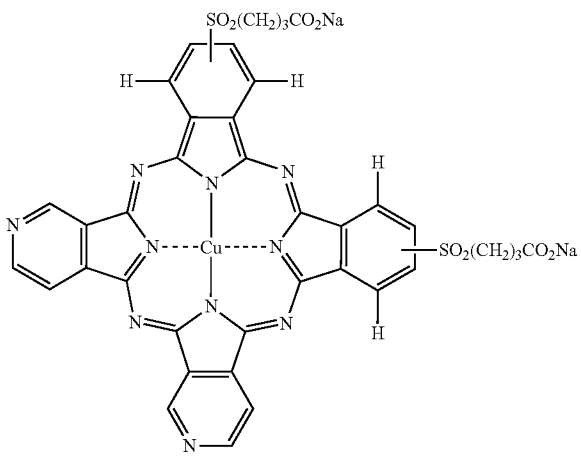
(P-38-2)
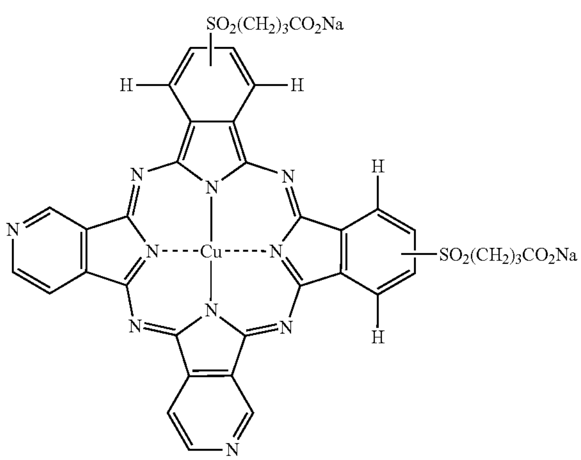
(P-38-3)
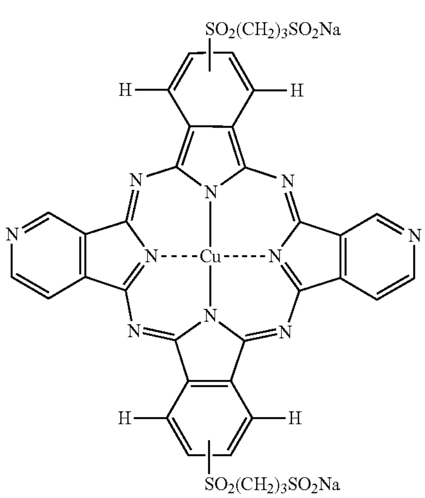
-continued
(P-38-4)
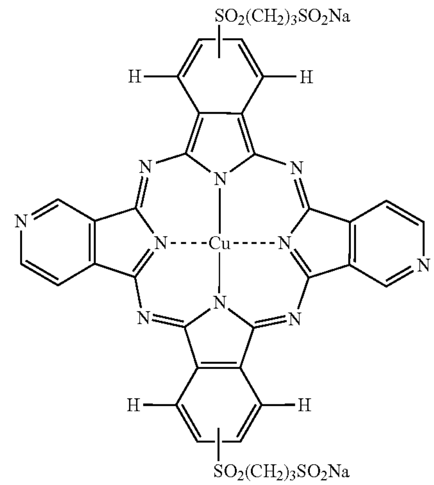
(P-39-1)
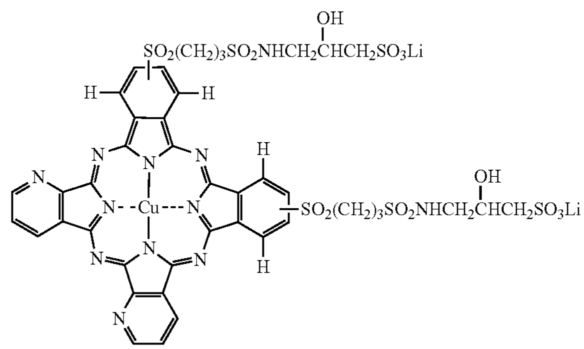
(P-39-2)
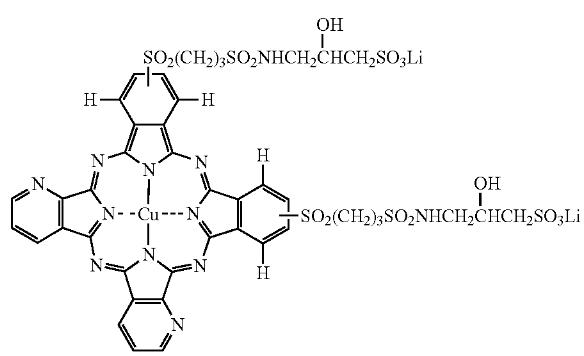

-continued
(P-39-3)
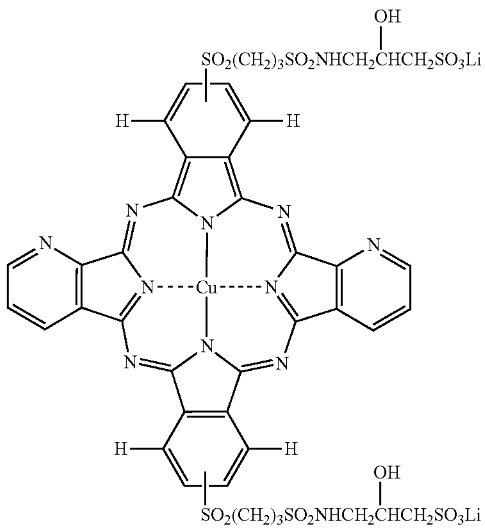
(P-39-4)
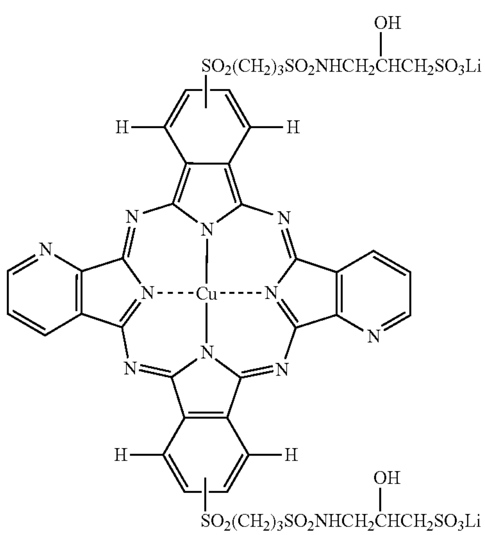
(P-40-1)
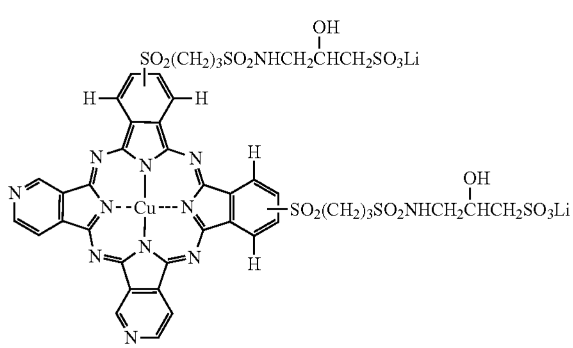
-continued
(P-40-2)
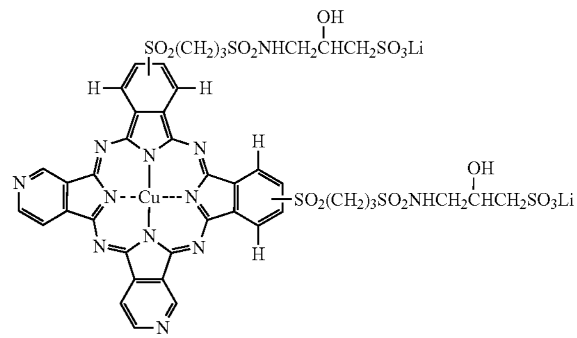
(P-40-3)
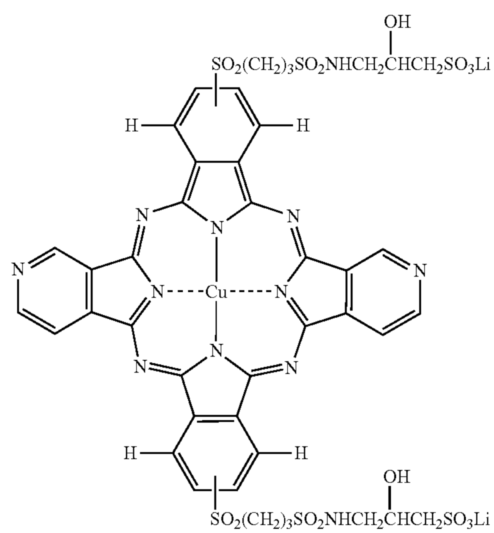
(P-40-4)
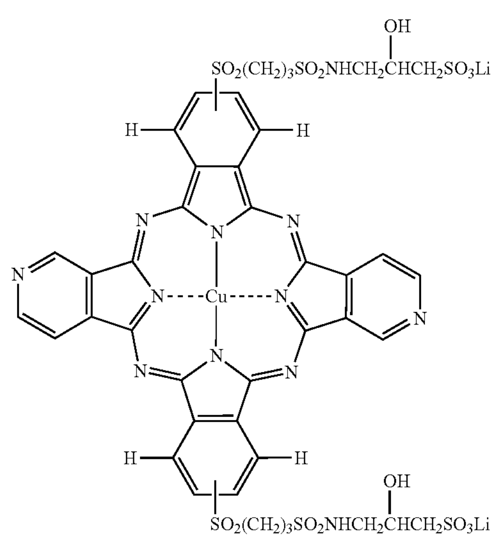

-continued
(P41-1)
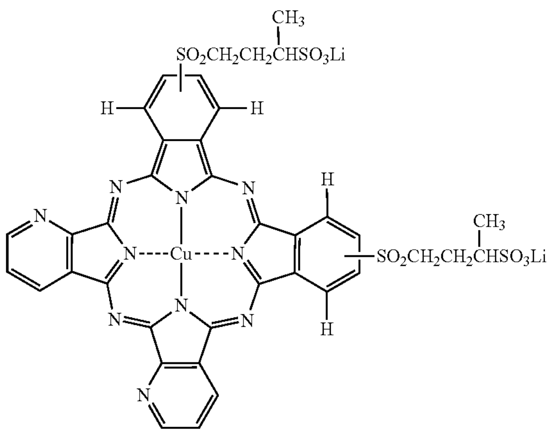
(P41-2)
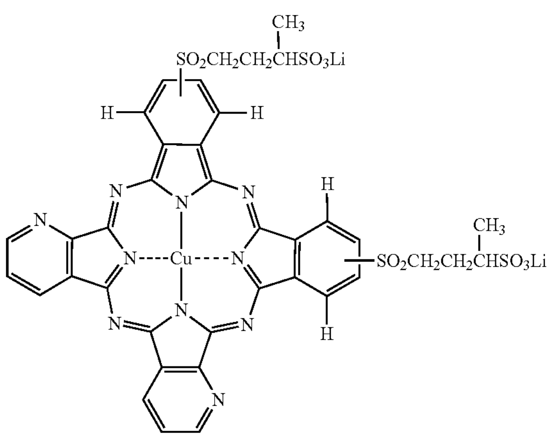
(P41-3)
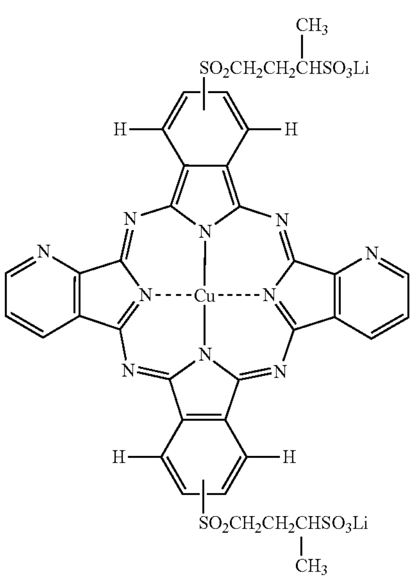
-continued
(P41-4)
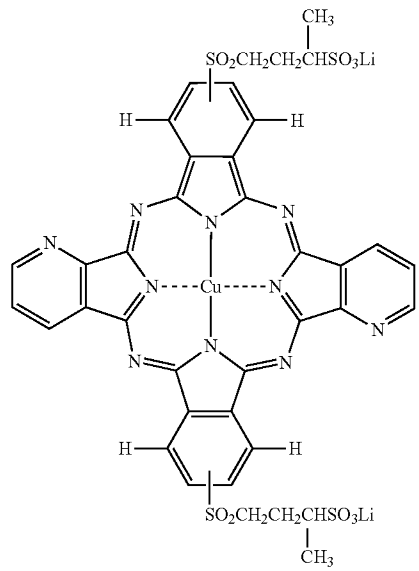
(P42-1)
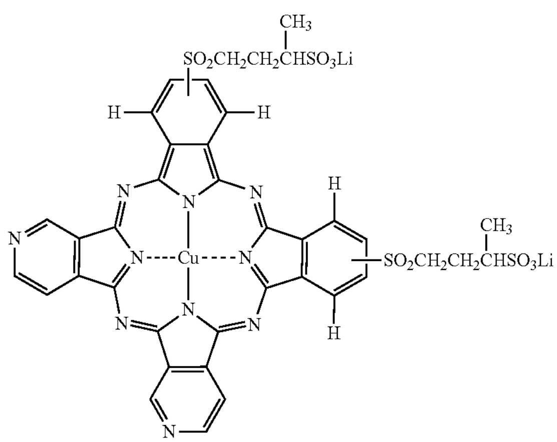
(P42-2)
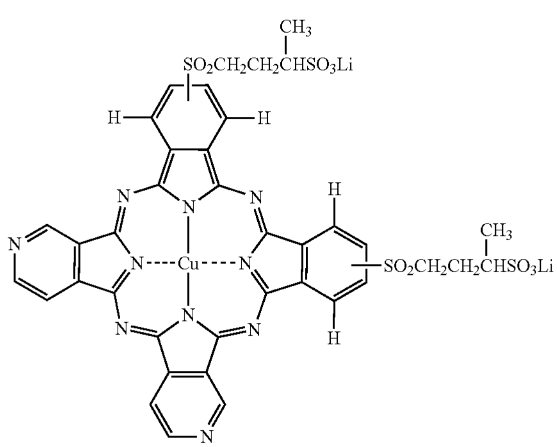

-continued
(P42-3)
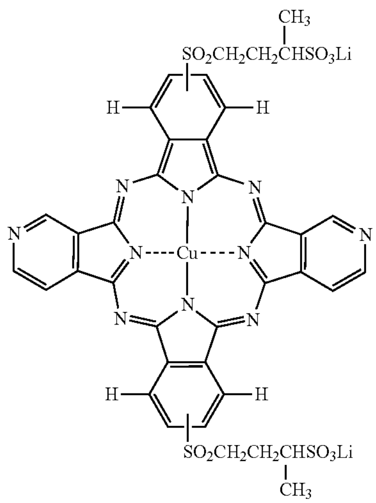
(P42-4)
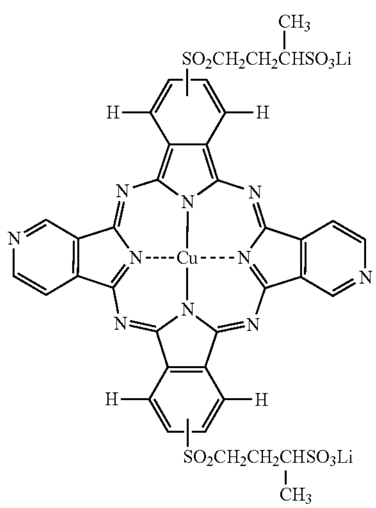
(P-43-1)
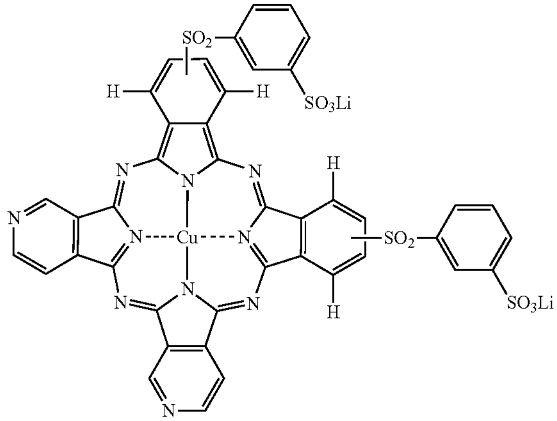
-continued
(P-43-2)
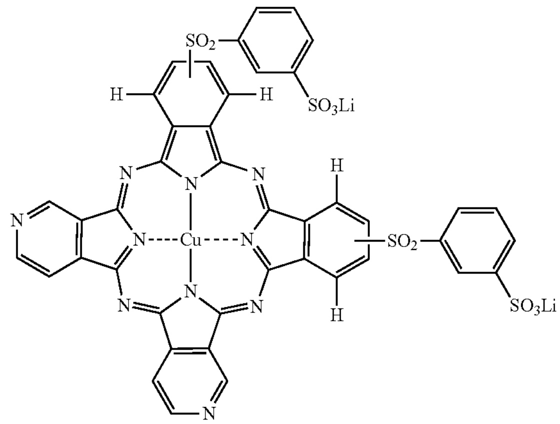
(P-43-3)
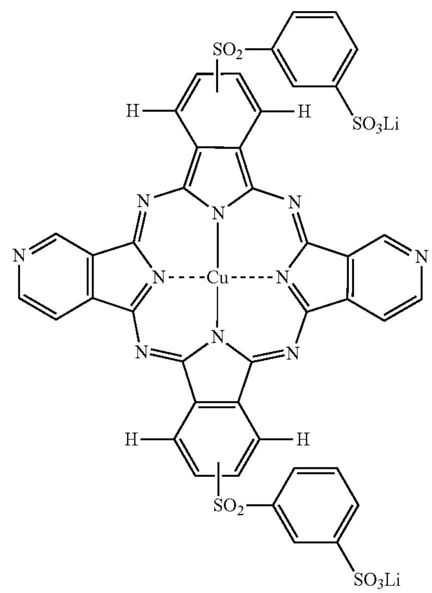
(P43-4)
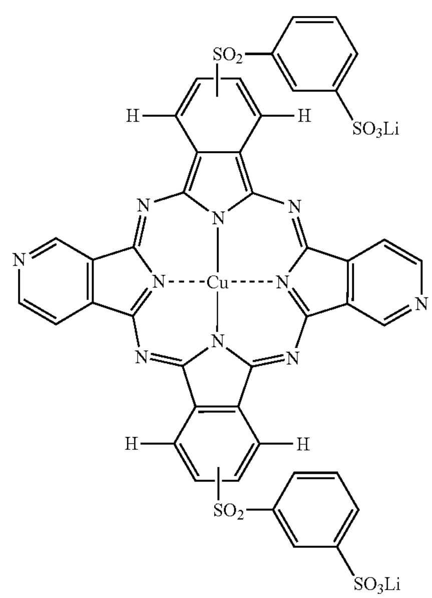

-continued (P-44-1)

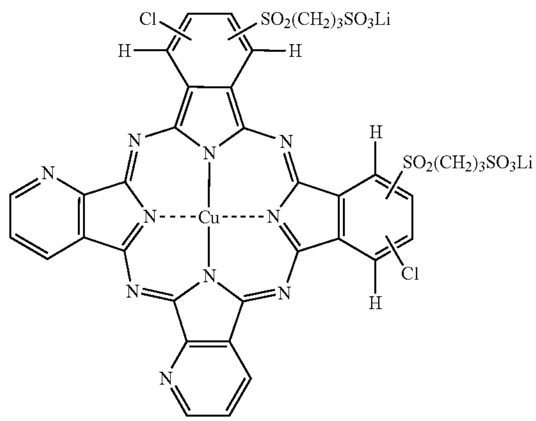

(P-44-2)

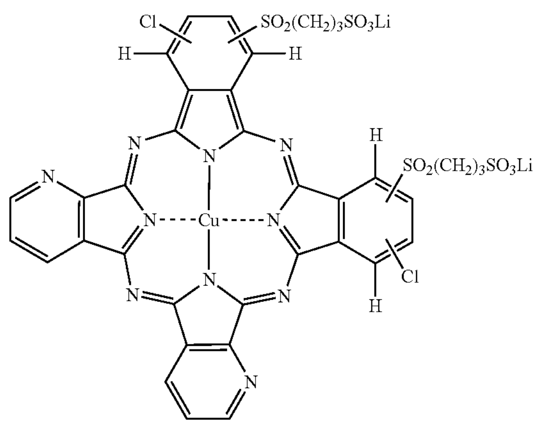

-continued (P-44-3)

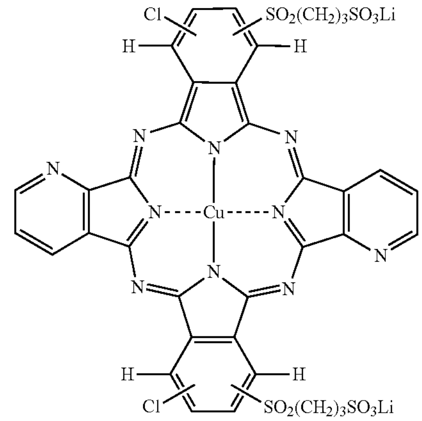

(P-44-4)

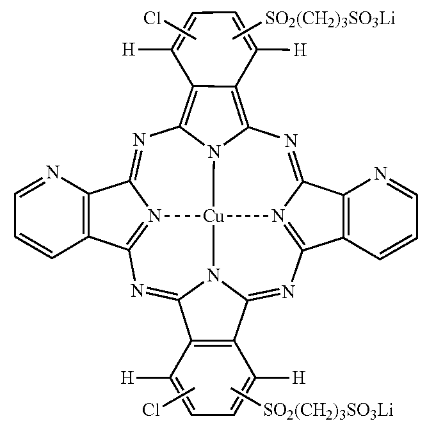

Specific examples of the case where one ring among the four rings of ring A, ring B, ring C, and ring D represents a substituted benzene ring, and the remaining three rings each represent a heterocyclic ring are described below without differentiating the substitution positons. Specifically, the specific examples below each encompass positional isomers having different substitution positons, such as (E1-11) to (E1-12) below. R represents a substituent.

(E1-11)

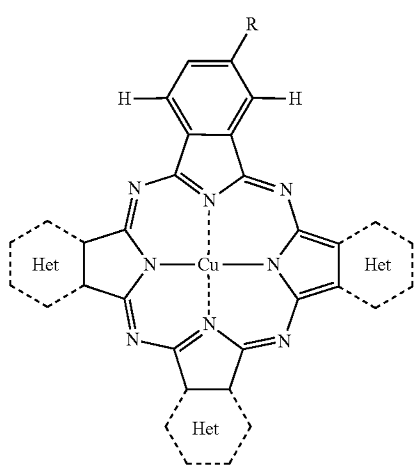

(E1-12)

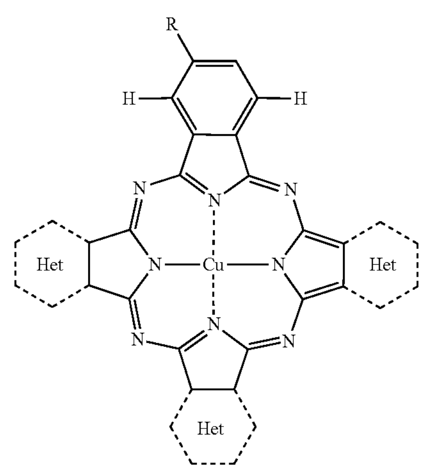

-continued
(P-45-1)
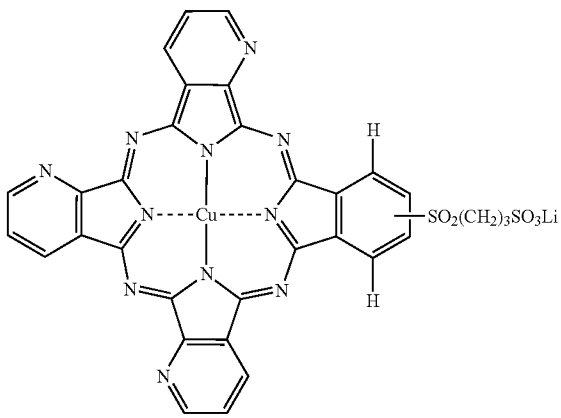
(P45-2)
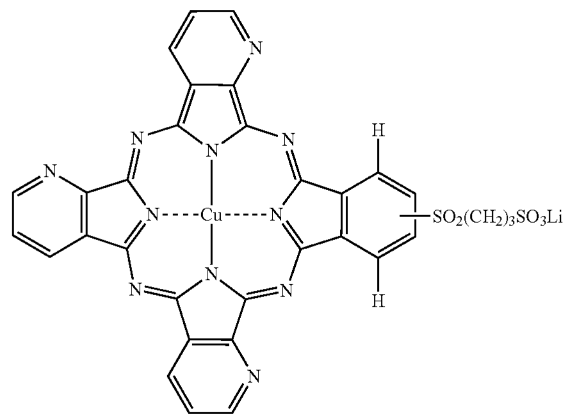
(P45-3)
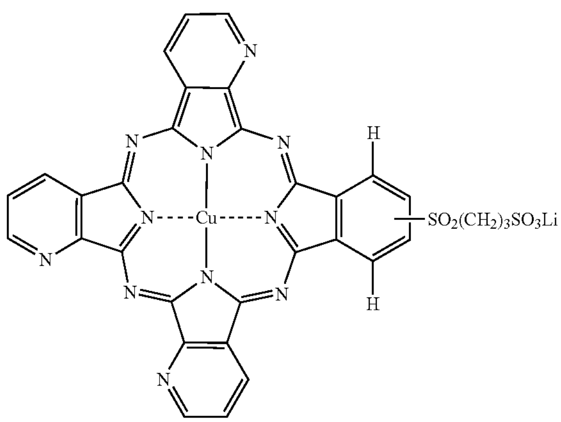
(P-45-4)
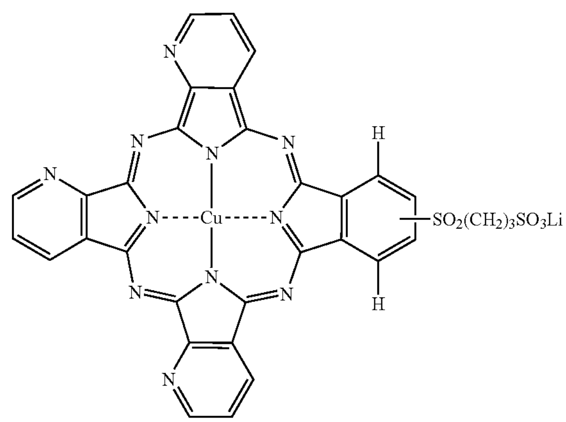
(P-46-1)
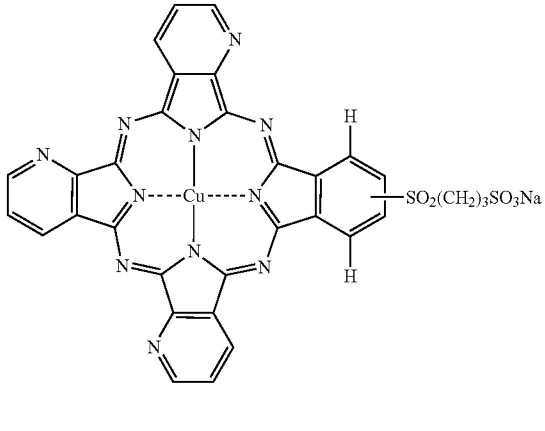
(P46-2)
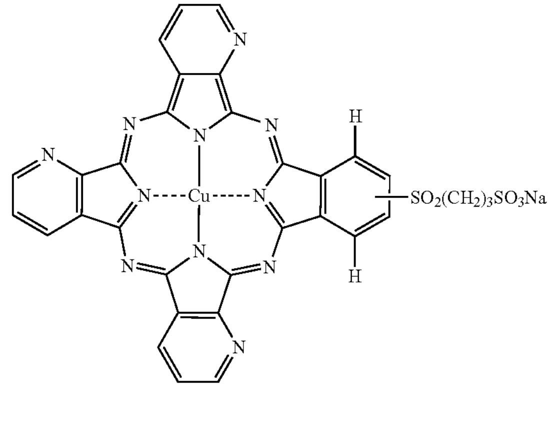

-continued
(P46-3)
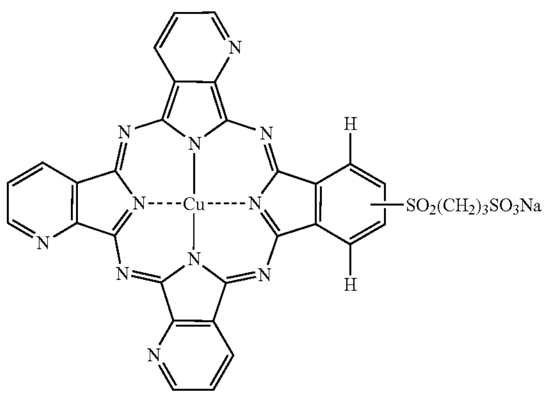
(P-46-4)
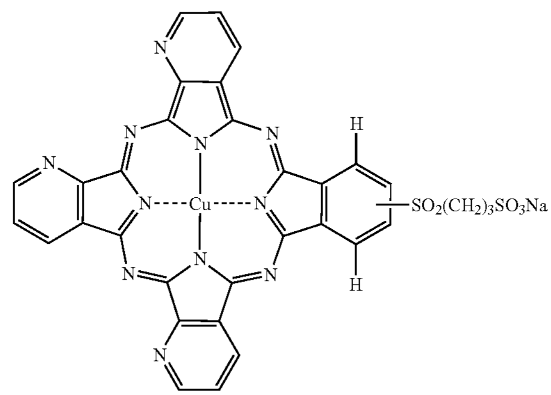
(P-47-1)
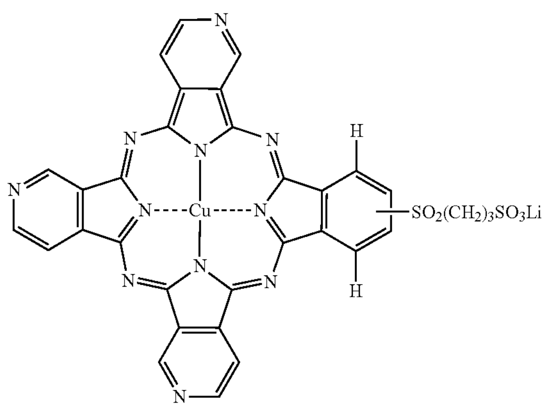
(P47-2)
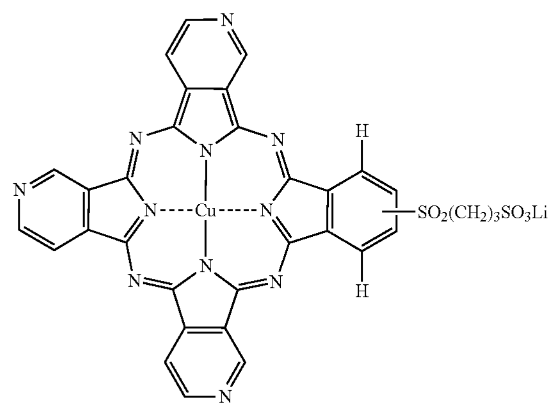
(P47-3)
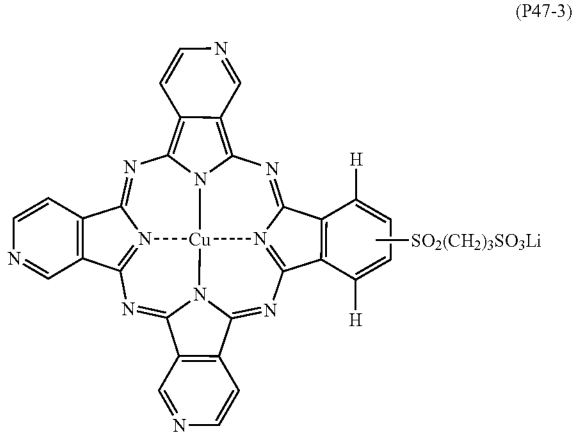
(P-47-4)
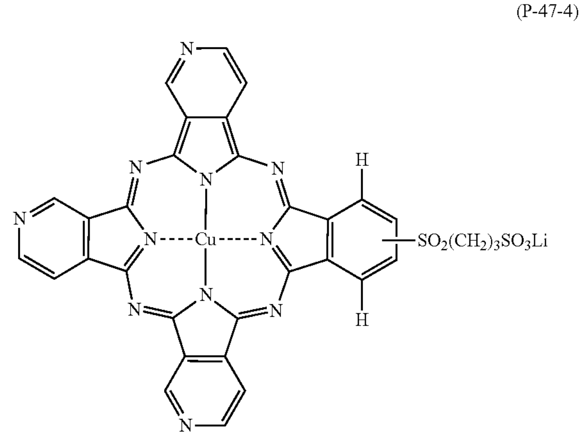

-continued
(P-48-1)
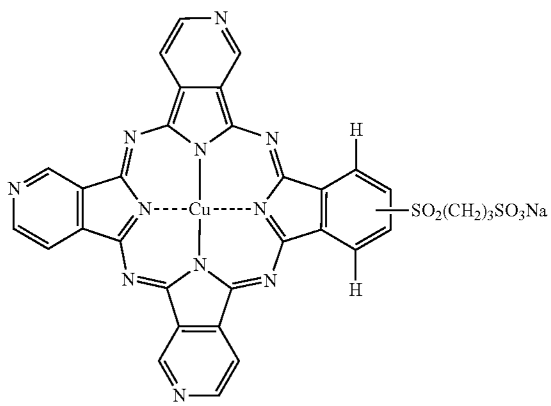
(P48-2)
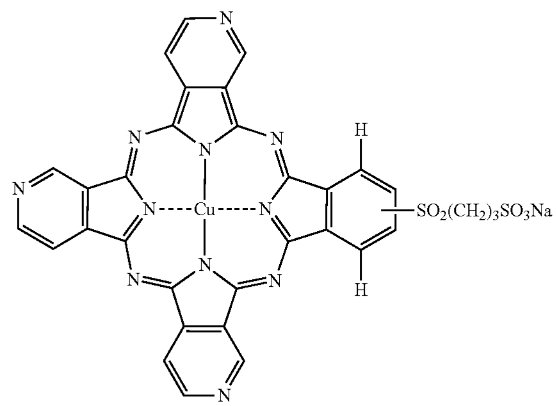
(P48-3)
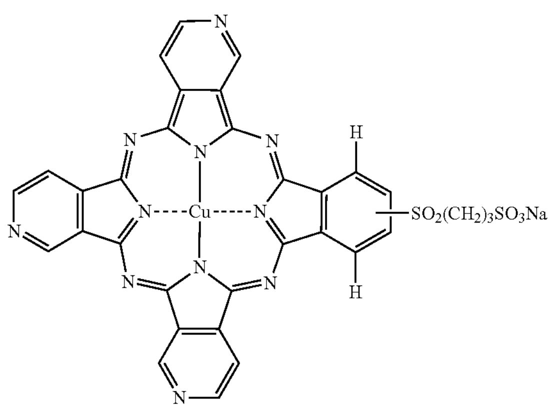
(P-48-4)
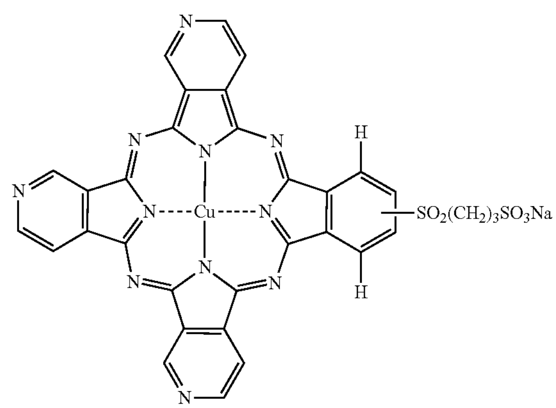
(P-49-1)
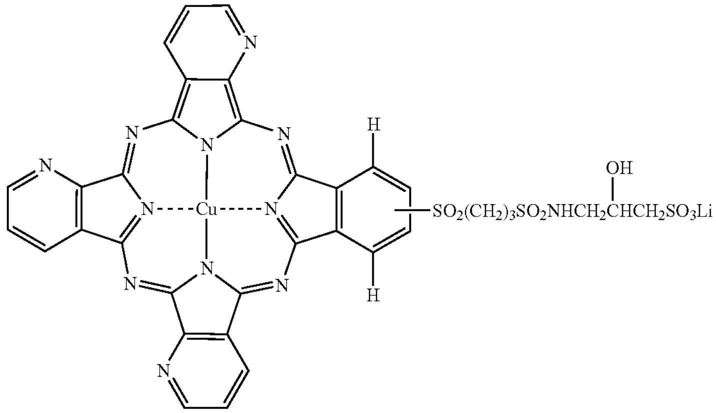

-continued
(P49-2)
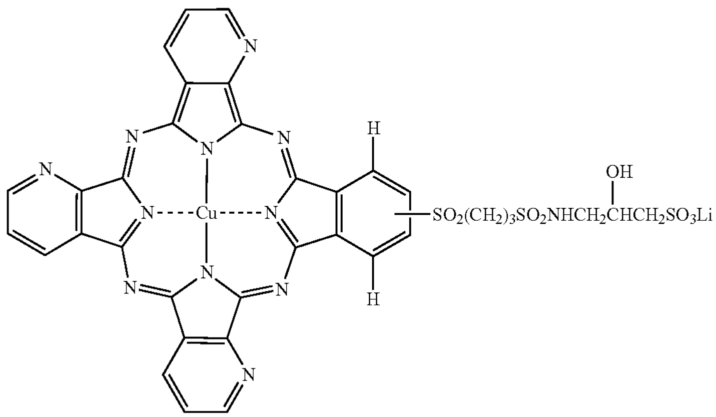
(P49-3)
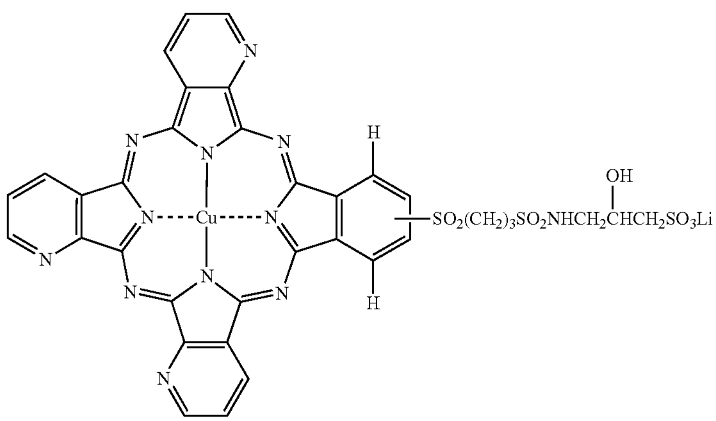
(P-49-4)
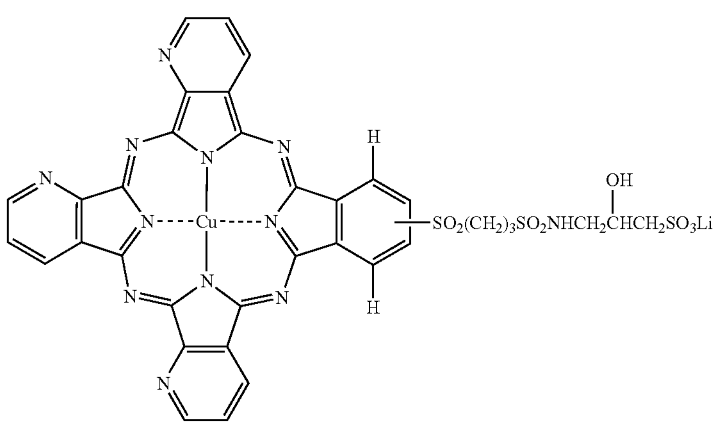

-continued
(P-50-1)
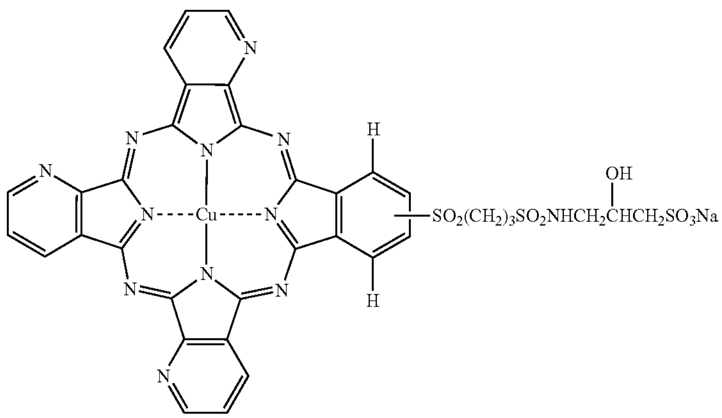
(P50-2)
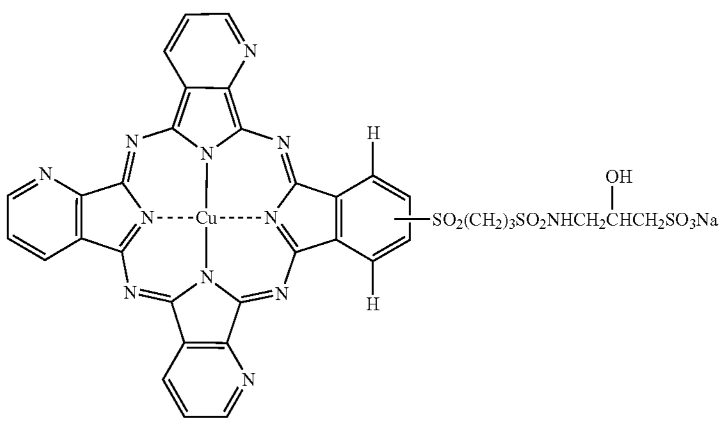
(P50-3)
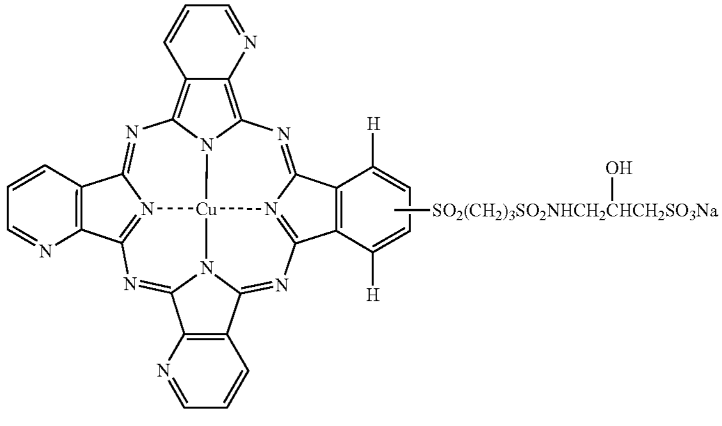

-continued
(P-50-4)
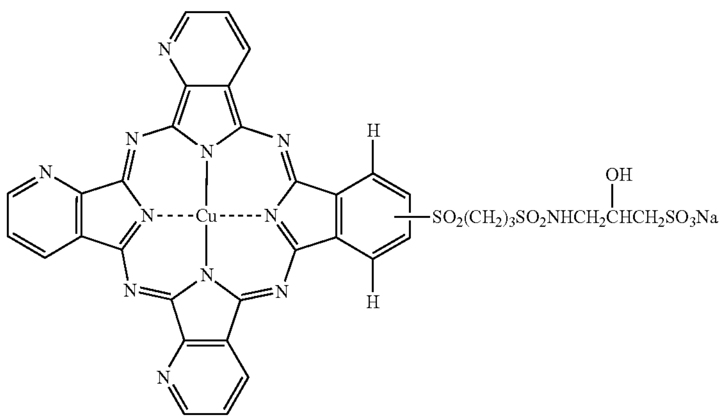
(P-51-1)
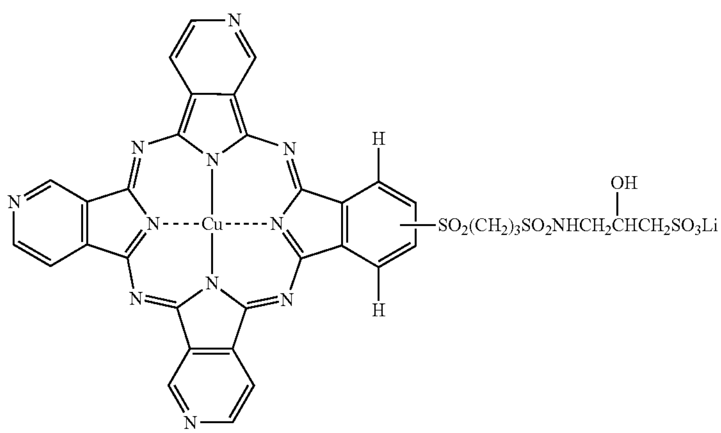
(P51-2)
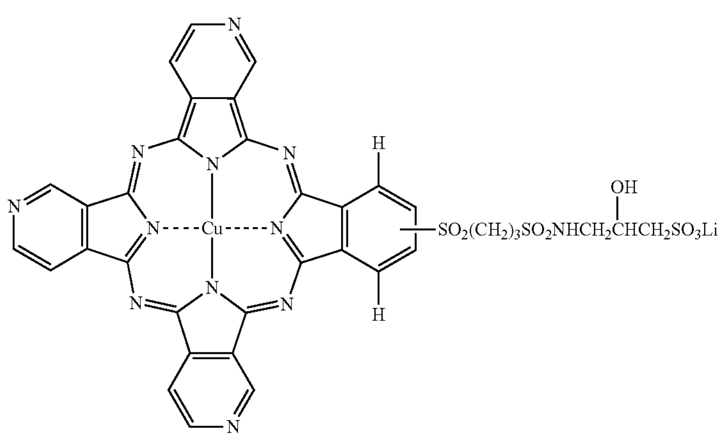

-continued
(P51-3)
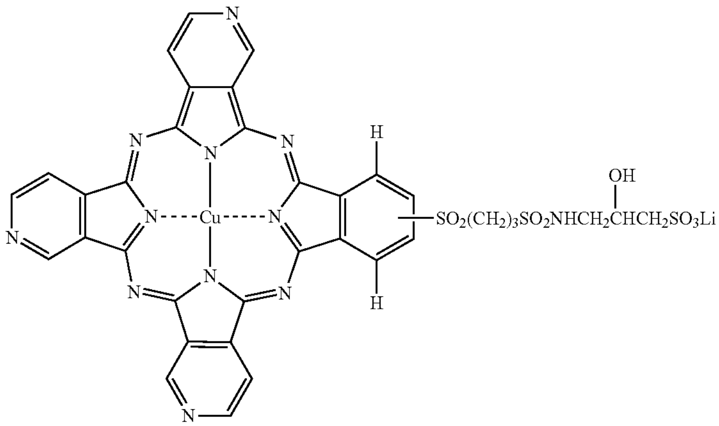
(P-51-4)
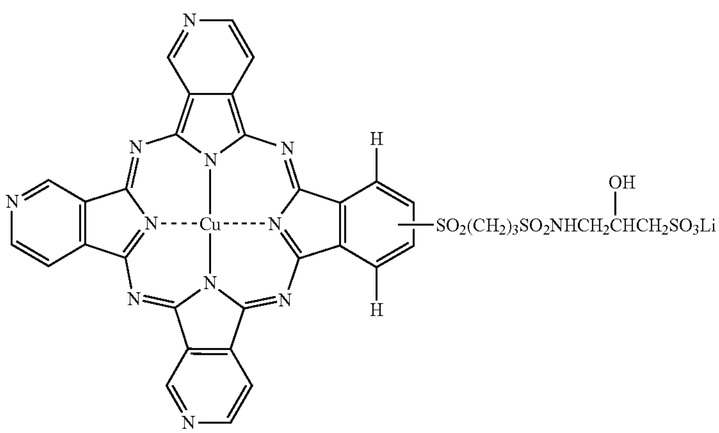
(P-52-1)
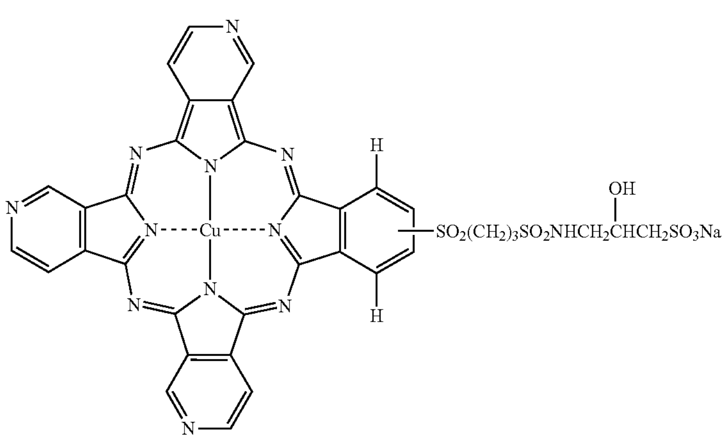

-continued
(P52-2)
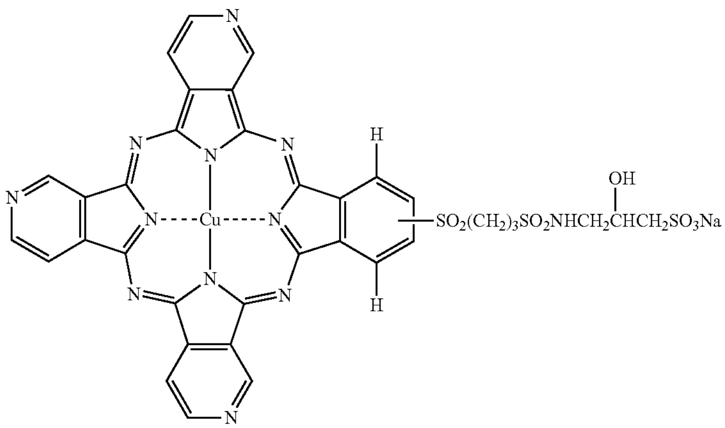
(P52-3)
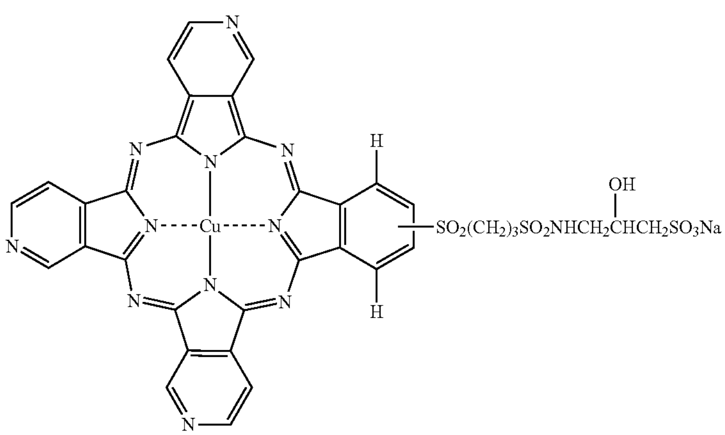
(P-52-4)
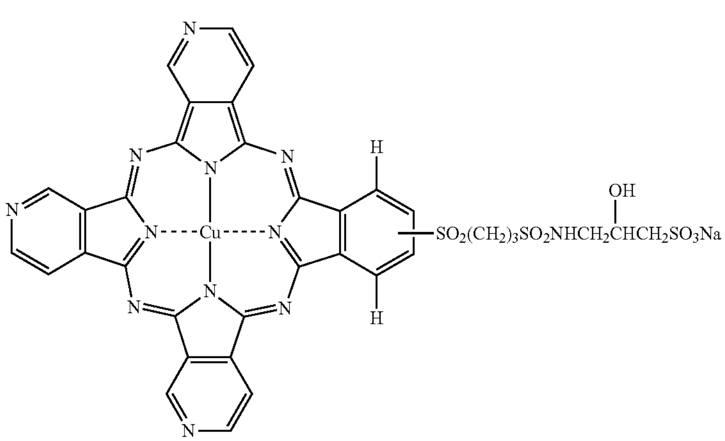

-continued
(P-53-1)
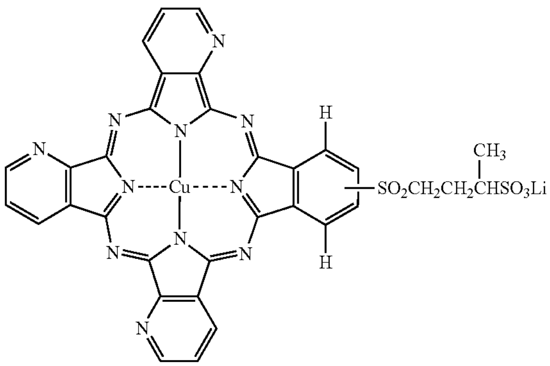
(P53-2)
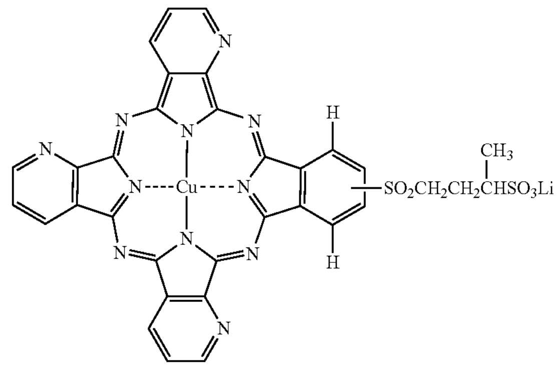
(P53-3)
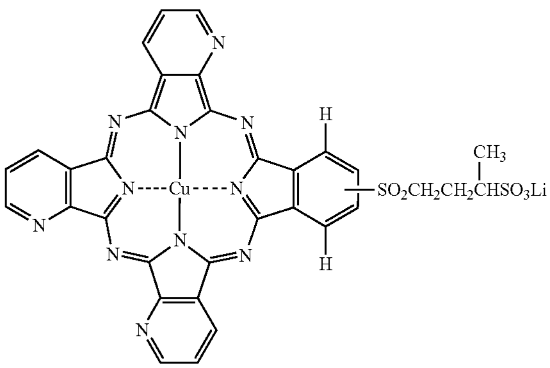
(P53-4)
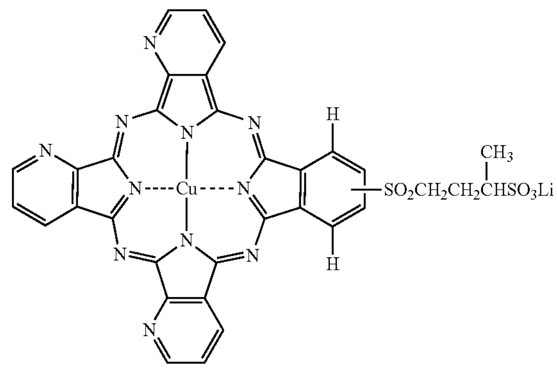
(P-54-1)
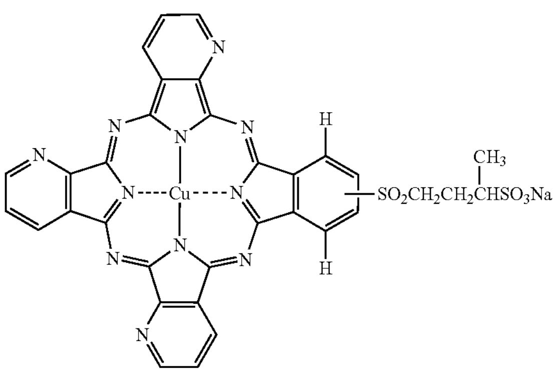
(P54-2)
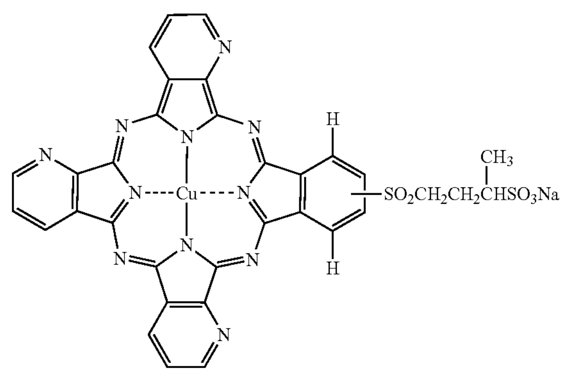
(P54-3)
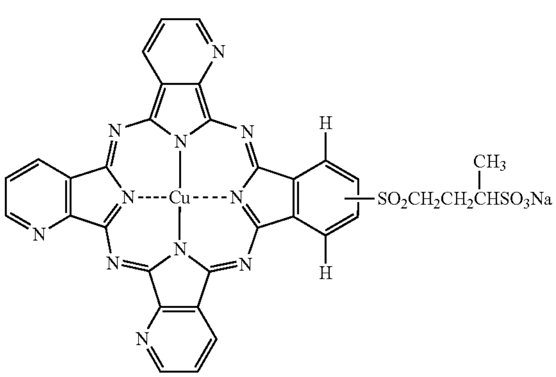
(P54-4)
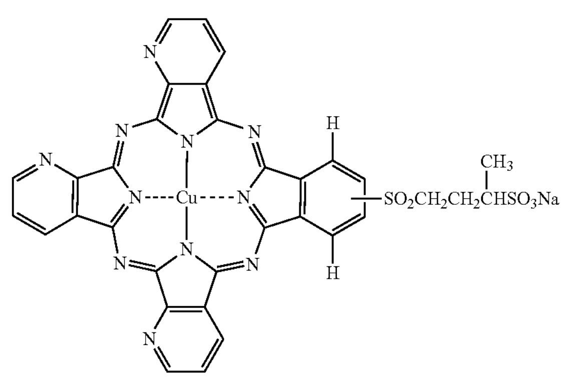

-continued
(P-55-1)
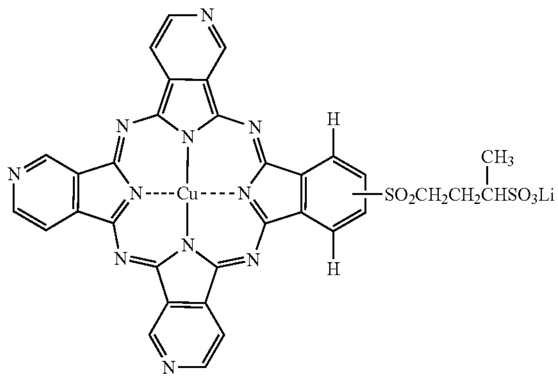
(P55-2)
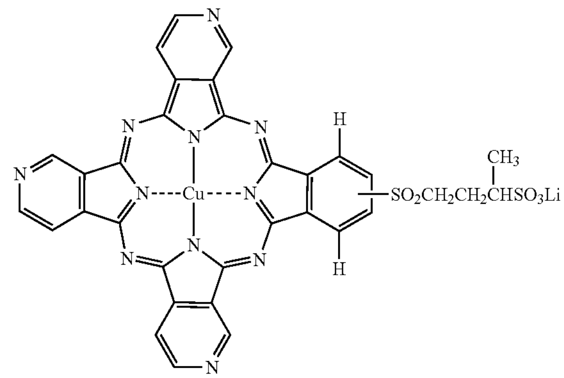
(P55-3)
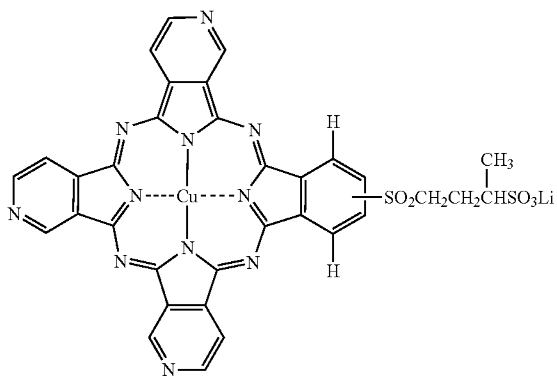
(P55-4)
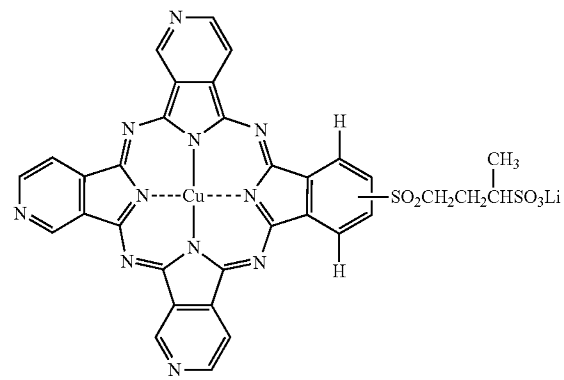
(P-56-1)
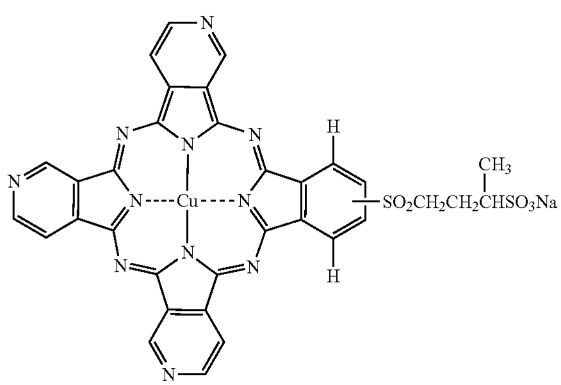
(P56-2)
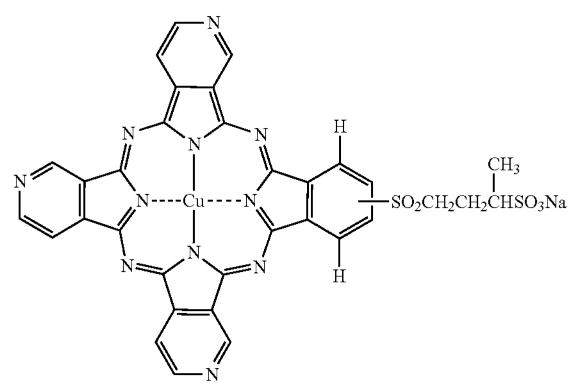
(P56-3)
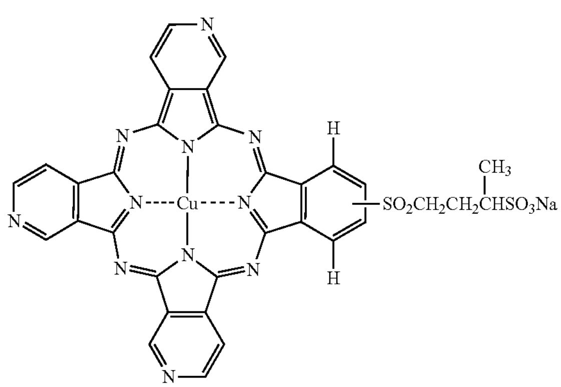
(P56-4)
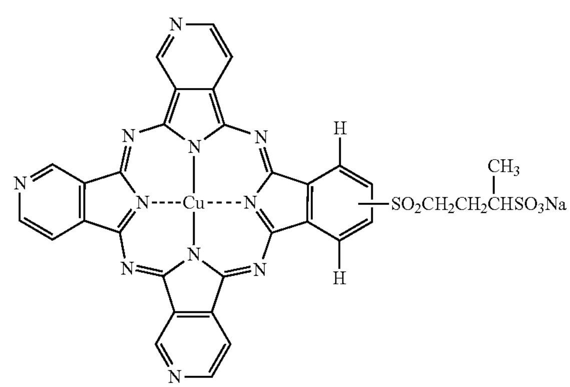

-continued
(P-57-1)
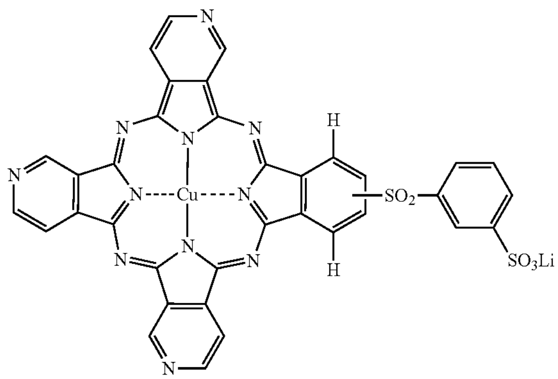
(P-57-2)
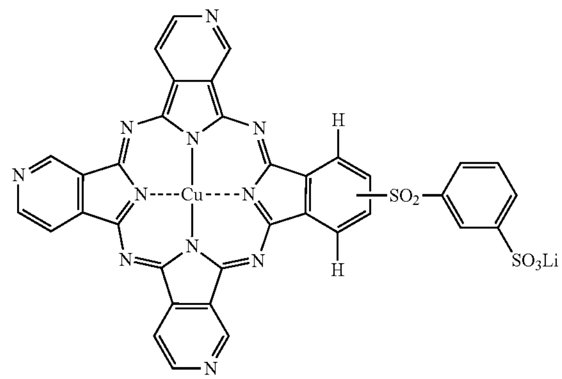
(P-57-3)
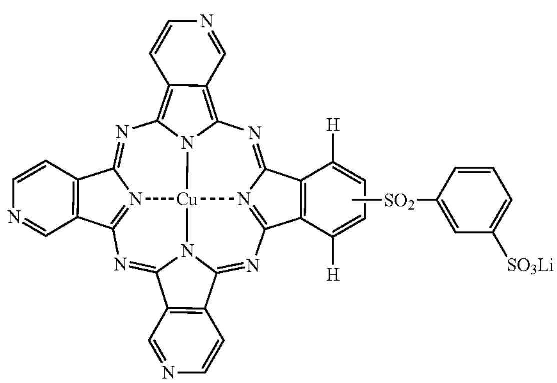
(P57-4)
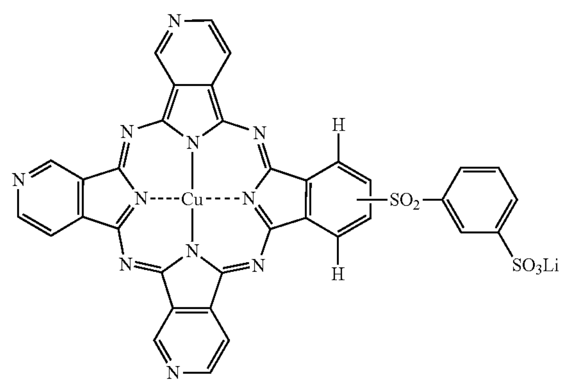
(P-58-1)
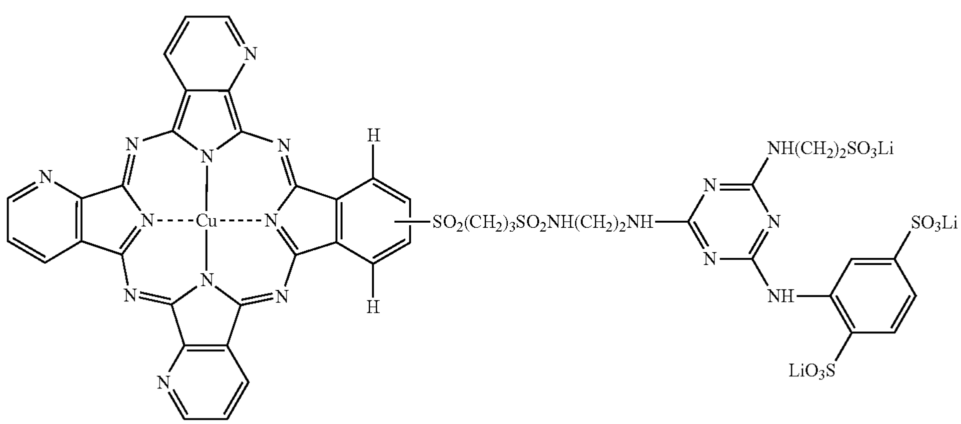
(P-58-2)
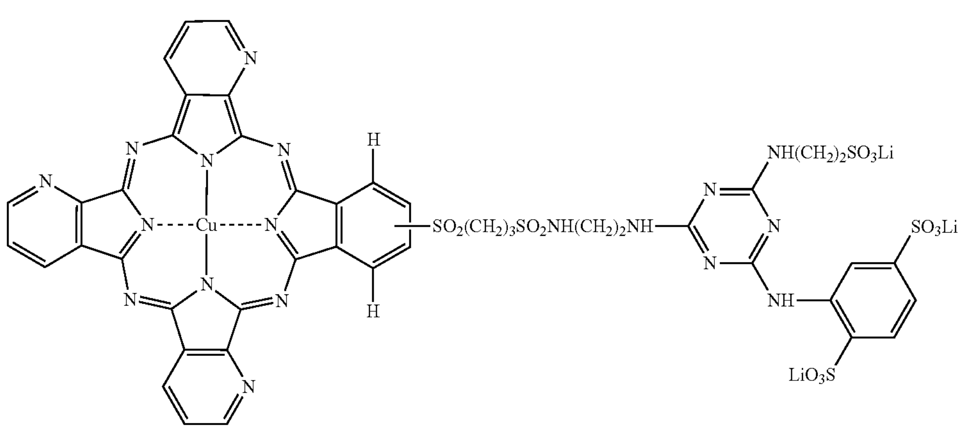

-continued
(P-58-3)
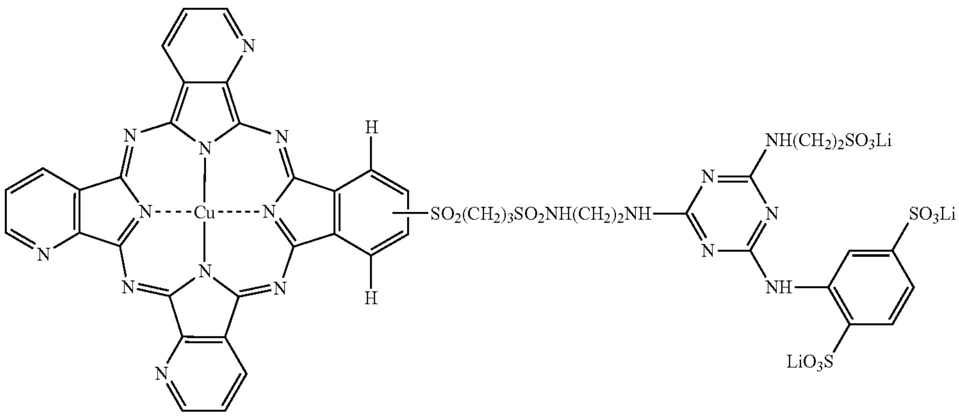
(P-58-4)
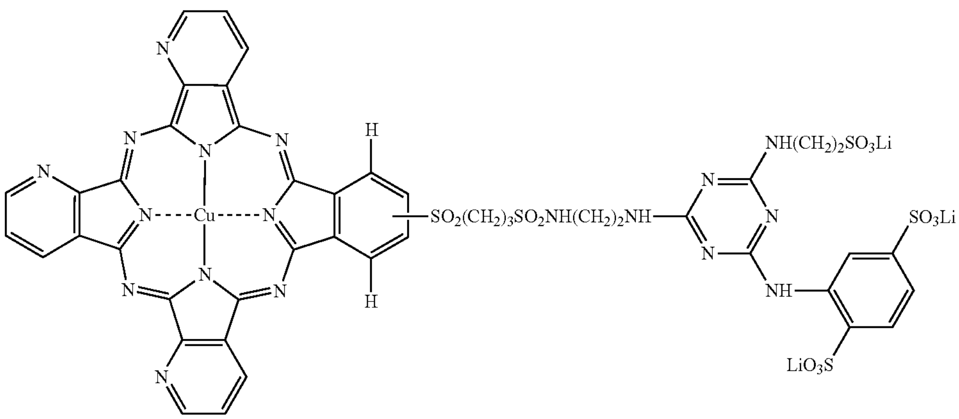
(P-59)
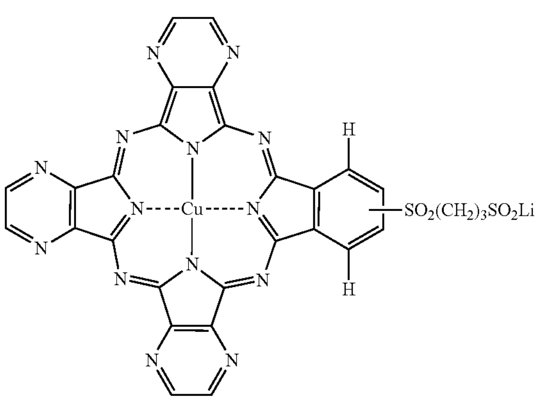
(P-60)
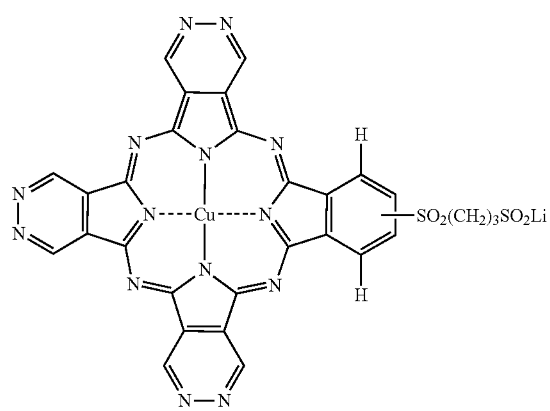

-continued
(P-61-1)
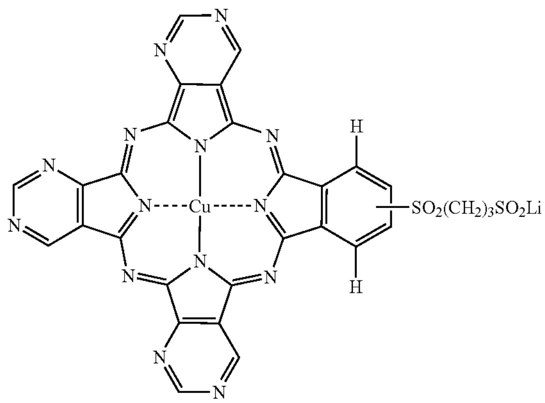
(P-61-2)
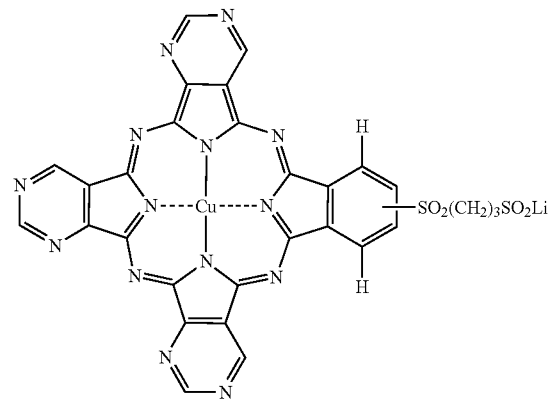
(P-62-1)
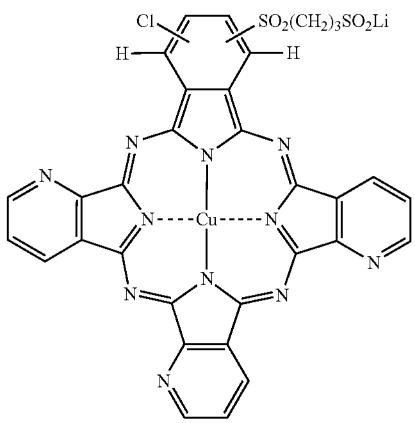
(P-62-2)
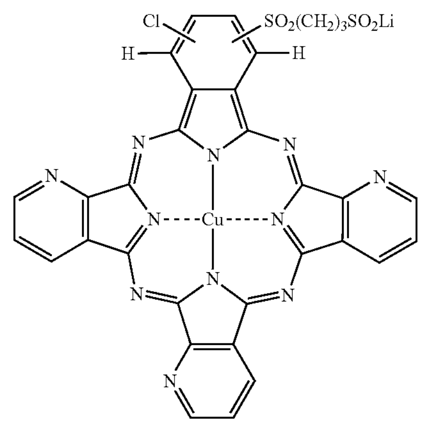
(P-62-3)
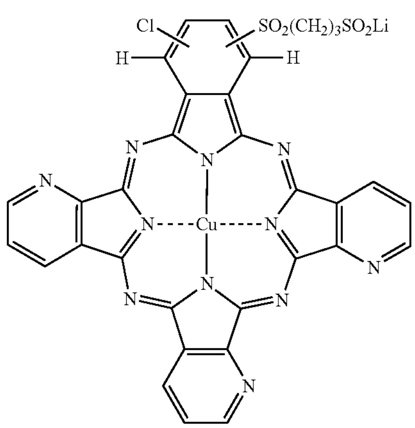
(P-62-4)
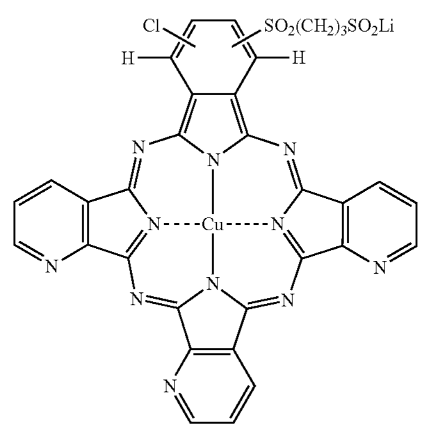
The dye ink composition according to the present invention may further contain a compound (toning agent) represented by general formula (Cy-1) below in addition to the dye represented by general formula (I).

(Cy-1)

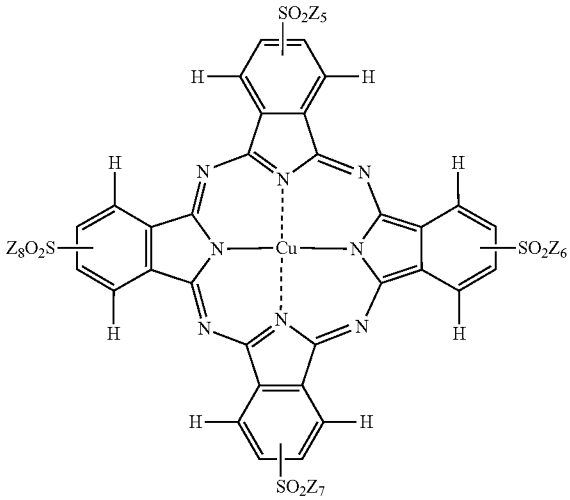

In general formula (Cy-1), $Z_5$, $Z_6$, $Z_7$, and $Z_8$ each independently represent a substituted or unsubstituted alkyl group, a substituted or unsubstituted aryl group, or a substituted or unsubstituted heterocyclic group. At least one of $Z_5$, $Z_6$, $Z_7$, or $Z_8$ has an ionic hydrophilic group as a substituent.

The alkyl group, aryl group, and heterocyclic group represented by $Z_5$, $Z_6$, $Z_7$, and $Z_8$ in general formula (Cy-1) are the same as the alkyl group, aryl group, and heterocyclic group, respectively, described as Z of —$SO_2$—Z, which is a preferred substituent included in general formula (I) above, and preferred examples are also the same.

The compound represented by general formula (Cy-1) is a phthalocyanine-based dye in which substituted sulfonyl groups (—$SO_2$—$Z_5$, —$SO_2$—$Z_6$, —$SO_2$—$Z_7$, and —$SO_2$—$Z_8$) are introduced to β positions. That is, in general formula (Cy-1), —$SO_2$—$Z_5$, —$SO_2$—$Z_6$, —$SO_2$—$Z_7$, and —$SO_2$—$Z_8$ replace hydrogen atoms at β positions but do not replace hydrogen atoms at α positions.

The compound represented by general formula (Cy-1) can be synthesized by a publicly known method (for example, methods described in JP3949385B, JP4512543B, and JP4854250B). The α positions and the β positions of the phthalocyanine skeleton are illustrated in formula (b) below.

Formula (b)

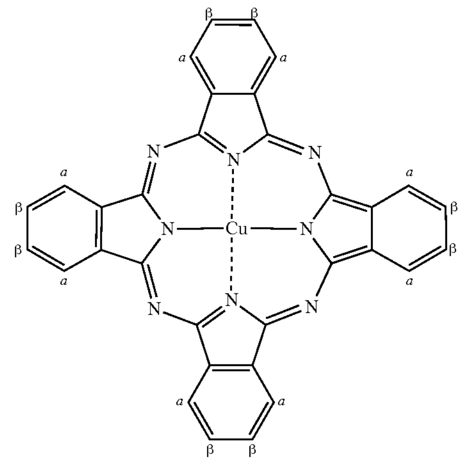

Specific examples of the compound represented by general formula (Cy-1) are described below, but are not limited thereto. In structural formulae of specific compounds below, each specific compound is a mixture including positional isomers (refer to (2A) to (2D) below) that vary depending on introduction positions (β positions) of specific substituted sulfonyl groups (R represents —$SO_2$—$Z_5$, —$SO_2$—$Z_6$, —$SO_2$—$Z_7$, or —$SO_2$—$Z_8$). Therefore, the introduction positions of substituents are not specified, and the positional isomers are treated as the same compound. In the specific examples below, it is indicated that the substituted sulfonyl groups each replace any hydrogen atom at a β position but do not replace the portions having "H" in each structural formula.

(2A)

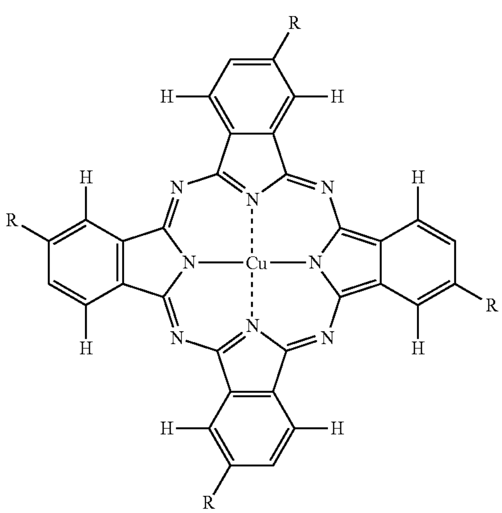

(2B)

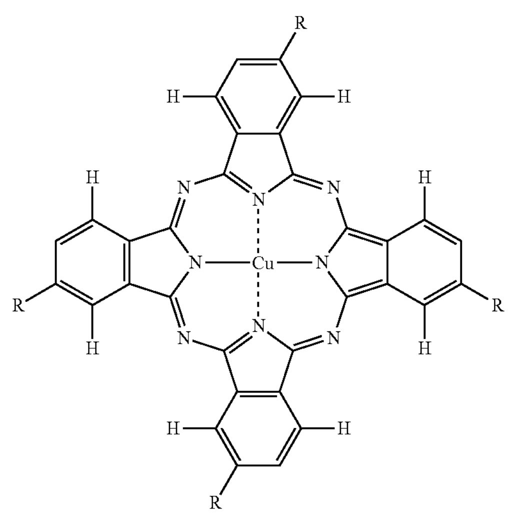

-continued
(2C)
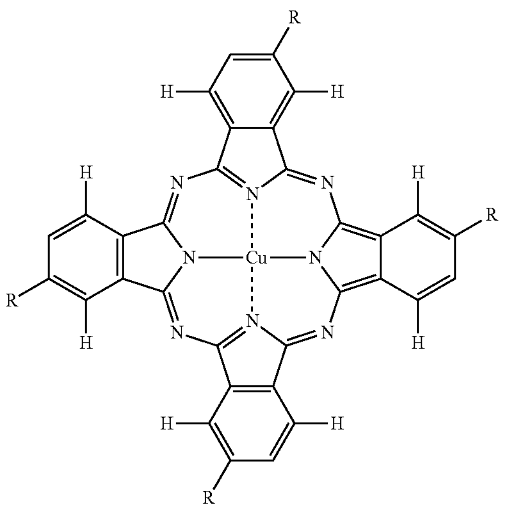
(2D)
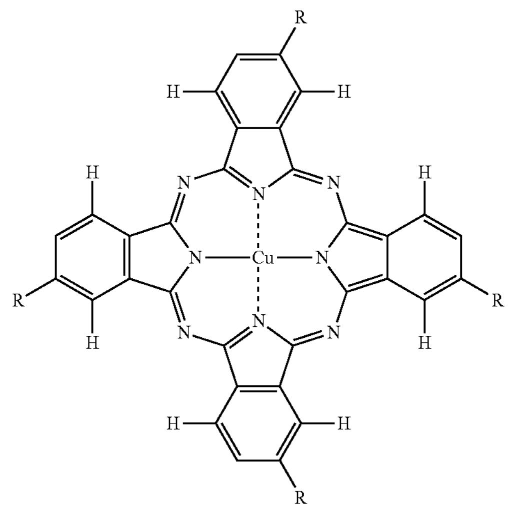
(C-1)
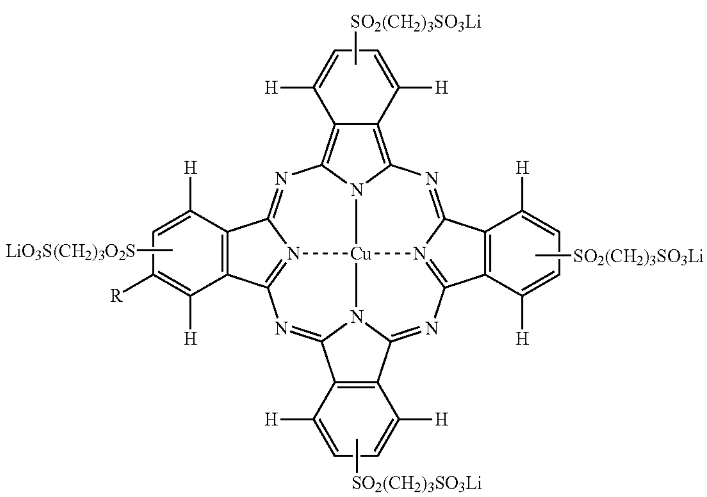
(C-2)
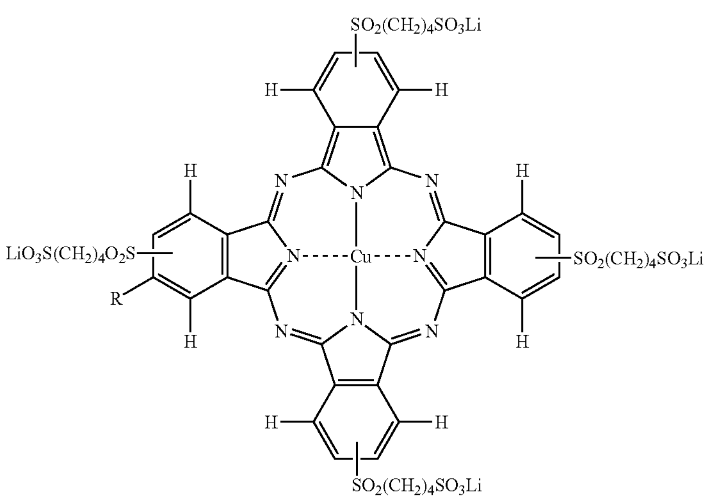

-continued
(C-3)
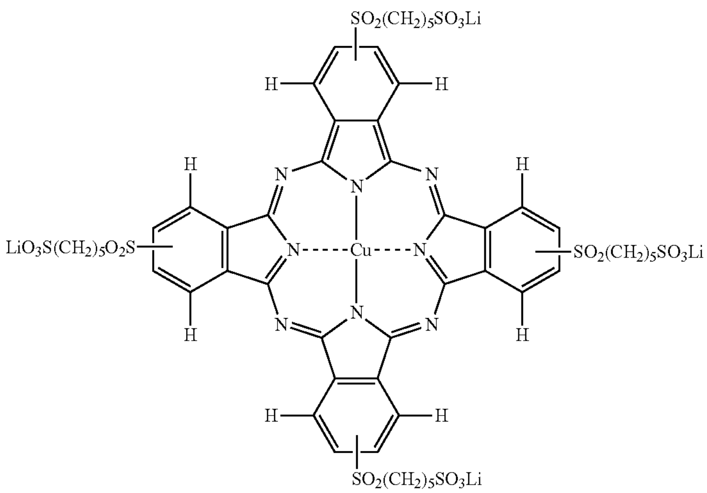
(C-4)
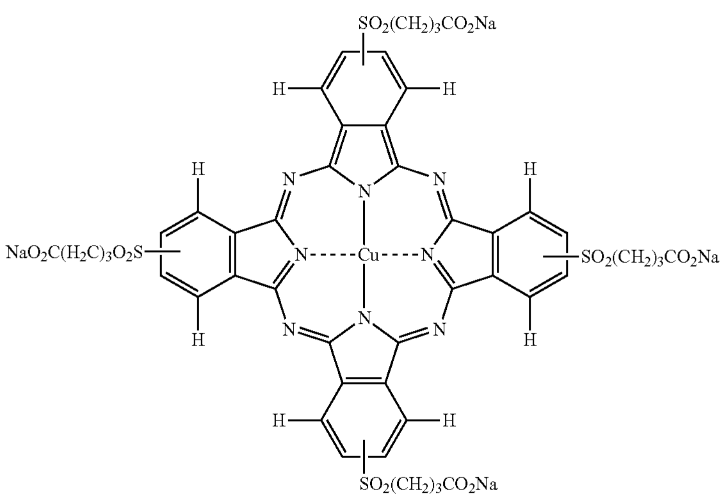
(C-5)
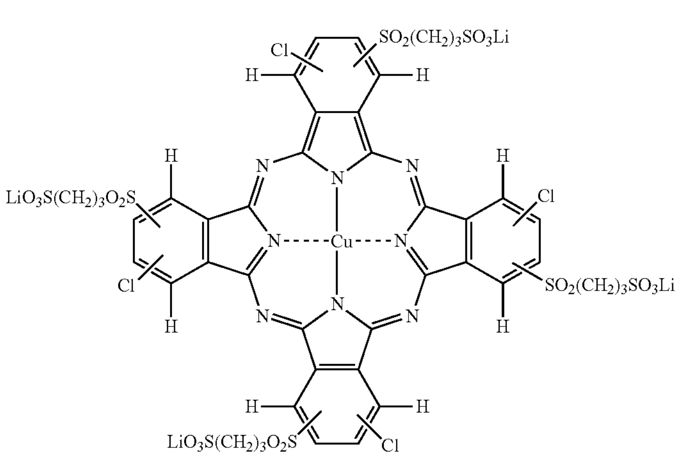

-continued
(C-6)
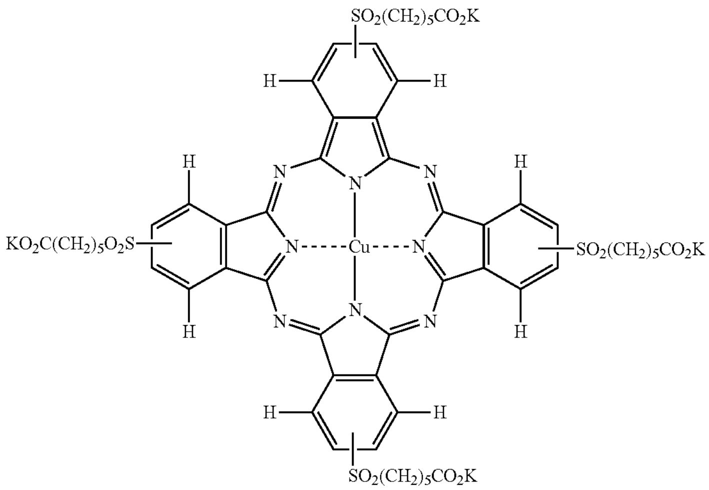
(C-7)
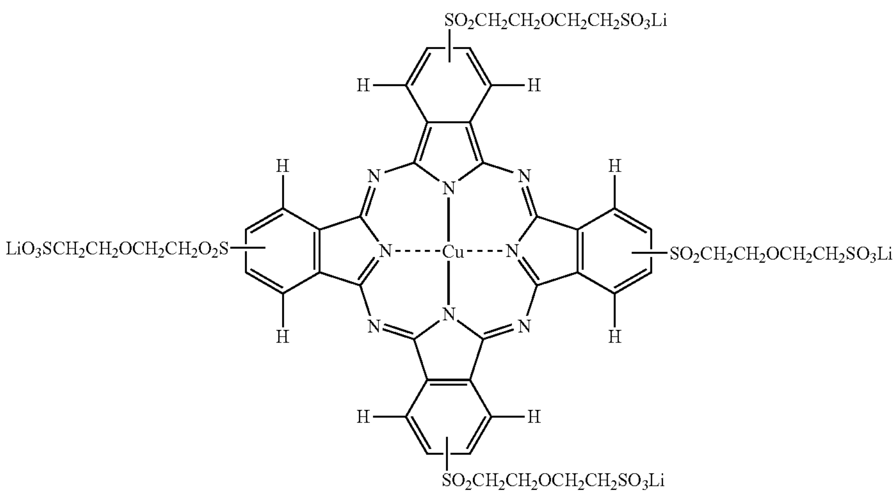
(C-8)
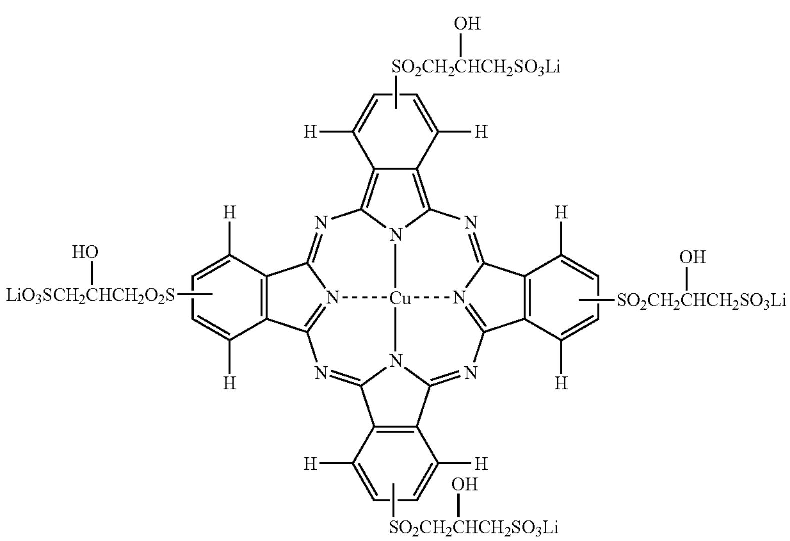

-continued
(C-9)
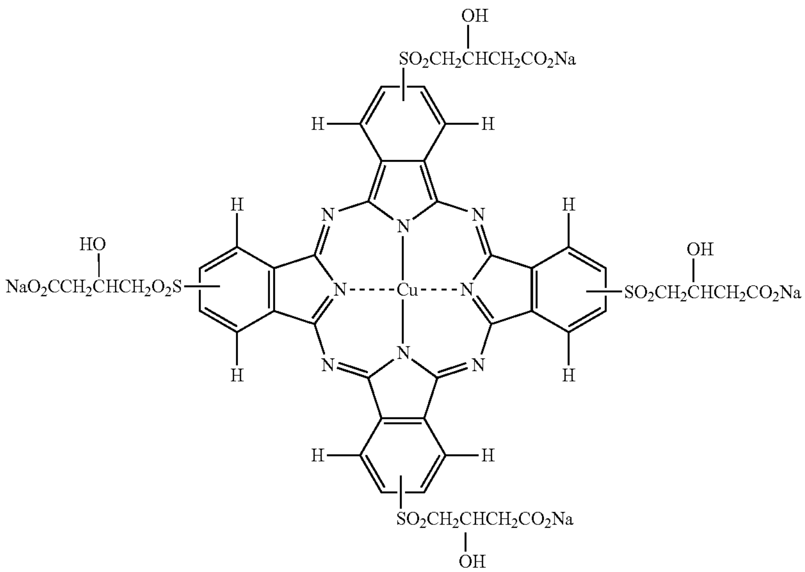
(C-10)
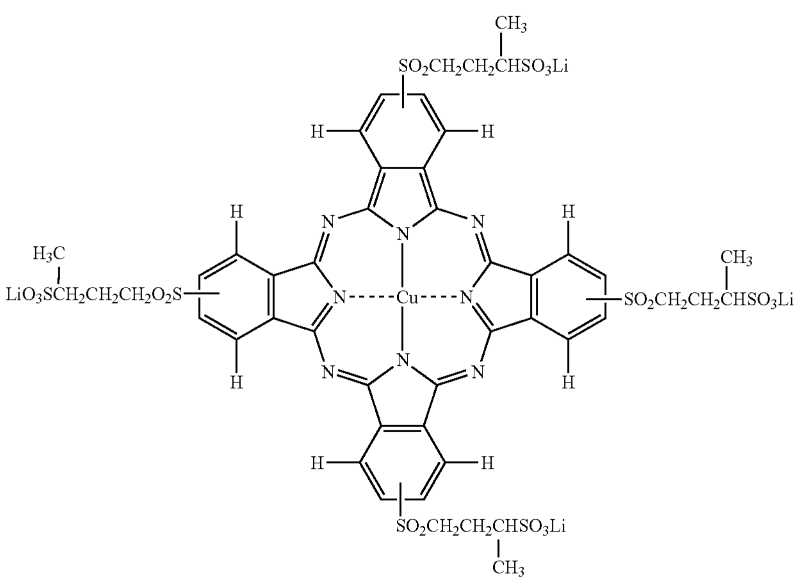

-continued
(C-11)
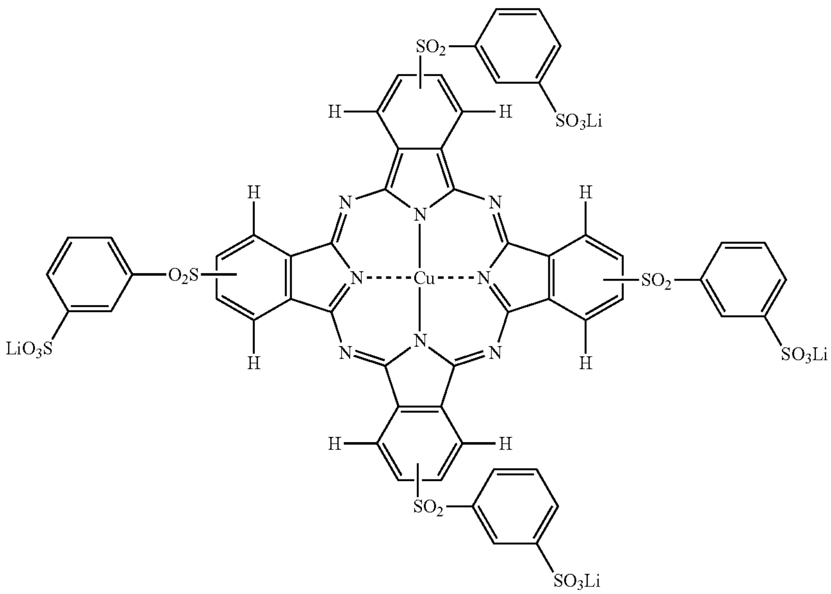
(C-12)
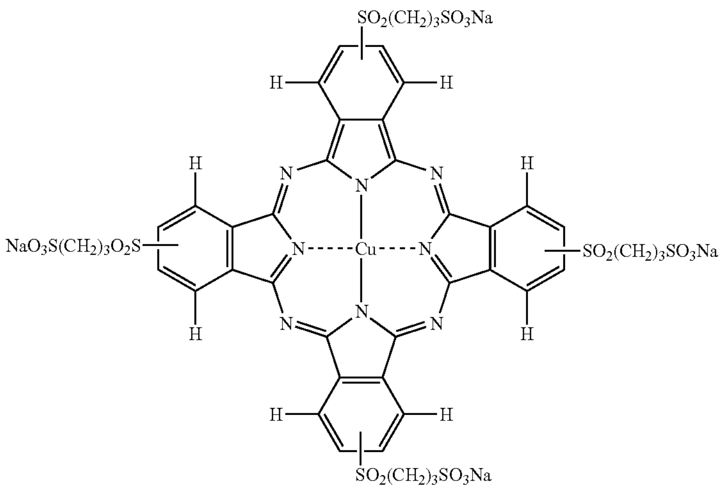
(C-13)
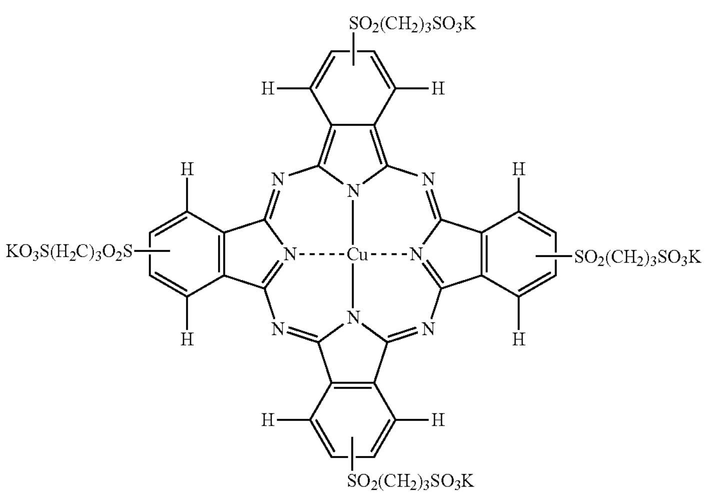

-continued
(C-14)
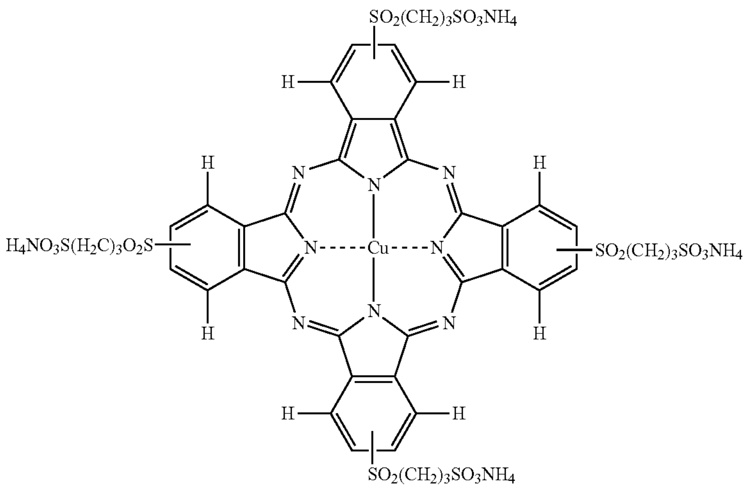
(C-15)
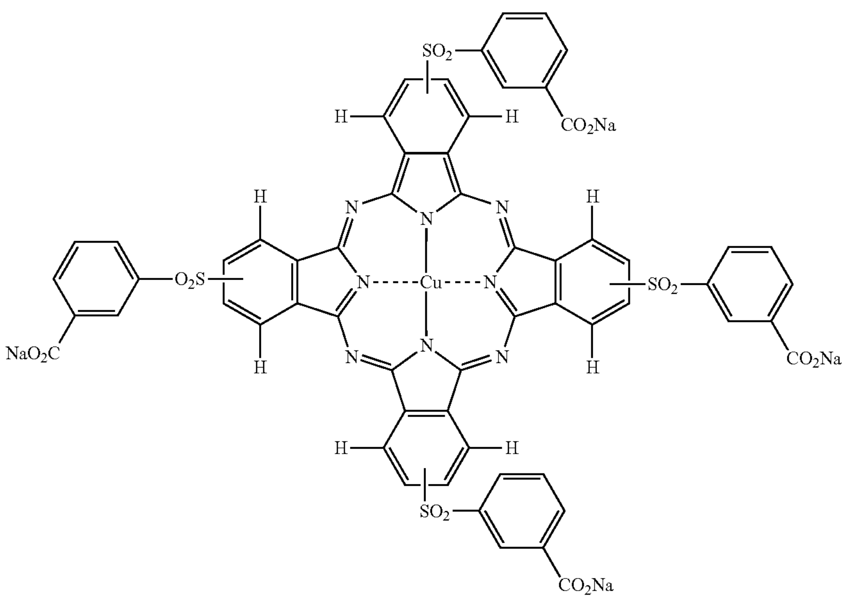
(C-16)
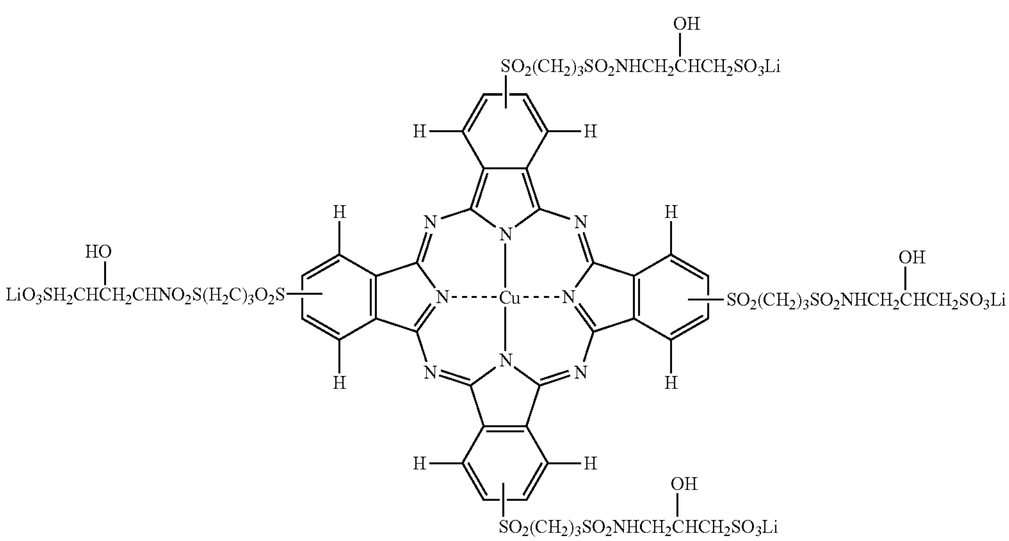

-continued
(C-17)
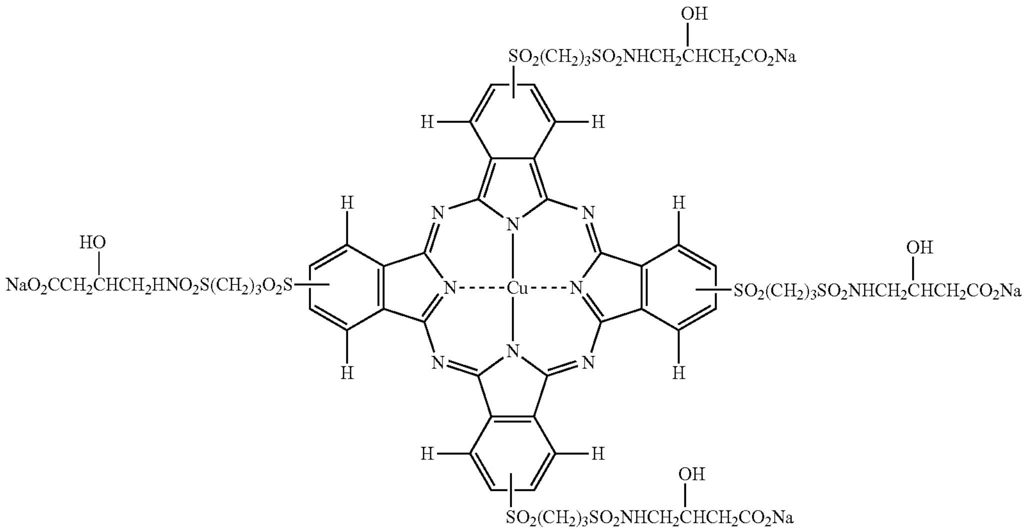
(C-18)
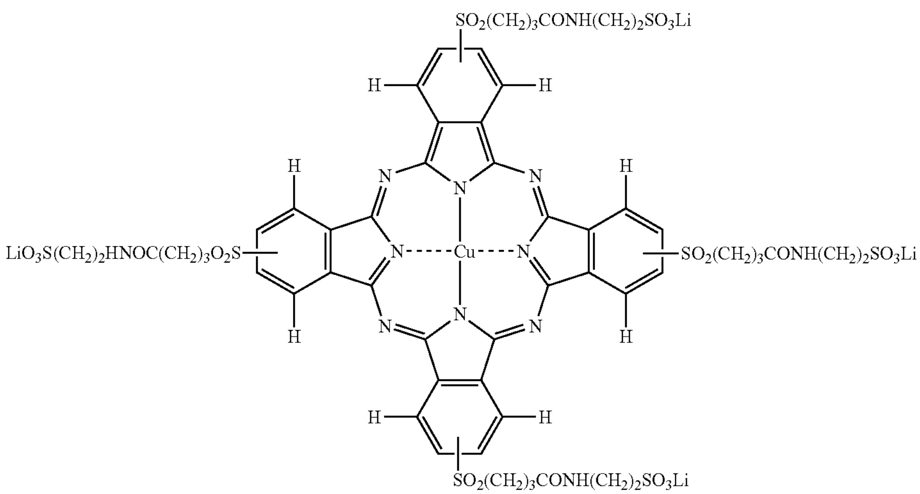
(C-19)
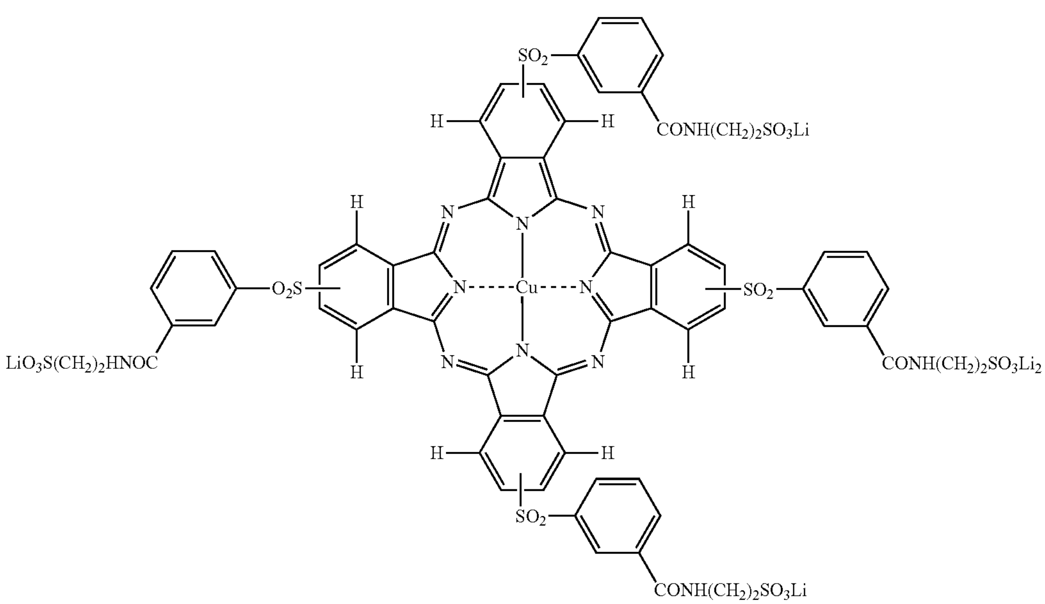

-continued
(C-20)
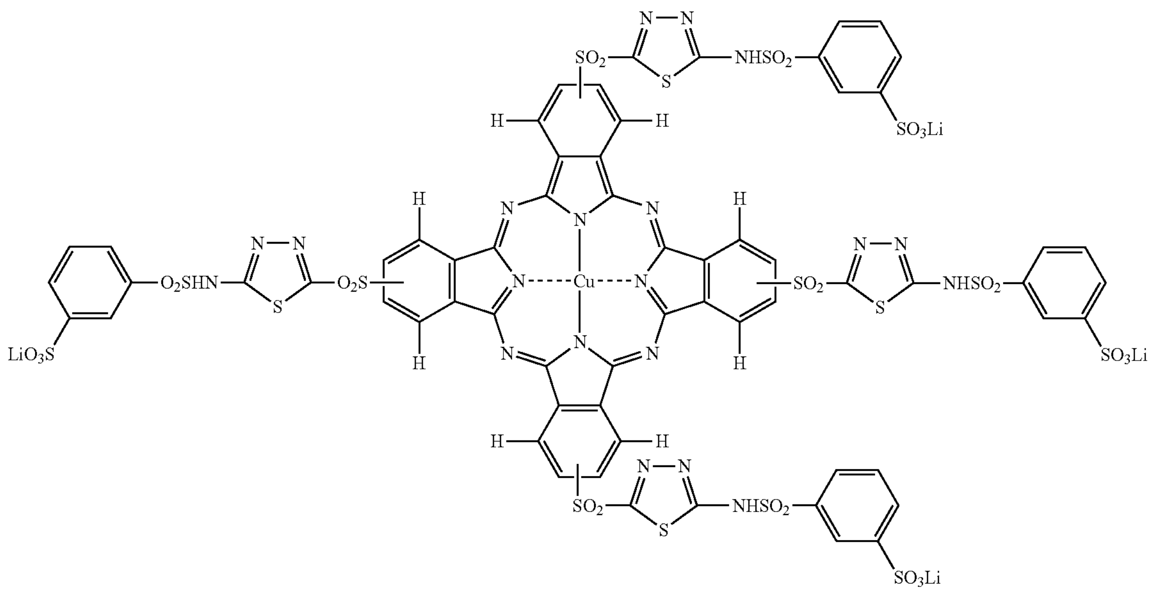
(C-21)
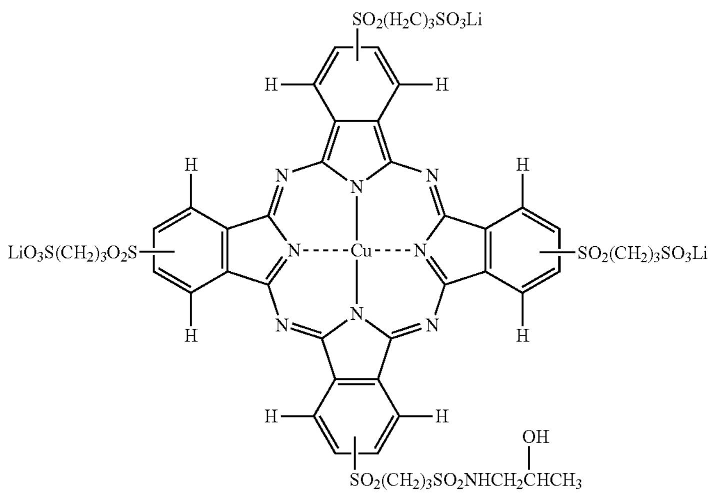
(C-22)
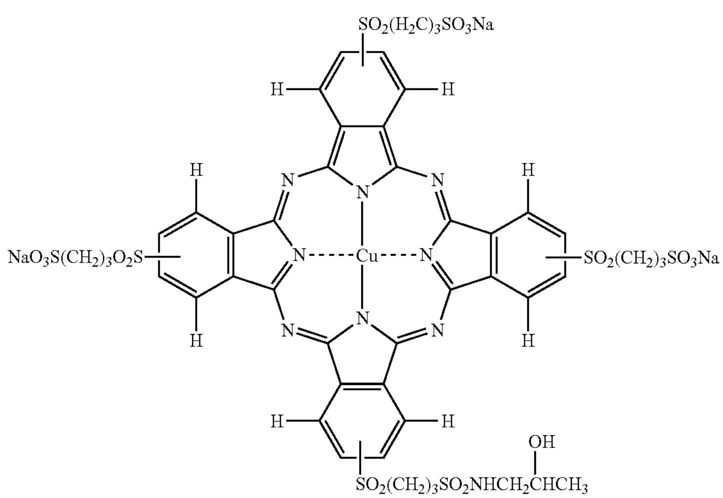

-continued
(C-23)
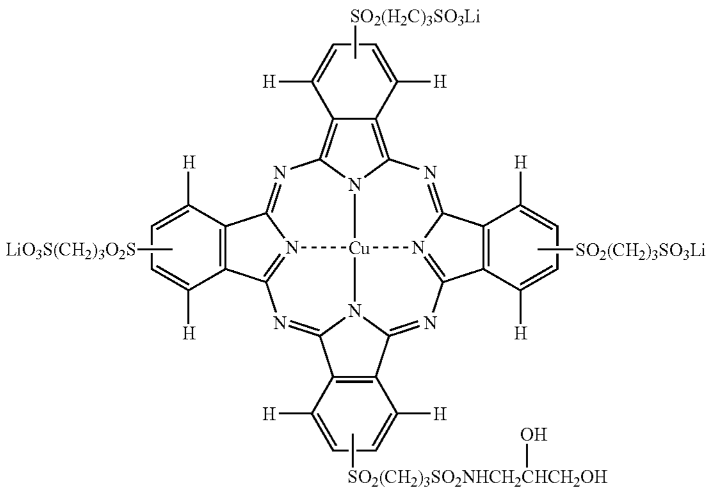
(C-24)
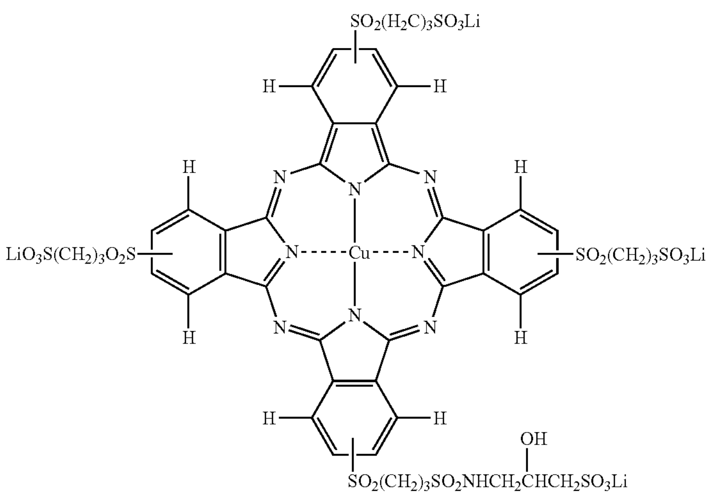
(C-25-1)
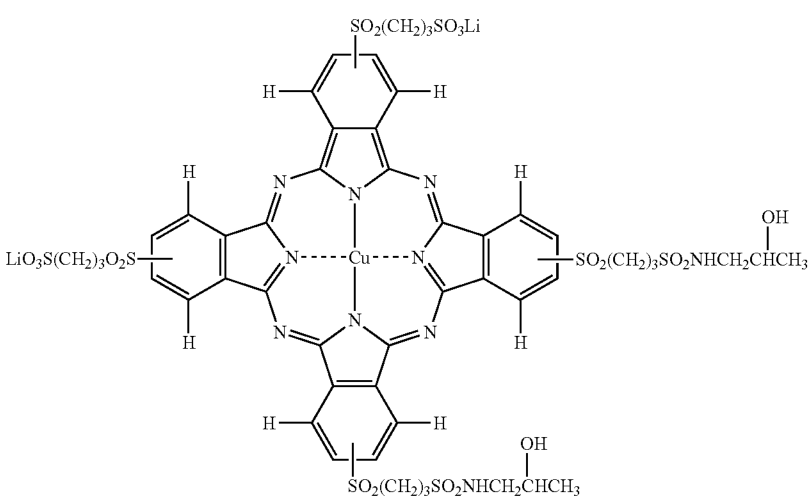

-continued
(C-25-2)
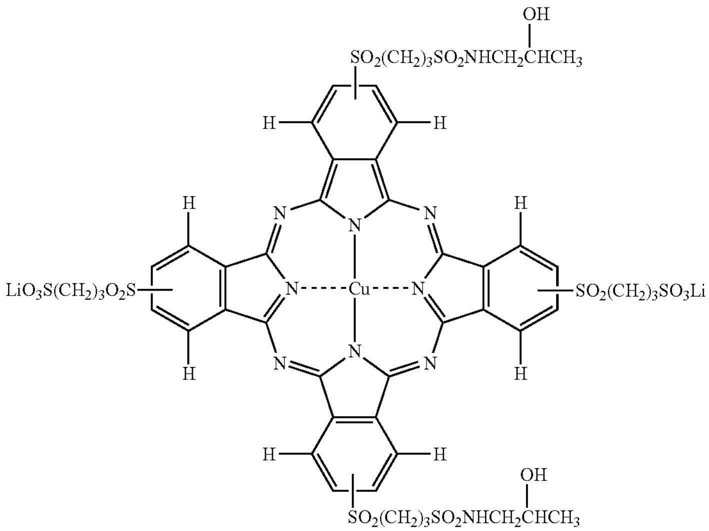
(C-26-1)
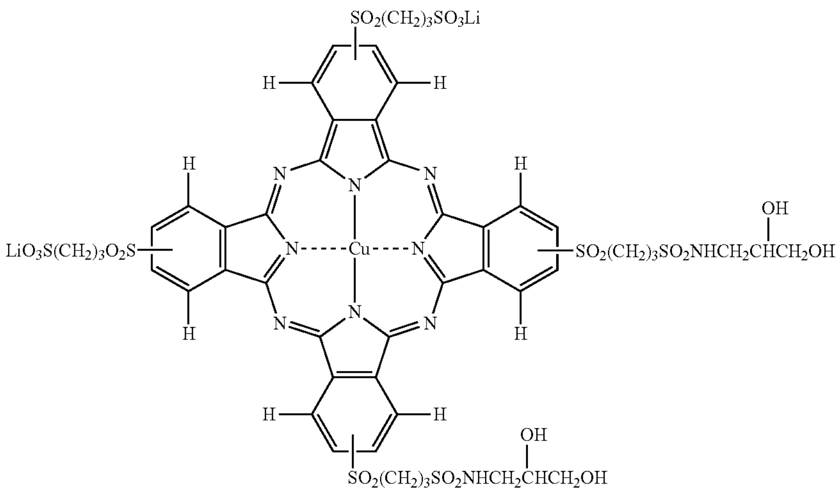
(C-26-2)
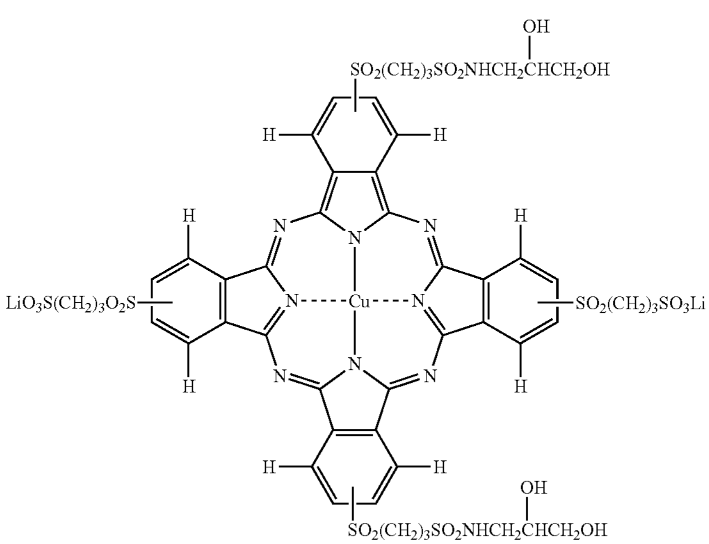

-continued
(C-27-1)
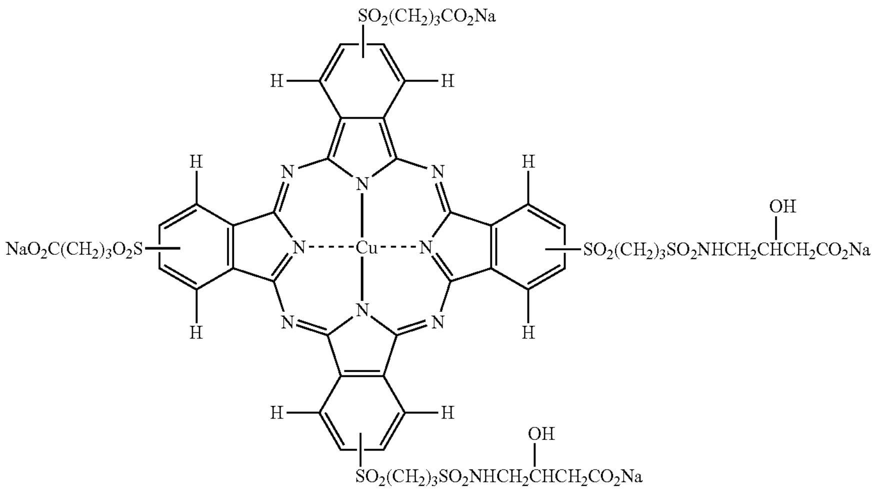
(C-27-2)
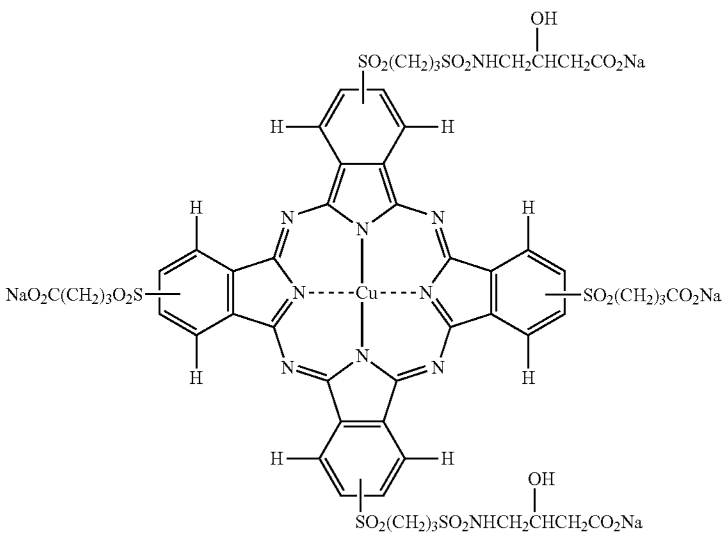
(C-28-1)
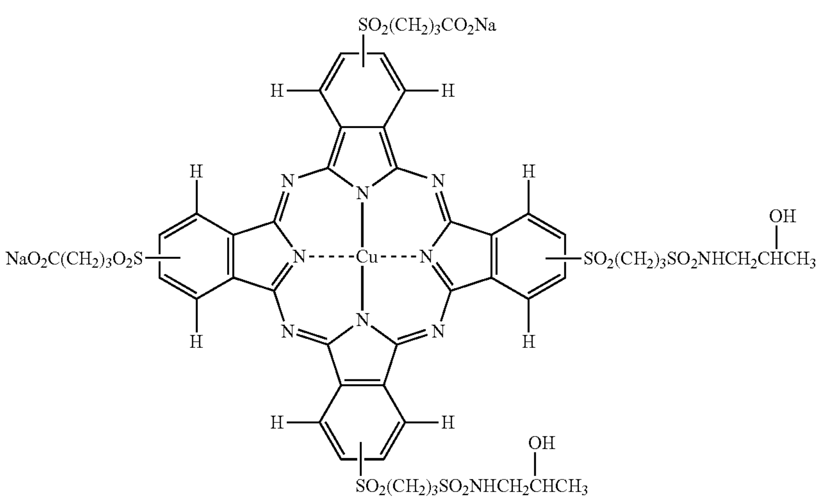

-continued
(C-28-2)
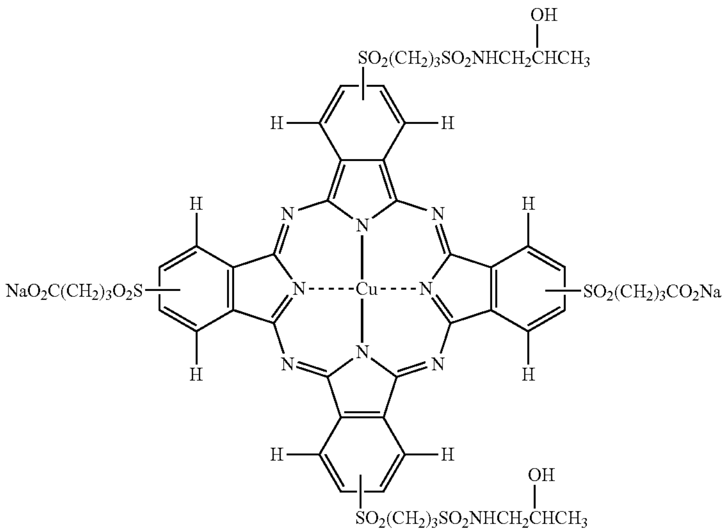
(C-29-1)
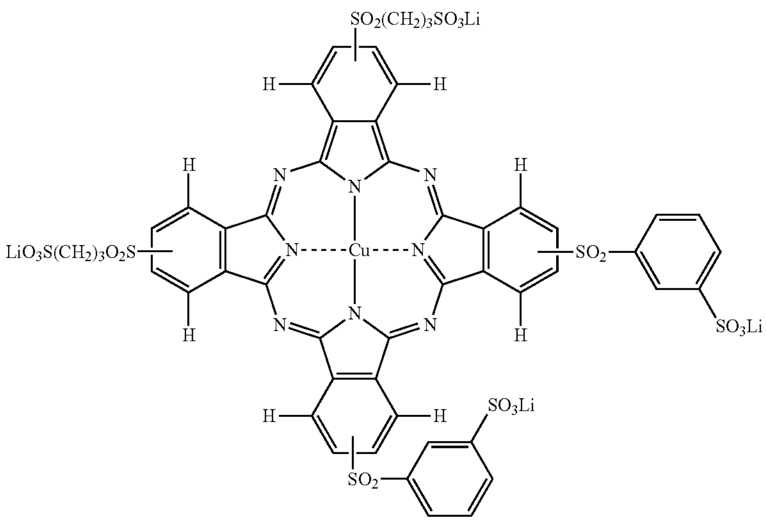
(C-29-2)
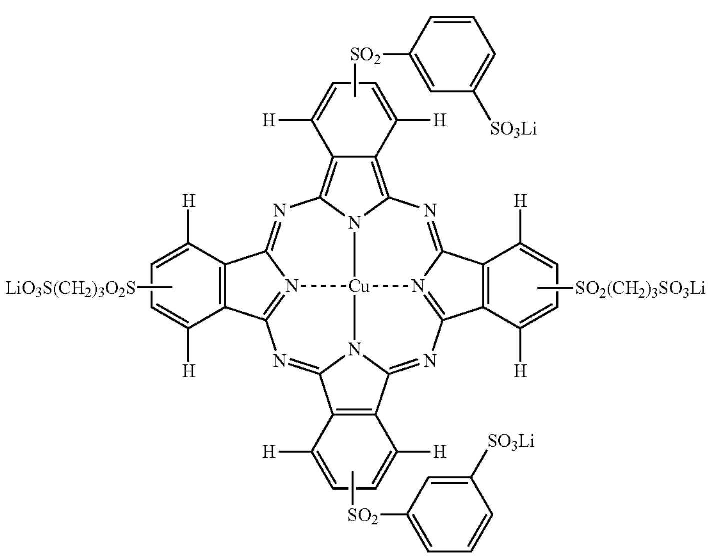

-continued
(C-30-1)
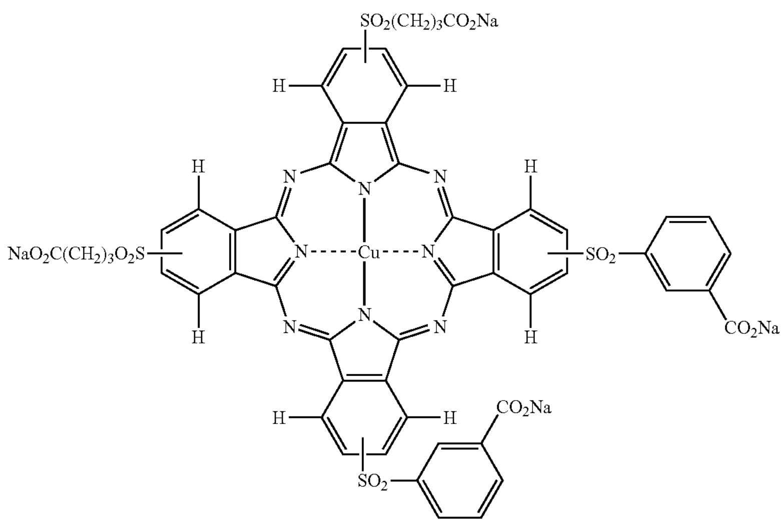
(C-30-2)
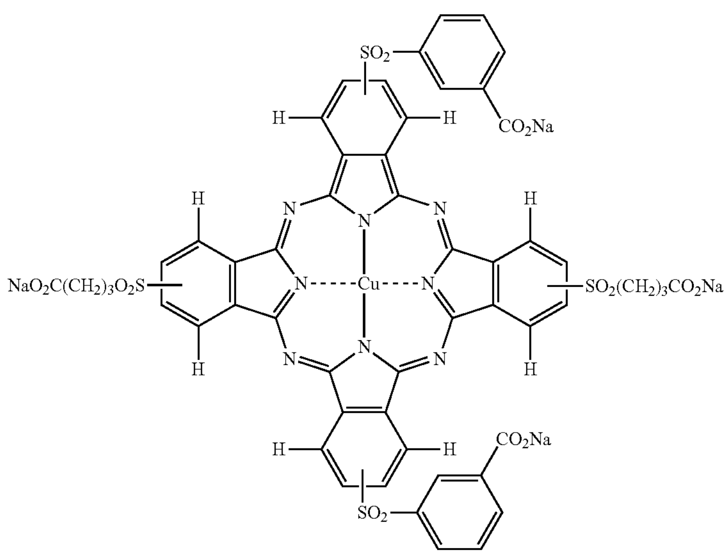
(C-31)
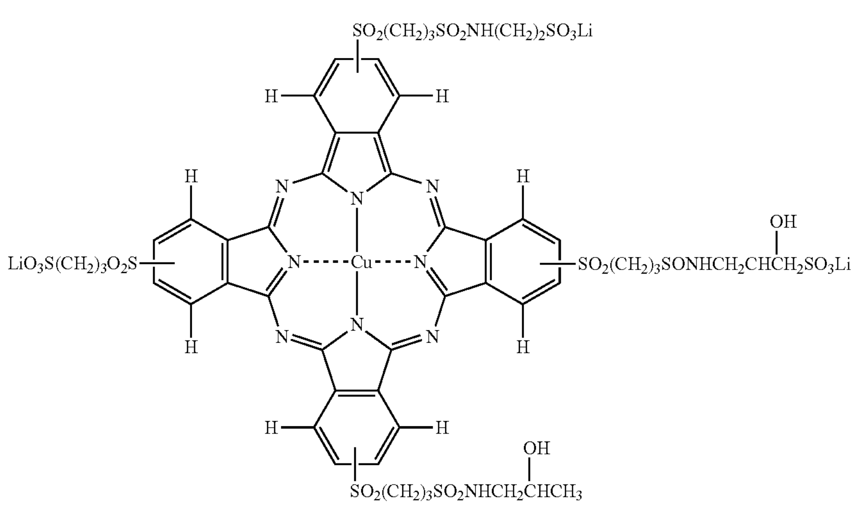

-continued
(C-32)
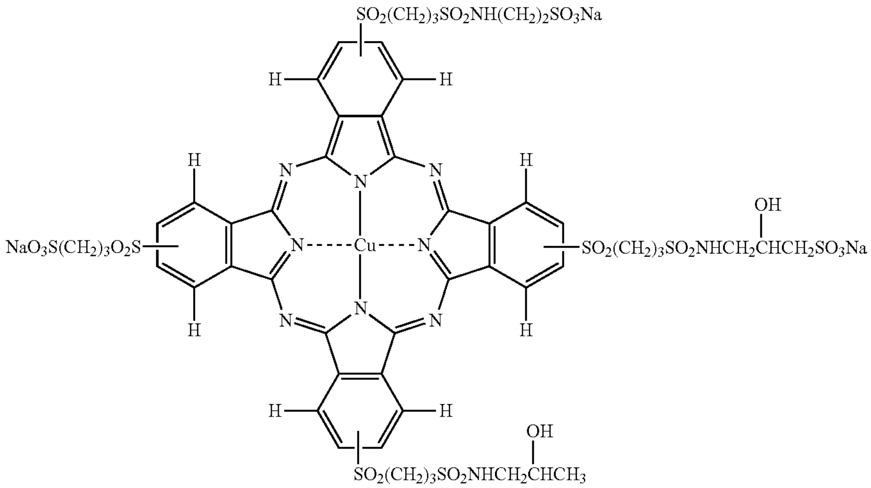
(C-33)
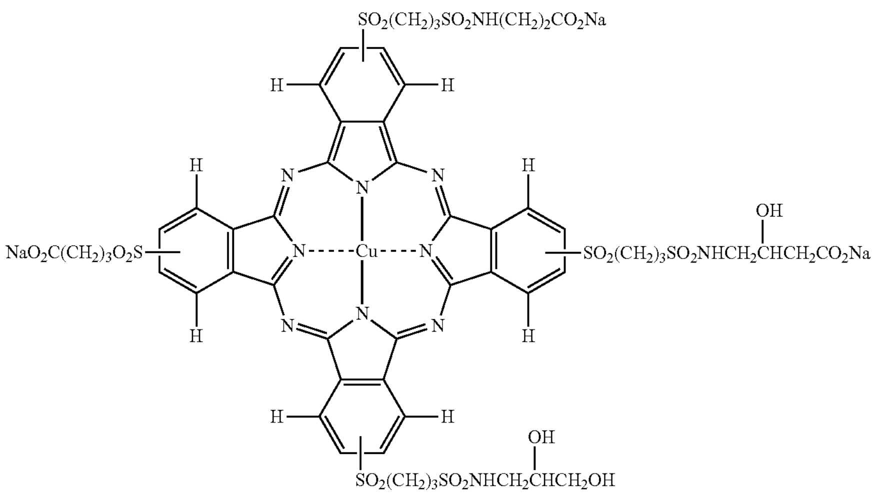
(C-34)
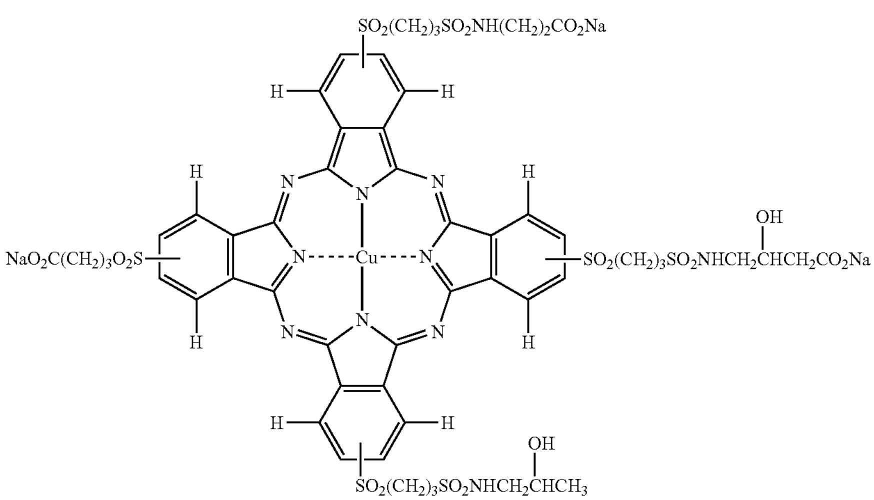

The dye ink composition according to the present invention may further contain a compound (toning agent) represented by general formula (Cy-2) below in addition to the dye represented by general formula (I).

(Cy-2)

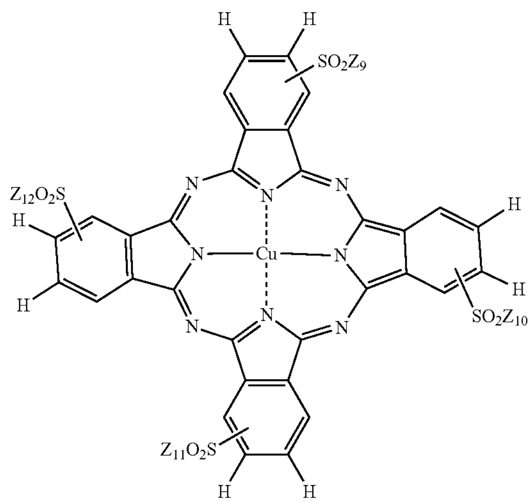

In general formula (Cy-2), $Z_9$, $Z_{10}$, $Z_{11}$, and $Z_{12}$ each independently represent a substituted or unsubstituted alkyl group, a substituted or unsubstituted aryl group, or a substituted or unsubstituted heterocyclic group. At least one of $Z_9$, $Z_{10}$, $Z_{11}$, or $Z_{12}$ has an ionic hydrophilic group as a substituent.

The alkyl group, aryl group, and heterocyclic group represented by $Z_9$, $Z_{10}$, $Z_{11}$, and $Z_{12}$ in general formula (Cy-2) are the same as the alkyl group, aryl group, and heterocyclic group, respectively, described as Z of —$SO_2$—Z, which is a preferred substituent included in general formula (I) above, and preferred examples are also the same.

The compound represented by general formula (Cy-2) is a phthalocyanine-based dye in which substituted sulfonyl groups (—$SO_2$—$Z_9$, —$SO_2$—$Z_{10}$, —$SO_2$—$Z_{11}$, and —$SO_2$—$Z_{12}$) are introduced to a positions. That is, in general formula (Cy-2), —$SO_2$—$Z_9$, —$SO_2$—$Z_{10}$, —$SO_2$—$Z_{11}$, and —$SO_2$—$Z_{12}$ replace hydrogen atoms at a positions but do not replace hydrogen atoms at β positions.

The compound represented by general formula (Cy-2) can be synthesized by a publicly known method (for example, methods described in JP3949385B and JP4854250B).

The α positions and the β positions of the phthalocyanine skeleton are illustrated in formula (b) above.

Specific examples of the compound represented by general formula (Cy-2) are described below, but are not limited thereto. In structural formulae of specific compounds below, each specific compound is a mixture including positional isomers (refer to (3A) to (3D) below) that vary depending on introduction positions (a positions) of specific substituted sulfonyl groups (Q represents —$SO_2$—$Z_9$, —$SO_2$—$Z_{10}$, —$SO_2$—$Z_{11}$, or —$SO_2$—$Z_{12}$). Therefore, the introduction positions of substituents are not specified, and the positional isomers are treated as the same compound. In the specific examples below, it is indicated that the substituted sulfonyl groups each replace any hydrogen atom at an α position but do not replace the portions having "H" in each structural formula.

(3A)

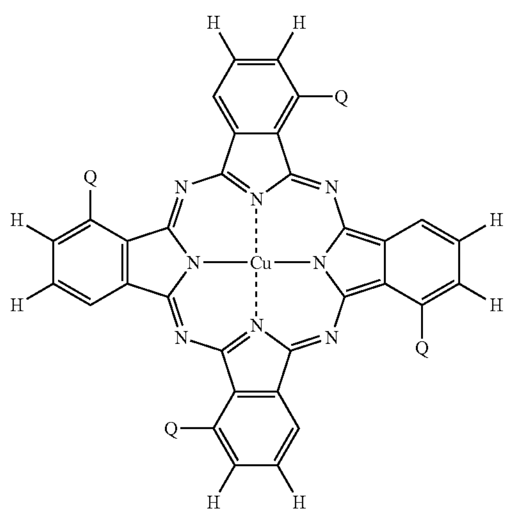

(3B)

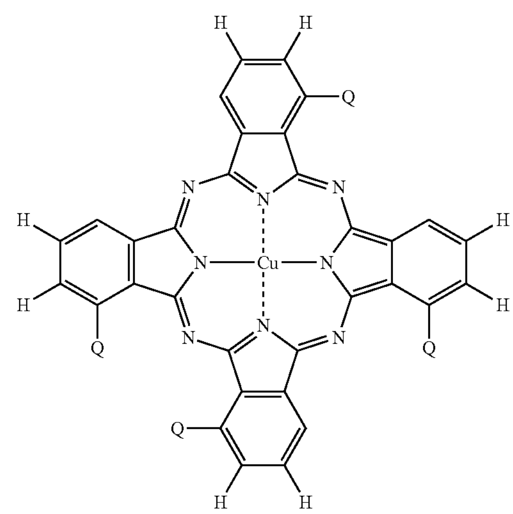

-continued
(3C)
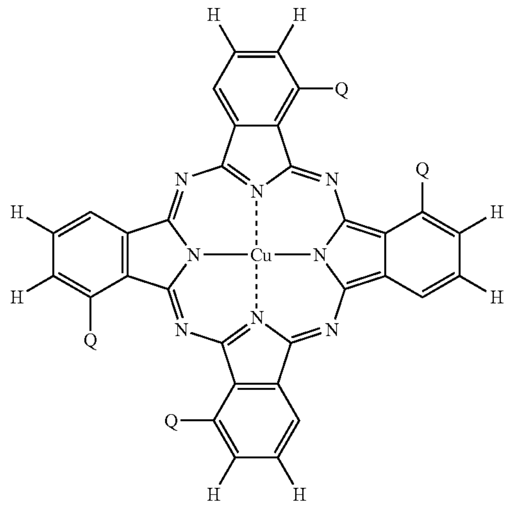
(3D)
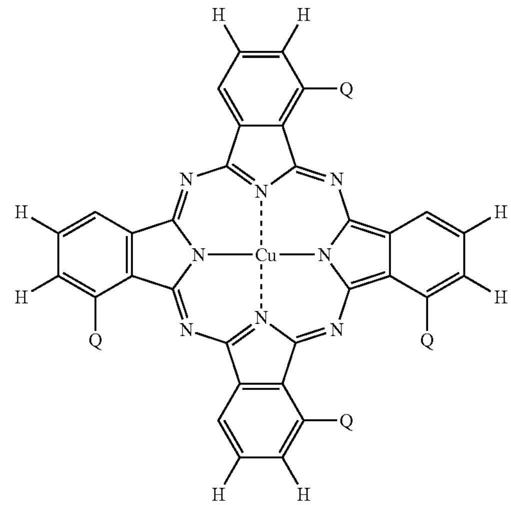
(C-41)
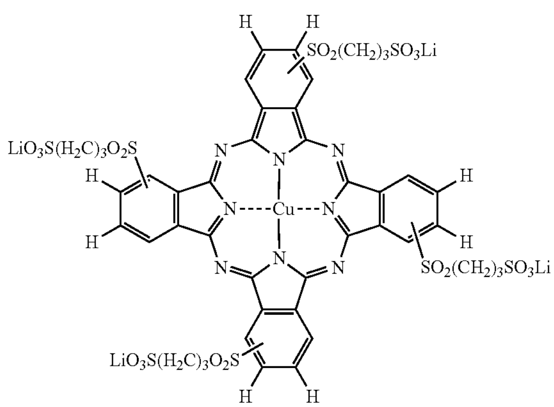
(C-42)
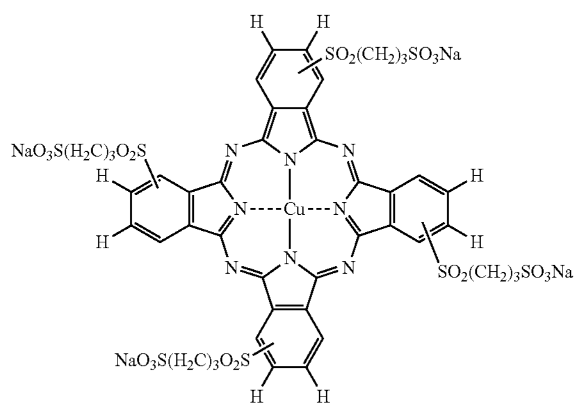
(C-43)
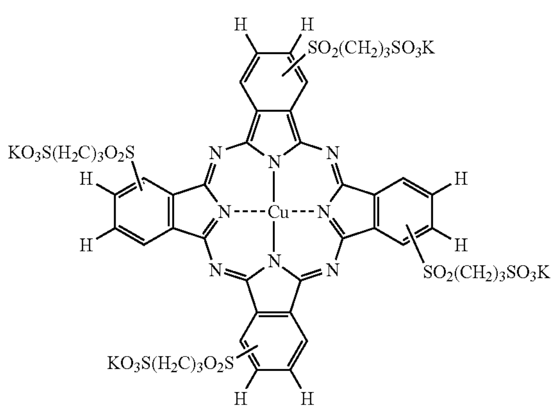
(C-44)
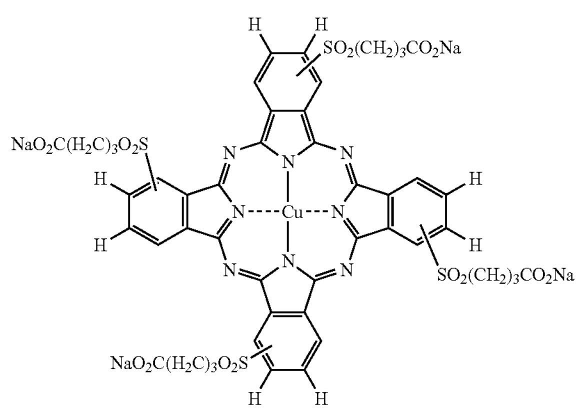

-continued (C-45)

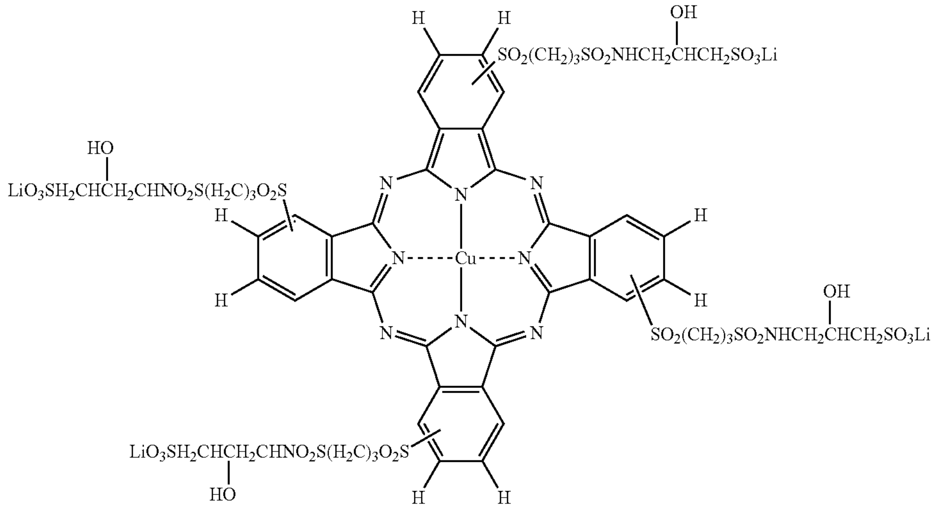

The use of the β-position substituted dye represented by general formula (I) and the α-position substituted compound represented by general formula (Cy-2) enables the ratio of α-position substitution and β-position substitution to be adjusted not in a molecule but between molecules. Consequently, both high printing density (on plain paper and on ink jet paper) and good image durability can be achieved at a high level.

The dye ink composition according to the present invention may further contain a compound (toning agent) represented by any of general formulae (Cy-3) to (Cy-6) in addition to the dye represented by general formula (I) above.

(Cy-3)

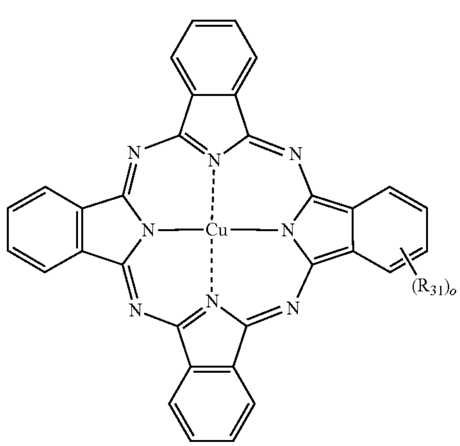

-continued (Cy-4)

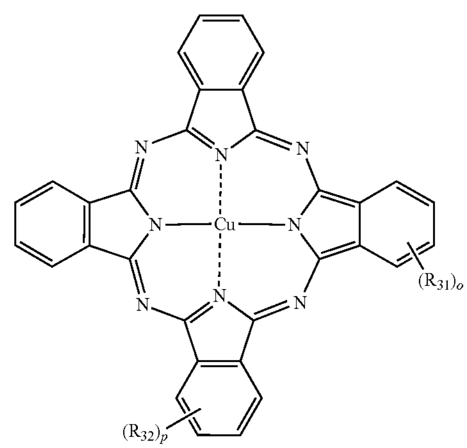

(Cy-5)

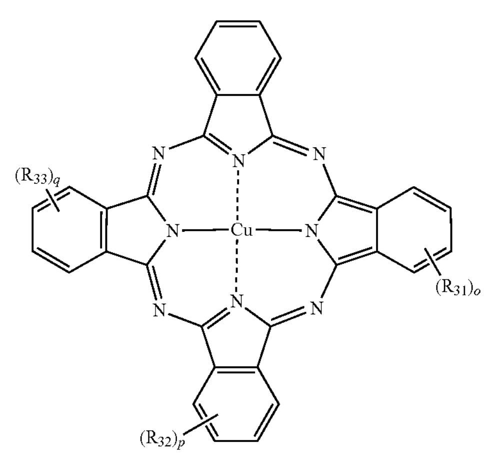

-continued (Cy-6)

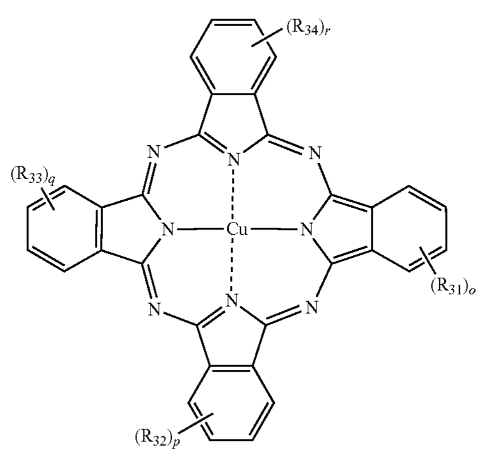

In general formulae (Cy-3) to (Cy-6), $R_{31}$, $R_{32}$, $R_{33}$, and $R_{34}$ each independently represent a substituted or unsubstituted sulfamoyl group, a substituted or unsubstituted carbamoyl group, a sulfo group, or a carboxy group, and in a case where a plurality of $R_{31}$'s, $R_{32}$'s, $R_{33}$'s, and $R_{34}$'s are present, they may be the same or different. o, p, q, and r each independently represent an integer of 1 to 4.

The toning agent represented by any of general formulae (Cy-3) to (Cy-6) is an α-position/β-position substitution mixture (for example, α-position/β-position≈10%/90% to 50%/50%) in which there is no selectivity of the introduction positions of substituents with regard to the α positions and the β positions of the phthalocyanine dye skeleton illustrated in formula (a) above.

In general formulae (Cy-3) to (Cy-6), preferred $R_{31}$, $R_{32}$, $R_{33}$, and $R_{34}$ are each independently a substituted or unsubstituted sulfamoyl group, a carbamoyl group, a sulfo group (—$SO_3M$), or a carboxy group (—COOM) from the viewpoints of availability of raw materials and the ease of synthesis. Of these, a substituted sulfamoyl group (—$SO_2NR_{41}R_{42}$: where $R_{41}$ and $R_{42}$ each independently represent a hydrogen atom or a substituent), an unsubstituted sulfamoyl group (—$SO_2NH_2$), and a sulfo group (—$SO_3M$) are preferred in view of the attained level of required performance of ink jet. Of these, a mixture of a substituted sulfamoyl group (—$SO_2NHR_{42}$: where $R_{42}$ represents a substituent that contains an ionic hydrophilic group), an unsubstituted sulfamoyl group (—$SO_2NH_2$), and a sulfo group (—$SO_3M$) is preferred from the viewpoints of water solubility and image durability.

The counter cation (M) of the ionic hydrophilic group contained in the toning agent represented by any of general formulae (Cy-3) to (Cy-6) above represents a hydrogen atom or a counter cation. Examples of the counter cation include, but are not particularly limited to, alkali metal ions, an ammonium ion, and organic cations (such as tetramethylammonium, guanidinium, and pyridinium). M is preferably a hydrogen atom, an ammonium ion, or an alkali metal ion, more preferably an alkali metal ion, still more preferably a lithium ion, a sodium ion, or a potassium ion, particularly preferably a lithium ion or a sodium ion, and most preferably a lithium ion. In particular, a lithium salt of a sulfo group (—$SO_3Li$) is preferred because the lithium salt enhances the solubility of the dye and improves ink stability.

When M represents a lithium ion, all M are not necessarily lithium ions, but substantially, the counter cation having the highest presence ratio is preferably a lithium ion. Under the conditions of such a presence ratio, the toning agent can include, as M, for example, a hydrogen atom, an alkali metal ion (e.g., a sodium ion or a potassium ion), an alkaline-earth metal ion (e.g., a magnesium ion, a calcium ion, or the like), a quaternary ammonium ion, a quaternary phosphonium ion, or a sulfonium ion.

The amount of lithium ions is preferably 50% or more, more preferably 60% or more, still more preferably 80% or more, and particularly preferably 90% or more relative to the total of M, and the upper limit thereof is preferably 100%.

o, p, q, and r each independently represent an integer of 1 to 4, more preferably 1 to 3, particularly preferably 1 to 2, and most preferably 1. A mixture of general formulae (Cy-3), (Cy-4), (Cy-5), and (Cy-6) is preferred from the viewpoint of availability of the dye serving as a coloring agent. Examples of the specific compound include C.I. Direct Blue 86, 87, and 199.

Phthalocyanine derivatives that are represented by general formulae (Cy-3) to (Cy-6) and that can be used in the present invention can be synthesized, for example, by employing methods described or cited in, for example, "Phthalocyanine—Chemistry and Function—" written by Shirai and Kobayashi, published by IPC (pp. 1 to 62) and "Phthalocyanines—Properties and Applications" written by C. C. Leznoff and A. B. P. Lever, published by VCH (pp. 1 to 54), or by combining methods similar to the foregoing methods.

The dye ink composition according to the present invention can contain, as a dye used in combination, a coloring agent that is other than the dye represented by general formula (I) and other than the aforementioned compounds, in addition to the dye represented by general formula (I). Typical dyes are listed below as examples. Note that "C.I." is an abbreviation of "color index".

C.I. Direct Blue: 6, 22, 25, 71, 78, 90, 106, 189, 262, 264, 276, 282, 314, etc.

C.I. Acid Blue: 9, 22, 40, 59, 93, 102, 104, 113, 117, 120, 167, 185, 197, 224, 228, 229, 234, 242, 243, 249, 254, 275, 279, 283, 310, 357, etc.

Compounds described in WO2007/091631A or JP2005-179469A may also be included.

In the dye ink composition, a ratio ($T_1/T_2/T_3/T_4$) of a content $T_1$ of the dye represented by general formula (I) based on the mass, a content $T_2$ of the dye represented by general formula (Cy-1) based on the mass, a content $T_3$ of the dye represented by general formula (Cy-2) based on the mass, and a total content $T_4$ of the compounds represented by general formulae (Cy-3) to (Cy-6) based on a mass is preferably 45 to 100/0 to 35/0 to 10/0 to 10, more preferably 50 to 100/0 to 35/0 to 10/0 to 5, still more preferably 55 to 100/0 to 35/0 to 10/0 to 5, particularly preferably 60 to 100/0 to 35/0 to 10/0, and most preferably 60 to 100/0 to 30/10/0 from the viewpoint of achieving both the printing density on plain paper and image fastness on ink jet paper.

When the ratio $T_1/T_2/T_3/T_4$ is within the above range, it is possible to obtain the effect of satisfying the following required performances at a high level: The ink has high long-term temporal stability (e.g., change in viscosity and change in surface tension, or reduction in precipitate), and a print sample obtained by using the ink has high printing density (color developability on ink jet paper and plain paper), reduced bronze luster, and high image durability (in particular, ozone resistance and light resistance on the ink jet dye).

The dye ink composition according to the present invention is preferably a composition for a cyan dye ink.

The content (% by mass) of the dye represented by general formula (I) in the dye ink composition (preferably, a dye ink composition for a cyan dye ink) according to the present invention is preferably 1.0% by mass or more and 8.0% by mass or less, more preferably 2.0% by mass or more and 6.0% by mass or less, still more preferably 3.0% by mass or more and 5.5% by mass or less, and most preferably 3.0% by mass or more and 5.0% by mass or less with respect to the total mass of the dye ink composition from the viewpoint of printing density and ejection reliability of the ink.

When the dye ink composition according to the present invention contains, as a coloring agent, compounds represented by general formulae (Cy-1) to (Cy-6), another phthalocyanine-based dye or a partial azaphthalocyanine-based dye other than that represented by general formula (I) above, or a triarylmethane-based dye in addition to the dye represented by general formula (I), the total content (% by mass) of all dyes in the dye ink composition (preferably, a dye ink composition for a cyan dye ink) is preferably 1.0% by mass or more and 8.0% by mass or less, more preferably 2.0% by mass or more and 6.0% by mass or less, still more preferably 3.0% by mass or more and 5.5% by mass or less, and most preferably 3.0% by mass or more and 5.0% by mass or less with respect to the total mass of the dye ink composition from the viewpoint of printing density and ejection reliability of the ink.

Compound Represented by General Formula (II)

The compound (additive) represented by general formula (II) and included in the dye ink composition according to the present invention will be described.

General formula (II)

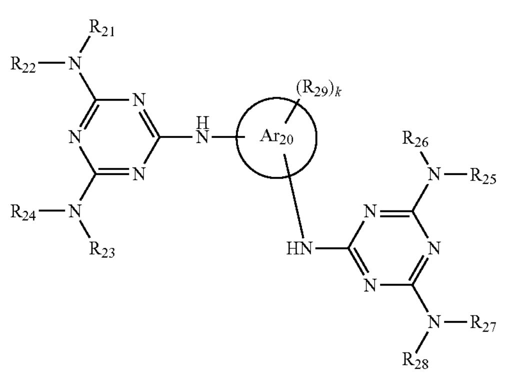

In general formula (II), $Ar_{20}$ represents a benzene ring or a naphthalene ring. Rn to $R_{28}$ each independently represent a hydrogen atom or a substituent. $R_{21}$ and $R_{22}$ may be linked to each other to form a ring. $R_{23}$ and $R_{24}$ may be linked to each other to form a ring. $R_{25}$ and $R_{26}$ may be linked to each other to form a ring. $R_{27}$ and $R_{28}$ may be linked to each other to form a ring. $R_{29}$ represents a substituent. In a case where $Ar_{20}$ represents a benzene ring, k represents an integer of 0 to 4. In a case where $Ar_{20}$ represents a naphthalene ring, k represents an integer of 0 to 6. In a case where a plurality of $R_{29}$'s are present, the plurality of $R_{29}$'s may be the same or different. In a case where a plurality of $R_{29}$'s are present, the plurality of $R_{29}$'s may be linked to each other to form a ring. However, the compound represented by general formula (II) has at least one hydrophilic group.

The compound represented by general formula (II) is preferably a colorless, water-soluble planar compound having more than 10 delocalized π electrons in one molecule. When the number of n electrons constituting the delocalized n-electron system increases, and the π-electron system extends, such a compound often has an absorption in the visible range. In the present invention, the term "colorless" also refers to a state of being very slightly colored within a range that does not affect an image. The water-soluble compound represented by general formula (II) may be a fluorescent compound, but is preferably a non-fluorescent compound and more preferably a compound having an absorption peak wavelength (λmax) of 350 nm or less, still more preferably 320 nm or less on the longest wavelength side and having a molar absorption coefficient of 10,000 or less.

The upper limit of the number of delocalized n electrons in one molecule of the compound represented by general formula (II) is not particularly limited, but is preferably 80 or less, more preferably 50 or less, and particularly preferably 30 or less. More than 10π electrons may form a single large delocalized system or may form two or more delocalized systems. In particular, a compound having two or more aromatic rings in one molecule is preferred. The aromatic rings may be aromatic hydrocarbon rings or aromatic heterocyclic rings including heteroatoms. Alternatively, the aromatic rings may be fused together to form a single aromatic ring. Examples of the aromatic rings include a benzene ring, a naphthalene ring, an anthracene ring, a pyridine ring, a pyrimidine ring, a pyrazine ring, and a triazine ring.

The compound represented by general formula (II) is preferably soluble in water and is preferably a compound that dissolves in an amount of at least 1 g or more in 100 g of water at 20° C. The compound is more preferably a compound that dissolves in an amount of 5 g or more, and most preferably a compound that dissolves in an amount of 10 g or more.

The compound represented by general formula (II) has at least one hydrophilic group in one molecule. In the case of a compound having two or more aromatic rings in one molecule, the compound particularly preferably has at least two hydrophilic groups linked to the aromatic rings in the molecule.

The hydrophilic groups can be easily selected as substituents from the I/O calculated value of {O: organic value} and {I: inorganic value} outlined in Shin Yuuki Gainen Zu-Kiso to Ouyo- (New edition of Organic conceptual diagram—Fundamentals and applications—) (SANKYO SHUPPAN Co., Ltd.), the log P value (usually, the partition coefficient P of molecules in the 1-octanol/water system), which is widely used as a hydrophobic parameter of compounds in the fields of chemistry/medical and pharmaceutical science, or the calculated value thereof, i.e., the C log P value, and the acid dissociation constant (pKa value) of a functional group. The hydrophilic groups are also preferably "strongly hydrophilic groups" and "groups that are not very strongly hydrophilic" in the description of "hydrophilic groups" of Kagaku Daijiten (Encyclopedic dictionary of chemistry), Fourth edition, (KYORITSU SHUPPAN Co., Ltd.). Since the dye ink composition (ink jet ink) according to the present invention is preferably used in a basic form, a hydrophilic group that has a high acid dissociation constant (pKa value) and that is not very strongly hydrophilic is also applicable. Specifically, such a group may be —$NH_2$, —OH, or —$CO_2H$ (or an alkali metal salt of a carboxy group).

Examples of more preferred hydrophilic groups include, in addition to ionic hydrophilic groups (preferably acidic groups, more preferably a sulfo group (—$SO_3M$), a carboxy group (—$CO_2M$), a phosphate group (—$PO(OM)_2$), and the like), a hydroxy group, an alkylcarbonylamino group, an arylcarbonylamino group, an alkylsulfonylamino group, an arylsulfonylamino group, and a quaternary ammonium group but are not limited thereto. The hydrophilic group is preferably an ionic hydrophilic group, more preferably a sulfo group (—$SO_3M$) or a carboxy group (—$CO_2M$), and most preferably a sulfo group (—$SO_3M$).

The compound represented by general formula (II) preferably has at least one ionic hydrophilic group.

M represents a hydrogen atom or a counter cation. Examples of the counter cation include, but are not particularly limited to, alkali metal ions, an ammonium ion, and organic cations (such as tetramethylammonium, guanidinium, and pyridinium).

M is preferably a hydrogen atom, an ammonium ion, or an alkali metal ion, more preferably an alkali metal ion, still more preferably a lithium ion, a sodium ion, or a potassium ion, and particularly preferably a lithium ion or a sodium ion. The counter cation may be a single salt or a mixed salt.

The compound represented by general formula (II) preferably has 1 to 10 hydrophilic groups and more preferably has 2 to 8 hydrophilic groups in one molecule.

The compound represented by general formula (II) preferably has 2 to 6 ionic hydrophilic groups and more preferably has 2 to 4 ionic hydrophilic groups in one molecule.

At least any one of $R_{21}$ to $R_{29}$ in general formula (II) preferably has an ionic hydrophilic group and more preferably has —$SO_3M$. Still more preferably, 2 to 6 of $R_{21}$ to $R_{29}$ have —$SO_3M$, and particularly preferably, 2 to 4 of $R_{21}$ to $R_{29}$ have —$SO_3M$.

In general formula (II), $R_{21}$ to $R_{28}$ each independently represent a hydrogen atom or a substituent, and an example of the substituent is a substituent selected from the above-described substituent group A. Examples of the substituent include an alkyl group, an aryl group, an aralkyl group, a heterocyclic group, an alkoxy group, an aryloxy group, a hydroxy group, an amino group (including an anilino group and a heterocyclic amino group), an acyl group, an acylamino group, a ureido group, a halogen atom, a sulfamoyl group, a carbamoyl group, a sulfonamide group, a sulfonyl group, a sulfenyl group, a sulfinyl group, and a hydrophilic group. These may further have a substituent.

$R_{21}$ to $R_{28}$ preferably each independently represent a hydrogen atom or an alkyl group. The alkyl group is preferably an alkyl group having 1 to 12 carbon atoms, more preferably an alkyl group having 1 to 8 carbon atoms, and most preferably an alkyl group having 1 to 6 carbon atoms. The alkyl group preferably has, as a substituent, the above-described hydrophilic group from the viewpoint of preservation stability of the water-based ink.

$R_{21}$ and $R_{22}$, $R_{23}$ and $R_{24}$, $R_{25}$ and $R_{26}$, and $R_{27}$ and $R_{28}$ may each be linked to each other to form a ring. The ring is not particularly limited, and may be an aromatic ring or a non-aromatic ring. The ring is preferably a five-membered ring or a six-membered ring. The ring may include a heteroatom (e.g., an oxygen atom, a nitrogen atom, or a sulfur atom) besides the nitrogen atoms to which $R_{21}$ to $R_{28}$ are linked.

$R_{29}$ represents a substituent, and an example of the substituent is a substituent selected from the substituent group A. Examples of the substituent include an alkyl group, an aryl group, an aralkyl group, a heterocyclic group, an alkoxy group, an aryloxy group, a hydroxy group, an amino group (including an anilino group and a heterocyclic amino group), an acyl group, an acylamino group, a ureido group, a halogen atom, a sulfamoyl group, a carbamoyl group, a sulfonamide group, a sulfonyl group, a sulfenyl group, a sulfinyl group, and a hydrophilic group. These may further have a substituent.

In a case where a plurality of $R_{29}$'s are present, the plurality of $R_{29}$'s may be the same or different. In a case where a plurality of $R_{29}$'s are present, the plurality of $R_{29}$'s may be linked to each other to form a ring. The ring is not particularly limited, and may be an aromatic ring or a non-aromatic ring. The ring is preferably a five-membered ring or a six-membered ring. The ring may include a heteroatom (e.g., an oxygen atom, a nitrogen atom, or a sulfur atom).

In general formula (II), $Ar_{20}$ represents a benzene ring or a naphthalene ring and preferably represents a benzene ring.

In a case where $Ar_{20}$ represents a benzene ring, k represents an integer of 0 to 4 and is preferably an integer of 0 to 2, and more preferably 0 or 1.

In a case where $Ar_{20}$ represents a naphthalene ring, k represents an integer of 0 to 6 and is preferably an integer of 0 to 4, more preferably an integer of 0 to 2, and still more preferably 0 or 1.

Specific examples of the compound represented by general formula (II) are described below, but are not limited thereto.

(A-1)

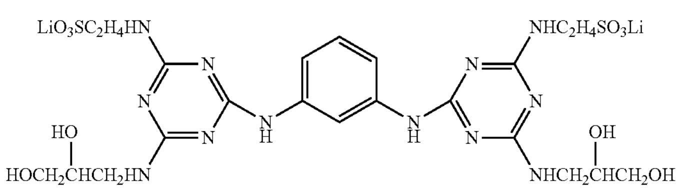

(A-2)

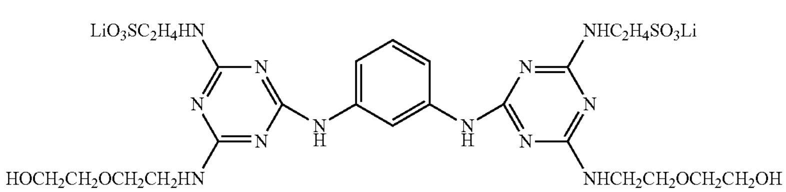

-continued
(A-3)
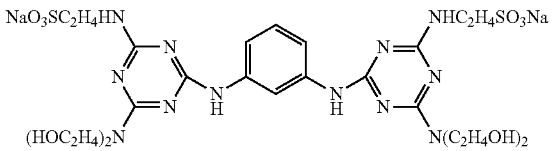
(A-4)
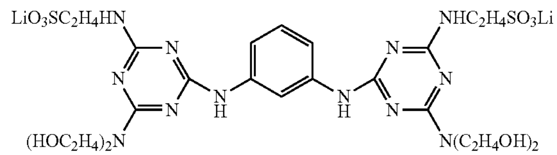
(A-5)
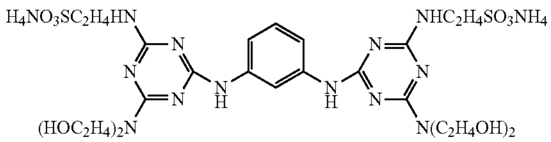
(A-6)
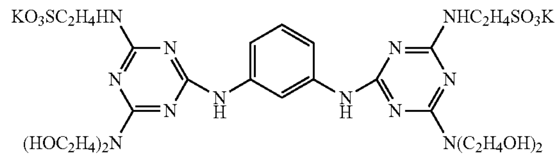
(A-7)
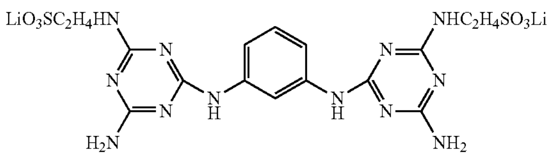
(A-8)
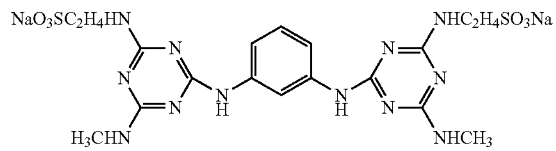
(A-9)
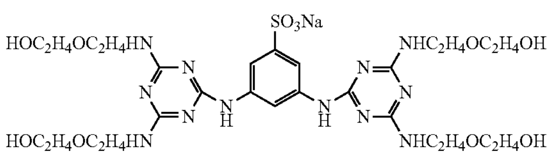
(A-10)
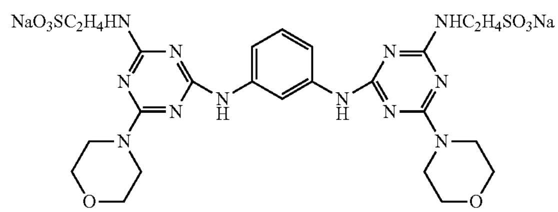
(A-11)
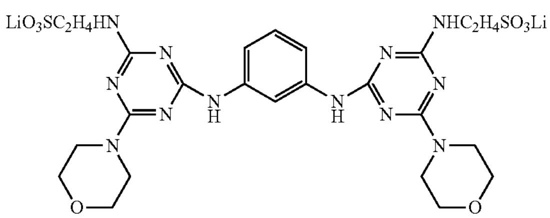
(A-12)
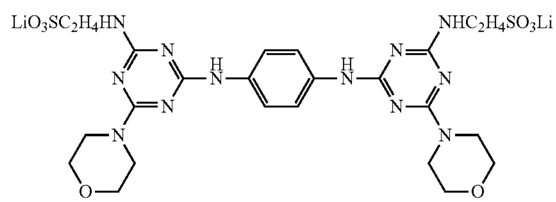
(A-13)
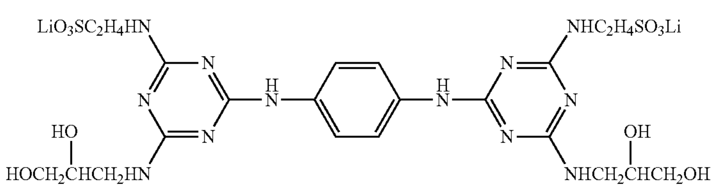
(A-14)
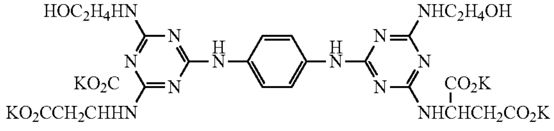
(A-15)
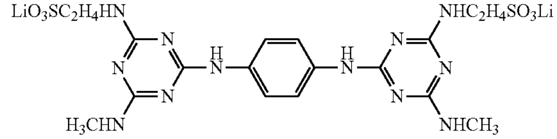
(A-16)
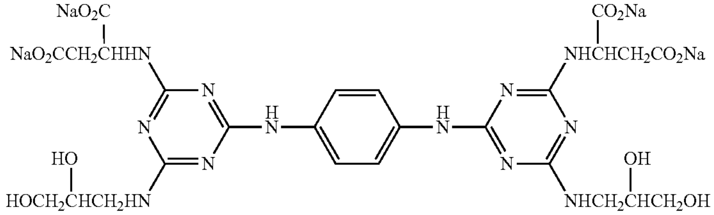

-continued
(A-17)
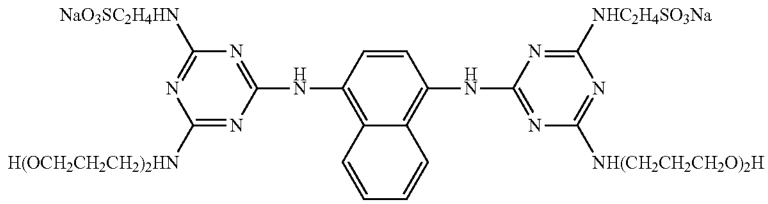
(A-18)
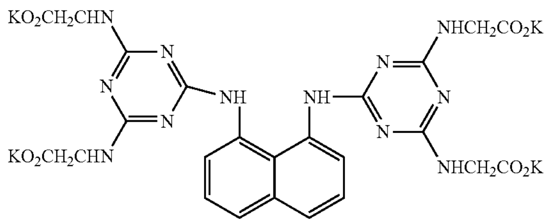
(A-19)
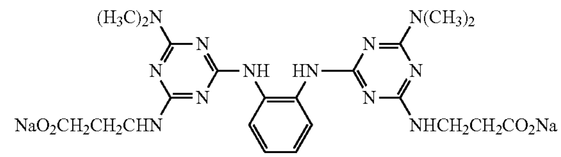
(A-20)
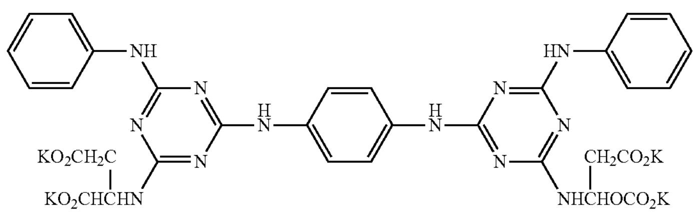
(A-21)
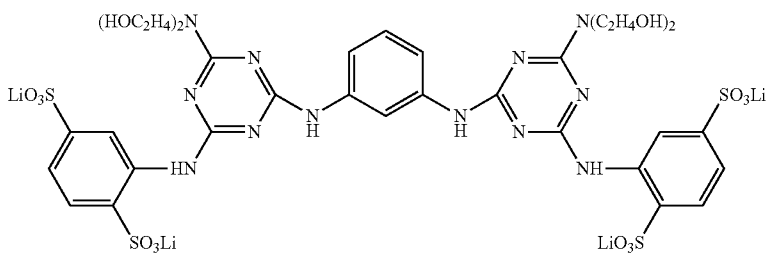
(A-22)
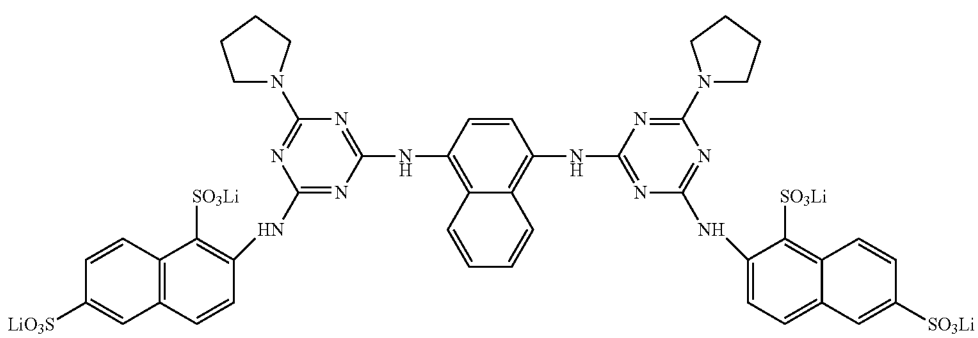
(A-23)
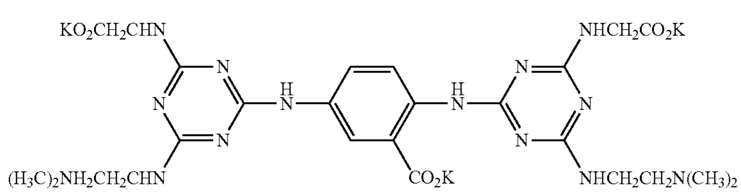
(A-24)
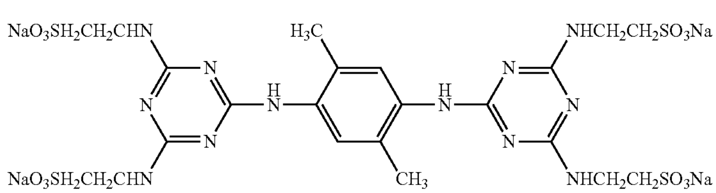

-continued (A-25)

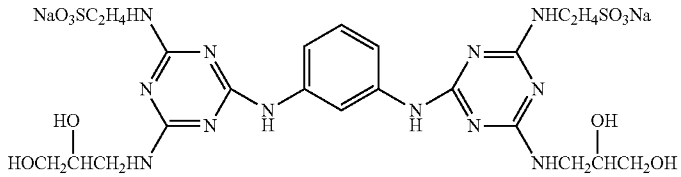

(A-26)

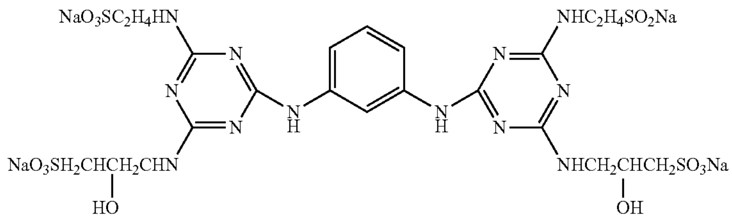

The content of the compound represented by general formula (II) in the dye ink composition (preferably, a dye ink composition for a cyan dye ink) according to the present invention is preferably 0.1% to 10.0% by mass, more preferably 0.3% to 5.0% by mass, still more preferably 0.5% to 4.0% by mass, particularly preferably 0.5% to 3.5% by mass, and most preferably 0.5% to 2.0% by mass with respect to the total mass of the dye ink composition. It is also preferable that the content of the compound represented by general formula (II) be 1.0% to 3.5% by mass or 1.5% to 2.0% by mass depending on the combination with the dye represented by general formula (I) above and the dyes represented by (Cy-1) to (Cy-6). The reason for this is as follows. While ejection reliability of the dye ink composition is ensured, the intermolecular interaction between the partial azaphthalocyanine dye represented by general formula (I) and the compound (additive) represented by general formula (II) that coexist in the dye ink composition is enhanced after the formation of a printed article to thereby reduce association between phthalocyanine dye molecules. Thus, the printing density (in particular, color developability on plain paper) is dramatically improved, and furthermore, the image durability (in particular, ozone resistance and light resistance) can also be satisfied.

The compound represented by general formula (II) can be synthesized by a publicly known method (for example, a method described in JP4686151B).

Chelating Agent

The dye ink composition according to the present invention may contain a chelating agent.

The chelating agent (also referred to as a "chelator") is a compound that binds to an inorganic or metal cation (particularly preferably, a polyvalent cation) to produce a chelate compound.

In the present invention, the chelating agent has a function of preventing the formation and growth (that is, functions as a solubilizing agent) of insoluble, precipitated foreign matter in a water-based ink composition, the foreign matter being derived from an inorganic or metal cation (in particular, a polyvalent cation).

When the dye ink composition (water-based ink composition) according to the present invention contains a chelating agent, the generation of precipitated foreign matter can be reduced even in long-term preservation of the water-based ink composition. Consequently, when an image is printed with an ink jet printer by using an ink for ink jet recording, the ink including the water-based ink composition after long-term preservation, ink clogging in a nozzle or the like is less likely to occur, and a printed article with a high quality can be obtained. The chelating agent that can be used in the present invention is not particularly limited, and various chelating agents can be used.

Recently, inks for ink jet recording have been experiencing a change from cartridge inks to large-volume ink-tank models, and further improvements in performance have been required for storage stability in long-term preservation and for print quality and ejection stability of inks after long-term preservation. When the dye ink composition according to the present invention contains a chelating agent, there is provided an ink for ink jet recording, the ink having high storage stability in long-term preservation and exhibiting high print quality and ejection stability after long-term preservation.

The chelating agent may be any solubilizing agent that forms a complex with a cation present in the dye ink composition (water-based ink composition) by a chelating action to exhibit the effect of reducing the generation and growth of precipitated foreign matter in the water-based ink composition. Various types of such chelating agents may be used alone or in combination of two or more thereof. The chelating agent is preferably a water-soluble compound.

Examples of the chelating agent include ethylenediaminetetraacetic acid (EDTA) and salts thereof (e.g., EDTA-4 sodium (tetrasodium salt) and EDTA-4 lithium (tetralithium salt)), picolinic acid and salts thereof (e.g., picolinic acid sodium salt), quinolinic acid and salts thereof (e.g., quinolinic acid sodium salt), 1,10-phenanthroline, 8-hydroxyquinoline, 3-hydroxy-2,2'-iminodisuccinic acid tetrasodium salt, methylglycinediacetic acid (MGDA) and salts thereof, L-glutamic acid diacetic acid (GLDA) and salts thereof, L-aspartic acid diacetic acid (ASDA) and salts thereof, hydroxyethyliminodiacetic acid (HIDA) and salts thereof, 3-hydroxy-2,2'-iminodisuccinic acid (HIDS) and salts thereof, dicarboxymethyl glutamic acid (CMGA) and salts thereof, and (S,S)-ethylenediaminedisuccinic acid (EDDS) and salts thereof. The salts among the above chelating agents are preferably, for example, salts of ammonium, amine, or the like besides salts of a monovalent metal such as sodium, potassium, or lithium. Among the above chelating agents, these exhibit a chelating action that is less likely to decrease with respect to a change in pH of the dye ink composition. Therefore, the chelating action is exhibited in a wider pH range, and for example, it is possible to further improve the response of the chelating action to a change in pH of the dye ink composition, such as a change with time.

The content of the chelating agent is preferably 0.001% by mass or more and 1.1% by mass or less with respect to the total mass of the dye ink composition. The content is more preferably 0.001% by mass or more and 0.5% by mass or less, still more preferably 0.001% by mass or more and 0.3% by mass or less, and particularly preferably 0.001% by mass or more and 0.1% by mass or less. If the content is 0.001% by mass or more, the chelating action can be effectively exhibited. If the content is 1.1% by mass or less, it is possible to suppress an excessive increase in the viscosity of the dye ink composition and an excessive increase in pH thereof due to the addition of the chelating agent.

A ratio of the chelating agent to the dye (content of chelating agent based on mass:content of dye based on mass) in the dye ink composition is preferably in the range of 0.0001:1 to 0.15:1 (chelating agent/dye is preferably from 0.0001 to 0.15). The ratio is more preferably in the range of 0.0001:1 to 0.01:1, and still more preferably in the range of 0.0002:1 to 0.005:1. A metal that is likely to form a metal salt is a metal that can be mixed during the manufacturing process of a dye or a metal that can be included in an ink container of a dye ink composition and eluted into the dye ink composition; however, if the ratio is within the above range, the generation of foreign matter that causes clogging of an ink jet head can be effectively suppressed. In addition, the chelating action can be effectively exhibited, and an excessive increase in the viscosity of the dye ink composition and an excessive increase in pH thereof can be suppressed.

An example of the use of the dye ink composition according to the present invention is an image recording material for forming an image. Specific examples thereof include, besides a recording material for an ink jet process described in detail below, a thermal recording material, a pressure-sensitive recording material, a recording material for an electrophotographic process, a transfer-type silver halide photosensitive material, a printing ink, and a recording pen. The use of the dye ink composition is preferably a recording material for an ink jet process, a thermal recording material, or a recording material for an electrophotographic process, and more preferably a recording material for an ink jet process.

The dye ink composition according to the present invention is applicable to a color filter for recording/reproducing a color image used in a solid-state imaging element such as a charge-coupled device (CCD) or a display such as a liquid crystal display (LCD) or a plasma display panel (PDP), or a dye solution for dyeing various fibers.

In using the dye ink composition according to the present invention, physical properties, such as solubility, dispersibility, and thermal mobility, suitable for the use of the dye ink composition can be adjusted with substituents. The colorant used in the present invention can be used in a dissolved state, in an emulsified and dispersed state, and further, in a dispersed solid state depending on the system used.

The dye ink composition according to the present invention is particularly suitable for a dye ink for ink jet recording.

The dye ink composition according to the present invention can be produced by using, as a medium, water, further using a lipophilic medium or an aqueous medium, as needed, and dissolving and/or dispersing a coloring agent, a toning agent, and an additive in the medium.

Examples of the water include pure water such as deionized water, ion-exchange water, ultrafiltered water, reverse osmosis water, and distilled water; and ultrapure water.

The dye ink composition according to the present invention can contain other solvents in addition to water. The other solvents are preferably water-miscible organic solvents.

Examples of water-miscible organic solvents include alcohols (e.g., methanol, ethanol, propanol, isopropanol, butanol, isobutanol, sec-butanol, t-butanol, pentanol, hexanol, cyclohexanol, and benzyl alcohol); polyhydric alcohols (e.g., ethylene glycol, diethylene glycol, triethylene glycol, polyethylene glycol, propylene glycol, dipropylene glycol, polypropylene glycol, butylene glycol, hexanediol, pentanediol, glycerin, hexanetriol, and thiodiglycol); glycol derivatives (e.g., ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monoethyl ether, and ethylene glycol monophenyl ether); amines (e.g., ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine, and tetramethylpropylenediamine); and other polar solvents (e.g., formamide, N,N-dimethylformamide, N,N-dimethylacetamide, dimethyl sulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile, and acetone). Two or more water-miscible organic solvents may be used in combination.

In the dye ink composition according to the present invention, the water content is preferably 40% to 80% by mass, more preferably 45% to 70% by mass, and still more preferably 50% to 60% by mass with respect to the total mass of the ink composition from the viewpoints of ejection stability and storage stability of the ink.

When the dye ink composition according to the present invention contains a water-miscible organic solvent, the content of the water-miscible organic solvent is preferably 10% to 55% by mass, more preferably 20% to 50% by mass, and still more preferably 30% to 45% by mass with respect to the total mass of the ink composition.

The dye ink according to the present invention can optionally contain other additives as long as the effects of the present invention are not impaired.

Examples of the other additives include publicly known additives such as anti-drying agents (humectants), anti-fading agents, emulsion stabilizers, penetration enhancing agents, ultraviolet absorbers, preservatives, fungicides, pH adjusting agents, surface tension adjusting agents, anti-foaming agents, viscosity modifiers, dispersing agents, dispersion stabilizers, anticorrosives, and betaines (described in JP2003-306623A).

Examples of the surface tension adjusting agents include nonionic, cationic, and anionic surfactants. Preferred examples of the surfactants include anionic surfactants such as fatty acid salts, alkyl sulfuric acid ester salts, alkyl benzene sulfonates, alkyl naphthalene sulfonates, dialkyl sulfosuccinates, alkyl phosphoric acid ester salts, naphthalene sulfonic acid formalin condensates, and polyoxyethylene alkyl sulfuric acid ester salts; and nonionic surfactants such as polyoxyethylene alkyl ethers, polyoxyethylene alkyl allyl ethers, polyoxyethylene fatty acid esters, sorbitan fatty acid esters, polyoxyethylene sorbitan fatty acid esters, polyoxyethylene alkyl amines, glycerin fatty acid esters, and oxyethylene oxypropylene block copolymers. SURFYNOL (registered trademark) series, which are acetylene-based polyoxyethylene oxide surfactants, are also preferably used. In addition, for example, an amine oxide amphoteric surfactant such as N,N-dimethyl-N-alkylamine oxide is also preferable. Furthermore, the agents described as surfactants on pages (37) to (38) of JP1984-157636A (JP-S59-157636A) and the research disclosure No. 308119 (1989) can also be used.

Preservative

In the present invention, the preservative refers to an agent having a function of preventing microorganisms, in particular, bacteria and fungi (mold) from generating and growing.

Example of the preservative include inorganic preservatives containing heavy-metal ions and organic preservatives. Examples of the organic preservatives that can be used include quaternary ammonium salts (such as tetrabutylammonium chloride, cetylpyridinium chloride, and benzyltrimethylammonium chloride), phenols (such as phenol, cresol, butylphenol, xylenol, and bisphenol), phenoxy ether derivatives (such as phenoxyethanol), heterocyclic compounds (such as benzotriazole, 1,2-benzisothiazolin-3-one, sodium dehydroacetate, and PROXEL (registered trademark) series manufactured by LONZA), alkane diols (such as pentylene glycol (1,2-pentanediol), isopentyldiol (3-methyl-1,3-butanediol), hexanediol (e.g., 1,2-hexanediol), and caprylyl glycol (1,2-octanediol)), acid amides, carbamic acid, carbamates, amidines/guanidines, pyridines (such as sodium pyridinethione-1-oxide), diazines, triazines, pyrroles/imidazoles, oxazoles/oxazines, thiazoles/thiadiazines, thioureas, thiosemicarbazides, dithiocarbamates, sulfides, sulfoxides, sulfones, sulfamides, antibiotic substances (such as penicillin and tetracycline), aromatic carboxylic acids and salts thereof (such as sodium benzoate), and aromatic carboxylic acid esters and salts thereof (such as p-hydroxybenzoic acid ethyl ester).

The preservative is preferably at least one selected from the group consisting of heterocyclic compounds, phenols, phenoxy ether derivatives, and alkane diols, and more preferably a heterocyclic compound.

Preservatives described in, for example, Bokin Bobai Handbook (Antibacterial and antifungal handbook) (GIHODO SHUPPAN Co., Ltd.: 1986) and Bokin-bobai-zai Jiten (Encyclopedia of antibacterial and antifungal agents) (edited by encyclopedia editorial committee of The Society for Antibacterial and Antifungal Agents, Japan) can also be used as the preservatives.

These compounds that can be used may have a structure such as an oil-soluble structure or a water-soluble structure. The compounds are preferably water-soluble compounds.

Two or more preservatives may be contained.

The heterocyclic compound is preferably a thiazole compound or a benzotriazole compound.

Thiazole compounds particularly function as fungicides among preservatives. Examples of thiazole compounds include benzisothiazoline, isothiazoline, 1,2-benzisothiazolin-3-one, 5-chloro-2-methyl-4-isothiazolin-3-one, 2-(thiocyanomethylthio)benzothiazole, 2-mercaptobenzothiazole, and 3-allyloxy-1,2-benzisothiazole-1,1-oxide. PROXEL (registered trademark) series manufactured by LONZA can also be used as the thiazole fungicides.

Benzotriazole compounds particularly function as anticorrosives among preservatives and can prevent, for example, formation of rust, one cause of which is contact of a metal material (in particular, 42 alloy (nickel-iron alloy containing 42% nickel)) constituting an ink jet head with an ink. Examples of benzotriazole compounds include 1H-benzotriazole, 4-methyl-1H-benzotriazole, 5-methyl-1H-benzotriazole, sodium salts thereof, and potassium salts thereof.

The content of the preservative in the dye ink composition according to the present invention is not particularly limited, and the preservative can be used in a wide range of the content thereof. The content of the preservative is preferably 0.001% to 10% by mass, more preferably 0.005% to 2.0% by mass, still more preferably 0.01% to 0.5% by mass, and particularly preferably 0.01% to 0.1% by mass with respect to the total amount of the dye ink composition. When the content of the preservative is 0.001% to 10% by mass, the effect of the preservative can be more efficiently obtained, and generation of a precipitate can be reduced.

Ink Jet Recording Method

In an ink jet recording method according to the present invention, energy is provided to a dye ink for ink jet recording according to the present invention to form an image on a publicly known image-receiving material, that is, plain paper, resin coat paper, ink jet paper described in, for example, JP1996-169172A (JP-H08-169172A), JP1996-27693A (JP-H08-27693A), JP1990-276670A (JP-H02-276670A), JP1995-276789A (JP-H07-276789A), JP1997-323475A (JP-H09-323475A), JP1987-238783A (JP-S62-238783A), JP1998-153989A (JP-H10-153989A), JP1998-217473A (JP-H10-217473A), JP1998-235995A (JP-H10-235995A), JP1998-337947A (JP-H10-337947A), and JP1998-217597A (JP-H10-217597A), a film, paper for common use in electrophotography, a textile, glass, metal, ceramic, or the like.

In the formation of an image, a polymer latex compound may be used in combination for the purpose of providing glossiness and water resistance and improving weather resistance.

The recording process of the ink jet recording method according to the present invention is not limited, and any publicly known process is employed. Examples thereof include a charge control process of utilizing an electrostatic attraction force to eject an ink; a drop-on-demand process (pressure pulse process) of utilizing vibration pressure of a piezo element; an acoustic ink jet process including changing electric signals to acoustic beams and applying the acoustic beams to an ink to eject the ink by utilizing the radiation pressure; and a thermal ink jet process including heating an ink to form bubbles and utilizing the generated pressure. The ink jet recording process includes a process including ejecting a plurality of droplets of a low-concentration ink called a photo ink with a small volume, a process in which the image quality is improved by using a plurality of inks having substantially the same hue but different densities, and a process of using a colorless, transparent ink.

Physical Properties of Dye Ink Composition

The surface tension of the dye ink composition according to the present invention is preferably 10 mN/m or more and 60 mN/m or less, more preferably 20 mN/m or more and 60 mN/m or less, and still more preferably 30 mN/m or more and 40 mN/m or less, at 25° C. When the dye ink composition according to the present invention has a surface tension within the above range, it is possible to effectively suppress the occurrence of, for example, misdirected ejection (deviation of a landing point of an ink) due to wetting near ejection ports caused when the dye ink composition is used in an ink jet process. The surface tension of the ink can be adjusted by appropriately determining the contents of the surfactant and the like in the dye ink composition. The pH of the dye ink composition according to the present invention is preferably adjusted to a desired value so as to achieve good ejection properties when the dye ink composition is used in an ink jet recording apparatus. The dye ink composition according to the present invention preferably has a viscosity of 1.0 mPa·s or more and 5.0 mPa·s or less, at 25° C.

Ink Cartridge and Ink Jet Printer

The dye ink composition according to the present invention can be contained in an ink cartridge and used in the form of the ink cartridge. This is also preferred from the viewpoint of, for example, the ease of handling. Such an ink cartridge is publicly known in this technical field, and an ink cartridge can be produced by appropriately employing a publicly known method.

The ink cartridge can be used in an ink jet printer.

The ink cartridge can be used for, for example, typical writing materials, recorders, and pen plotters and is particularly preferably used for an ink jet recording method.

Ink Jet Recording Method and Ink Jet Recording Apparatus

An ink jet recording method according to the present invention has an image recording step of ejecting a dye ink for ink jet recording, the dye ink including the above-described dye ink composition according to the present invention, by using a recording head for an ink jet process to record an image on a recording medium. In the image recording step, a magenta dye ink composition, a yellow dye ink composition, and a black dye ink composition besides the above-described dye ink composition (preferably, a cyan dye ink composition) according to the present invention can be used as an ink set. An ink jet recording apparatus in the present invention includes an ink container that contains a dye ink and a recording head configured to eject the ink. The dye ink contained in the ink container corresponds to the above-described cyan dye ink composition according to the present invention, the magenta ink composition, the yellow ink composition, and the black ink composition. The steps and configurations of the ink jet recording method and recording apparatus may be publicly known steps and configurations, respectively.

Any recording medium that can be used for typical ink jet recording can be used as a recording medium on which an image is recorded with the dye ink composition according to the present invention. Examples of such a recording medium include ink jet recording media having a porous layer on a support, such as glossy paper, coated paper, and glossy films; and plain paper in which fibers are exposed on at least part of the surface, such as so-called copy paper.

EXAMPLES

Hereafter, the present invention will be described in detail with reference to Examples, but the present invention is not limited to these Examples.

Example 1

Preparation of Cyan Dye Ink Composition 1

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 1 (100 g). Subsequently, the ink composition was diluted to 1/2500, and the dye concentration in the ink composition was quantitatively analyzed by determining an absorbance (ABS) of a UV-Vis spectrum. According to the result, the dye solid-content concentration was 4% by mass.

| | |
|---|---|
| Cyan dye (P-5) | 1.69 g |
| Cyan dye (mixture of P-32-1 to P-32-4) | 0.85 g |
| Cyan dye (mixture of P-45-1 to P-45-4) | 0.19 g |
| Cyan dye (C-1) | 1.27 g |
| Additive (A-4) | 0.50 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

The above preservative is PROXEL (registered trademark) XL2 (s) manufactured by LONZA. Preservatives used in Examples and Comparative Examples below are also the same. The above surfactant is SURFYNOL (registered trademark) 465 manufactured by Nissin Chemical Industry Co., Ltd. Surfactants used in Examples and Comparative Examples below are also the same.

Example 2

Preparation of Cyan Dye Ink Composition 2

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous sodium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 2 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-11) | 1.69 g |
| Cyan dye (mixture of P-36-1 to P-36-4) | 0.85 g |
| Cyan dye (mixture of P-46-1 to P-46-4) | 0.19 g |
| Cyan dye (C-12) | 1.27 g |
| Additive (A-3) | 0.50 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Example 3

Preparation of Cyan Dye Ink Composition 3

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 3 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-6) | 1.69 g |
| Cyan dye (mixture of P-33-1 to P-33-4) | 0.85 g |
| Cyan dye (mixture of P-47-1 to P-47-4) | 0.19 g |
| Cyan dye (C-1) | 1.27 g |
| Additive (A-4) | 0.50 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Example 4

Preparation of Cyan Dye Ink Composition 4

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous sodium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 4 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-12) | 1.69 g |
| Cyan dye (mixture of P-38-1 to P-38-4) | 0.85 g |
| Cyan dye (mixture of P-48-1 to P-48-4) | 0.19 g |
| Cyan dye (C-12) | 1.27 g |
| Additive (A-3) | 0.50 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Example 5

Preparation of Cyan Dye Ink Composition 5

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 5 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-7) | 1.69 g |
| Cyan dye (mixture of P-34-1 to P-34-2) | 0.85 g |
| Cyan dye (P-59) | 0.19 g |
| Cyan dye (C-1) | 1.27 g |
| Additive (A-4) | 0.50 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Example 6

Preparation of Cyan Dye Ink Composition 6

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 6 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-5) | 1.69 g |
| Cyan dye (mixture of P-32-1 to P-32-4) | 0.85 g |
| Cyan dye (mixture of P-45-1 to P-45-4) | 0.19 g |
| Cyan dye (C-1) | 1.27 g |
| Additive (A-4) | 1.00 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Example 7

Preparation of Cyan Dye Ink Composition 7

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous sodium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 7 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-11) | 1.69 g |
| Cyan dye (mixture of P-36-1 to P-36-4) | 0.85 g |
| Cyan dye (mixture of P-46-1 to P-46-4) | 0.19 g |
| Cyan dye (C-12) | 1.27 g |
| Additive (A-3) | 1.00 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Example 8

Preparation of Cyan Dye Ink Composition 8

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 8 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-6) | 1.69 g |
| Cyan dye (mixture of P-33-1 to P-33-4) | 0.85 g |
| Cyan dye (mixture of P-47-1 to P-47-4) | 0.19 g |
| Cyan dye (C-1) | 1.27 g |
| Additive (A-4) | 1.00 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Example 9

Preparation of Cyan Dye Ink Composition 9

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous sodium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 9 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-12) | 1.69 g |
| Cyan dye (mixture of P-38-1 to P-38-4) | 0.85 g |
| Cyan dye (mixture of P-48-1 to P-48-4) | 0.19 g |
| Cyan dye (C-12) | 1.27 g |
| Additive (A-3) | 1.00 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Example 10

Preparation of Cyan Dye Ink Composition 10

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 10 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-7) | 1.69 g |
| Cyan dye (mixture of P-34-1 to P-34-2) | 0.85 g |
| Cyan dye (P-59) | 0.19 g |
| Cyan dye (C-1) | 1.27 g |
| Additive (A-4) | 1.00 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Example 11

Preparation of Cyan Dye Ink Composition 11

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 11 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-5) | 1.69 g |
| Cyan dye (mixture of P-32-1 to P-32-4) | 0.85 g |
| Cyan dye (mixture of P-45-1 to P-45-4) | 0.19 g |
| Cyan dye (C-1) | 1.27 g |
| Additive (A-4) | 1.50 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Example 12

Preparation of Cyan Dye Ink Composition 12

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous sodium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 12 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-11) | 1.69 g |
| Cyan dye (mixture of P-36-1 to P-36-4) | 0.85 g |
| Cyan dye (mixture of P-46-1 to P-46-4) | 0.19 g |
| Cyan dye (C-12) | 1.27 g |
| Additive (A-3) | 1.50 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Example 13

Preparation of Cyan Dye Ink Composition 13

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 13 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-6) | 1.69 g |
| Cyan dye (mixture of P-33-1 to P-33-4) | 0.85 g |
| Cyan dye (mixture of P-47-1 to P-47-4) | 0.19 g |
| Cyan dye (C-1) | 1.27 g |
| Additive (A-4) | 1.50 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Example 14

Preparation of Cyan Dye Ink Composition 14

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous sodium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 14 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-12) | 1.69 g |
| Cyan dye (mixture of P-38-1 to P-38-4) | 0.85 g |
| Cyan dye (mixture of P-48-1 to P-48-4) | 0.19 g |
| Cyan dye (C-12) | 1.27 g |
| Additive (A-3) | 1.50 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Example 15

Preparation of Cyan Dye Ink Composition 15

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 15 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-7) | 1.69 g |
| Cyan dye (mixture of P-34-1 to P-34-2) | 0.85 g |
| Cyan dye (P-59) | 0.19 g |
| Cyan dye (C-1) | 1.27 g |
| Additive (A-4) | 1.50 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Example 16

Preparation of Cyan Dye Ink Composition 16

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 16 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-5) | 1.69 g |
| Cyan dye (mixture of P-32-1 to P-32-4) | 0.85 g |
| Cyan dye (mixture of P-45-1 to P-45-4) | 0.19 g |
| Cyan dye (C-1) | 1.27 g |
| Additive (A-4) | 2.00 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Example 17

Preparation of Cyan Dye Ink Composition 17

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous sodium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 17 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-11) | 1.69 g |
| Cyan dye (mixture of P-36-1 to P-36-4) | 0.85 g |
| Cyan dye (mixture of P-46-1 to P-46-4) | 0.19 g |
| Cyan dye (C-12) | 1.27 g |
| Additive (A-3) | 2.00 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Example 18

Preparation of Cyan Dye Ink Composition 18

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 18 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-6) | 1.69 g |
| Cyan dye (mixture of P-33-1 to P-33-4) | 0.85 g |
| Cyan dye (mixture of P-47-1 to P-47-4) | 0.19 g |
| Cyan dye (C-1) | 1.27 g |
| Additive (A-4) | 2.00 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Example 19

Preparation of Cyan Dye Ink Composition 19

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous sodium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 19 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-12) | 1.69 g |
| Cyan dye (mixture of P-38-1 to P-38-4) | 0.85 g |
| Cyan dye (mixture of P-48-1 to P-48-4) | 0.19 g |
| Cyan dye (C-12) | 1.27 g |
| Additive (A-3) | 2.00 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Example 20

Preparation of Cyan Dye Ink Composition 20

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 20 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-7) | 1.69 g |
| Cyan dye (mixture of P-34-1 to P-34-2) | 0.85 g |
| Cyan dye (P-59) | 0.19 g |
| Cyan dye (C-1) | 1.27 g |
| Additive (A-4) | 2.00 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Example 21

Preparation of Cyan Dye Ink Composition 21

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 21 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-18) | 1.69 g |
| Cyan dye (mixture of P-41-1 to P-41-4) | 0.85 g |
| Cyan dye (mixture of P-53-1 to P-53-4) | 0.19 g |
| Cyan dye (C-10) | 1.27 g |
| Additive (A-4) | 1.00 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Example 22

Preparation of Cyan Dye Ink Composition 22

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 22 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-19) | 1.69 g |
| Cyan dye (mixture of P-42-1 to P-42-4) | 0.85 g |
| Cyan dye (mixture of P-55-1 to P-55-4) | 0.19 g |
| Cyan dye (C-10) | 1.27 g |
| Additive (A-4) | 1.00 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Example 23

Preparation of Cyan Dye Ink Composition 23

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 23 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-20) | 1.69 g |
| Cyan dye (mixture of P-43-1 to P-43-4) | 0.85 g |
| Cyan dye (mixture of P-57-1 to P-57-4) | 0.19 g |
| Cyan dye (C-11) | 1.27 g |
| Additive (A-4) | 1.00 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Example 24

Preparation of Cyan Dye Ink Composition 24

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 24 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-22) | 1.69 g |
| Cyan dye (mixture of P-39-1 to P-39-4) | 0.85 g |
| Cyan dye (mixture of P-49-1 to P-49-4) | 0.19 g |
| Cyan dye (C-16) | 1.27 g |
| Additive (A-4) | 1.00 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Example 25

Preparation of Cyan Dye Ink Composition 25

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 25 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-23) | 1.69 g |
| Cyan dye (mixture of P-40-1 to P-40-4) | 0.85 g |
| Cyan dye (mixture of P-51-1 to P-51-4) | 0.19 g |
| Cyan dye (C-16) | 1.27 g |
| Additive (A-4) | 1.00 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Example 26

Preparation of Cyan Dye Ink Composition 26

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 26 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-5) | 1.07 g |
| Cyan dye (mixture of P-32-1 to P-32-4) | 1.60 g |
| Cyan dye (mixture of P-45-1 to P-45-4) | 1.07 g |
| Cyan dye (C-1) | 0.26 g |
| Additive (A-4) | 1.50 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Example 27

Preparation of Cyan Dye Ink Composition 27

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous sodium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 27 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-11) | 1.07 g |
| Cyan dye (mixture of P-36-1 to P-36-4) | 1.60 g |
| Cyan dye (mixture of P-46-1 to P-46-4) | 1.07 g |
| Cyan dye (C-12) | 0.26 g |
| Additive (A-3) | 1.50 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Example 28

Preparation of Cyan Dye Ink Composition 28

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 28 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-6) | 1.07 g |
| Cyan dye (mixture of P-33-1 to P-33-4) | 1.60 g |
| Cyan dye (mixture of P-47-1 to P-47-4) | 1.07 g |
| Cyan dye (C-1) | 0.26 g |
| Additive (A-4) | 1.50 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Example 29

Preparation of Cyan Dye Ink Composition 29

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous sodium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 29 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-12) | 1.07 g |
| Cyan dye (mixture of P-38-1 to P-38-4) | 1.60 g |
| Cyan dye (mixture of P-48-1 to P-48-4) | 1.07 g |
| Cyan dye (C-12) | 0.26 g |
| Additive (A-3) | 1.50 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Example 30

Preparation of Cyan Dye Ink Composition 30

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 30 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-7) | 1.07 g |
| Cyan dye (mixture of P-34-1 to P-34-2) | 1.60 g |
| Cyan dye (P-59) | 1.07 g |
| Cyan dye (C-1) | 0.26 g |
| Additive (A-4) | 1.50 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Example 31

Preparation of Cyan Dye Ink Composition 31

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 31 (100 g). Subsequently, the dye concentration in the ink composition was quantitatively analyzed by performing the same operation as in Example 1. According to the result, the dye solid-content concentration was 5% by mass.

| | |
|---|---|
| Cyan dye (P-5) | 2.11 g |
| Cyan dye (mixture of P-32-1 to P-32-4) | 1.06 g |
| Cyan dye (mixture of P-45-1 to P-45-4) | 0.24 g |
| Cyan dye (C-1) | 1.59 g |
| Additive (A-4) | 1.50 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Example 32

Preparation of Cyan Dye Ink Composition 32

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous sodium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 32 (100 g). Subsequently, the dye concentration in the ink composition was quantitatively analyzed by performing the same operation as in Example 1. According to the result, the dye solid-content concentration was 5% by mass.

| | |
|---|---|
| Cyan dye (P-11) | 2.11 g |
| Cyan dye (mixture of P-36-1 to P-36-4) | 1.06 g |
| Cyan dye (mixture of P-46-1 to P-46-4) | 0.24 g |
| Cyan dye (C-12) | 1.59 g |
| Additive (A-3) | 1.50 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Example 33

Preparation of Cyan Dye Ink Composition 33

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 33 (100 g). Subsequently, the dye concentration in the ink composition was quantitatively analyzed by performing the same operation as in Example 1. According to the result, the dye solid-content concentration was 5% by mass.

| | |
|---|---|
| Cyan dye (P-6) | 2.11 g |
| Cyan dye (mixture of P-33-1 to P-33-4) | 1.06 g |
| Cyan dye (mixture of P-47-1 to P-47-4) | 0.24 g |
| Cyan dye (C-1) | 1.59 g |
| Additive (A-4) | 1.50 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Example 34

Preparation of Cyan Dye Ink Composition 34

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous sodium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 34 (100 g). Subsequently, the dye concentration in the ink composition was quantitatively analyzed by performing the same operation as in Example 1. According to the result, the dye solid-content concentration was 5% by mass.

| | |
|---|---|
| Cyan dye (P-12) | 2.11 g |
| Cyan dye (mixture of P-38-1 to P-38-4) | 1.06 g |
| Cyan dye (mixture of P-48-1 to P-48-4) | 0.24 g |
| Cyan dye (C-12) | 1.59 g |
| Additive (A-3) | 1.50 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Example 35

Preparation of Cyan Dye Ink Composition 35

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 35 (100 g). Subsequently, the dye concentration in the ink composition was quantitatively analyzed by performing the same operation as in Example 1. According to the result, the dye solid-content concentration was 5% by mass.

| | |
|---|---|
| Cyan dye (P-7) | 2.11 g |
| Cyan dye (mixture of P-34-1 to P-34-2) | 1.06 g |
| Cyan dye (P-59) | 0.24 g |
| Cyan dye (C-1) | 1.59 g |
| Additive (A-4) | 1.50 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Example 36

Preparation of Cyan Dye Ink Composition 36

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 36 (100 g). Subsequently, the dye concentration in the ink composition was quantitatively analyzed by performing the same operation as in Example 1. According to the result, the dye solid-content concentration was 5% by mass.

| | |
|---|---|
| Cyan dye (P-18) | 2.11 g |
| Cyan dye (mixture of P-41-1 to P-41-4) | 1.06 g |
| Cyan dye (mixture of P-53-1 to P-53-4) | 0.24 g |
| Cyan dye (C-10) | 1.59 g |
| Additive (A-4) | 1.50 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Example 37

Preparation of Cyan Dye Ink Composition 37

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 37 (100 g). Subsequently, the dye concentration in the ink composition was quantitatively analyzed by performing the same operation as in Example 1. According to the result, the dye solid-content concentration was 5% by mass.

| | |
|---|---|
| Cyan dye (P-19) | 2.11 g |
| Cyan dye (mixture of P-42-1 to P-42-4) | 1.06 g |
| Cyan dye (mixture of P-55-1 to P-55-4) | 0.24 g |
| Cyan dye (C-10) | 1.59 g |
| Additive (A-4) | 1.50 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Example 38

Preparation of Cyan Dye Ink Composition 38

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 38 (100 g). Subsequently, the dye concentration in the ink composition was quantitatively analyzed by performing the same operation as in Example 1. According to the result, the dye solid-content concentration was 5% by mass.

| | |
|---|---|
| Cyan dye (P-20) | 2.11 g |
| Cyan dye (mixture of P-43-1 to P-43-4) | 1.06 g |
| Cyan dye (mixture of P-57-1 to P-57-4) | 0.24 g |
| Cyan dye (C-11) | 1.59 g |
| Additive (A-4) | 1.50 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Example 39

Preparation of Cyan Dye Ink Composition 39

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 39 (100 g). Subsequently, the dye concentration in the ink composition was quantitatively analyzed by performing the same operation as in Example 1. According to the result, the dye solid-content concentration was 5% by mass.

| | |
|---|---|
| Cyan dye (P-22) | 2.11 g |
| Cyan dye (mixture of P-39-1 to P-39-4) | 1.06 g |
| Cyan dye (mixture of P-49-1 to P-49-4) | 0.24 g |
| Cyan dye (C-16) | 1.59 g |
| Additive (A-4) | 1.50 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Example 40

Preparation of Cyan Dye Ink Composition 40

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 40 (100 g). Subsequently, the dye concentration in the ink composition was quantitatively analyzed by performing the same operation as in Example 1. According to the result, the dye solid-content concentration was 5% by mass.

| | |
|---|---|
| Cyan dye (P-23) | 2.11 g |
| Cyan dye (mixture of P-40-1 to P-40-4) | 1.06 g |
| Cyan dye (mixture of P-51-1 to P-51-4) | 0.24 g |
| Cyan dye (C-16) | 1.59 g |
| Additive (A-4) | 1.50 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Example 41

Preparation of Cyan Dye Ink Composition 41

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 41 (100 g). Subsequently, the dye concentration in the ink composition was quantitatively analyzed by performing the same operation as in Example 1. According to the result, the dye solid-content concentration was 3% by mass.

| | |
|---|---|
| Cyan dye (P-5) | 1.27 g |
| Cyan dye (mixture of P-32-1 to P-32-4) | 0.64 g |
| Cyan dye (mixture of P-45-1 to P-45-4) | 0.13 g |
| Cyan dye (C-1) | 0.96 g |
| Additive (A-4) | 1.00 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Example 42

Preparation of Cyan Dye Ink Composition 42

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous sodium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 42 (100 g). Subsequently, the dye concentration in the ink composition was quantitatively analyzed by performing the same operation as in Example 1. According to the result, the dye solid-content concentration was 3% by mass.

| | |
|---|---|
| Cyan dye (P-11) | 1.27 g |
| Cyan dye (mixture of P-36-1 to P-36-4) | 0.64 g |
| Cyan dye (mixture of P-46-1 to P-46-4) | 0.13 g |
| Cyan dye (C-12) | 0.96 g |
| Additive (A-3) | 1.00 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Example 43

Preparation of Cyan Dye Ink Composition 43

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 43 (100 g). Subsequently, the dye concentration in the ink composition was quantitatively analyzed by performing the same operation as in Example 1. According to the result, the dye solid-content concentration was 3% by mass.

| | |
|---|---|
| Cyan dye (P-6) | 1.27 g |
| Cyan dye (mixture of P-33-1 to P-33-4) | 0.64 g |
| Cyan dye (mixture of P-47-1 to P-47-4) | 0.13 g |
| Cyan dye (C-1) | 0.96 g |
| Additive (A-4) | 1.00 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Example 44

Preparation of Cyan Dye Ink Composition 44

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous sodium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 44 (100 g). Subsequently, the dye concentration in the ink composition was quantitatively analyzed by performing the same operation as in Example 1. According to the result, the dye solid-content concentration was 3% by mass.

| | |
|---|---|
| Cyan dye (P-12) | 1.27 g |
| Cyan dye (mixture of P-38-1 to P-38-4) | 0.64 g |
| Cyan dye (mixture of P-48-1 to P-48-4) | 0.13 g |
| Cyan dye (C-12) | 0.96 g |
| Additive (A-3) | 1.00 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Example 45

Preparation of Cyan Dye Ink Composition 45

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 45 (100 g). Subsequently, the dye concentration in the ink composition was quantitatively analyzed by performing the same operation as in Example 1. According to the result, the dye solid-content concentration was 3% by mass.

| | |
|---|---|
| Cyan dye (P-7) | 1.27 g |
| Cyan dye (mixture of P-34-1 to P-34-2) | 0.64 g |
| Cyan dye (P-59) | 0.13 g |
| Cyan dye (C-1) | 0.96 g |
| Additive (A-4) | 1.00 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Example 46

Preparation of Cyan Dye Ink Composition 46

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 46 (100 g). Subsequently, the dye concentration in the ink composition was quantitatively analyzed by performing the same operation as in Example 1. According to the result, the dye solid-content concentration was 3% by mass.

| | |
|---|---|
| Cyan dye (P-18) | 1.27 g |
| Cyan dye (mixture of P-41-1 to P-41-4) | 0.64 g |
| Cyan dye (mixture of P-53-1 to P-53-4) | 0.13 g |
| Cyan dye (C-10) | 0.96 g |
| Additive (A-4) | 1.00 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Example 47

Preparation of Cyan Dye Ink Composition 47

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 47 (100 g). Subsequently, the dye concentration in the ink composition was quantitatively analyzed by performing the same operation as in Example 1. According to the result, the dye solid-content concentration was 3% by mass.

| | |
|---|---|
| Cyan dye (P-19) | 1.27 g |
| Cyan dye (mixture of P-42-1 to P-42-4) | 0.64 g |
| Cyan dye (mixture of P-55-1 to P-55-4) | 0.13 g |
| Cyan dye (C-10) | 0.96 g |
| Additive (A-4) | 1.00 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Example 48

Preparation of Cyan Dye Ink Composition 48

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 48 (100 g). Subsequently, the dye concentration in the ink composition was quantitatively analyzed by performing the same operation as in Example 1. According to the result, the dye solid-content concentration was 3% by mass.

| | |
|---|---|
| Cyan dye (P-20) | 1.27 g |
| Cyan dye (mixture of P-43-1 to P-43-4) | 0.64 g |
| Cyan dye (mixture of P-57-1 to P-57-4) | 0.13 g |
| Cyan dye (C-11) | 0.96 g |
| Additive (A-4) | 1.00 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Example 49

Preparation of Cyan Dye Ink Composition 49

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 49 (100 g). Subsequently, the dye concentration in the ink composition was quantitatively analyzed by performing the same operation as in Example 1. According to the result, the dye solid-content concentration was 3% by mass.

| | |
|---|---|
| Cyan dye (P-22) | 1.27 g |
| Cyan dye (mixture of P-39-1 to P-39-4) | 0.64 g |
| Cyan dye (mixture of P-49-1 to P-49-4) | 0.13 g |
| Cyan dye (C-16) | 0.96 g |
| Additive (A-4) | 1.00 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Example 50

Preparation of Cyan Dye Ink Composition 50

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 50 (100 g). Subsequently, the dye concentration in the ink composition was quantitatively analyzed by performing the same operation as in Example 1. According to the result, the dye solid-content concentration was 3% by mass.

| | |
|---|---|
| Cyan dye (P-23) | 1.27 g |
| Cyan dye (mixture of P-40-1 to P-40-4) | 0.64 g |
| Cyan dye (mixture of P-51-1 to P-51-4) | 0.13 g |
| Cyan dye (C-16) | 0.96 g |
| Additive (A-4) | 1.00 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Example 51

Preparation of Cyan Dye Ink Composition 51

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 51 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-5) | 1.52 g |
| Cyan dye (mixture of P-32-1 to P-32-4) | 0.77 g |
| Cyan dye (mixture of P-45-1 to P-45-4) | 0.17 g |
| Cyan dye (C-1) | 1.14 g |
| Cyan dye (C-41) | 0.40 g |
| Additive (A-4) | 1.00 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Example 52

Preparation of Cyan Dye Ink Composition 52

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous sodium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 52 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-11) | 1.52 g |
| Cyan dye (mixture of P-36-1 to P-36-4) | 0.77 g |
| Cyan dye (mixture of P-46-1 to P-46-4) | 0.17 g |
| Cyan dye (C-12) | 1.14 g |
| Cyan dye (C-42) | 0.40 g |
| Additive (A-3) | 1.00 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Example 53

Preparation of Cyan Dye Ink Composition 53

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 53 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-6) | 1.52 g |
| Cyan dye (mixture of P-33-1 to P-33-4) | 0.77 g |
| Cyan dye (mixture of P-47-1 to P-47-4) | 0.17 g |
| Cyan dye (C-1) | 1.14 g |
| Cyan dye (C-41) | 0.40 g |
| Additive (A-4) | 1.00 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Example 54

Preparation of Cyan Dye Ink Composition 54

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous sodium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 54 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-12) | 1.52 g |
| Cyan dye (mixture of P-38-1 to P-38-4) | 0.77 g |
| Cyan dye (mixture of P-48-1 to P-48-4) | 0.17 g |
| Cyan dye (C-12) | 1.14 g |
| Cyan dye (C-42) | 0.40 g |

-continued

| | |
|---|---|
| Additive (A-3) | 1.00 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Example 55

Preparation of Cyan Dye Ink Composition 55

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 55 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-7) | 1.52 g |
| Cyan dye (mixture of P-34-1 to P-34-2) | 0.77 g |
| Cyan dye (P-59) | 0.17 g |
| Cyan dye (C-1) | 1.14 g |
| Cyan dye (C-41) | 0.40 g |
| Additive (A-4) | 1.00 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Example 56

Preparation of Cyan Dye Ink Composition 56

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 56 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-5) | 1.52 g |
| Cyan dye (mixture of P-32-1 to P-32-4) | 0.77 g |
| Cyan dye (mixture of P-45-1 to P-45-4) | 0.13 g |
| Cyan dye (C-1) | 1.14 g |
| Cyan dye (C-41) | 0.20 g |
| C.I. Acid Blue 9 | 0.20 g |
| Additive (A-4) | 1.00 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Example 57

Preparation of Cyan Dye Ink Composition 57

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 57 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-6) | 1.52 g |
| Cyan dye (mixture of P-33-1 to P-33-4) | 0.77 g |
| Cyan dye (mixture of P-47-1 to P-47-4) | 0.17 g |
| Cyan dye (C-1) | 1.14 g |
| Cyan dye (C-41) | 0.20 g |
| C.I. Acid Blue 9 | 0.20 g |
| Additive (A-4) | 1.00 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Example 58

Preparation of Cyan Dye Ink Composition 58

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 58 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-7) | 1.52 g |
| Cyan dye (mixture of P-34-1 to P-34-2) | 0.77 g |
| Cyan dye (P-59) | 0.17 g |
| Cyan dye (C-1) | 1.14 g |
| Cyan dye (C-41) | 0.20 g |
| C.I. Acid Blue 9 | 0.20 g |
| Additive (A-4) | 1.00 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Example 59

Preparation of Cyan Dye Ink Composition 59

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 59 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-5) | 1.52 g |
| Cyan dye (mixture of P-32-1 to P-32-4) | 0.77 g |
| Cyan dye (mixture of P-45-1 to P-45-4) | 0.17 g |
| Cyan dye (C-1) | 1.14 g |
| Cyan dye (C-41) | 0.20 g |
| C.I. Direct Blue 199 | 0.20 g |
| Additive (A-4) | 1.00 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Example 60

Preparation of Cyan Dye Ink Composition 60

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 60 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-6) | 1.52 g |
| Cyan dye (mixture of P-33-1 to P-33-4) | 0.77 g |
| Cyan dye (mixture of P-47-1 to P-47-4) | 0.17 g |
| Cyan dye (C-1) | 1.14 g |
| Cyan dye (C-41) | 0.20 g |
| C.I. Direct Blue 199 | 0.20 g |
| Additive (A-4) | 1.00 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Example 61

Preparation of Cyan Dye Ink Composition 61

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 61 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-5) | 1.52 g |
| Cyan dye (mixture of P-32-1 to P-32-4) | 0.77 g |
| Cyan dye (mixture of P-45-1 to P-45-4) | 0.17 g |
| Cyan dye (C-1) | 1.14 g |
| C.I. Acid Blue 9 | 0.40 g |
| Additive (A-4) | 1.00 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Example 62

Preparation of Cyan Dye Ink Composition 62

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous sodium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 62 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-11) | 1.52 g |
| Cyan dye (mixture of P-36-1 to P-36-4) | 0.77 g |
| Cyan dye (mixture of P-46-1 to P-46-4) | 0.17 g |
| Cyan dye (C-12) | 1.14 g |
| C.I. Acid Blue 9 | 0.40 g |
| Additive (A-3) | 1.00 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Example 63

Preparation of Cyan Dye Ink Composition 63

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 63 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-6) | 1.52 g |
| Cyan dye (mixture of P-33-1 to P-33-4) | 0.77 g |
| Cyan dye (mixture of P-47-1 to P-47-4) | 0.17 g |
| Cyan dye (C-1) | 1.14 g |
| C.I. Acid Blue 9 | 0.40 g |
| Additive (A-4) | 1.00 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Example 64

Preparation of Cyan Dye Ink Composition 64

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous sodium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 64 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-12) | 1.52 g |
| Cyan dye (mixture of P-38-1 to P-38-4) | 0.77 g |
| Cyan dye (mixture of P-48-1 to P-48-4) | 0.17g |
| Cyan dye (C-12) | 1.14 g |
| C.I. Acid Blue 9 | 0.40 g |
| Additive (A-3) | 1.00 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Example 65

Preparation of Cyan Dye Ink Composition 65

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 65 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-7) | 1.52 g |
| Cyan dye (mixture of P-34-1 to P-34-2) | 0.77 g |
| Cyan dye (mixture of P-59) | 0.17 g |
| Cyan dye (C-1) | 1.14 g |
| C.I. Acid Blue 9 | 0.40 g |
| Additive (A-4) | 1.00 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Example 66

Preparation of Cyan Dye Ink Composition 66

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 66 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-5) | 1.52 g |
| Cyan dye (mixture of P-32-1 to P-32-4) | 0.77 g |
| Cyan dye (mixture of P-45-1 to P-45-4) | 0.17 g |
| Cyan dye (C-1) | 1.14 g |
| C.I. Direct Blue 199 | 0.40 g |
| Additive (A-4) | 1.00 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Example 67

Preparation of Cyan Dye Ink Composition 67

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous sodium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 67 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-11) | 1.52 g |
| Cyan dye (mixture of P-36-1 to P-36-4) | 0.77 g |
| Cyan dye (mixture of P-46-1 to P-46-4) | 0.17 g |
| Cyan dye (C-12) | 1.14 g |
| C.I. Direct Blue 199 | 0.40 g |
| Additive (A-3) | 1.00 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Example 68

Preparation of Cyan Dye Ink Composition 68

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 68 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-6) | 1.52 g |
| Cyan dye (mixture of P-33-1 to P-33-4) | 0.77 g |
| Cyan dye (mixture of P-47-1 to P-47-4) | 0.17 g |
| Cyan dye (C-1) | 1.14 g |
| C.I. Direct Blue 199 | 0.40 g |
| Additive (A-4) | 1.00 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Example 69

Preparation of Cyan Dye Ink Composition 69

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous sodium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 69 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-12) | 1.52 g |
| Cyan dye (mixture of P-38-1 to P-38-4) | 0.77 g |
| Cyan dye (mixture of P-48-1 to P-48-4) | 0.17 g |
| Cyan dye (C-12) | 1.14 g |
| C.I. Direct Blue 199 | 0.40 g |
| Additive (A-3) | 1.00 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Example 70

Preparation of Cyan Dye Ink Composition 70

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 70 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-7) | 1.52 g |
| Cyan dye (mixture of P-34-1 to P-34-2) | 0.77 g |
| Cyan dye (P-59) | 0.17 g |
| Cyan dye (C-1) | 1.14 g |
| C.I. Direct Blue 199 | 0.40 g |
| Additive (A-4) | 1.00 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Example 71

Preparation of Cyan Dye Ink Composition 71

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 71 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-5) | 1.69 g |
| Cyan dye (mixture of P-32-1 to P-32-4) | 0.85 g |
| Cyan dye (mixture of P-45-1 to P-45-4) | 0.19 g |
| Cyan dye (C-1) | 1.27 g |
| Additive (A-4) | 0.50 g |
| Preservative | 0.11 g |
| Glycerin | 7.00 g |
| Ethylene urea | 7.00 g |
| 1,5-Pentanediol | 7.00 g |
| 2-Pyrrolidone | 5.00 g |
| Surfactant | 0.50 g |

Example 72

Preparation of Cyan Dye Ink Composition 72

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous sodium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 72 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-11) | 1.69 g |
| Cyan dye (mixture of P-36-1 to P-36-4) | 0.85 g |
| Cyan dye (mixture of P-46-1 to P-46-4) | 0.19 g |
| Cyan dye (C-12) | 1.27 g |
| Additive (A-3) | 0.50 g |
| Preservative | 0.11 g |
| Glycerin | 7.00 g |
| Ethylene urea | 7.00 g |
| 1,5-Pentanediol | 7.00 g |
| 2-Pyrrolidone | 5.00 g |
| Surfactant | 0.50 g |

Example 73

Preparation of Cyan Dye Ink Composition 73

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 73 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-6) | 1.69 g |
| Cyan dye (mixture of P-33-1 to P-33-4) | 0.85 g |
| Cyan dye (mixture of P-47-1 to P-47-4) | 0.19 g |
| Cyan dye (C-1) | 1.27 g |
| Additive (A-4) | 0.50 g |
| Preservative | 0.11 g |
| Glycerin | 7.00 g |
| Ethylene urea | 7.00 g |
| 1,5-Pentanediol | 7.00 g |
| 2-Pyrrolidone | 5.00 g |
| Surfactant | 0.50 g |

Example 74

Preparation of Cyan Dye Ink Composition 74

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous sodium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 74 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-12) | 1.69 g |
| Cyan dye (mixture of P-38-1 to P-38-4) | 0.85 g |
| Cyan dye (mixture of P-48-1 to P-48-4) | 0.19 g |
| Cyan dye (C-12) | 1.27 g |
| Additive (A-3) | 0.50 g |
| Preservative | 0.11 g |
| Glycerin | 7.00 g |
| Ethylene urea | 7.00 g |
| 1,5-Pentanediol | 7.00 g |
| 2-Pyrrolidone | 5.00 g |
| Surfactant | 0.50 g |

Example 75

Preparation of Cyan Dye Ink Composition 75

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 75 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-7) | 1.69 g |
| Cyan dye (mixture of P-34-1 to P-34-2) | 0.85 g |
| Cyan dye (P-59) | 0.19 g |
| Cyan dye (C-1) | 1.27 g |
| Additive (A-4) | 0.50 g |
| Preservative | 0.11 g |
| Glycerin | 7.00 g |
| Ethylene urea | 7.00 g |
| 1,5-Pentanediol | 7.00 g |
| 2-Pyrrolidone | 5.00 g |
| Surfactant | 0.50 g |

Example 76

Preparation of Cyan Dye Ink Composition 76

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 76 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-5) | 1.69 g |
| Cyan dye (mixture of P-32-1 to P-32-4) | 0.85 g |
| Cyan dye (mixture of P-45-1 to P-45-4) | 0.19 g |
| Cyan dye (C-1) | 1.27 g |
| Additive (A-4) | 1.00 g |
| Preservative | 0.11 g |
| Glycerin | 7.00 g |
| Ethylene urea | 7.00 g |
| 1,5-Pentanediol | 7.00 g |
| 2-Pyrrolidone | 5.00 g |
| Surfactant | 0.50 g |

Example 77

Preparation of Cyan Dye Ink Composition 77

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous sodium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 77 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-11) | 1.69 g |
| Cyan dye (mixture of P-36-1 to P-36-4) | 0.85 g |
| Cyan dye (mixture of P-46-1 to P-46-4) | 0.19 g |
| Cyan dye (C-12) | 1.27 g |
| Additive (A-3) | 1.00 g |
| Preservative | 0.11 g |
| Glycerin | 7.00 g |
| Ethylene urea | 7.00 g |
| 1,5-Pentanediol | 7.00 g |
| 2-Pyrrolidone | 5.00 g |
| Surfactant | 0.50 g |

Example 78

Preparation of Cyan Dye Ink Composition 78

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 78 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-6) | 1.69 g |
| Cyan dye (mixture of P-33-1 to P-33-4) | 0.85 g |
| Cyan dye (mixture of P-47-1 to P-47-4) | 0.19 g |
| Cyan dye (C-1) | 1.27 g |
| Additive (A-4) | 1.00 g |
| Preservative | 0.11 g |
| Glycerin | 7.00 g |
| Ethylene urea | 7.00 g |
| 1,5-Pentanediol | 7.00 g |
| 2-Pyrrolidone | 5.00 g |
| Surfactant | 0.50 g |

Example 79

Preparation of Cyan Dye Ink Composition 79

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous sodium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 79 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-12) | 1.69 g |
| Cyan dye (mixture of P-38-1 to P-38-4) | 0.85 g |
| Cyan dye (mixture of P-48-1 to P-48-4) | 0.19 g |
| Cyan dye (C-12) | 1.27 g |
| Additive (A-3) | 1.00 g |
| Preservative | 0.11 g |
| Glycerin | 7.00 g |
| Ethylene urea | 7.00 g |
| 1,5-Pentanediol | 7.00 g |
| 2-Pyrrolidone | 5.00 g |
| Surfactant | 0.50 g |

Example 80

Preparation of Cyan Dye Ink Composition 80

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 80 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-7) | 1.69 g |
| Cyan dye (mixture of P-34-1 to P-34-2) | 0.85 g |
| Cyan dye (P-59) | 0.19 g |
| Cyan dye (C-1) | 1.27 g |
| Additive (A-4) | 1.00 g |
| Preservative | 0.11 g |
| Glycerin | 7.00 g |
| Ethylene urea | 7.00 g |
| 1,5-Pentanediol | 7.00 g |
| 2-Pyrrolidone | 5.00 g |
| Surfactant | 0.50 g |

Example 81

Preparation of Cyan Dye Ink Composition 81

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 81 (100 g). Subsequently, the dye concentration in the ink composition was quantitatively analyzed by performing the same operation as in Example 1. According to the result, the dye solid-content concentration was 4% b mass.

| | |
|---|---|
| Cyan dye (P-5) | 1.52 g |
| Cyan dye (mixture of P-32-1 to P-32-4) | 0.77 g |
| Cyan dye (mixture of P-45-1 to P-45-4) | 0.17 g |
| Cyan dye (C-1) | 1.14 g |
| Cyan dye (C-41) | 0.20 g |
| C.I. Acid Blue 9 | 0.20 g |
| Additive (A-4) | 1.00 g |
| Preservative | 0.11 g |
| Glycerin | 7.00 g |
| Ethylene urea | 7.00 g |
| 1,5-Pentanediol | 7.00 g |
| 2-Pyrrolidone | 5.00 g |
| Surfactant | 0.50 g |

Example 82

Preparation of Cyan Dye Ink Composition 82

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous sodium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 82 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-11) | 1.52 g |
| Cyan dye (mixture of P-36-1 to P-36-4) | 0.77 g |
| Cyan dye (mixture of P-46-1 to P-46-4) | 0.17 g |
| Cyan dye (C-12) | 1.14 g |
| Cyan dye (C-42) | 0.20 g |
| C.I. Acid Blue 9 | 0.20 g |
| Additive (A-3) | 1.00 g |
| Preservative | 0.11 g |
| Glycerin | 7.00 g |
| Ethylene urea | 7.00 g |
| 1,5-Pentanediol | 7.00 g |
| 2-Pyrrolidone | 5.00 g |
| Surfactant | 0.50 g |

Example 83

Preparation of Cyan Dye Ink Composition 83

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 83 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-6) | 1.52 g |
| Cyan dye (mixture of P-33-1 to P-33-4) | 0.77 g |
| Cyan dye (mixture of P-47-1 to P-47-4) | 0.17 g |
| Cyan dye (C-1) | 1.14 g |
| Cyan dye (C-41) | 0.20 g |
| C.I. Acid Blue 9 | 0.20 g |
| Additive (A-4) | 1.00 g |
| Preservative | 0.11 g |
| Glycerin | 7.00 g |
| Ethylene urea | 7.00 g |
| 1,5-Pentanediol | 7.00 g |
| 2-Pyrrolidone | 5.00 g |
| Surfactant | 0.50 g |

Example 84

Preparation of Cyan Dye Ink Composition 84

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous sodium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 84 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-12) | 1.52 g |
| Cyan dye (mixture of P-38-1 to P-38-4) | 0.77 g |
| Cyan dye (mixture of P-48-1 to P-48-4) | 0.17 g |
| Cyan dye (C-12) | 1.14 g |
| Cyan dye (C-42) | 0.20 g |
| C.I. Acid Blue 9 | 0.20 g |
| Additive (A-3) | 1.00 g |
| Preservative | 0.11 g |
| Glycerin | 7.00 g |
| Ethylene urea | 7.00 g |
| 1,5-Pentanediol | 7.00 g |
| 2-Pyrrolidone | 5.00 g |
| Surfactant | 0.50 g |

Example 85

Preparation of Cyan Dye Ink Composition 85

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 85 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-7) | 1.52 g |
| Cyan dye (mixture of P-34-1 to P-34-2) | 0.77 g |
| Cyan dye (P-59) | 0.17 g |
| Cyan dye (C-1) | 1.14 g |
| Cyan dye (C-41) | 0.20 g |
| C.I. Acid Blue 9 | 0.20 g |
| Additive (A-4) | 1.00 g |
| Preservative | 0.11 g |
| Glycerin | 7.00 g |
| Ethylene urea | 7.00 g |
| 1,5-Pentanediol | 7.00 g |
| 2-Pyrrolidone | 5.00 g |
| Surfactant | 0.50 g |

Example 86

Preparation of Cyan Dye Ink Composition 86

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 86 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-5) | 1.52 g |
| Cyan dye (mixture of P-32-1 to P-32-4) | 0.77 g |
| Cyan dye (mixture of P-45-1 to P-45-4) | 0.17 g |
| Cyan dye (C-1) | 1.14 g |
| C.I. Acid Blue 9 | 0.40 g |
| Additive (A-4) | 1.00 g |
| Preservative | 0.11 g |
| Glycerin | 7.00 g |
| Ethylene urea | 7.00 g |
| 1,5-Pentanediol | 7.00 g |
| 2-Pyrrolidone | 5.00 g |
| Surfactant | 0.50 g |

Example 87

Preparation of Cyan Dye Ink Composition 87

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous sodium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 87 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-11) | 1.52 g |
| Cyan dye (mixture of P-36-1 to P-36-4) | 0.77 g |
| Cyan dye (mixture of P-46-1 to P-46-4) | 0.17 g |
| Cyan dye (C-12) | 1.14 g |
| C.I. Acid Blue 9 | 0.40 g |
| Additive (A-3) | 1.00 g |
| Preservative | 0.11 g |
| Glycerin | 7.00 g |
| Ethylene urea | 7.00 g |
| 1,5-Pentanediol | 7.00 g |
| 2-Pyrrolidone | 5.00 g |
| Surfactant | 0.50 g |

Example 88

Preparation of Cyan Dye Ink Composition 88

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 88 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-6) | 1.52 g |
| Cyan dye (mixture of P-33-1 to P-33-4) | 0.77 g |
| Cyan dye (mixture of P-47-1 to P-47-4) | 0.17 g |
| Cyan dye (C-1) | 1.14 g |
| C.I. Acid Blue 9 | 0.40 g |
| Additive (A-4) | 1.00 g |
| Preservative | 0.11 g |
| Glycerin | 7.00 g |
| Ethylene urea | 7.00 g |
| 1,5-Pentanediol | 7.00 g |
| 2-Pyrrolidone | 5.00 g |
| Surfactant | 0.50 g |

Example 89

Preparation of Cyan Dye Ink Composition 89

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous sodium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 89 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-12) | 1.52 g |
| Cyan dye (mixture of P-38-1 to P-38-4) | 0.77 g |
| Cyan dye (mixture of P-48-1 to P-48-4) | 0.17 g |
| Cyan dye (C-12) | 1.14 g |
| C.I. Acid Blue 9 | 0.40 g |
| Additive (A-3) | 1.00 g |
| Preservative | 0.11 g |
| Glycerin | 7.00 g |
| Ethylene urea | 7.00 g |
| 1,5-Pentanediol | 7.00 g |
| 2-Pyrrolidone | 5.00 g |
| Surfactant | 0.50 g |

Example 90

Preparation of Cyan Dye Ink Composition 90

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 90 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-7) | 1.52 g |
| Cyan dye (mixture of P-34-1 to P-34-2) | 0.77 g |
| Cyan dye (P-59) | 0.17 g |
| Cyan dye (C-1) | 1.14 g |
| C.I. Acid Blue 9 | 0.40 g |
| Additive (A-4) | 1.00 g |
| Preservative | 0.11 g |
| Glycerin | 7.00 g |
| Ethylene urea | 7.00 g |
| 1,5-Pentanediol | 7.00 g |
| 2-Pyrrolidone | 5.00 g |
| Surfactant | 0.50 g |

Example 91

Preparation of Cyan Dye Ink Composition 91

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 91 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-5) | 1.52 g |
| Cyan dye (mixture of P-32-1 to P-32-4) | 0.77 g |
| Cyan dye (mixture of P-45-1 to P-45-4) | 0.17 g |
| Cyan dye (C-1) | 1.14 g |
| C.I. Direct Blue 199 | 0.40 g |
| Additive (A-4) | 1.00 g |
| Preservative | 0.11 g |
| Glycerin | 7.00 g |
| Ethylene urea | 7.00 g |
| 1,5-Pentanediol | 7.00 g |
| 2-Pyrrolidone | 5.00 g |
| Surfactant | 0.50 g |

Example 92

Preparation of Cyan Dye Ink Composition 92

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous sodium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 92 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-11) | 1.52 g |
| Cyan dye (mixture of P-36-1 to P-36-4) | 0.77 g |
| Cyan dye (mixture of P-46-1 to P-46-4) | 0.17 g |
| Cyan dye (C-12) | 1.14 g |
| C.I. Direct Blue 199 | 0.40 g |
| Additive (A-3) | 1.00 g |
| Preservative | 0.11 g |
| Glycerin | 7.00 g |
| Ethylene urea | 7.00 g |
| 1,5-Pentanediol | 7.00 g |
| 2-Pyrrolidone | 5.00 g |
| Surfactant | 0.50 g |

Example 93

Preparation of Cyan Dye Ink Composition 93

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 93 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-6) | 1.52 g |
| Cyan dye (mixture of P-33-1 to P-33-4) | 0.77 g |
| Cyan dye (mixture of P-47-1 to P-47-4) | 0.17 g |
| Cyan dye (C-1) | 1.14 g |
| C.I. Direct Blue 199 | 0.40 g |
| Additive (A-4) | 1.00 g |
| Preservative | 0.11 g |
| Glycerin | 7.00 g |
| Ethylene urea | 7.00 g |
| 1,5-Pentanediol | 7.00 g |
| 2-Pyrrolidone | 5.00 g |
| Surfactant | 0.50 g |

Example 94

Preparation of Cyan Dye Ink Composition 94

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous sodium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 94 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-12) | 1.52 g |
| Cyan dye (mixture of P-38-1 to P-38-4) | 0.77 g |
| Cyan dye (mixture of P-48-1 to P-48-4) | 0.17 g |
| Cyan dye (C-12) | 1.14 g |
| C.I. Direct Blue 199 | 0.40 g |
| Additive (A-3) | 1.00 g |
| Preservative | 0.11 g |
| Glycerin | 7.00 g |
| Ethylene urea | 7.00 g |
| 1,5-Pentanediol | 7.00 g |
| 2-Pyrrolidone | 5.00 g |
| Surfactant | 0.50 g |

Example 95

Preparation of Cyan Dye Ink Composition 95

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 95 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-7) | 1.52 g |
| Cyan dye (mixture of P-34-1 to P-34-2) | 0.77 g |
| Cyan dye (P-59) | 0.17 g |
| Cyan dye (C-1) | 1.14 g |
| C.I. Direct Blue 199 | 0.40 g |
| Additive (A-4) | 1.00 g |
| Preservative | 0.11 g |
| Glycerin | 7.00 g |
| Ethylene urea | 7.00 g |
| 1,5-Pentanediol | 7.00 g |
| 2-Pyrrolidone | 5.00 g |
| Surfactant | 0.50 g |

Example 96

Preparation of Cyan Dye Ink Composition 96

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 96 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-5) | 1.69 g |
| Cyan dye (mixture of P-32-1 to P-32-4) | 0.85 g |
| Cyan dye (mixture of P-45-1 to P-45-4) | 0.19 g |
| Cyan dye (C-1) | 1.27 g |
| Additive (A-1) | 1.00 g |
| Preservative | 0.11 g |
| Glycerin | 7.00 g |
| Ethylene urea | 7.00 g |
| 1,5-Pentanediol | 7.00 g |
| 2-Pyrrolidone | 5.00 g |
| Surfactant | 0.50 g |

Example 97

Preparation of Cyan Dye Ink Composition 97

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 97 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-6) | 1.69 g |
| Cyan dye (mixture of P-33-1 to P-33-4) | 0.85 g |
| Cyan dye (mixture of P-47-1 to P-47-4) | 0.19 g |
| Cyan dye (C-1) | 1.27 g |
| Additive (A-1) | 1.00 g |
| Preservative | 0.11 g |
| Glycerin | 7.00 g |
| Ethylene urea | 7.00 g |
| 1,5-Pentanediol | 7.00 g |
| 2-Pyrrolidone | 5.00 g |
| Surfactant | 0.50 g |

Example 98

Preparation of Cyan Dye Ink Composition 98

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 98 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-7) | 1.69 g |
| Cyan dye (mixture of P-34-1 to P-34-2) | 0.85 g |
| Cyan dye (P-59) | 0.19 g |
| Cyan dye (C-1) | 1.27 g |
| Additive (A-1) | 1.00 g |
| Preservative | 0.11 g |
| Glycerin | 7.00 g |
| Ethylene urea | 7.00 g |
| 1,5-Pentanediol | 7.00 g |
| 2-Pyrrolidone | 5.00 g |
| Surfactant | 0.50 g |

Example 99

Preparation of Cyan Dye Ink Composition 99

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 99 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-5) | 1.69 g |
| Cyan dye (mixture of P-32-1 to P-32-4) | 0.85 g |
| Cyan dye (mixture of P-45-1 to P-45-4) | 0.19 g |
| Cyan dye (C-1) | 1.27 g |
| Additive (A-2) | 1.00 g |
| Preservative | 0.11 g |
| Glycerin | 7.00 g |
| Ethylene urea | 7.00 g |
| 1,5-Pentanediol | 7.00 g |
| 2-Pyrrolidone | 5.00 g |
| Surfactant | 0.50 g |

Example 100

Preparation of Cyan Dye Ink Composition 100

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 100 (100 g). Subsequently, the dye concentration in the ink composition was quantitatively analyzed by performing the same operation as in Example 1. According to the result, the dye solid-content concentration was 4% b mass.

| | |
|---|---|
| Cyan dye (P-6) | 1.69 g |
| Cyan dye (mixture of P-33-1 to P-33-4) | 0.85 g |
| Cyan dye (mixture of P-47-1 to P-47-4) | 0.19 g |
| Cyan dye (C-1) | 1.27 g |
| Additive (A-2) | 1.00 g |
| Preservative | 0.11 g |
| Glycerin | 7.00 g |
| Ethylene urea | 7.00 g |
| 1,5-Pentanediol | 7.00 g |
| 2-Pyrrolidone | 5.00 g |
| Surfactant | 0.50 g |

Example 101

Preparation of Cyan Dye Ink Composition 101

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 101 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-7) | 1.69 g |
| Cyan dye (mixture of P-34-1 to P-34-2) | 0.85 g |
| Cyan dye (P-59) | 0.19 g |
| Cyan dye (C-1) | 1.27 g |
| Additive (A-2) | 1.00 g |
| Preservative | 0.11 g |
| Glycerin | 7.00 g |
| Ethylene urea | 7.00 g |
| 1,5-Pentanediol | 7.00 g |
| 2-Pyrrolidone | 5.00 g |
| Surfactant | 0.50 g |

Example 102

Preparation of Cyan Dye Ink Composition 102

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 102 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-5) | 2.47 g |
| Cyan dye (mixture of P-32-1 to P-32-4) | 1.24 g |
| Cyan dye (mixture of P-45-1 to P-45-4) | 0.29 g |
| Additive (A-4) | 1.50 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Example 103

Preparation of Cyan Dye Ink Composition 103

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 103 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-6) | 2.47 g |
| Cyan dye (mixture of P-33-1 to P-33-4) | 1.24 g |
| Cyan dye (mixture of P-47-1 to P-47-4) | 0.29 g |
| Additive (A-4) | 1.50 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Example 104

Preparation of Cyan Dye Ink Composition 104

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 104 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-7) | 2.47 g |
| Cyan dye (mixture of P-34-1 to P-34-2) | 1.24 g |
| Cyan dye (P-59) | 0.29 g |
| Additive (A-4) | 1.50 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Example 105

Preparation of Cyan Dye Ink Composition 105

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 105 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-5) | 2.47 g |
| Cyan dye (mixture of P-32-1 to P-32-4) | 1.24 g |
| Cyan dye (mixture of P-45-1 to P-45-4) | 0.29 g |
| Additive (A-4) | 1.50 g |
| Preservative | 0.11 g |
| Glycerin | 7.00 g |
| Ethylene urea | 7.00 g |
| 1,5-Pentanediol | 7.00 g |
| 2-Pyrrolidone | 5.00 g |
| Surfactant | 0.50 g |

Example 106

Preparation of Cyan Dye Ink Composition 106

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 106 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-6) | 2.47 g |
| Cyan dye (mixture of P-33-1 to P-33-4) | 1.24 g |
| Cyan dye (mixture of P-47-1 to P-47-4) | 0.29 g |
| Additive (A-4) | 1.50 g |
| Preservative | 0.11 g |
| Glycerin | 7.00 g |
| Ethylene urea | 7.00 g |
| 1,5-Pentanediol | 7.00 g |
| 2-Pyrrolidone | 5.00 g |
| Surfactant | 0.50 g |

Example 107

Preparation of Cyan Dye Ink Composition 107

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 107 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-7) | 2.47 g |
| Cyan dye (mixture of P-34-1 to P-34-2) | 1.24 g |
| Cyan dye (P-59) | 0.29 g |
| Additive (A-4) | 1.50 g |
| Preservative | 0.11 g |
| Glycerin | 7.00 g |
| Ethylene urea | 7.00 g |
| 1,5-Pentanediol | 7.00 g |
| 2-Pyrrolidone | 5.00 g |
| Surfactant | 0.50 g |

Example 108

Preparation of Cyan Dye Ink Composition 108

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 108 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-1) | 1.69 g |
| Cyan dye (mixture of P-44-1 to P-44-4) | 0.85 g |
| Cyan dye (mixture of P-62-1 to P-62-4) | 0.19 g |
| Cyan dye (C-5) | 1.27 g |
| Additive (A-4) | 1.00 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Example 109

Preparation of Cyan Dye Ink Composition 109

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 109 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-1) | 1.07 g |
| Cyan dye (mixture of P-44-1 to P-44-4) | 1.60 g |
| Cyan dye (mixture of P-62-1 to P-62-4) | 1.07 g |
| Cyan dye (C-5) | 0.26 g |
| Additive (A-4) | 1.50 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Example 110

Preparation of Cyan Dye Ink Composition 110

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 110 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-1) | 1.69 g |
| Cyan dye (mixture of P-44-1 to P-44-4) | 0.85 g |
| Cyan dye (mixture of P-62-1 to P-62-4) | 0.19 g |
| Cyan dye (C-5) | 1.27 g |
| Additive (A-4) | 1.00 g |
| Preservative | 0.11 g |
| Glycerin | 7.00 g |
| Ethylene urea | 7.00 g |
| 1,5-Pentanediol | 7.00 g |
| 2-Pyrrolidone | 5.00 g |
| Surfactant | 0.50 g |

Example 111

Preparation of Cyan Dye Ink Composition 111

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 111 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-5) | 1.07 g |
| Cyan dye (mixture of P-32-1 to P-32-4) | 1.60 g |
| Cyan dye (mixture of P-45-1 to P-45-4) | 1.07 g |
| Cyan dye (C-1) | 0.26 g |
| Additive (A-4) | 1.50 g |
| EDTA (tetralithium salt) | 0.05 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Example 112

Preparation of Cyan Dye Ink Composition 112

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 112 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-6) | 1.07 g |
| Cyan dye (mixture of P-33-1 to P-33-4) | 1.60 g |
| Cyan dye (mixture of P-47-1 to P-47-4) | 1.07 g |
| Cyan dye (C-1) | 0.26 g |
| Additive (A-4) | 1.50 g |
| EDTA (tetralithium salt) | 0.05 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Example 113

Preparation of Cyan Dye Ink Composition 113

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 113 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-7) | 1.07 g |
| Cyan dye (mixture of P-34-1 to P-34-2) | 1.60 g |
| Cyan dye (P-59) | 1.07 g |
| Cyan dye (C-1) | 0.26 g |
| Additive (A-4) | 1.50 g |
| EDTA (tetralithium salt) | 0.05 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |

-continued

| | |
|---|---|
| Propylene glycol | 0.12 g |
| Surfactant | 1.00 g |

Example 114

Preparation of Cyan Dye Ink Composition 114

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 114 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-22) | 1.07 g |
| Cyan dye (mixture of P-39-1 to P-39-4) | 1.60 g |
| Cyan dye (mixture of P-49-1 to P-49-4) | 1.07 g |
| Cyan dye (C-16) | 0.26 g |
| Additive (A-4) | 1.50 g |
| EDTA (tetralithium salt) | 0.05 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Example 115

Preparation of Cyan Dye Ink Composition 115

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 115 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-23) | 1.07 g |
| Cyan dye (mixture of P-40-1 to P-40-4) | 1.60 g |
| Cyan dye (mixture of P-51-1 to P-51-4) | 1.07 g |
| Cyan dye (C-16) | 0.26 g |
| Additive (A-4) | 1.50 g |

-continued

| | |
|---|---|
| EDTA (tetralithium salt) | 0.05 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Example 116

Preparation of Cyan Dye Ink Composition 116

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 116 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-5) | 1.52 g |
| Cyan dye (mixture of P-32-1 to P-32-4) | 0.77 g |
| Cyan dye (mixture of P-45-1 to P-45-4) | 0.17 g |
| Cyan dye (C-1) | 1.14 g |
| Cyan dye (C-41) | 0.40 g |
| Additive (A-4) | 1.00 g |
| EDTA (tetralithium salt) | 0.03 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Example 117

Preparation of Cyan Dye Ink Composition 117

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 117 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-6) | 1.52 g |
| Cyan dye (mixture of P-33-1 to P-33-4) | 0.77 g |
| Cyan dye (mixture of P-47-1 to P-47-4) | 0.17 g |
| Cyan dye (C-1) | 1.14 g |
| Cyan dye (C-41) | 0.40 g |
| Additive (A-4) | 1.00 g |
| EDTA (tetralithium salt) | 0.03 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Example 118

Preparation of Cyan Dye Ink Composition 118

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 118 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-7) | 1.52 g |
| Cyan dye (mixture of P-34-1 to P-34-2) | 0.77 g |
| Cyan dye (P-59) | 0.17 g |
| Cyan dye (C-1) | 1.14 g |
| Cyan dye (C-41) | 0.40 g |
| Additive (A-4) | 1.00 g |
| EDTA (tetralithium salt) | 0.03 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Example 119

Preparation of Cyan Dye Ink Composition 119

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 119 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-22) | 1.52 g |
| Cyan dye (mixture of P-39-1 to P-39-4) | 0.77 g |
| Cyan dye (mixture of P-49-1 to P-49-4) | 0.17 g |
| Cyan dye (C-16) | 1.14 g |
| Cyan dye (C-41) | 0.40 g |
| Additive (A-4) | 1.50 g |
| EDTA (tetralithium salt) | 0.03 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Example 120

Preparation of Cyan Dye Ink Composition 120

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 120 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-23) | 1.52 g |
| Cyan dye (mixture of P-40-1 to P-40-4) | 0.77 g |
| Cyan dye (mixture of P-51-1 to P-51-4) | 0.17 g |
| Cyan dye (C-16) | 1.14 g |
| Cyan dye (C-41) | 0.40 g |
| Additive (A-4) | 1.50 g |
| EDTA (tetralithium salt) | 0.03 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Example 121

Preparation of Cyan Dye Ink Composition 121

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 121 (100 g). Subsequently, the dye concentration in the ink composition was quantitatively analyzed by performing the same operation as in Example 1. According to the result, the dye solid-content concentration was 4% b mass.

| | |
|---|---|
| Cyan dye (P-5) | 1.07 g |
| Cyan dye (mixture of P-32-1 to P-32-4) | 1.60 g |
| Cyan dye (mixture of P-45-1 to P-45-4) | 1.07 g |
| Cyan dye (C-1) | 0.26 g |
| Additive (A-4) | 1.50 g |
| EDTA (tetralithium salt) | 0.02 g |
| Preservative | 0.11 g |
| Glycerin | 7.00 g |
| Ethylene urea | 7.00 g |
| 1,5-Pentanediol | 7.00 g |
| 2-Pyrrolidone | 5.00 g |
| Surfactant | 0.50 g |

Example 122

Preparation of Cyan Dye Ink Composition 122

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 122 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-6) | 1.07 g |
| Cyan dye (mixture of P-33-1 to P-33-4) | 1.60 g |
| Cyan dye (mixture of P-47-1 to P-47-4) | 1.07 g |
| Cyan dye (C-1) | 0.26 g |
| Additive (A-4) | 1.50 g |
| EDTA (tetralithium salt) | 0.02 g |
| Preservative | 0.11 g |
| Glycerin | 7.00 g |
| Ethylene urea | 7.00 g |
| 1,5-Pentanediol | 7.00 g |
| 2-Pyrrolidone | 5.00 g |
| Surfactant | 0.50 g |

Example 123

Preparation of Cyan Dye Ink Composition 123

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 123 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-7) | 1.07 g |
| Cyan dye (mixture of P-34-1 to P-34-2) | 1.60 g |
| Cyan dye (P-59) | 1.07 g |
| Cyan dye (C-1) | 0.26 g |
| Additive (A-4) | 1.50 g |
| EDTA (tetralithium salt) | 0.02 g |
| Preservative | 0.11 g |
| Glycerin | 7.00 g |
| Ethylene urea | 7.00 g |
| 1,5-Pentanediol | 7.00 g |
| 2-Pyrrolidone | 5.00 g |
| Surfactant | 0.50 g |

Example 124

Preparation of Cyan Dye Ink Composition 124

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 124 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-22) | 1.07 g |
| Cyan dye (mixture of P-39-1 to P-39-4) | 1.60 g |
| Cyan dye (mixture of P-49-1 to P-49-4) | 1.07 g |
| Cyan dye (C-16) | 0.26 g |
| Additive (A-4) | 1.50 g |
| EDTA (tetralithium salt) | 0.02 g |
| Preservative | 0.11 g |
| Glycerin | 7.00 g |
| Ethylene urea | 7.00 g |
| 1,5-Pentanediol | 7.00 g |
| 2-Pyrrolidone | 5.00 g |
| Surfactant | 0.50 g |

Example 125

Preparation of Cyan Dye Ink Composition 125

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 125 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-23) | 1.07 g |
| Cyan dye (mixture of P-40-1 to P-40-4) | 1.60 g |
| Cyan dye (mixture of P-51-1 to P-51-4) | 1.07 g |
| Cyan dye (C-16) | 0.26 g |
| Additive (A-4) | 1.50 g |
| EDTA (tetralithium salt) | 0.02 g |
| Preservative | 0.11 g |
| Glycerin | 7.00 g |
| Ethylene urea | 7.00 g |
| 1,5-Pentanediol | 7.00 g |
| 2-Pyrrolidone | 5.00 g |
| Surfactant | 0.50 g |

Example 126

Preparation of Cyan Dye Ink Composition 126

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 126 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-5) | 1.52 g |
| Cyan dye (mixture of P-32-1 to P-32-4) | 0.77 g |
| Cyan dye (mixture of P-45-1 to P-45-4) | 0.17 g |
| Cyan dye (C-1) | 1.14 g |
| Cyan dye (C-41) | 0.40 g |
| Additive (A-4) | 1.00 g |
| EDTA (tetralithium salt) | 0.01 g |
| Preservative | 0.11 g |
| Glycerin | 7.00 g |
| Ethylene urea | 7.00 g |
| 1,5-Pentanediol | 7.00 g |
| 2-Pyrrolidone | 5.00 g |
| Surfactant | 0.50 g |

Example 127

Preparation of Cyan Dye Ink Composition 127

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 127 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-6) | 1.52 g |
| Cyan dye (mixture of P-33-1 to P-33-4) | 0.77 g |
| Cyan dye (mixture of P-47-1 to P-47-4) | 0.17 g |
| Cyan dye (C-1) | 1.14 g |
| Cyan dye (C-41) | 0.40 g |
| Additive (A-4) | 1.00 g |
| EDTA (tetralithium salt) | 0.01 g |
| Preservative | 0.11 g |
| Glycerin | 7.00 g |
| Ethylene urea | 7.00 g |
| 1,5-Pentanediol | 7.00 g |
| 2-Pyrrolidone | 5.00 g |
| Surfactant | 0.50 g |

Example 128

Preparation of Cyan Dye Ink Composition 128

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 128 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-7) | 1.52 g |
| Cyan dye (mixture of P-34-1 to P-34-2) | 0.77 g |
| Cyan dye (P-59) | 0.17 g |
| Cyan dye (C-1) | 1.14 g |
| Cyan dye (C-41) | 0.40 g |
| Additive (A-4) | 1.00 g |
| EDTA (tetralithium salt) | 0.01 g |
| Preservative | 0.11 g |
| Glycerin | 7.00 g |
| Ethylene urea | 7.00 g |
| 1,5-Pentanediol | 7.00 g |
| 2-Pyrrolidone | 5.00 g |
| Surfactant | 0.50 g |

Example 129

Preparation of Cyan Dye Ink Composition 129

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 129 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-22) | 1.52 g |
| Cyan dye (mixture of P-39-1 to P-39-4) | 0.77 g |
| Cyan dye (mixture of P-49-1 to P-49-4) | 0.17 g |
| Cyan dye (C-16) | 1.14 g |
| Cyan dye (C-41) | 0.40 g |
| Additive (A-4) | 1.50 g |
| EDTA (tetralithium salt) | 0.01 g |
| Preservative | 0.11 g |
| Glycerin | 7.00 g |
| Ethylene urea | 7.00 g |
| 1,5-Pentanediol | 7.00 g |
| 2-Pyrrolidone | 5.00 g |
| Surfactant | 0.50 g |

Example 130

Preparation of Cyan Dye Ink Composition 130

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a cyan dye ink composition 130 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-23) | 1.52 g |
| Cyan dye (mixture of P-40-1 to P-40-4) | 0.77 g |
| Cyan dye (mixture of P-51-1 to P-51-4) | 0.17 g |
| Cyan dye (C-16) | 1.14 g |
| Cyan dye (C-41) | 0.40 g |
| Additive (A-4) | 1.50 g |
| EDTA (tetralithium salt) | 0.01 g |
| Preservative | 0.11 g |
| Glycerin | 7.00 g |
| Ethylene urea | 7.00 g |
| 1,5-Pentanediol | 7.00 g |
| 2-Pyrrolidone | 5.00 g |
| Surfactant | 0.50 g |

Comparative Example 1

Preparation of Comparative Cyan Dye Ink Composition 1

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a comparative cyan dye ink composition 1 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-5) | 1.69 g |
| Cyan dye (mixture of P-32-1 to P-32-4) | 0.85 g |
| Cyan dye (mixture of P-45-1 to P-45-4) | 0.19 g |
| Cyan dye (C-1) | 1.27 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Comparative Example 2

Preparation of Comparative Cyan Dye Ink Composition 2

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous sodium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a comparative cyan dye ink composition 2 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-11) | 1.69 g |
| Cyan dye (mixture of P-36-1 to P-36-4) | 0.85 g |
| Cyan dye (mixture of P-46-1 to P-46-4) | 0.19 g |
| Cyan dye (C-12) | 1.27 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Comparative Example 3

Preparation of Comparative Cyan Dye Ink Composition 3

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a comparative cyan dye ink composition 3 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-6) | 1.69 g |
| Cyan dye (mixture of P-33-1 to P-33-4) | 0.85 g |
| Cyan dye (mixture of P-47-1 to P-47-4) | 0.19 g |
| Cyan dye (C-1) | 1.27 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Comparative Example 4

Preparation of Comparative Cyan Dye Ink Composition 4

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous sodium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a comparative cyan dye ink composition 4 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-12) | 1.69 g |
| Cyan dye (mixture of P-38-1 to P-38-4) | 0.85 g |
| Cyan dye (mixture of P-48-1 to P-48-4) | 0.19 g |
| Cyan dye (C-12) | 1.27 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Comparative Example 5

Preparation of Comparative Cyan Dye Ink Composition 5

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a comparative cyan dye ink composition 5 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-7) | 1.69 g |
| Cyan dye (mixture of P-34-1 to P-34-2) | 0.85 g |
| Cyan dye (P-59) | 0.19 g |
| Cyan dye (C-1) | 1.27 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Comparative Example 6

Preparation of Comparative Cyan Dye Ink Composition 6

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a comparative cyan dye ink composition 6 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-5) | 1.07 g |
| Cyan dye (mixture of P-32-1 to P-32-4) | 1.60 g |
| Cyan dye (mixture of P-45-1 to P-45-4) | 1.07 g |
| Cyan dye (C-1) | 0.26 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Comparative Example 7

Preparation of Comparative Cyan Dye Ink Composition 7

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous sodium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a comparative cyan dye ink composition 7 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-11) | 1.07 g |
| Cyan dye (mixture of P-36-1 to P-36-4) | 1.60 g |
| Cyan dye (mixture of P-46-1 to P-46-4) | 1.07 g |
| Cyan dye (C-12) | 0.26 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Comparative Example 8

Preparation of Comparative Cyan Dye Ink Composition 8

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a comparative cyan dye ink composition 8 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-6) | 1.07 g |
| Cyan dye (mixture of P-33-1 to P-33-4) | 1.60 g |
| Cyan dye (mixture of P-47-1 to P-47-4) | 1.07 g |
| Cyan dye (C-1) | 0.26 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Comparative Example 9

Preparation of Comparative Cyan Dye Ink Composition 9

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous sodium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a comparative cyan dye ink composition 9 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-12) | 1.07 g |
| Cyan dye (mixture of P-38-1 to P-38-4) | 1.60 g |
| Cyan dye (mixture of P-48-1 to P-48-4) | 1.07 g |
| Cyan dye (C-12) | 0.26 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Comparative Example 10

Preparation of Comparative Cyan Dye Ink Composition 10

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a comparative cyan dye ink composition 10 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-7) | 1.07 g |
| Cyan dye (mixture of P-34-1 to P-34-2) | 1.60 g |
| Cyan dye (P-59) | 1.07 g |
| Cyan dye (C-1) | 0.26 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Comparative Example 11

Preparation of Comparative Cyan Dye Ink Composition 11

Deionized water was added to a mixture including components below in the corresponding amounts below up to a total weight of 90 g, and the resulting mixture was then stirred for one hour under heating at 30° C. to 40° C.

Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a comparative cyan dye ink composition 11 (100 g). Subsequently, the dye concentration in the ink composition was quantitatively analyzed by performing the same operation as in Example 1. According to the result, the dye solid-content concentration was 5% by mass.

| | |
|---|---|
| Cyan dye (P-5) | 2.11 g |
| Cyan dye (mixture of P-32-1 to P-32-4) | 1.05 g |
| Cyan dye (mixture of P-45-1 to P-45-4) | 0.24 g |
| Cyan dye (C-1) | 1.59 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Comparative Example 12

Preparation of Comparative Cyan Dye Ink Composition 12

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous sodium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a comparative cyan dye ink composition 12 (100 g). Subsequently, the dye concentration in the ink composition was quantitatively analyzed by performing the same operation as in Example 1. According to the result, the dye solid-content concentration was 5% by mass.

| | |
|---|---|
| Cyan dye (P-11) | 2.11 g |
| Cyan dye (mixture of P-36-1 to P-36-4) | 1.05 g |
| Cyan dye (mixture of P-46-1 to P-46-4) | 0.24 g |
| Cyan dye (C-12) | 1.59 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Comparative Example 13

Preparation of Comparative Cyan Dye Ink Composition 13

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a comparative cyan dye ink composition 13 (100 g). Subsequently, the dye concentration in the ink composition was quantitatively analyzed by performing the same operation as in Example 1. According to the result, the dye solid-content concentration was 5% by mass.

| | |
|---|---|
| Cyan dye (P-6) | 2.11 g |
| Cyan dye (mixture of P-33-1 to P-33-4) | 1.05 g |
| Cyan dye (mixture of P-47-1 to P-47-4) | 0.24 g |
| Cyan dye (C-1) | 1.59 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Comparative Example 14

Preparation of Comparative Cyan Dye Ink Composition 14

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous sodium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a comparative cyan dye ink composition 14 (100 g). Subsequently, the dye concentration in the ink composition was quantitatively analyzed by performing the same operation as in Example 1. According to the result, the dye solid-content concentration was 5% by mass.

| | |
|---|---|
| Cyan dye (P-12) | 2.11 g |
| Cyan dye (mixture of P-38-1 to P-38-4) | 1.05 g |
| Cyan dye (mixture of P-48-1 to P-48-4) | 0.24 g |
| Cyan dye (C-12) | 1.59 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Comparative Example 15

Preparation of Comparative Cyan Dye Ink Composition 15

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a comparative cyan dye ink composition 15 (100 g). Subsequently, the dye concentration in the ink composition was quantitatively analyzed by performing the same operation as in Example 1. According to the result, the dye solid-content concentration was 5% by mass.

| | |
|---|---|
| Cyan dye (P-7) | 2.11 g |
| Cyan dye (mixture of P-34-1 to P-34-2) | 1.05 g |
| Cyan dye (P-59) | 0.24 g |
| Cyan dye (C-1) | 1.59 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Comparative Example 16

Preparation of Comparative Cyan Dye Ink Composition 16

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a comparative cyan dye ink composition 16 (100 g). Subsequently, the dye concentration in the ink composition was quantitatively analyzed by performing the same operation as in Example 1. According to the result, the dye solid-content concentration was 3% by mass.

| | |
|---|---|
| Cyan dye (P-5) | 1.27 g |
| Cyan dye (mixture of P-32-1 to P-32-4) | 0.64 g |
| Cyan dye (mixture of P-45-1 to P-45-4) | 0.13 g |
| Cyan dye (C-1) | 0.96 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Comparative Example 17

Preparation of Comparative Cyan Dye Ink Composition 17

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous sodium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a comparative cyan dye ink composition 17 (100 g). Subsequently, the dye concentration in the ink composition was quantitatively analyzed by performing the same operation as in Example 1. According to the result, the dye solid-content concentration was 3% b mass.

| | |
|---|---|
| Cyan dye (P-11) | 1.27 g |
| Cyan dye (mixture of P-36-1 to P-36-4) | 0.64 g |
| Cyan dye (mixture of P-46-1 to P-46-4) | 0.13 g |
| Cyan dye (C-12) | 0.96 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Comparative Example 18

Preparation of Comparative Cyan Dye Ink Composition 18

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a comparative cyan dye ink composition 18 (100 g). Subsequently, the dye concentration in the ink composition was quantitatively analyzed by performing the same operation as in Example 1. According to the result, the dye solid-content concentration was 3% by mass.

| | |
|---|---|
| Cyan dye (P-6) | 1.27 g |
| Cyan dye (mixture of P-33-1 to P-33-4) | 0.64 g |
| Cyan dye (mixture of P-47-1 to P-47-4) | 0.13 g |
| Cyan dye (C-1) | 0.96 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |

-continued

| | |
|---|---|
| Propylene glycol | 0.12 g |
| Surfactant | 1.00 g |

Comparative Example 19

Preparation of Comparative Cyan Dye Ink Composition 19

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous sodium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a comparative cyan dye ink composition 19 (100 g). Subsequently, the dye concentration in the ink composition was quantitatively analyzed by performing the same operation as in Example 1. According to the result, the dye solid-content concentration was 3% by mass.

| | |
|---|---|
| Cyan dye (P-12) | 1.27 g |
| Cyan dye (mixture of P-38-1 to P-38-4) | 0.64 g |
| Cyan dye (mixture of P-48-1 to P-48-4) | 0.13 g |
| Cyan dye (C-12) | 0.96 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Comparative Example 20

Preparation of Comparative Cyan Dye Ink Composition 20

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a comparative cyan dye ink composition 20 (100 g). Subsequently, the dye concentration in the ink composition was quantitatively analyzed by performing the same operation as in Example 1. According to the result, the dye solid-content concentration was 3% by mass.

| | |
|---|---|
| Cyan dye (P-7) | 1.27 g |
| Cyan dye (mixture of P-34-1 to P-34-2) | 0.64 g |
| Cyan dye (P-59) | 0.13 g |
| Cyan dye (C-1) | 0.96 g |
| Preservative | 0.11 g |

-continued

| | |
|---|---|
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Comparative Example 21

Preparation of Comparative Cyan Dye Ink Composition 21

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a comparative cyan dye ink composition 21 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-18) | 1.69 g |
| Cyan dye (mixture of P-41-1 to P-41-4) | 0.85 g |
| Cyan dye (mixture of P-53-1 to P-53-4) | 0.19 g |
| Cyan dye (C-10) | 1.27 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Comparative Example 22

Preparation of Comparative Cyan Dye Ink Composition 22

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a comparative cyan dye ink composition 22 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-19) | 1.69 g |
| Cyan dye (mixture of P-42-1 to P-42-4) | 0.85 g |
| Cyan dye (mixture of P-55-1 to P-55-4) | 0.19 g |
| Cyan dye (C-10) | 1.27 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Comparative Example 23

Preparation of Comparative Cyan Dye Ink Composition 23

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a comparative cyan dye ink composition 23 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-20) | 1.69 g |
| Cyan dye (mixture of P-43-1 to P-43-4) | 0.85 g |
| Cyan dye (mixture of P-57-1 to P-57-4) | 0.19 g |
| Cyan dye (C-11) | 1.27 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Comparative Example 24

Preparation of Comparative Cyan Dye Ink Composition 24

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a comparative cyan dye ink composition 24 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-22) | 1.69 g |
| Cyan dye (mixture of P-39-1 to P-39-4) | 0.85 g |
| Cyan dye (mixture of P-49-1 to P-49-4) | 0.19 g |
| Cyan dye (C-16) | 1.27 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Comparative Example 25

Preparation of Comparative Cyan Dye Ink Composition 25

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a comparative cyan dye ink composition 25 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-23) | 1.69 g |
| Cyan dye (mixture of P-40-1 to P-40-4) | 0.85 g |
| Cyan dye (mixture of P-51-1 to P-51-4) | 0.19 g |
| Cyan dye (C-16) | 1.27 g |
| Preservative | 0.11 g |
| Glycerin | 9.70 g |
| Triethyleneglycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Comparative Example 26

Preparation of Comparative Cyan Dye Ink Composition 26

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous sodium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a comparative cyan dye ink composition 26 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (C.I. Acid Blue 9) | 4.00 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Comparative Example 27

Preparation of Comparative Cyan Dye Ink Composition 27

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous sodium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a comparative cyan dye ink composition 27 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (C.I. Acid Blue 9) | 4.00 g |
| Additive (A-3) | 1.00 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Comparative Example 28

Preparation of Comparative Cyan Dye Ink Composition 28

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous sodium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a comparative cyan dye ink composition 28 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (C.I. Acid Blue 9) | 3.60 g |
| Cyan dye (C-42) | 0.40 g |
| Additive (A-3) | 1.00 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Comparative Example 29

Preparation of Comparative Cyan Dye Ink Composition 29

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a comparative cyan dye ink composition 29 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (C.I. Acid Blue 9) | 3.60 g |
| Cyan dye (C-41) | 0.40 g |
| Additive (A-4) | 1.00 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Comparative Example 30

Preparation of Comparative Cyan Dye Ink Composition 30

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous sodium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a comparative cyan dye ink composition 30 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (C.I. Acid Blue 9) | 3.60 g |
| Cyan dye (C-12) | 0.20 g |
| Cyan dye (C-42) | 0.20 g |
| Additive (A-3) | 1.00 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propyl ene glycol | 0.12 g |
| Surfactant | 1.00 g |

Comparative Example 31

Preparation of Comparative Cyan Dye Ink Composition 31

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous sodium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a comparative cyan dye ink composition 31 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (C.I. Direct Blue 199) | 4.00 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Comparative Example 32

Preparation of Comparative Cyan Dye Ink Composition 32

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous sodium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a comparative cyan dye ink composition 32 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (C.I. Direct Blue 199) | 4.00 g |
| Additive (A-3) | 1.00 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Comparative Example 33

Preparation of Comparative Cyan Dye Ink Composition 33

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous sodium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a comparative cyan dye ink composition 33 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (C.I. Direct Blue 199) | 3.60 g |
| Cyan dye (C-42) | 0.40 g |
| Additive (A-3) | 1.00 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Comparative Example 34

Preparation of Comparative Cyan Dye Ink Composition 34

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a comparative cyan dye ink composition 34 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (C.I. Direct Blue 199) | 3.60 g |
| Cyan dye (C-41) | 0.40 g |
| Additive (A-4) | 1.00 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Comparative Example 35

Preparation of Comparative Cyan Dye Ink Composition 35

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous sodium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a comparative cyan dye ink composition 35 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (C.I. Direct Blue 199) | 3.60 g |
| Cyan dye (C-12) | 0.20 g |
| Cyan dye (C-42) | 0.20 g |
| Additive (A-3) | 1.00 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Comparative Example 36

Preparation of Comparative Cyan Dye Ink Composition 36

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous sodium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a comparative cyan dye ink composition 36 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (C.I. Acid Blue 9) | 2.00 g |
| Cyan dye (C.I. Direct Blue 199) | 2.00 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Comparative Example 37

Preparation of Comparative Cyan Dye Ink Composition 37

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous sodium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a comparative cyan dye ink composition 37 (100 g). Subsequently, the dye concentration in the ink composition was quantitatively analyzed by performing the same operation as in Example 1. According to the result, the dye solid-content concentration was 4% b mass.

| | |
|---|---|
| Cyan dye (C.I. Acid Blue 9) | 2.00 g |
| Cyan dye (C.I. Direct Blue 199) | 2.00 g |
| Additive (A-3) | 1.00 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Comparative Example 38

Preparation of Comparative Cyan Dye Ink Composition 38

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous sodium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a comparative cyan dye ink composition 38 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (C.I. Acid Blue 9) | 1.80 g |
| Cyan dye (C.I. Direct Blue 199) | 1.80 g |
| Cyan dye (C-42) | 0.40 g |
| Additive (A-3) | 1.00 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Comparative Example 39

Preparation of Comparative Cyan Dye Ink Composition 39

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous sodium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a comparative cyan dye ink composition 39 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (C.I. Acid Blue 9) | 1.80 g |
| Cyan dye (C.I. Direct Blue 199) | 1.80 g |
| Cyan dye (C-12) | 0.20 g |
| Cyan dye (C-42) | 0.20 g |
| Additive (A-3) | 1.00 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Comparative Example 40

Preparation of Comparative Cyan Dye Ink Composition 40

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a comparative cyan dye ink composition 40 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (C.I. Acid Blue 9) | 1.80 g |
| Cyan dye (C.I. Direct Blue 199) | 1.80 g |
| Cyan dye (C-1) | 0.20 g |
| Cyan dye (C-41) | 0.20 g |
| Additive (A-4) | 1.00 g |
| Preservative | 0.11 g |
| Glycerin | 9.70 g |
| Triethylene glycol | 3.40 g |
| Triethylene glycol monobutyl ether | 9.90 g |
| 2-Pyrrolidone | 2.50 g |
| 1,2-Hexanediol | 1.30 g |
| Propylene glycol | 0.12 g |
| Surfactant | 1.00 g |

Comparative Example 41

Preparation of Comparative Cyan Dye Ink Composition 41

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a comparative cyan dye ink composition 41 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-5) | 1.69 g |
| Cyan dye (mixture of P-32-1 to P-32-4) | 0.85 g |
| Cyan dye (mixture of P-45-1 to P-45-4) | 0.19 g |
| Cyan dye (C-1) | 1.27 g |
| Preservative | 0.11 g |
| Glycerin | 7.00 g |
| Ethylene urea | 7.00 g |
| 1,5-Pentanediol | 7.00 g |
| 2-Pyrrolidone | 5.00 g |
| Surfactant | 0.50 g |

Comparative Example 42

Preparation of Comparative Cyan Dye Ink Composition 42

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous sodium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a comparative cyan dye ink composition 42 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-11) | 1.69 g |
| Cyan dye (mixture of P-36-1 to P-36-4) | 0.85 g |
| Cyan dye (mixture of P-46-1 to P-46-4) | 0.19 g |
| Cyan dye (C-12) | 1.27 g |
| Preservative | 0.11 g |
| Glycerin | 7.00 g |
| Ethylene urea | 7.00 g |
| 1,5-Pentanediol | 7.00 g |
| 2-Pyrrolidone | 5.00 g |
| Surfactant | 0.50 g |

Comparative Example 43

Preparation of Comparative Cyan Dye Ink Composition 43

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a comparative cyan dye ink composition 43 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-6) | 1.69 g |
| Cyan dye (mixture of P-33-1 to P-33-4) | 0.85 g |
| Cyan dye (mixture of P-47-1 to P-47-4) | 0.19 g |
| Cyan dye (C-1) | 1.27 g |
| Preservative | 0.11 g |
| Glycerin | 7.00 g |
| Ethylene urea | 7.00 g |
| 1,5-Pentanediol | 7.00 g |
| 2-Pyrrolidone | 5.00 g |
| Surfactant | 0.50 g |

Comparative Example 44

Preparation of Comparative Cyan Dye Ink Composition 44

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous sodium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a comparative cyan dye ink composition 44 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-12) | 1.69 g |
| Cyan dye (mixture of P-38-1 to P-38-4) | 0.85 g |
| Cyan dye (mixture of P-48-1 to P-48-4) | 0.19 g |
| Cyan dye (C-12) | 1.27 g |
| Preservative | 0.11 g |
| Glycerin | 7.00 g |
| Ethylene urea | 7.00 g |
| 1,5-Pentanediol | 7.00 g |
| 2-Pyrrolidone | 5.00 g |
| Surfactant | 0.50 g |

Comparative Example 45

Preparation of Comparative Cyan Dye Ink Composition 45

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a comparative cyan dye ink composition 45 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-7) | 1.69 g |
| Cyan dye (mixture of P-34-1 to P-34-2) | 0.85 g |
| Cyan dye (P-59) | 0.19 g |
| Cyan dye (C-1) | 1.27 g |
| Preservative | 0.11 g |
| Glycerin | 7.00 g |
| Ethylene urea | 7.00 g |
| 1,5-Pentanediol | 7.00 g |
| 2-Pyrrolidone | 5.00 g |
| Surfactant | 0.50 g |

Comparative Example 46

Preparation of Comparative Cyan Dye Ink Composition 46

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a comparative cyan dye ink composition 46 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-5) | 1.07 g |
| Cyan dye (mixture of P-32-1 to P-32-4) | 1.60 g |
| Cyan dye (mixture of P-45-1 to P-45-4) | 1.07 g |
| Cyan dye (C-1) | 0.26 g |
| Preservative | 0.11 g |
| Glycerin | 7.00 g |
| Ethylene urea | 7.00 g |
| 1,5-Pentanediol | 7.00 g |
| 2-Pyrrolidone | 5.00 g |
| Surfactant | 0.50 g |

Comparative Example 47

Preparation of Comparative Cyan Dye Ink Composition 47

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous sodium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a comparative cyan dye ink composition 47 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-11) | 1.07 g |
| Cyan dye (mixture of P-36-1 to P-36-4) | 1.60 g |
| Cyan dye (mixture of P-46-1 to P-46-4) | 1.07 g |
| Cyan dye (C-12) | 0.26 g |
| Preservative | 0.11 g |
| Glycerin | 7.00 g |
| Ethylene urea | 7.00 g |
| 1,5-Pentanediol | 7.00 g |
| 2-Pyrrolidone | 5.00 g |
| Surfactant | 0.50 g |

Comparative Example 48

Preparation of Comparative Cyan Dye Ink Composition 48

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a comparative cyan dye ink composition 48 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-6) | 1.07 g |
| Cyan dye (mixture of P-33-1 to P-33-4) | 1.60 g |
| Cyan dye (mixture of P-47-1 to P-47-4) | 1.07 g |
| Cyan dye (C-1) | 0.26 g |
| Preservative | 0.11 g |
| Glycerin | 7.00 g |
| Ethylene urea | 7.00 g |
| 1,5-Pentanediol | 7.00 g |
| 2-Pyrrolidone | 5.00 g |
| Surfactant | 0.50 g |

Comparative Example 49

Preparation of Comparative Cyan Dye Ink Composition 49

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous sodium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a comparative cyan dye ink composition 49 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-12) | 1.07 g |
| Cyan dye (mixture of P-38-1 to P-38-4) | 1.60 g |
| Cyan dye (mixture of P-48-1 to P-48-4) | 1.07 g |
| Cyan dye (C-12) | 0.26 g |
| Preservative | 0.11 g |
| Glycerin | 7.00 g |
| Ethylene urea | 7.00 g |
| 1,5-Pentanediol | 7.00 g |
| 2-Pyrrolidone | 5.00 g |
| Surfactant | 0.50 g |

Comparative Example 50

Preparation of Comparative Cyan Dye Ink Composition 50

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a comparative cyan dye ink composition 50 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-7) | 1.07 g |
| Cyan dye (mixture of P-34-1 to P-34-2) | 1.60 g |
| Cyan dye (P-59) | 1.07 g |
| Cyan dye (C-1) | 0.26 g |
| Preservative | 0.11 g |
| Glycerin | 7.00 g |
| Ethylene urea | 7.00 g |
| 1,5-Pentanediol | 7.00 g |
| 2-Pyrrolidone | 5.00 g |
| Surfactant | 0.50 g |

Comparative Example 51

Preparation of Comparative Cyan Dye Ink Composition 51

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a comparative cyan dye ink composition 51 (100 g). Subsequently, the dye concentration in the ink composition was quantitatively analyzed by performing the same operation as in Example 1. According to the result, the dye solid-content concentration was 5% by mass.

| | |
|---|---|
| Cyan dye (P-5) | 2.11 g |
| Cyan dye (mixture of P-32-1 to P-32-4) | 1.05 g |
| Cyan dye (mixture of P-45-1 to P-45-4) | 0.24 g |
| Cyan dye (C-1) | 1.59 g |
| Preservative | 0.11 g |
| Glycerin | 7.00 g |
| Ethylene urea | 7.00 g |
| 1,5-Pentanediol | 7.00 g |
| 2-Pyrrolidone | 5.00 g |
| Surfactant | 0.50 g |

Comparative Example 52

Preparation of Comparative Cyan Dye Ink Composition 52

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous sodium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a comparative cyan dye ink composition 52 (100 g). Subsequently, the dye concentration in the ink composition was quantitatively analyzed by performing the same operation as in Example 1. According to the result, the dye solid-content concentration was 5% by mass.

| | |
|---|---|
| Cyan dye (P-11) | 2.11 g |
| Cyan dye (mixture of P-36-1 to P-36-4) | 1.05 g |
| Cyan dye (mixture of P-46-1 to P-46-4) | 0.24 g |
| Cyan dye (C-12) | 1.59 g |
| Preservative | 0.11 g |
| Glycerin | 7.00 g |
| Ethylene urea | 7.00 g |
| 1,5-Pentanediol | 7.00 g |
| 2-Pyrrolidone | 5.00 g |
| Surfactant | 0.50 g |

Comparative Example 53

Preparation of Comparative Cyan Dye Ink Composition 53

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a comparative cyan dye ink composition 53 (100 g). Subsequently, the dye concentration in the ink composition was quantitatively analyzed by performing the same operation as in Example 1. According to the result, the dye solid-content concentration was 5% by mass.

| | |
|---|---|
| Cyan dye (P-6) | 2.11 g |
| Cyan dye (mixture of P-33-1 to P-33-4) | 1.05 g |
| Cyan dye (mixture of P-47-1 to P-47-4) | 0.24 g |
| Cyan dye (C-1) | 1.59 g |
| Preservative | 0.11 g |
| Glycerin | 7.00 g |
| Ethylene urea | 7.00 g |
| 1,5-Pentanediol | 7.00 g |
| 2-Pyrrolidone | 5.00 g |
| Surfactant | 0.50 g |

Comparative Example 54

Preparation of Comparative Cyan Dye Ink Composition 54

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous sodium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a comparative cyan dye ink composition 54 (100 g). Subsequently, the dye concentration in the ink composition was quantitatively analyzed by performing the same operation as in Example 1. According to the result, the dye solid-content concentration was 5% by mass.

| | |
|---|---|
| Cyan dye (P-12) | 2.11 g |
| Cyan dye (mixture of P-38-1 to P-38-4) | 1.05 g |
| Cyan dye (mixture of P-48-1 to P-48-4) | 0.24 g |
| Cyan dye (C-12) | 1.59 g |
| Preservative | 0.11 g |
| Glycerin | 7.00 g |
| Ethylene urea | 7.00 g |
| 1,5-Pentanediol | 7.00 g |
| 2-Pyrrolidone | 5.00 g |
| Surfactant | 0.50 g |

Comparative Example 55

Preparation of Comparative Cyan Dye Ink Composition 55

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 µm, and the filtration device was then washed with 10 g of deionized water to collect an ink residue. Ten grams of the deionized water used for collecting the ink residue was added to 90 g of the mixture that had been previously filtered to prepare a comparative cyan dye ink composition 55 (100 g). Subsequently, the dye concentration in the ink composition was quantitatively analyzed by performing the same operation as in Example 1. According to the result, the dye solid-content concentration was 5% by mass.

| | |
|---|---|
| Cyan dye (P-7) | 2.11 g |
| Cyan dye (mixture of P-34-1 to P-34-2) | 1.05 g |
| Cyan dye (P-59) | 0.24 g |
| Cyan dye (C-1) | 1.59 g |
| Preservative | 0.11 g |
| Glycerin | 7.00 g |
| Ethylene urea | 7.00 g |
| 1,5-Pentanediol | 7.00 g |
| 2-Pyrrolidone | 5.00 g |
| Surfactant | 0.50 g |

Comparative Example 56

Preparation of Comparative Cyan Dye Ink Composition 56

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 µm, and the filtration device was then washed with 10 g of deionized water to collect an ink residue. Ten grams of the deionized water used for collecting the ink residue was added to 90 g of the mixture that had been previously filtered to prepare a comparative cyan dye ink composition 56 (100 g). Subsequently, the dye concentration in the ink composition was quantitatively analyzed by performing the same operation as in Example 1. According to the result, the dye solid-content concentration was 3% by mass.

| | |
|---|---|
| Cyan dye (P-5) | 1.27 g |
| Cyan dye (mixture of P-32-1 to P-32-4) | 0.64 g |
| Cyan dye (mixture of P-45-1 to P-45-4) | 0.13 g |
| Cyan dye (C-1) | 0.96 g |
| Preservative | 0.11 g |
| Glycerin | 7.00 g |
| Ethylene urea | 7.00 g |
| 1,5-Pentanediol | 7.00 g |
| 2-Pyrrolidone | 5.00 g |
| Surfactant | 0.50 g |

Comparative Example 57

Preparation of Comparative Cyan Dye Ink Composition 57

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous sodium hydroxide solution, filtration was performed under reduced pressure with a microfilter having an average pore size of 0.25 µm, and the filtration device was then washed with 10 g of deionized water to collect an ink residue. Ten grams of the deionized water used for collecting the ink residue was added to 90 g of the mixture that had been previously filtered to prepare a comparative cyan dye ink composition 57 (100 g). Subsequently, the dye concentration in the ink composition was quantitatively analyzed by performing the same operation as in Example 1. According to the result, the dye solid-content concentration was 3% by mass.

| | |
|---|---|
| Cyan dye (P-11) | 1.27 g |
| Cyan dye (mixture of P-36-1 to P-36-4) | 0.64 g |
| Cyan dye (mixture of P-46-1 to P-46-4) | 0.13 g |
| Cyan dye (C-12) | 0.96 g |
| Preservative | 0.11 g |
| Glycerin | 7.00 g |
| Ethylene urea | 7.00 g |
| 1,5-Pentanediol | 7.00 g |
| 2-Pyrrolidone | 5.00 g |
| Surfactant | 0.50 g |

Comparative Example 58

Preparation of Comparative Cyan Dye Ink Composition 58

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 µm, and the filtration device was then washed with 10 g of deionized water to collect an ink residue. Ten grams of the deionized water used for collecting the ink residue was added to 90 g of the mixture that had been previously filtered to prepare a comparative cyan dye ink composition 58 (100 g). Subsequently, the dye concentration in the ink composition was quantitatively analyzed by performing the same operation as in Example 1. According to the result, the dye solid-content concentration was 3% by mass.

| | |
|---|---|
| Cyan dye (P-6) | 1.27 g |
| Cyan dye (mixture of P-33-1 to P-33-4) | 0.64 g |
| Cyan dye (mixture of P-47-1 to P-47-4) | 0.13 g |
| Cyan dye (C-1) | 0.96 g |
| Preservative | 0.11 g |
| Glycerin | 7.00 g |
| Ethylene urea | 7.00 g |
| 1,5-Pentanediol | 7.00 g |
| 2-Pyrrolidone | 5.00 g |
| Surfactant | 0.50 g |

Comparative Example 59

Preparation of Comparative Cyan Dye Ink Composition 59

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous sodium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a comparative cyan dye ink composition 59 (100 g). Subsequently, the dye concentration in the ink composition was quantitatively analyzed by performing the same operation as in Example 1. According to the result, the dye solid-content concentration was 3% by mass.

| | |
|---|---|
| Cyan dye (P-12) | 1.27 g |
| Cyan dye (mixture of P-38-1 to P-38-4) | 0.64 g |
| Cyan dye (mixture of P-48-1 to P-48-4) | 0.13 g |
| Cyan dye (C-12) | 0.96 g |
| Preservative | 0.11 g |
| Glycerin | 7.00 g |
| Ethylene urea | 7.00 g |
| 1,5-Pentanediol | 7.00 g |
| 2-Pyrrolidone | 5.00 g |
| Surfactant | 0.50 g |

Comparative Example 60

Preparation of Comparative Cyan Dye Ink Composition 60

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a comparative cyan dye ink composition 60 (100 g). Subsequently, the dye concentration in the ink composition was quantitatively analyzed by performing the same operation as in Example 1. According to the result, the dye solid-content concentration was 3% by mass.

| | |
|---|---|
| Cyan dye (P-7) | 1.27 g |
| Cyan dye (mixture of P-34-1 to P-34-2) | 0.64 g |
| Cyan dye (P-59) | 0.13 g |
| Cyan dye (C-1) | 0.96 g |
| Preservative | 0.11 g |
| Glycerin | 7.00 g |
| Ethylene urea | 7.00 g |
| 1,5-Pentanediol | 7.00 g |
| 2-Pyrrolidone | 5.00 g |
| Surfactant | 0.50 g |

Comparative Example 61

Preparation of Comparative Cyan Dye Ink Composition 61

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a comparative cyan dye ink composition 61 (100 g). Subsequently, the dye concentration in the ink composition was quantitatively analyzed by performing the same operation as in Example 1. According to the result, the dye solid-content concentration was 4% b mass.

| | |
|---|---|
| Cyan dye (P-18) | 1.69 g |
| Cyan dye (mixture of P-41-1 to P-41-4) | 0.85 g |
| Cyan dye (mixture of P-53-1 to P-53-4) | 0.19 g |
| Cyan dye (C-10) | 1.27 g |
| Preservative | 0.11 g |
| Glycerin | 7.00 g |
| Ethylene urea | 7.00 g |
| 1,5-Pentanediol | 7.00 g |
| 2-Pyrrolidone | 5.00 g |
| Surfactant | 0.50 g |

Comparative Example 62

Preparation of Comparative Cyan Dye Ink Composition 62

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a comparative cyan dye ink composition 62 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-19) | 1.69 g |
| Cyan dye (mixture of P-42-1 to P-42-4) | 0.85 g |
| Cyan dye (mixture of P-55-1 to P-55-4) | 0.19 g |
| Cyan dye (C-10) | 1.27 g |
| Preservative | 0.11 g |
| Glycerin | 7.00 g |
| Ethylene urea | 7.00 g |
| 1,5-Pentanediol | 7.00 g |
| 2-Pyrrolidone | 5.00 g |
| Surfactant | 0.50 g |

Comparative Example 63

Preparation of Comparative Cyan Dye Ink Composition 63

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a comparative cyan dye ink composition 63 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-20) | 1.69 g |
| Cyan dye (mixture of P-43-1 to P-43-4) | 0.85 g |
| Cyan dye (mixture of P-57-1 to P-57-4) | 0.19 g |
| Cyan dye (C-11) | 1.27 g |
| Preservative | 0.11 g |
| Glycerin | 7.00 g |
| Ethylene urea | 7.00 g |
| 1,5-Pentanediol | 7.00 g |
| 2-Pyrrolidone | 5.00 g |
| Surfactant | 0.50 g |

Comparative Example 64

Preparation of Comparative Cyan Dye Ink Composition 64

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a comparative cyan dye ink composition 64 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-22) | 1.69 g |
| Cyan dye (mixture of P-39-1 to P-39-4) | 0.85 g |
| Cyan dye (mixture of P-49-1 to P-49-4) | 0.19 g |
| Cyan dye (C-16) | 1.27 g |
| Preservative | 0.11 g |
| Glycerin | 7.00 g |
| Ethylene urea | 7.00 g |
| 1,5-Pentanediol | 7.00 g |
| 2-Pyrrolidone | 5.00 g |
| Surfactant | 0.50 g |

Comparative Example 65

Preparation of Comparative Cyan Dye Ink Composition 65

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a comparative cyan dye ink composition 65 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (P-23) | 1.69 g |
| Cyan dye (mixture of P-40-1 to P-40-4) | 0.85 g |
| Cyan dye (mixture of P-51-1 to P-51-4) | 0.19 g |
| Cyan dye (C-16) | 1.27 g |
| Preservative | 0.11 g |
| Glycerin | 7.00 g |
| Ethylene urea | 7.00 g |
| 1,5-Pentanediol | 7.00 g |
| 2-Pyrrolidone | 5.00 g |
| Surfactant | 0.50 g |

Comparative Example 66

Preparation of Comparative Cyan Dye Ink Composition 66

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous sodium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a comparative cyan dye ink composition 66 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (C.I. Acid Blue 9) | 4.00 g |
| Preservative | 0.11 g |
| Glycerin | 7.00 g |
| Ethylene urea | 7.00 g |
| 1,5-Pentanediol | 7.00 g |
| 2-Pyrrolidone | 5.00 g |
| Surfactant | 0.50 g |

Comparative Example 67

Preparation of Comparative Cyan Dye Ink Composition 67

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous sodium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a comparative cyan dye ink composition 67 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (C.I. Acid Blue 9) | 4.00 g |
| Additive (A-3) | 1.00 g |
| Preservative | 0.11 g |
| Glycerin | 7.00 g |
| Ethylene urea | 7.00 g |
| 1,5-Pentanediol | 7.00 g |
| 2-Pyrrolidone | 5.00 g |
| Surfactant | 0.50 g |

Comparative Example 68

Preparation of Comparative Cyan Dye Ink Composition 68

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous sodium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a comparative cyan dye ink composition 68 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (C.I. Acid Blue 9) | 3.60 g |
| Cyan dye (C-42) | 0.40 g |
| Additive (A-3) | 1.00 g |
| Preservative | 0.11 g |
| Glycerin | 7.00 g |

-continued

| | |
|---|---|
| Ethylene urea | 7.00 g |
| 1,5-Pentanediol | 7.00 g |
| 2-Pyrrolidone | 5.00 g |
| Surfactant | 0.50 g |

Comparative Example 69

Preparation of Comparative Cyan Dye Ink Composition 69

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a comparative cyan dye ink composition 69 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (C.I. Acid Blue 9) | 3.60 g |
| Cyan dye (C-41) | 0.40 g |
| Additive (A-4) | 1.00 g |
| Preservative | 0.11 g |
| Glycerin | 7.00 g |
| Ethylene urea | 7.00 g |
| 1,5-Pentanediol | 7.00 g |
| 2-Pyrrolidone | 5.00 g |
| Surfactant | 0.50 g |

Comparative Example 70

Preparation of Comparative Cyan Dye Ink Composition 70

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous sodium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a comparative cyan dye ink composition 70 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (C.I. Acid Blue 9) | 3.60 g |
| Cyan dye (C-12) | 0.20 g |
| Cyan dye (C-42) | 0.20 g |
| Additive (A-3) | 1.00 g |
| Preservative | 0.11 g |
| Glycerin | 7.00 g |

| | |
|---|---|
| Ethylene urea | 7.00 g |
| 1,5-Pentanediol | 7.00 g |
| 2-Pyrrolidone | 5.00 g |
| Surfactant | 0.50 g |

Comparative Example 71

Preparation of Comparative Cyan Dye Ink Composition 71

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous sodium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a comparative cyan dye ink composition 71 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (C.I. Direct Blue 199) | 4.00 g |
| Preservative | 0.11 g |
| Glycerin | 7.00 g |
| Ethylene urea | 7.00 g |
| 1,5-Pentanediol | 7.00 g |
| 2-Pyrrolidone | 5.00 g |
| Surfactant | 0.50 g |

Comparative Example 72

Preparation of Comparative Cyan Dye Ink Composition 72

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous sodium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a comparative cyan dye ink composition 72 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (C.I. Direct Blue 199) | 4.00 g |
| Additive (A-3) | 1.00 g |
| Preservative | 0.11 g |
| Glycerin | 7.00 g |
| Ethylene urea | 7.00 g |
| 1,5-Pentanediol | 7.00 g |

| | |
|---|---|
| 2-Pyrrolidone | 5.00 g |
| Surfactant | 0.50 g |

Comparative Example 73

Preparation of Comparative Cyan Dye Ink Composition 73

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous sodium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a comparative cyan dye ink composition 73 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (C.I. Direct Blue 199) | 3.60 g |
| Cyan dye (C-42) | 0.40 g |
| Additive (A-3) | 1.00 g |
| Preservative | 0.11 g |
| Glycerin | 7.00 g |
| Ethylene urea | 7.00 g |
| 1,5-Pentanediol | 7.00 g |
| 2-Pyrrolidone | 5.00 g |
| Surfactant | 0.50 g |

Comparative Example 74

Preparation of Comparative Cyan Dye Ink Composition 74

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a comparative cyan dye ink composition 74 (100 g). Subsequently, the dye concentration in the ink composition was quantitatively analyzed by performing the same operation as in Example 1. According to the result, the dye solid-content concentration was 4% b mass.

| | |
|---|---|
| Cyan dye (C.I. Direct Blue 199) | 3.60 g |
| Cyan dye (C-41) | 0.40 g |
| Additive (A-4) | 1.00 g |
| Preservative | 0.11 g |
| Glycerin | 7.00 g |
| Ethylene urea | 7.00 g |
| 1,5-Pentanediol | 7.00 g |
| 2-Pyrrolidone | 5.00 g |
| Surfactant | 0.50 g |

Comparative Example 75

Preparation of Comparative Cyan Dye Ink Composition 75

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous sodium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a comparative cyan dye ink composition 75 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (C.I. Direct Blue 199) | 3.60 g |
| Cyan dye (C-12) | 0.20 g |
| Cyan dye (C-42) | 0.20 g |
| Additive (A-3) | 1.00 g |
| Preservative | 0.11 g |
| Glycerin | 7.00 g |
| Ethylene urea | 7.00 g |
| 1,5-Pentanediol | 7.00 g |
| 2-Pyrrolidone | 5.00 g |
| Surfactant | 0.50 g |

Comparative Example 76

Preparation of Comparative Cyan Dye Ink Composition 76

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous sodium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a comparative cyan dye ink composition 76 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (C.I. Acid Blue 9) | 2.00 g |
| Cyan dye (C.I. Direct Blue 199) | 2.00 g |
| Preservative | 0.11 g |
| Glycerin | 7.00 g |
| Ethylene urea | 7.00 g |
| 1,5-Pentanediol | 7.00 g |
| 2-Pyrrolidone | 5.00 g |
| Surfactant | 0.50 g |

Comparative Example 77

Preparation of Comparative Cyan Dye Ink Composition 77

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous sodium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a comparative cyan dye ink composition 77 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (C.I. Acid Blue 9) | 2.00 g |
| Cyan dye (C.I. Direct Blue 199) | 2.00 g |
| Additive (A-3) | 1.00 g |
| Preservative | 0.11 g |
| Glycerin | 7.00 g |
| Ethylene urea | 7.00 g |
| 1,5-Pentanediol | 7.00 g |
| 2-Pyrrolidone | 5.00 g |
| Surfactant | 0.50 g |

Comparative Example 78

Preparation of Comparative Cyan Dye Ink Composition 78

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous sodium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a comparative cyan dye ink composition 78 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (C.I. Acid Blue 9) | 1.80 g |
| Cyan dye (C.I. Direct Blue 199) | 1.80 g |
| Cyan dye (C-42) | 0.40 g |
| Additive (A-3) | 1.00 g |
| Preservative | 0.11 g |
| Glycerin | 7.00 g |
| Ethylene urea | 7.00 g |
| 1,5-Pentanediol | 7.00 g |
| 2-Pyrrolidone | 5.00 g |
| Surfactant | 0.50 g |

Comparative Example 79

Preparation of Comparative Cyan Dye Ink Composition 79

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous sodium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a comparative cyan dye ink composition 79 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (C.I. Acid Blue 9) | 1.80 g |
| Cyan dye (C.I. Direct Blue 199) | 1.80 g |
| Cyan dye (C-12) | 0.20 g |
| Cyan dye (C-42) | 0.20 g |
| Additive (A-3) | 1.00 g |
| Preservative | 0.11 g |
| Glycerin | 7.00 g |
| Ethylene urea | 7.00 g |
| 1,5-Pentanediol | 7.00 g |
| 2-Pyrrolidone | 5.00 g |
| Surfactant | 0.50 g |

Comparative Example 80

Preparation of Comparative Cyan Dye Ink Composition 80

Deionized water was added to a mixture including components below in the corresponding amounts below up to a total weight of 90 g, and the resulting mixture was then stirred for one hour under heating at 30° C. to 40° C. Subsequently, the pH was adjusted to 9.0 with a 10 mol/L aqueous lithium hydroxide solution, filtration was performed under reduced pressure with a microfilter having an average pore size of 0.25 μm, and the filtration device was then washed with 10 g of deionized water to collect an ink residue. Ten grams of the deionized water used for collecting the ink residue was added to 90 g of the mixture that had been previously filtered to prepare a comparative cyan dye ink composition 80 (100 g). Subsequently, the dye concentration in the ink composition was quantitatively analyzed by performing the same operation as in Example 1. According to the result, the dye solid-content concentration was 4% by mass.

| | |
|---|---|
| Cyan dye (C.I. Acid Blue 9) | 1.80 g |
| Cyan dye (C.I. Direct Blue 199) | 1.80 g |
| Cyan dye (C-1) | 0.20 g |
| Cyan dye (C-41) | 0.20 g |
| Additive (A-4) | 1.00 g |
| Preservative | 0.11 g |
| Glycerin | 7.00 g |
| Ethylene urea | 7.00 g |
| 1,5-Pentanediol | 7.00 g |
| 2-Pyrrolidone | 5.00 g |
| Surfactant | 0.50 g |

Image Recording and Evaluation

Image recording was performed as follows by using the cyan dye ink compositions prepared above, and the evaluation was performed. In each of Examples and Comparative Examples, the image recording was performed with a combination of the following ink jet printer and recording paper, and a practical test was performed.

In each of Examples and Comparative Examples, a cyan single-color image was formed by using each cyan dye ink composition alone.

Each of the cyan dye ink compositions of Examples 1 to 70, 102 to 104, 108 to 109, and 111 to 120 and Comparative Examples 1 to 40 was loaded in an ink cartridge, and images that were recorded on photo paper (ink jet paper) (Photo Paper <Glossy> manufactured by SEIKO EPSON CORPORATION) and plain paper (Xerox P paper: manufactured by Fuji Xerox Co., Ltd.) with an ink jet printer (PM-700C; manufactured by SEIKO EPSON CORPORATION) were evaluated.

Each of the cyan dye ink compositions of Examples 71 to 101, 105 to 107, 110, and 121 to 130 and Comparative Examples 41 to 80 was loaded in an ink cartridge, and images that were recorded on ink jet paper (Photo Glossy Paper PT-201; manufactured by Canon Inc.) and plain paper (Xerox P paper: manufactured by Fuji Xerox Co., Ltd.) with an ink jet printer (PIXUS Pro9000 MkII; manufactured by Canon Inc.) were evaluated.

Printing Density (Color Developability)

A solid image (an image printed at an applied voltage of 100%) was recorded by using each cyan dye ink composition with the combination of the ink jet printer and recording paper described above.

The printing density of the formed solid image was measured with a reflection densitometer (trade name: X-Rite 310TR, manufactured by X-Rite Inc.). Each cyan single-color image was evaluated in the following four grades in terms of printing density (optical density) determined when a red filter was used.

(Ink Jet Paper)
A: 2.0 or more
B: 1.8 or more and less than 2.0
C: 1.7 or more and less than 1.8
D: less than 1.7

(Plain Paper)
A: 0.90 or more
B: 0.85 or more and less than 0.90
C: 0.80 or more and less than 0.85
D: less than 0.80

Ozone Resistance

While dry air was passed through two coaxial glass tubes of a Siemens ozonizer, an alternating voltage of 5 kV was applied to provide an ozone gas concentration of 10±0.1 ppm (parts per million) in a box serving as a dark place at room temperature (23° C.; relative humidity 50%). Paper on which an image was formed was left to stand in the box for five days. The image density of the image after being left to stand in ozone gas was measured with a reflection densitometer (trade name: X-Rite 310TR, manufactured by X-Rite Inc.). A colorant residual ratio was calculated from the initial image density Ci and the image density Cf2 after being left to stand in ozone gas, and the evaluation was performed. The colorant residual ratio was measured on an image portion having an initial image density of 1.0±0.2. The ozone gas concentration in the box was controlled by using an ozone gas monitor (model: OZG-EM-01) manufactured by APPLICS Co., Ltd.

A red filter used for measurement of a cyan image density was used. The colorant residual ratio was determined by the following formula, and ozone resistance was evaluated in accordance with the determination criteria below.

$$\text{Colorant residual ratio (\%)}=(Cf2/Ci)\times 100$$

AA: The colorant residual ratio is 85% or more and less than 95%.

A: The colorant residual ratio is 80% or more and less than 85%.

B: The colorant residual ratio is 75% or more and less than 80%.

C: The colorant residual ratio is 70% or more and less than 75%.

D: The colorant residual ratio is less than 70%.

Light Resistance

The image density Ci immediately after recording was measured. Subsequently, the image was irradiated with xenon light (100 klux, 23° C., relative humidity 50%; SC37 filter that cuts off wavelengths of 370 nm or less was used in combination) for 28 days by using a weather meter (Atlas C. 165). The image density Cf1 was then measured again. The colorant residual ratio was calculated from the image densities before and after the irradiation with xenon light, and the evaluation was performed. The image density was measured with a reflection densitometer (trade name: X-Rite 310TR, manufactured by X-Rite Inc.). The colorant residual ratio was measured on an image portion having an initial image density of 1.0±0.2.

A red filter used for measurement of a cyan image density was used. The colorant residual ratio was determined by the following formula, and light resistance was evaluated in accordance with the determination criteria below.

$$\text{Colorant residual ratio (\%)}=(Cf1/Ci)\times 100$$

A: The colorant residual ratio is 90% or more and less than 95%.

B: The colorant residual ratio is 80% or more and less than 90%.

C: The colorant residual ratio is 70% or more and less than 80%.

D: The colorant residual ratio is less than 70%.

The results of Examples are shown in Tables 1 to 4 below, and the results of Comparative Examples are shown in Tables 5 and 6.

TABLE 1

| | Printing density | | Ozone resistance | Light resistance |
|---|---|---|---|---|
| | Plain paper | Ink jet paper | | |
| Example 1 | B | A | AA | A |
| Example 2 | B | A | AA | A |
| Example 3 | B | A | AA | A |
| Example 4 | B | A | AA | A |
| Example 5 | B | A | AA | A |
| Example 6 | B | A | AA | A |
| Example 7 | B | A | AA | A |
| Example 8 | B | A | AA | A |
| Example 9 | B | A | AA | A |
| Example 10 | B | A | AA | A |
| Example 11 | A | A | A | A |
| Example 12 | A | A | A | A |
| Example 13 | A | A | A | A |
| Example 14 | A | A | A | A |
| Example 15 | A | A | A | A |
| Example 16 | A | A | A | A |
| Example 17 | A | A | A | A |
| Example 18 | A | A | A | A |
| Example 19 | A | A | A | A |
| Example 20 | A | A | A | A |

TABLE 1-continued

| | Printing density | | Ozone resistance | Light resistance |
|---|---|---|---|---|
| | Plain paper | Ink jet paper | | |
| Example 21 | B | A | AA | A |
| Example 22 | B | A | AA | A |
| Example 23 | B | A | AA | A |
| Example 24 | B | A | AA | A |
| Example 25 | B | A | AA | A |
| Example 26 | A | A | AA | A |
| Example 27 | A | A | AA | A |
| Example 28 | A | A | AA | A |
| Example 29 | A | A | AA | A |
| Example 30 | A | A | AA | A |
| Example 31 | A | A | A | A |
| Example 32 | A | A | A | A |
| Example 33 | A | A | A | A |
| Example 34 | A | A | A | A |
| Example 35 | A | A | A | A |
| Example 36 | A | A | A | A |
| Example 37 | A | A | A | A |
| Example 38 | A | A | A | A |
| Example 39 | A | A | AA | A |
| Example 40 | A | A | AA | A |

TABLE 2

| | Printing density | | Ozone resistance | Light resistance |
|---|---|---|---|---|
| | Plain paper | Ink jet paper | | |
| Example 41 | B | B | AA | A |
| Example 42 | B | B | AA | A |
| Example 43 | B | B | AA | A |
| Example 44 | B | B | AA | A |
| Example 45 | B | B | AA | A |
| Example 46 | B | B | AA | A |
| Example 47 | B | B | AA | A |
| Example 48 | B | B | AA | A |
| Example 49 | B | B | AA | A |
| Example 50 | B | B | AA | A |
| Example 51 | A | A | A | A |
| Example 52 | A | A | A | A |
| Example 53 | A | A | A | A |
| Example 54 | A | A | A | A |
| Example 55 | A | A | A | A |
| Example 56 | A | A | B | B |
| Example 57 | A | A | B | B |
| Example 58 | A | A | B | B |
| Example 59 | A | A | B | A |
| Example 60 | A | A | B | A |
| Example 61 | A | A | B | B |
| Example 62 | A | A | B | B |
| Example 63 | A | A | B | B |
| Example 64 | A | A | B | B |
| Example 65 | A | A | B | B |
| Example 66 | B | A | B | A |
| Example 67 | B | A | B | A |
| Example 68 | B | A | B | A |
| Example 69 | B | A | B | A |
| Example 70 | B | A | B | A |
| Example 71 | B | A | AA | A |
| Example 72 | B | A | AA | A |
| Example 73 | B | A | AA | A |
| Example 74 | B | A | AA | A |
| Example 75 | B | A | AA | A |
| Example 76 | B | A | AA | A |
| Example 77 | B | A | AA | A |
| Example 78 | B | A | AA | A |
| Example 79 | B | A | AA | A |
| Example 80 | B | A | AA | A |

TABLE 3

| | Printing density | | Ozone resistance | Light resistance |
|---|---|---|---|---|
| | Plain paper | | Ink jet paper | |
| Example 81 | A | A | B | B |
| Example 82 | A | A | B | B |
| Example 83 | A | A | B | B |
| Example 84 | A | A | B | B |
| Example 85 | A | A | B | B |
| Example 86 | A | A | B | B |
| Example 87 | A | A | B | B |
| Example 88 | A | A | B | B |
| Example 89 | A | A | B | B |
| Example 90 | A | A | B | B |
| Example 91 | B | A | B | A |
| Example 92 | B | A | B | A |
| Example 93 | B | A | B | A |
| Example 94 | B | A | B | A |
| Example 95 | B | A | B | A |
| Example 96 | B | A | AA | A |
| Example 97 | B | A | AA | A |
| Example 98 | B | A | AA | A |
| Example 99 | B | A | AA | A |
| Example 100 | B | A | AA | A |
| Example 101 | B | A | AA | A |
| Example 102 | A | A | AA | A |
| Example 103 | A | A | AA | A |
| Example 104 | A | A | AA | A |
| Example 105 | A | A | AA | A |
| Example 106 | A | A | AA | A |
| Example 107 | A | A | AA | A |
| Example 108 | B | A | AA | B |
| Example 109 | A | A | AA | B |
| Example 110 | B | A | AA | B |
| Example 111 | A | A | AA | A |
| Example 112 | A | A | AA | A |
| Example 113 | A | A | AA | A |
| Example 114 | A | A | AA | A |
| Example 115 | A | A | AA | A |
| Example 116 | A | A | A | A |
| Example 117 | A | A | A | A |
| Example 118 | A | A | A | A |
| Example 119 | A | A | AA | A |
| Example 120 | A | A | AA | A |

TABLE 4

| | Printing density | | Ozone resistance | Light resistance |
|---|---|---|---|---|
| | Plain paper | | Ink jet paper | |
| Example 121 | A | A | AA | A |
| Example 122 | A | A | AA | A |
| Example 123 | A | A | AA | A |
| Example 124 | A | A | AA | A |
| Example 125 | A | A | AA | A |
| Example 126 | A | A | A | A |
| Example 127 | A | A | A | A |
| Example 128 | A | A | A | A |
| Example 129 | A | A | AA | A |
| Example 130 | A | A | AA | A |

TABLE 5

| | Printing density | | Ozone resistance | Light resistance |
|---|---|---|---|---|
| | Plain paper | | Ink jet paper | |
| Comparative Example 1 | C | A | A | A |
| Comparative Example 2 | C | A | A | A |
| Comparative Example 3 | C | A | A | A |
| Comparative Example 4 | C | A | A | A |

TABLE 5-continued

| | Printing density | | Ozone resistance | Light resistance |
|---|---|---|---|---|
| | Plain paper | | Ink jet paper | |
| Comparative Example 5 | C | A | A | A |
| Comparative Example 6 | C | A | A | A |
| Comparative Example 7 | C | A | A | A |
| Comparative Example 8 | C | A | A | A |
| Comparative Example 9 | C | A | A | A |
| Comparative Example 10 | C | A | A | A |
| Comparative Example 11 | C | A | A | A |
| Comparative Example 12 | C | A | A | A |
| Comparative Example 13 | C | A | A | A |
| Comparative Example 14 | C | A | A | A |
| Comparative Example 15 | C | A | A | A |
| Comparative Example 16 | D | A | A | A |
| Comparative Example 17 | D | A | A | A |
| Comparative Example 18 | D | A | A | A |
| Comparative Example 19 | D | A | A | A |
| Comparative Example 20 | D | A | A | A |
| Comparative Example 21 | C | A | A | A |
| Comparative Example 22 | C | A | A | A |
| Comparative Example 23 | C | A | A | A |
| Comparative Example 24 | C | A | A | A |
| Comparative Example 25 | C | A | A | A |
| Comparative Example 26 | A | A | D | D |
| Comparative Example 27 | A | A | D | D |
| Comparative Example 28 | A | A | D | D |
| Comparative Example 29 | A | A | D | D |
| Comparative Example 30 | A | A | D | D |
| Comparative Example 31 | B | A | C | A |
| Comparative Example 32 | B | A | C | A |
| Comparative Example 33 | A | A | C | A |
| Comparative Example 34 | A | A | C | A |
| Comparative Example 35 | B | A | C | A |
| Comparative Example 36 | A | A | D | D |
| Comparative Example 37 | A | A | D | D |
| Comparative Example 38 | A | A | D | D |
| Comparative Example 39 | A | A | D | D |
| Comparative Example 40 | A | A | D | D |

TABLE 6

| | Printing density | | Ozone resistance | Light resistance |
|---|---|---|---|---|
| | Plain paper | | Ink jet paper | |
| Comparative Example 41 | C | A | A | A |
| Comparative Example 42 | C | A | A | A |
| Comparative Example 43 | C | A | A | A |
| Comparative Example 44 | C | A | A | A |
| Comparative Example 45 | C | A | A | A |
| Comparative Example 46 | C | A | A | A |
| Comparative Example 47 | C | A | A | A |
| Comparative Example 48 | C | A | A | A |
| Comparative Example 49 | C | A | A | A |
| Comparative Example 50 | C | A | A | A |
| Comparative Example 51 | C | A | A | A |
| Comparative Example 52 | C | A | A | A |
| Comparative Example 53 | C | A | A | A |
| Comparative Example 54 | C | A | A | A |
| Comparative Example 55 | C | A | A | A |
| Comparative Example 56 | D | A | A | A |
| Comparative Example 57 | D | A | A | A |
| Comparative Example 58 | D | A | A | A |
| Comparative Example 59 | D | A | A | A |
| Comparative Example 60 | D | A | A | A |
| Comparative Example 61 | C | A | A | A |
| Comparative Example 62 | C | A | A | A |
| Comparative Example 63 | C | A | A | A |
| Comparative Example 64 | C | A | A | A |
| Comparative Example 65 | C | A | A | A |
| Comparative Example 66 | A | A | D | D |
| Comparative Example 67 | A | A | D | D |
| Comparative Example 68 | A | A | D | D |

TABLE 6-continued

| | Printing density | | Ozone resistance | Light resistance |
|---|---|---|---|---|
| | Plain paper | | Ink jet paper | |
| Comparative Example 69 | A | A | D | D |
| Comparative Example 70 | A | A | D | D |
| Comparative Example 71 | B | A | C | A |
| Comparative Example 72 | B | A | C | A |
| Comparative Example 73 | A | A | C | A |
| Comparative Example 74 | A | A | C | A |
| Comparative Example 75 | B | A | C | A |
| Comparative Example 76 | A | A | D | D |
| Comparative Example 77 | A | A | D | D |
| Comparative Example 78 | A | A | D | D |
| Comparative Example 79 | A | A | D | D |
| Comparative Example 80 | A | A | D | D |

Ink Ejection Stability

Ink ejection stability was evaluated as follows. Each of the cyan dye ink compositions prepared in Examples 1 to 70, 102 to 104, 108 to 109, and 111 to 120 was loaded in an ink cartridge for an ink jet recording apparatus (trade name: PM-700C, manufactured by SEIKO EPSON CORPORATION). This cartridge was installed in the ink jet recording apparatus, and ejection of the ink from all nozzles was confirmed. Subsequently, an image was output on 100 sheets with A4 size (ink jet paper, Photo Paper <Glossy> manufactured by SEIKO EPSON CORPORATION), and the evaluation was performed in accordance with the criteria below.

Each of the cyan dye ink compositions prepared in Examples 71 to 101, 105 to 107, 110, and 121 to 130 was loaded in an ink cartridge for an ink jet recording apparatus (trade name: PIXUS Pro9000 MkII, manufactured by Canon Inc.). The cartridge was installed in the ink jet recording apparatus, and ejection of the ink from all nozzles was confirmed. Subsequently, an image was output on 100 sheets with A4 size (ink jet paper, Photo Glossy Paper PT-201; manufactured by Canon Inc.), and the evaluation was performed in accordance with the criteria below.

A: Substantially no print irregularity occurs from start to end of printing.

B: Output with print irregularity occurs at a small number of positions.

C: Output with print irregularity occurs at a large number of positions.

D: Print irregularity occurs from start to end of printing.

The test of the ink ejection stability was performed immediately after the preparation of each dye ink composition and after the dye ink composition was preserved in the ink cartridge at 40° C. and a relative humidity of 80% for 4 weeks.

In the tables below, the results obtained in the cases where a dye ink composition immediately after the preparation was used are shown in the column of “Immediately after preparation of ink”. The results obtained in the cases where the test was performed after a dye ink composition was preserved in an ink cartridge at 40° C. and a relative humidity of 80% for 4 weeks are shown in the column of “After 4-week mandatory test”.

Storage Stability

With regard to each of the cyan dye ink compositions prepared in Examples 1 to 130, the evaluation of storage stability of the ink was performed after the ink was preserved at 60° C. for 4 weeks and after the ink was preserved at 60° C. for 10 weeks, as a mandatory test.

The storage stability was evaluated in two grades. When substantially the same performance as that of the dye ink composition immediately after preparation was maintained, the dye ink composition was evaluated as A. When the performance of at least one of the evaluation items (printing density, light resistance, ozone resistance, or ejection stability) deteriorated after the mandatory test, the dye ink composition was evaluated as B.

The results of Examples are shown in Tables 7 to 9 below.

TABLE 7

| | Ink ejection stability | | Ink long-term storage stability | |
|---|---|---|---|---|
| | Immediately after preparation of ink | After 4-week mandatory test | After 4-week mandatory test | After 10-week mandatory test |
| Example 1 | A | A | A | B |
| Example 2 | A | A | A | B |
| Example 3 | A | A | A | B |
| Example 4 | A | A | A | B |
| Example 5 | A | A | A | B |
| Example 6 | A | A | A | B |
| Example 7 | A | A | A | B |
| Example 8 | A | A | A | B |
| Example 9 | A | A | A | B |
| Example 10 | A | A | A | B |
| Example 11 | A | A | A | B |
| Example 12 | A | A | A | B |
| Example 13 | A | A | A | B |
| Example 14 | A | A | A | B |
| Example 15 | A | A | A | B |
| Example 16 | A | A | A | B |
| Example 17 | A | A | A | B |
| Example 18 | A | A | A | B |
| Example 19 | A | A | A | B |
| Example 20 | A | A | A | B |
| Example 21 | A | A | A | B |
| Example 22 | A | A | A | B |
| Example 23 | A | A | A | B |
| Example 24 | A | A | A | B |
| Example 25 | A | A | A | B |
| Example 26 | A | A | A | B |
| Example 27 | A | A | A | B |
| Example 28 | A | A | A | B |
| Example 29 | A | A | A | B |
| Example 30 | A | A | A | B |
| Example 31 | A | A | A | B |
| Example 32 | A | A | A | B |
| Example 33 | A | A | A | B |
| Example 34 | A | A | A | B |
| Example 35 | A | A | A | B |
| Example 36 | A | A | A | B |
| Example 37 | A | A | A | B |
| Example 38 | A | A | A | B |
| Example 39 | A | A | A | B |
| Example 40 | A | A | A | B |
| Example 41 | A | A | A | B |
| Example 42 | A | A | A | B |
| Example 43 | A | A | A | B |
| Example 44 | A | A | A | B |
| Example 45 | A | A | A | B |
| Example 46 | A | A | A | B |
| Example 47 | A | A | A | B |
| Example 48 | A | A | A | B |
| Example 49 | A | A | A | B |
| Example 50 | A | A | A | B |

TABLE 8

| | Ink ejection stability | | Ink long-term storage stability | |
|---|---|---|---|---|
| | Immediately after preparation of ink | After 4-week mandatory test | After 4-week mandatory lest | After 10-week mandatory test |
| Example 51 | A | A | A | B |
| Example 52 | A | A | A | B |
| Example 53 | A | A | A | B |
| Example 54 | A | A | A | B |
| Example 55 | A | A | A | B |
| Example 56 | A | A | A | B |
| Example 57 | A | A | A | B |
| Example 58 | A | A | A | B |
| Example 59 | A | A | A | B |
| Example 60 | A | A | A | B |
| Example 61 | A | A | A | B |
| Example 62 | A | A | A | B |
| Example 63 | A | A | A | B |
| Example 64 | A | A | A | B |
| Example 65 | A | A | A | B |
| Example 66 | A | A | A | B |
| Example 67 | A | A | A | B |
| Example 68 | A | A | A | B |
| Example 69 | A | A | A | B |
| Example 70 | A | A | A | B |
| Example 71 | A | A | A | B |
| Example 72 | A | A | A | B |
| Example 73 | A | A | A | B |
| Example 74 | A | A | A | B |
| Example 75 | A | A | A | B |
| Example 76 | A | A | A | B |
| Example 77 | A | A | A | B |
| Example 78 | A | A | A | B |
| Example 79 | A | A | A | B |
| Example 80 | A | A | A | B |
| Example 81 | A | A | A | B |
| Example 82 | A | A | A | B |
| Example 83 | A | A | A | B |
| Example 84 | A | A | A | B |
| Example 85 | A | A | A | B |
| Example 86 | A | A | A | B |
| Example 87 | A | A | A | B |
| Example 88 | A | A | A | B |
| Example 89 | A | A | A | B |
| Example 90 | A | A | A | B |
| Example 91 | A | A | A | B |
| Example 92 | A | A | A | B |
| Example 93 | A | A | A | B |
| Example 94 | A | A | A | B |
| Example 95 | A | A | A | B |
| Example 96 | A | A | A | B |
| Example 97 | A | A | A | B |
| Example 98 | A | A | A | B |
| Example 99 | A | A | A | B |
| Example 100 | A | A | A | B |

TABLE 9

| | Ink ejection stability | | Ink long-term storage stability | |
|---|---|---|---|---|
| | Immediately after preparation of ink | After 4-week mandatory test | After 4-week mandatory test | After 10-week mandatory test |
| Example 101 | A | A | A | B |
| Example 102 | A | A | A | B |
| Example 103 | A | A | A | B |
| Example 104 | A | A | A | B |
| Example 105 | A | A | A | B |
| Example 106 | A | A | A | B |
| Example 107 | A | A | A | B |
| Example 108 | A | A | A | B |
| Example 109 | A | A | A | B |
| Example 110 | A | A | A | B |

TABLE 9-continued

| | Ink ejection stability | | Ink long-term storage stability | |
|---|---|---|---|---|
| | Immediately after preparation of ink | After 4-week mandatory test | After 4-week mandatory test | After 10-week mandatory test |
| Example 111 | A | A | A | A |
| Example 112 | A | A | A | A |
| Example 113 | A | A | A | A |
| Example 114 | A | A | A | A |
| Example 115 | A | A | A | A |
| Example 116 | A | A | A | A |
| Example 117 | A | A | A | A |
| Example 118 | A | A | A | A |
| Example 119 | A | A | A | A |
| Example 120 | A | A | A | A |
| Example 121 | A | A | A | A |
| Example 122 | A | A | A | A |
| Example 123 | A | A | A | A |
| Example 124 | A | A | A | A |
| Example 125 | A | A | A | A |
| Example 126 | A | A | A | A |
| Example 127 | A | A | A | A |
| Example 128 | A | A | A | A |
| Example 129 | A | A | A | A |
| Example 130 | A | A | A | A |

The above results showed that the cyan dye ink compositions of Examples of the present invention are dye ink compositions that enable the formation of images having high printing density (color developability) on plain paper and ink jet paper and having high durability (light resistance and ozone resistance).

Moreover, the cyan dye ink compositions according to the present invention have good storage stability in long-term preservation and achieve high print quality and ejection stability of the ink after long-term preservation.

Accordingly, the dye ink compositions of Examples of the present invention had high printing density on plain paper (color developability), which served as application to documents. Furthermore, durabilities on ink jet paper (light resistance and ozone resistance of an ink jet printed article), which served as application to photographs, were achieved at a high level, and long-term preservation stability of the dye ink compositions was higher than that in the related art.

The present invention can provide a dye ink composition, a dye ink for ink jet recording, and an ink jet recording method that enable the formation of an image having high printing density (in particular, color developability on plain paper) and having high ozone resistance and high light resistance.

The present invention has been described in detail and with reference to specific embodiments. It is obvious for those skilled in the art that various changes and modifications can be made without departing from the spirit and scope of the present invention.

What is claimed is:

1. A dye ink composition comprising:

a dye represented by the following general formula (I);

water;

a compound represented by the following general formula (II); and a toning agent represented by the following general formula (Cy-2):

General formula (I)

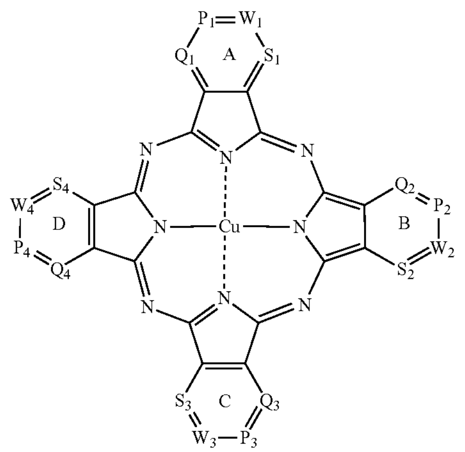

wherein, in the general formula (I), $Q_1$, $P_1$, $W_1$, $S_1$, $Q_2$, $P_2$, $W_2$, $S_2$, $Q_3$, $P_3$, $W_3$, $S_3$, $Q_4$, $P_4$, $W_4$, and $S_4$ each independently represent ═N— or ═$CR^1$—; $R^1$ represents a hydrogen atom or a substituent;

a ring A formed from $Q_1$, $P_1$, $W_1$, and $S_1$, a ring B formed from $Q_2$, $P_2$, $W_2$, and $S_2$, a ring C formed from $Q_3$, $P_3$, $W_3$, and $S_3$, and a ring D formed from $Q_4$, $P_4$, $W_4$, and $S_4$ each independently represent a substituted or unsubstituted benzene ring or a substituted or unsubstituted six-membered nitrogen-containing heterocyclic ring;

in a case where three rings among the four rings of the ring A, the ring B, the ring C, and the ring D each represent a substituted or unsubstituted benzene ring, the remaining one ring represents a substituted or unsubstituted pyridine ring, a substituted or unsubstituted pyrazine ring, a substituted or unsubstituted pyrimidine ring, or a substituted or unsubstituted pyridazine ring;

in a case where two rings among the four rings of the ring A, the ring B, the ring C, and the ring D each represent a substituted or unsubstituted benzene ring, the remaining two rings each independently represent a substituted or unsubstituted pyridine ring, a substituted or unsubstituted pyrazine ring, a substituted or unsubstituted pyrimidine ring, or a substituted or unsubstituted pyridazine ring;

in a case where one ring among the four rings of the ring A, the ring B, the ring C, and the ring D represents a substituted or unsubstituted benzene ring, the remaining three rings each independently represent a substituted or unsubstituted pyridine ring, a substituted or unsubstituted pyrazine ring, a substituted or unsubstituted pyrimidine ring, or a substituted or unsubstituted pyridazine ring;

all the four rings of the ring A, the ring B, the ring C, and the ring D do not simultaneously represent a substituted or unsubstituted benzene ring;

all the four rings of the ring A, the ring B, the ring C, and the ring D do not simultaneously represent a substituted or unsubstituted six-membered nitrogen-containing heterocyclic ring; and the dye represented by the general formula (I) has at least one ionic hydrophilic group as a substituent, General formula (II)

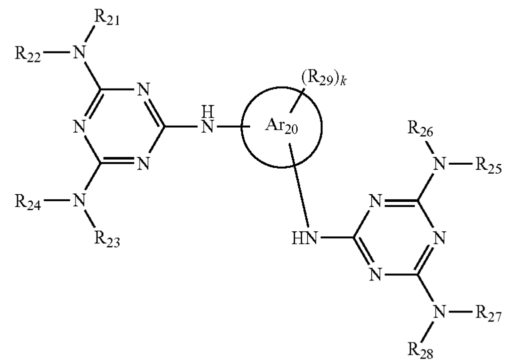

wherein, in the general formula (II), $Ar_{20}$ represents a benzene ring or a naphthalene ring; $R_{21}$ to $R_{28}$ each independently represent a hydrogen atom or a substituent; $R_{21}$ and $R_{22}$ may be linked to each other to form a ring, $R_{23}$ and $R_{24}$ may be linked to each other to form a ring; $R_{25}$ and $R_{26}$ may be linked to each other to form a ring; $R_{27}$ and $R_{28}$ may be linked to each other to form a ring; $R_{29}$ represents a substituent; in a case where $Ar_{20}$ represents a benzene ring, k represents an integer of 0 to 4; in a case where $Ar_{20}$ represents a naphthalene ring, k represents an integer of 0 to 6; in a case where a plurality of $R_{29}$'s are present, the plurality of $R_{29}$'s may be the same as or different from each other; in a case where a plurality of $R_{29}$'s are present, the plurality of $R_{29}$'s may be linked to each other to form a ring; and the compound represented by the general formula (II) has at least one hydrophilic group, (Cy-2)

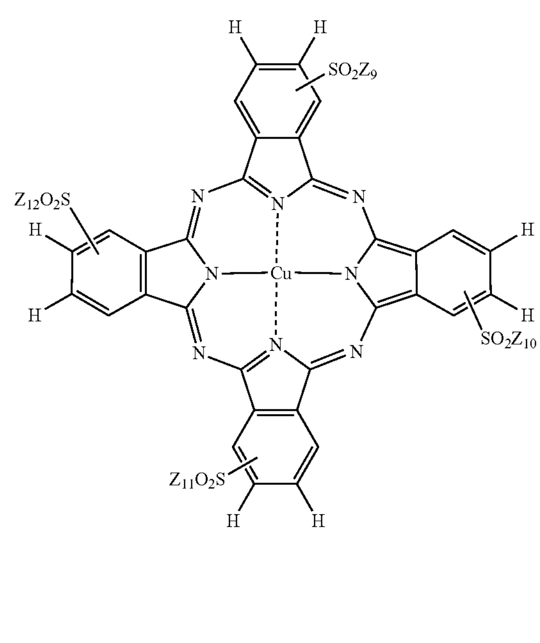

wherein, in the general formula (Cy-2), $Z_9$, $Z_{10}$, $Z_{11}$, and $Z_{12}$ each independently represent a substituted or unsubstituted alkyl group, a substituted or unsubstituted aryl group, or a substituted or unsubstituted heterocyclic group; and at least one of $Z_9$, $Z_{10}$, $Z_{11}$, or $Z_{12}$ has an ionic hydrophilic group as a substituent.

2. The dye ink composition according to claim 1, wherein at least one of the ring A, the ring B, the ring C, or the ring D in the dye represented by the general formula (I) has at least one group selected from the group consisting of —$SO_2$—Z, —$SO_3M$, and —$CO_2M$, wherein M represents a hydrogen atom or a counter cation, and Z represents a substituted or unsubstituted alkyl group, a substituted or unsubstituted aryl group, or a substituted or unsubstituted heterocyclic group.

3. The dye ink composition according to claim 2, wherein at least one of the ring A, the ring B, the ring C, or the ring D in the dye represented by the general formula (I) has —$SO_2$—Z.

4. The dye ink composition according to claim 3, wherein one to three of $P_1$, $W_1$, $P_2$, $W_2$, $P_3$, $W_3$, $P_4$, and $W_4$ in the general formula (I) have the —$SO_2$—Z as a substituent.

5. The dye ink composition according to claim 4, further comprising a toning agent represented by the following general formula (Cy-1):

(Cy-1)

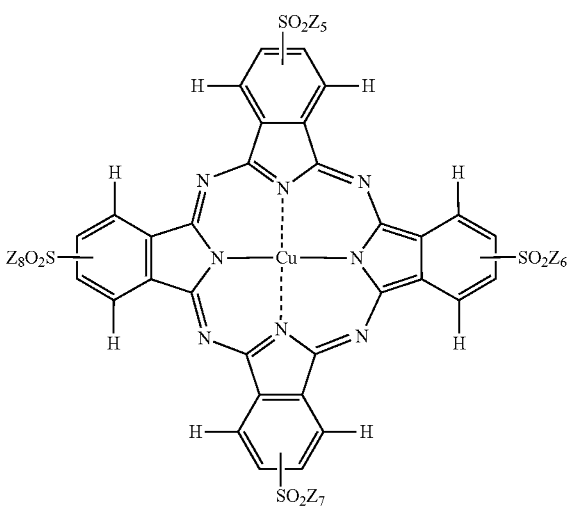

wherein, in the general formula (Cy-1), $Z_5$, $Z_6$, $Z_7$, and $Z_8$ each independently represent a substituted or unsubstituted alkyl group, a substituted or unsubstituted aryl group, or a substituted or unsubstituted heterocyclic group; and at least one of $Z_5$, $Z_6$, $Z_7$, or $Z_8$ has an ionic hydrophilic group as a substituent.

6. The dye ink composition according to claim 2, further comprising a toning agent represented by the following general formula (Cy-1):

(Cy-1)

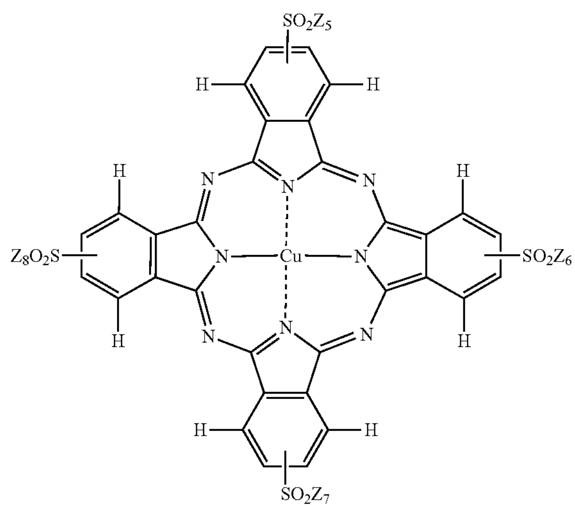

wherein, in the general formula (Cy-1), $Z_5$, $Z_6$, $Z_7$, and $Z_8$ each independently represent a substituted or unsubstituted alkyl group, a substituted or unsubstituted aryl group, or a substituted or unsubstituted heterocyclic group; and at least one of $Z_5$, $Z_6$, $Z_7$, or $Z_8$ has an ionic hydrophilic group as a substituent.

7. The dye ink composition according to claim 2, further comprising a toning agent represented by any of the following general formulae (Cy-3) to (Cy-6):

(Cy-3)

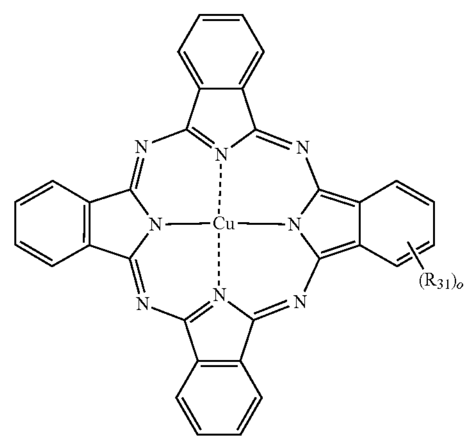

(Cy-4)

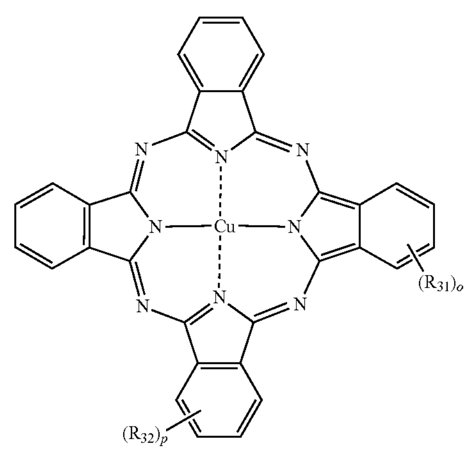

-continued (Cy-5)

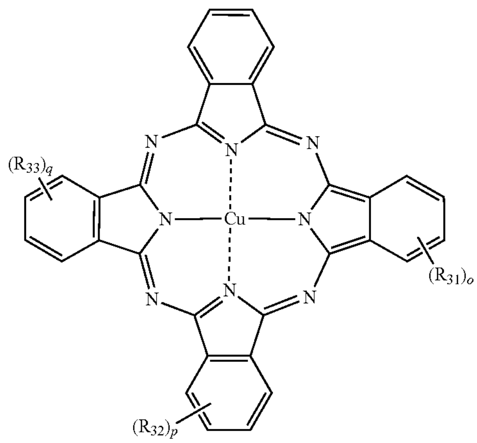

(Cy-6)

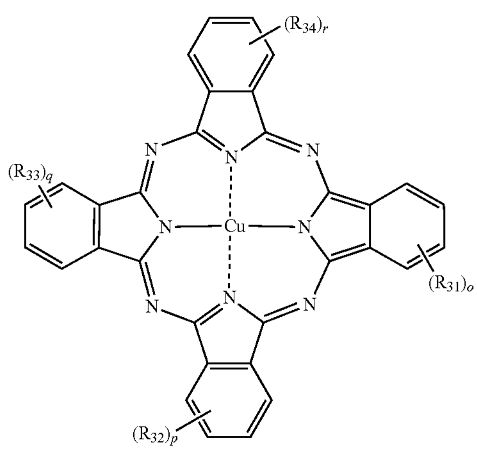

wherein, in the general formulae (Cy-3) to (Cy-6), $R_{31}$, $R_{32}$, $R_{33}$, and $R_{34}$ each independently represent a substituted or unsubstituted sulfamoyl group, a substituted or unsubstituted carbamoyl group, a sulfo group, or a carboxy group; in a case where a plurality of $R_{31}$'s are present, the plurality of $R_{32}$'s may be the same or different; in a case where a plurality of $R_{32}$'s are present, the plurality of $R_{32}$'s may be the same as or different from each other; in a case where a plurality of $R_{33}$'s are present, the plurality of $R_{33}$'s may be the same as or different from each other: in a case where a plurality of $R_{34}$'s are present, the plurality of $R_{34}$'s may be the same as or different from each other; and o, p, q, and r each independently represent an integer of 1 to 4.

8. The dye ink composition according to claim 3, further comprising a toning agent represented by the following general formula (Cy-1):

(Cy-1)

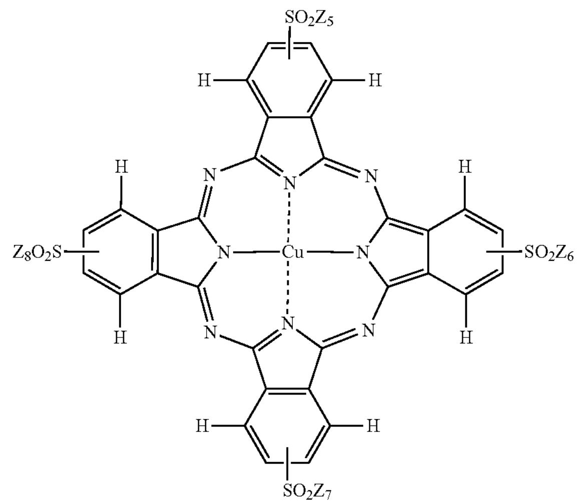

wherein, in the general formula (Cy-1), $Z_5$, $Z_6$, $Z_7$, and $Z_8$ each independently represent a substituted or unsubstituted alkyl group, a substituted or unsubstituted aryl group, or a substituted or unsubstituted heterocyclic group; and at least one of $Z_5$, $Z_6$, $Z_7$, or $Z_8$ has an ionic hydrophilic group as a substituent.

9. The dye ink composition according to claim 3, further comprising a toning agent represented by any of the following general formulae (Cy-3) to (Cy-6):

(Cy-3)

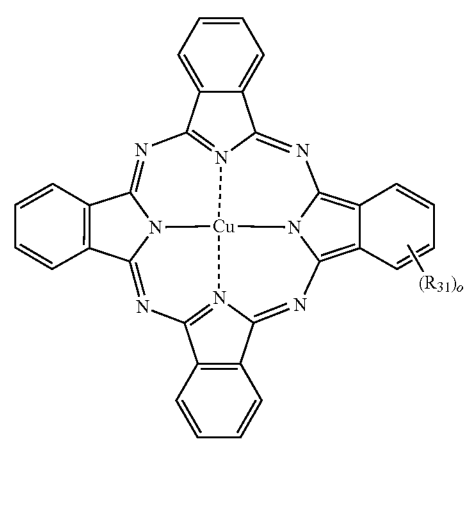

-continued (Cy-4)

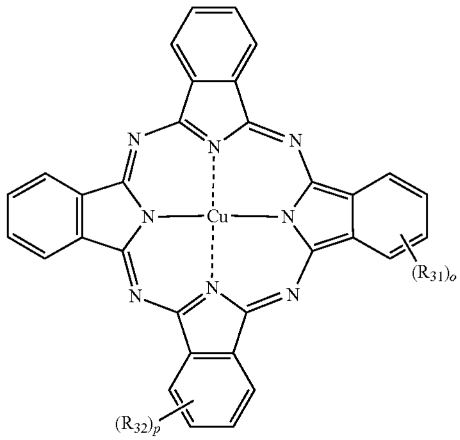

(Cy-5)

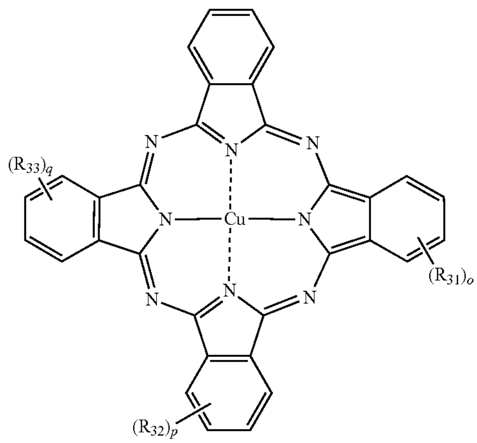

(Cy-6)

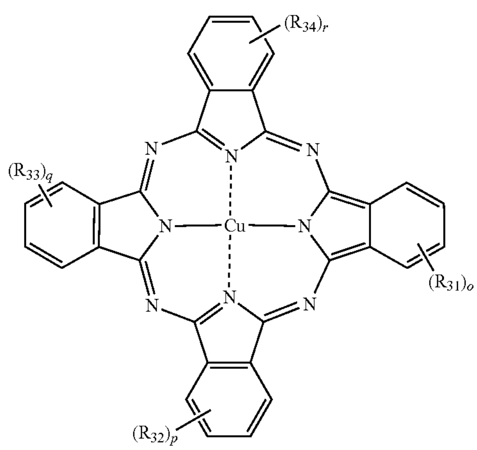

wherein, in the general formulae (Cy-3) to (Cy-6), $R_{31}$, $R_{32}$, $R_{33}$, and $R_{34}$ each independently represent a substituted or unsubstituted sulfamoyl group, a substituted or unsubstituted carbamoyl group, a sulfo group, or a carboxy group; in a case where a plurality of $R_{31}$'s are present, the plurality of $R_{31}$'s may be the same or different; in a case where a plurality of $R_{32}$'s are present, the plurality of $R_{32}$'s may be the same as or different from each other; in a case where a plurality of $R_{33}$'s are present, the plurality of $R_{33}$'s may be the same as or different from each other: in a case where a plurality of $R_{34}$'s are present, the plurality of $R_{34}$'s may be the same as or different from each other; and o, p, q, and r each independently represent an integer of 1 to 4.

10. The dye ink composition according to claim 4, further comprising a toning agent represented by any of the following general formulae (Cy-3) to (Cy-6):

(Cy-3)

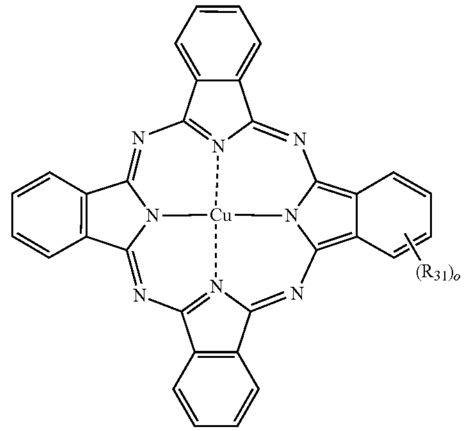

(Cy-4)

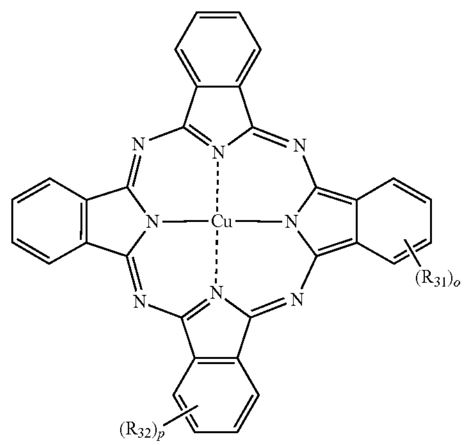

(Cy-5)

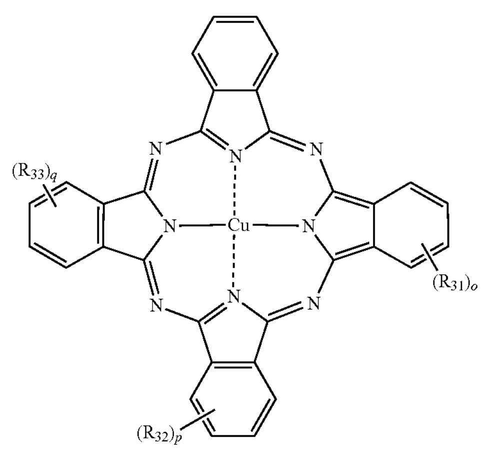

-continued (Cy-6)

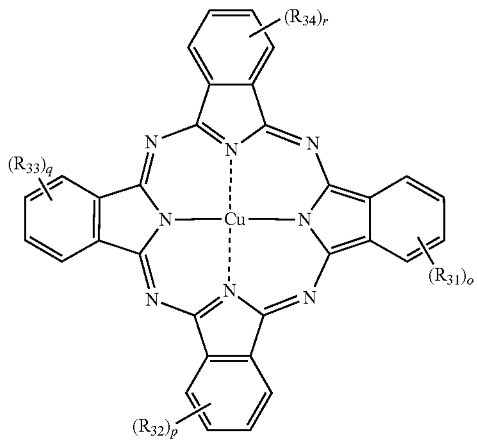

wherein, in the general formulae (Cy-3) to (Cy-6), $R_{31}$, $R_{32}$, $R_{33}$, and $R_{34}$ each independently represent a substituted or unsubstituted sulfamoyl group, a substituted or unsubstituted carbamoyl group, a sulfo group, or a carboxy group; in a case where a plurality of $R_{31}$'s are present, the plurality of $R_{31}$'s may be the same or different; in a case where a plurality of $R_{32}$'s are present, the plurality of $R_{32}$'s may be the same as or different from each other; in a case where a plurality of $R_{33}$'s are present, the plurality of $R_{33}$'s may be the same as or different from each other: in a case where a plurality of $R_{34}$'s are present, the plurality of $R_{34}$'s may be the same as or different from each other; and o, p, q, and r each independently represent an integer of 1 to 4.

11. The dye ink composition according to claim 1, further comprising a toning agent represented by the following general formula (Cy-1):

(Cy-1)

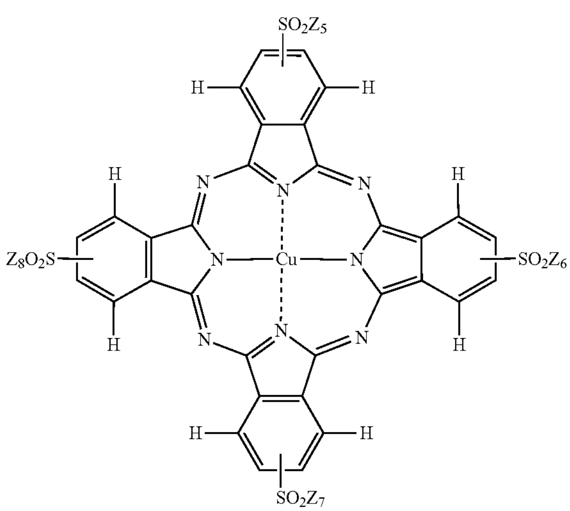

wherein, in the general formula (Cy-1), $Z_5$, $Z_6$, $Z_7$, and $Z_8$ each independently represent a substituted or unsubstituted alkyl group, a substituted or unsubstituted aryl group, or a substituted or unsubstituted heterocyclic group; and at least one of $Z_5$, $Z_6$, $Z_7$, or $Z_8$ has an ionic hydrophilic group as a substituent.

12. The dye ink composition according to claim 1, further comprising a toning agent represented by any of the following general formulae (Cy-3) to (Cy-6):

(Cy-3)

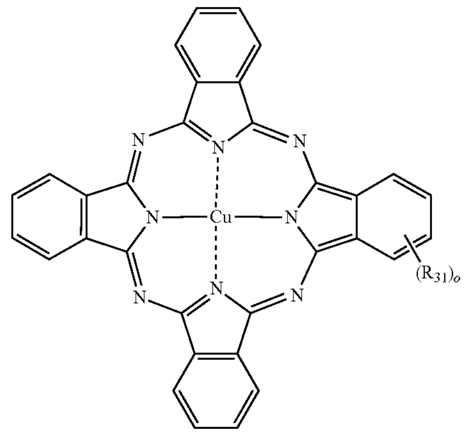

(Cy-4)

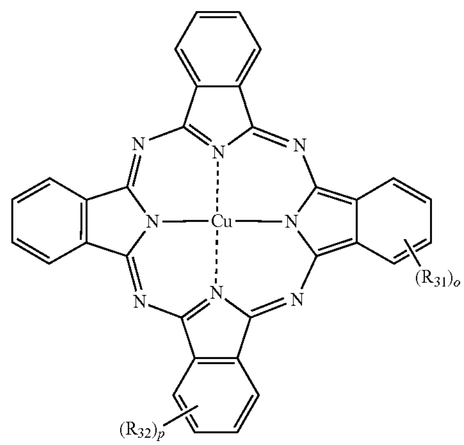

(Cy-5)

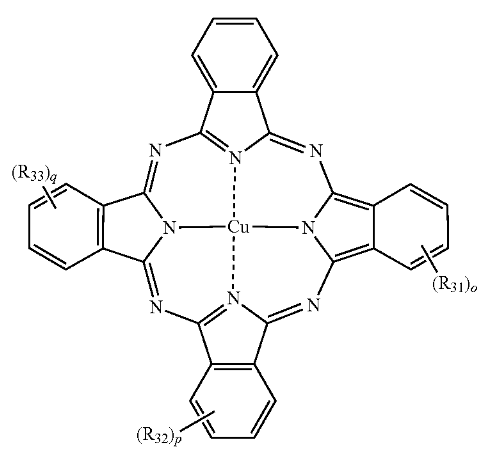

-continued (Cy-6)

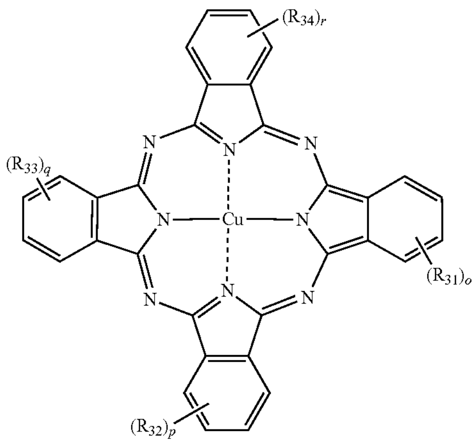

wherein, in the general formulae (Cy-3) to (Cy-6), $R_{31}$, $R_{32}$, $R_{33}$, and $R_{34}$ each independently represent a substituted or unsubstituted sulfamoyl group, a substituted or unsubstituted carbamoyl group, a sulfo group, or a carboxy group; in a case where a plurality of $R_{31}$'s are present, the plurality of $R_{31}$'s may be the same as or different from each other; in a case where a plurality of $R_{32}$'s are present, the plurality of $R_{32}$'s may be the same as or different from each other; in a case where a plurality of $R_{33}$'s are present, the plurality of $R_{33}$'s may be the same as or different from each other; in a case where a plurality of $R_{34}$'s are present, the plurality of $R_{34}$'s may be the same as or different from each other; and o, p, q, and r each independently represent an integer of 1 to 4.

13. The dye ink composition according to claim 1, wherein the compound represented by the general formula (II) has at least one ionic hydrophilic group.

14. The dye ink composition according to claim 1, wherein at least any one of $R_{21}$ to $R_{29}$ in the general formula (II) has an ionic hydrophilic group.

15. The dye ink composition according to claim 1, wherein a content of the dye represented by the general formula (I) is 3.0% to 5.0% by mass with respect to a total mass of the dye ink composition, and the dye ink composition is a composition for a cyan dye ink.

16. The dye ink composition according to claim 1, wherein a content of the compound represented by the general formula (II) is 0.5% to 2.0% by mass with respect to a total mass of the dye ink composition, and the dye ink composition is a composition for a cyan dye ink.

17. The dye ink composition according to claim 1, further comprising a chelating agent, wherein a content of the chelating agent is 0.001% to 0.3% by mass with respect to a total mass of the dye ink composition.

18. The dye ink composition according to claim 1, further comprising a preservative.

19. A dye ink for ink jet recording, the dye ink comprising the dye ink composition according to claim 1.

20. An ink jet recording method comprising using the dye ink for ink jet recording according to claim 19.

* * * * *